US012721288B2

(12) United States Patent
Ramsey et al.

(10) Patent No.: US 12,721,288 B2
(45) Date of Patent: Sep. 1, 2026

(54) IRRIGATION CONTROL SYSTEMS AND USER INTERFACES

(71) Applicant: Rain Bird Corporation, Azusa, CA (US)

(72) Inventors: Bret A. Ramsey, Auburn, CA (US); Patrick V. Loper, Oro Valley, AZ (US); Paul G. Tobey, Tucson, AZ (US); Jeremy Meyers, Tucson, AZ (US); José Orlando Miranda Álvarez, Hermosillo (MX)

(73) Assignee: Rain Bird Corporation, Azusa, CA (US)

( * ) Notice: Subject to any disclaimer, the term of this patent is extended or adjusted under 35 U.S.C. 154(b) by 0 days.

(21) Appl. No.: 18/123,979

(22) Filed: Mar. 20, 2023

(65) Prior Publication Data

US 2023/0315273 A1 Oct. 5, 2023

Related U.S. Application Data

(60) Provisional application No. 63/428,032, filed on Nov. 25, 2022, provisional application No. 63/399,611, (Continued)

(51) Int. Cl.
*A01G 25/16* (2006.01)
*G05B 19/042* (2006.01)
(Continued)

(52) U.S. Cl.
CPC .......... *A01G 25/165* (2013.01); *A01G 25/16* (2013.01); *G05B 19/042* (2013.01); (Continued)

(58) Field of Classification Search
CPC ............... G06F 3/04847; G06F 3/0482; G06F 3/04845; A01G 25/16; G05B 19/042; G05B 2219/2625
See application file for complete search history.

(56) References Cited

U.S. PATENT DOCUMENTS 7,010,394 B1 3/2006 Runge
7,058,478 B2 6/2006 Alexanian
(Continued)

OTHER PUBLICATIONS

Screen captures from YouTube video clip entitled “Running stations backwards Good,” 23 pages, uploaded on Mar. 27, 2019 by user “Robert Munro”. Retrieved from Internet: <https://www.youtube.com/watch?v=bGNDItnYpWk> (Year: 2019).*
(Continued)

*Primary Examiner* — John T Repsher, III
(74) *Attorney, Agent, or Firm* — Fitch, Even, Tabin & Flannery LLP

(57) ABSTRACT

Systems, user interfaces, and methods related to irrigation control systems are provided herein. In some embodiments, an irrigation control system includes an irrigation management application which, when executed by an electronic device, causes a user interface to be displayed to a user. The user interface includes features that permit a user to do one or more of configure, monitor, program, control, adjust various components and/or operations of the irrigation management system.

27 Claims, 55 Drawing Sheets

Related U.S. Application Data filed on Aug. 19, 2022, provisional application No. 63/321,633, filed on Mar. 18, 2022.

(51) Int. Cl.
*G05B 19/048* (2006.01)
*G06F 3/0482* (2013.01)
*G06F 3/04845* (2022.01)
*G06F 3/04847* (2022.01)

(52) U.S. Cl.
CPC ..... *G05B 19/0426* (2013.01); *G05B 19/0428* (2013.01); *G05B 19/048* (2013.01); *G06F 3/0482* (2013.01); *G06F 3/04845* (2013.01); *G06F 3/04847* (2013.01); *G05B 2219/2625* (2013.01)

(56) References Cited

U.S. PATENT DOCUMENTS 7,133,749 B2 11/2006 Goldberg
7,203,576 B1 * 4/2007 Wilson ................ A01G 25/165 405/52
7,216,020 B2 5/2007 Marian
7,266,428 B2 9/2007 Alexanian
7,305,280 B2 12/2007 Marian
7,337,042 B2 2/2008 Marian
7,363,113 B2 4/2008 Runge
7,403,840 B2 7/2008 Moore
7,412,303 B1 8/2008 Porter
7,430,458 B2 9/2008 Dansereau
7,574,284 B2 8/2009 Goldberg
7,584,023 B1 9/2009 Palmer
7,590,471 B2 9/2009 Jacobsen
7,596,429 B2 9/2009 Cardinal
7,631,813 B1 12/2009 Lichte
7,844,368 B2 11/2010 Alexanian
7,853,363 B1 12/2010 Porter
7,877,168 B1 1/2011 Porter
7,899,580 B2 3/2011 Cardinal
7,912,588 B2 3/2011 Runge
7,917,249 B2 3/2011 Jacobsen
7,930,069 B2 4/2011 Savelle
7,962,244 B2 6/2011 Alexanian
7,962,245 B2 6/2011 Runge
8,024,074 B2 9/2011 Stelford
8,028,470 B2 10/2011 Anderson
8,035,403 B1 10/2011 Campbell
8,219,935 B2 7/2012 Hunts
8,285,421 B2 10/2012 Vander Griend
8,285,460 B2 10/2012 Hoffman
8,301,309 B1 10/2012 Woytoxitz
8,302,881 B1 11/2012 Campbell
8,308,077 B1 11/2012 Campbell
8,311,786 B2 11/2012 Kisch
8,322,072 B2 12/2012 Anderson
8,354,852 B1 1/2013 Campbell
8,359,142 B2 1/2013 Hoffman
8,366,017 B1 2/2013 Campbell
8,368,529 B1 2/2013 Campbell
8,374,553 B1 2/2013 Campbell
8,396,604 B2 3/2013 Imes
8,401,705 B2 3/2013 Alexanian
8,444,063 B2 5/2013 Lichte
8,494,683 B2 7/2013 Piper
8,498,749 B2 7/2013 Imes
8,504,180 B2 8/2013 Imes
8,538,592 B2 9/2013 Alexanian
8,548,632 B1 10/2013 Porter
8,565,927 B1 10/2013 Campbell
8,600,564 B2 12/2013 Imes
8,600,569 B2 12/2013 Woytowitz
8,606,415 B1 12/2013 Woytowitz
8,620,480 B2 12/2013 Alexanian
8,636,229 B1 1/2014 Clark
8,636,230 B1 1/2014 Clark
8,650,069 B2 2/2014 Mason, Sr.
8,660,705 B2 2/2014 Woytowitz
8,682,493 B1 3/2014 Campbell
8,700,222 B1 4/2014 Woytowitz
8,733,155 B2 5/2014 Hill
8,738,189 B2 5/2014 Alexanian
8,739,830 B2 6/2014 Bradbury
8,746,591 B2 6/2014 Lichte
8,751,052 B1 6/2014 Campbell
8,793,024 B1 7/2014 Woytowitz
8,839,135 B2 9/2014 Vander Griend
8,843,855 B2 9/2014 Andrew
8,849,523 B1 9/2014 Chan
8,862,275 B2 10/2014 Runge
8,862,277 B1 10/2014 Campbell
8,863,012 B2 10/2014 Nara
8,874,275 B2 10/2014 Alexanian
8,924,031 B1 12/2014 Evett
8,924,032 B2 12/2014 Woytowitz
8,948,921 B2 2/2015 Halahan
8,981,946 B2 3/2015 Runge
9,049,821 B1 6/2015 Hanna
9,095,102 B2 8/2015 Masters
9,107,354 B2 8/2015 Martin
9,131,642 B2 9/2015 Groeneveld
9,149,013 B2 10/2015 Andrews
9,192,110 B2 11/2015 Standerfer
9,200,985 B2 12/2015 Rice
9,242,255 B2 1/2016 Lichte
9,265,192 B2 2/2016 Chan
9,297,839 B2 3/2016 Romney
9,301,460 B2 4/2016 Runge
9,301,461 B2 4/2016 Woytowitz
9,307,706 B2 4/2016 Larsen
9,326,462 B2 5/2016 Runge
9,360,874 B2 6/2016 Imes
9,374,950 B2 6/2016 Upadhyaya
9,414,552 B2 8/2016 Halahan
9,504,213 B2 11/2016 Levine
9,527,102 B2 12/2016 Hill
9,565,810 B2 2/2017 Eng
9,594,366 B2 3/2017 Klein
9,623,431 B2 4/2017 Lichte
9,629,313 B1 4/2017 Grossman
9,633,536 B1 4/2017 Makarovich
9,667,710 B2 5/2017 Wilbur
9,684,312 B1 6/2017 Eyring
9,703,275 B2 7/2017 Ersavas
9,717,191 B2 8/2017 Endrizzi
9,756,797 B2 9/2017 Sarver
9,763,396 B2 9/2017 Endrizzi
9,781,887 B2 10/2017 Woytowitz
9,792,557 B2 10/2017 Mathur
9,813,512 B2 11/2017 Wilbur
9,817,380 B2 11/2017 Bangalore
9,829,869 B2 11/2017 Ersavas
9,829,871 B1 11/2017 Goodman
9,872,445 B2 1/2018 Cline
9,880,537 B2 1/2018 Mewes
9,886,016 B2 2/2018 Bermudez Rodriguez
9,889,458 B2 2/2018 Lichte
9,901,042 B2 2/2018 Endrizzi
9,907,238 B2 3/2018 Endrizzi
9,912,732 B2 3/2018 Romney
9,924,644 B2 3/2018 Endrizzi
9,939,297 B1 4/2018 Eyring
9,943,046 B2 4/2018 Bermudez Rodriguez
9,945,832 B2 4/2018 Trobat
9,949,450 B2 4/2018 Richings, Sr.
9,959,507 B2 5/2018 Mathur
9,977,440 B2 5/2018 Imes
9,986,313 B2 5/2018 Schwarzkopf
10,004,184 B2 6/2018 Bryant
10,028,425 B2 7/2018 Canyon
10,028,426 B2 7/2018 Schildroth
10,028,451 B2 7/2018 Rowan
10,028,454 B2 7/2018 Williams
10,034,421 B2 7/2018 Doughty

(56) References Cited

U.S. PATENT DOCUMENTS 10,085,392 B2 10/2018 Neesen
10,101,753 B1 10/2018 Levine
10,123,493 B2 11/2018 Runge
10,124,358 B1 11/2018 Graham
10,139,797 B2 11/2018 Mewes
10,166,565 B2 1/2019 Lemkin
10,171,564 B2 1/2019 Wilbur
10,186,120 B2 1/2019 Farrell
10,188,049 B1 1/2019 Emanuel
10,194,598 B2 2/2019 Bauman
10,225,997 B1 3/2019 Levine
10,228,711 B2 3/2019 Woytowitz
10,231,391 B2 3/2019 Standerfer
10,234,876 B2 3/2019 Grossman
10,241,488 B2 3/2019 Bermudez Rodriguez
10,271,117 B2 4/2019 Lankford
10,274,969 B2 4/2019 Klein
10,278,342 B2 5/2019 Hattar
10,285,343 B2 5/2019 Whalley
10,299,447 B2 5/2019 Bermudez Rodriguez
10,306,844 B1 6/2019 Levine
10,356,991 B2 7/2019 Bryant
10,368,506 B2 8/2019 Neesen
10,371,814 B2 8/2019 Chan
10,387,977 B2 8/2019 Avey
10,394,206 B2 8/2019 Kantor
10,397,731 B2 8/2019 Klein
10,402,835 B2 9/2019 Benkert
10,412,882 B2 9/2019 Koch
10,433,502 B2 10/2019 Moritz
10,475,212 B2 11/2019 Sauder
10,485,190 B2 11/2019 Whalley
10,512,226 B2 12/2019 Lankford
10,512,227 B2 12/2019 Rainone
10,534,378 B1 1/2020 Eyring
10,555,462 B2 2/2020 Eng
10,561,874 B2 2/2020 Williams
10,569,284 B2 2/2020 Mareli
10,573,165 B2 2/2020 Schwarzkopf
10,602,682 B1 3/2020 Wardle
10,613,497 B1 4/2020 Goodman
10,613,556 B2 4/2020 Imes
10,625,288 B2 4/2020 Grossman
10,631,474 B2 4/2020 Guy
10,631,476 B2 4/2020 Bauman
10,631,477 B2 4/2020 Larue
10,638,675 B2 5/2020 Runge
10,654,061 B2 5/2020 Lichte
10,660,279 B2 5/2020 Larsen
10,667,456 B2 6/2020 Ethington
10,699,222 B2 6/2020 Hovis
10,713,819 B2 7/2020 Sauder
10,721,880 B2 7/2020 Guy
10,729,059 B2 8/2020 Canyon
10,743,482 B2 8/2020 Standerfer
10,743,483 B1 8/2020 Melrose
10,743,484 B2 8/2020 Klein
10,755,367 B2 8/2020 Bones
10,785,907 B2 9/2020 Doughty
10,791,681 B2 10/2020 Rowan
10,827,692 B2 11/2020 Ricketts
10,832,359 B2 11/2020 Avey
10,890,677 B2 1/2021 Larue
10,893,650 B1 1/2021 Sims
10,897,860 B2 1/2021 Ferras
10,918,030 B2 2/2021 Woytowitz
10,932,423 B2 3/2021 Klein
10,932,424 B2 3/2021 Larsen
10,936,871 B2 3/2021 Tran
10,939,227 B2 3/2021 Klein
10,969,798 B2 4/2021 Wardle
11,026,376 B2 6/2021 Mewes
11,061,375 B2 7/2021 Masters
11,069,005 B2 7/2021 Ethington
11,080,798 B2 8/2021 Ethington
11,089,745 B2 8/2021 Ben-Ner
11,112,764 B2 9/2021 Hickenlooper
11,113,649 B2 9/2021 Ethington
11,116,153 B1 9/2021 Sims
11,123,588 B2 9/2021 Williams
11,150,672 B2 10/2021 Klein
11,160,221 B2 11/2021 Melrose
11,163,274 B2 11/2021 Ersavas
11,178,829 B2 11/2021 Cline
11,182,931 B2 11/2021 Sauder
11,185,024 B2 11/2021 Larsen
11,191,227 B2 12/2021 Ebert
11,195,015 B2 12/2021 Tran
11,195,109 B2 12/2021 Mewes
11,210,933 B2 12/2021 Lafian
11,229,168 B2 1/2022 Woytowitz
11,240,976 B2 2/2022 Larsen
11,277,714 B2 3/2022 Griggs
11,281,240 B1 3/2022 Eyring
11,291,172 B2 4/2022 Beeri
11,341,591 B2 5/2022 Avey
11,343,983 B2 5/2022 Ferras
11,382,286 B2 7/2022 Anderson
11,399,475 B2 8/2022 Eng
11,406,071 B2 8/2022 Rowan
11,429,071 B2 8/2022 Larue
11,432,483 B2 9/2022 Ricketts
11,432,485 B2 9/2022 Larsen
11,455,760 B2 9/2022 Sangireddy
11,457,575 B1 10/2022 Sims
11,497,179 B2 11/2022 Lafian
11,510,373 B2 11/2022 Blejer
11,516,976 B2 12/2022 Sun
11,521,381 B2 12/2022 Tran
11,523,571 B2 12/2022 Lankford
11,538,317 B1 * 12/2022 Shahamat ........ G08B 13/19684
11,576,012 B2 2/2023 Griggs
11,625,798 B2 4/2023 Avey
11,631,040 B2 4/2023 Ruff
11,684,030 B2 6/2023 Larsen
11,738,361 B2 8/2023 Loper
11,771,023 B1 10/2023 Sims
11,771,024 B2 10/2023 Woytowitz
11,785,877 B2 10/2023 Lewis
11,785,879 B2 10/2023 Ethington
11,793,108 B2 10/2023 Takeda
11,798,203 B2 10/2023 Sauder
11,847,708 B2 12/2023 Ethington
11,893,648 B2 2/2024 Ethington
11,941,709 B2 3/2024 Ethington
12,029,173 B2 7/2024 Woytowitz
12,097,516 B2 9/2024 Loper
12,099,516 B2 9/2024 Pham
12,111,628 B2 10/2024 Hickenlooper
12,171,171 B1 12/2024 Sims
12,211,109 B2 1/2025 Bogdan
12,211,119 B2 1/2025 Monday
12,216,096 B1 2/2025 Jeske
12,324,381 B2 6/2025 Larsen
12,346,079 B2 7/2025 Woytowitz
2004/0089346 A1 5/2004 Sutardja
2011/0049260 A1 * 3/2011 Palmer .................. A01G 25/16
239/63
2012/0041606 A1 2/2012 Standerfer
2013/0207771 A1 8/2013 Ersavas
2014/0039696 A1 * 2/2014 Andrews ................ A01G 25/16
700/284
2014/0343737 A1 11/2014 Nguyen
2016/0057949 A1 * 3/2016 Williams ............ A01G 25/167
700/275
2017/0041407 A1 2/2017 Wilbur
2017/0345282 A1 11/2017 Farrell
2018/0014480 A1 * 1/2018 Montgomery ....... G05B 19/042
2018/0084742 A1 * 3/2018 Larsen ................ G05B 19/042
2020/0163293 A1 5/2020 Charling
2020/0246823 A1 8/2020 Grossman
2020/0267915 A1 * 8/2020 Ferras ................. A01G 25/167
2020/0305367 A1 * 10/2020 Blejer ............... G06Q 10/0631
2020/0327463 A1 10/2020 Hovis

(56) References Cited

U.S. PATENT DOCUMENTS

2020/0337256 A1* 10/2020 Larsen ................ A01G 25/167
2020/0344961 A1 11/2020 Guy
2020/0352120 A1 11/2020 Meron
2020/0359550 A1 11/2020 Tran
2021/0007299 A1 1/2021 Standerfer
2021/0059136 A1 3/2021 Hill
2021/0076562 A1 3/2021 Doughty
2021/0176931 A1 6/2021 Larsen
2021/0185472 A1 6/2021 Klein
2021/0289723 A1 9/2021 Mewes
2021/0373583 A1 12/2021 Klein
2021/0402237 A1 12/2021 Williams
2022/0026865 A1 1/2022 Ersavas
2022/0061237 A1 3/2022 Kah
2022/0071110 A1 3/2022 Larsen
2022/0110275 A1 4/2022 Cline
2022/0132757 A1 5/2022 Woytowitz
2022/0253957 A1 8/2022 Avey
2023/0036580 A1* 2/2023 Sabti ......................... B05B 7/32
2023/0214788 A1 7/2023 Ries
2023/0292684 A1 9/2023 Ramsey
2023/0320295 A1 10/2023 Ramsey
2023/0397552 A1 12/2023 Woytowitz
2023/0403999 A1 12/2023 Cline
2023/0404000 A1 12/2023 Ramsey
2023/0408994 A1 12/2023 Ramsey
2024/0008390 A1 1/2024 Aldor-Noiman
2024/0169453 A1 5/2024 Ethington
2024/0176467 A1 5/2024 Ramsey
2024/0260521 A1 8/2024 Huffman
2024/0295954 A1 9/2024 Stoller
2024/0331062 A1 10/2024 Barron
2024/0389518 A1 11/2024 Dimmic
2025/0010321 A1 1/2025 Patrick
2025/0063973 A1 2/2025 Bassett
2025/0124526 A1 4/2025 Bogdan
2025/0139849 A1 5/2025 Monday
2025/0160235 A1 5/2025 Bassett
2025/0160236 A1 5/2025 Bassett
2025/0217006 A1 7/2025 Ramsey

OTHER PUBLICATIONS

Toro; “Lynx Map Creation Process”; <https://www.youtube.com/watch?v=9qxiGPGOefE>; Jul. 11, 2016; pp. 1-5.
Toro; “Lynx Map”; <https://www.youtube.com/watch?v=zzyB4vVk89c>; Jul. 11, 2016; pp. 1-9.
U.S. Appl. No. 18/123,975, filed Mar. 20, 2023, Bret A. Ramsey.
U.S. Appl. No. 18/123,976, filed Mar. 20, 2023, Bret A. Ramsey.
U.S. Appl. No. 18/123,980, filed Mar. 20, 2023, Bret A. Ramsey.
U.S. Appl. No. 18/123,981, filed Mar. 20, 2023, Bret A. Ramsey.
OtOLawn; “Automatic Lawn Treatment & Smart Sprinkler System | OtO Lawn—OtO Inc.”; <https://otolawn.com/>; available at least as early as Aug. 2021; pp. 1-11.
OtOLawn; “OtO Lawn Quick Start Guide”; <https://cdn.shopify.com/s/files/1/0300/2780/8908/files/quick_start_guide_aug20.pdf?v=1628191757>; Aug. 2021; pp. 1-2.
U.S. Appl. No. 18/513,371, filed Mar. 20, 2023, Bret A. Ramsey.
USPTO; U.S. Appl. No. 18/123,975; Non-Final Rejection mailed Jun. 2, 2025; (pp. 1-20).
USPTO; U.S. Appl. No. 18/123,980; Non-Final Rejection mailed Jun. 3, 2025; (pp. 1-25).
USPTO; U.S. Appl. No. 18/123,976; Non-Final Rejection mailed Jun. 17, 2025; (pp. 1-24).
USPTO; U.S. Appl. No. 18/123,981; Non-Final Rejection mailed Jun. 20, 2025; (pp. 1-27).
Rain Bird; “Central Control Operation Manual for Cirrus”; available at least as of Jan. 1, 2022; 197 pages.
Rain Bird; “Central Control Operation Manual V3: Stratus™ II, Nimbus™ II, and Cirrus™ Systems”; available at least as of Jan. 1, 2022; 185 pages.
Rain Bird; “Central Control Operator’s Manual Addendum: Stratus™ LT, Stratus™ II, Nimbus™ II, and Cirrus™ Systems”; available at least as of Jan. 1, 2022; 40 pages.
Rain Bird; “Central Control Operator’s Manual: Stratus™ LT, Stratus™ II, Nimbus™ II, and Cirrus™ Systems”; available at least as of Jan. 1, 2022; 53 pages.
Rain Bird; “Central Control Systems—Take the Time to Compare”; available at least as early as Jun. 7, 2004; <http://www.rainbird.com/pdf/golf/bro_CentralControlSystems_D31772A.pdf>; 2 pages.
Rain Bird; “Cirrus Family Central Control Software Operator’s Manual, Version 8”; available at least as of Jan. 1, 2022, 47 pages.
Rain Bird; “Cirrus™ Central Control System—The Golf Industry’s Only Full-Featured Central Control System. Now with Rain Watch”; available at least as early as Jun. 7, 2004; <http://www.rainbird.com/pdf/golf/ts_Cirrus_D31674D.pdf>; 8 pages.
Rain Bird; “Maxi Nimbus Operator’s Manual”; available at least as of Jan. 1, 2022; 184 pages.
Rain Bird; “Rain Bird—Golf: Products: Cirrus Central Control Systems”; <http://www.rainbird.com/golf/products/centralcontrol/cirrus.htm>; Jun. 16, 2004; pp. 1-3; retrieved from Internet Archive Wayback Machine <https://web.archive.org/web/20040616192648/http://www.rainbird.com/golf/products/centralcontrol/cirrus.htm> on Aug. 23, 2020.
Rain Bird; “Rain Bird Nimbus II Central Control Software, version 8”; available at least as of Jan. 1, 2022; 13 pages.
USPTO; U.S. Appl. No. 18/123,975; Final Rejection mailed Oct. 21, 2025; (pp. 1-21).
USPTO; U.S. Appl. No. 18/123,976; Final Rejection mailed Oct. 21, 2025; (pp. 1-25).
USPTO; U.S. Appl. No. 18/123,980; Final Rejection mailed Oct. 27, 2025; (pp. 1-27).
USPTO; U.S. Appl. No. 18/123,981; Final Rejection mailed Oct. 27, 2025; (pp. 1-29).
USPTO; U.S. Appl. No. 18/123,981; Non-Final Rejection mailed Jun. 30, 2025; (pp. 1-26).
USPTO; U.S. Appl. No. 18/513,371; Non-Final Rejection mailed Aug. 26, 2025; (pp. 1-22).

* cited by examiner

Figure 1A:
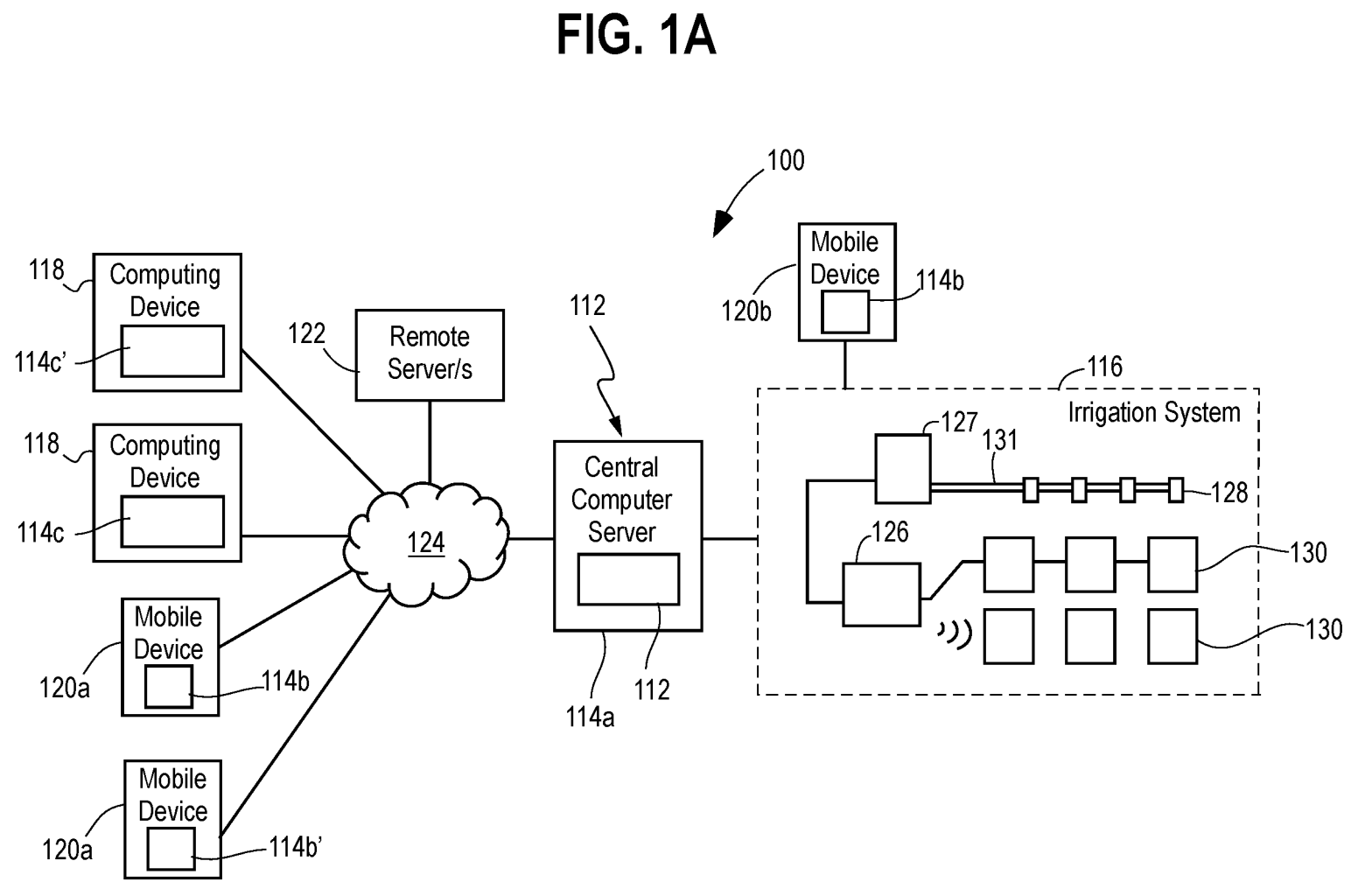

Irrigation System
116
128
130
130
127
131
126
Mobile Device
114b
120b
Central Computer Server
112
112
114a
Remote Server/s
122
124
Computing Device
118
114c'
Computing Device
118
114c
Mobile Device
114b
120a
Mobile Device
114b'
120a 100
Irrigation System
116
128
130
130
127
131
126
Mobile Device
114b
120b
Mobile Device
114b
120c
124
Central Server
112a
114a
Cloud Server
112b
114d
Remote Server/s
122
Computing Device
118
114c
Mobile Device
114b
120a
Mobile Device
114b'
120a
Computing Device
118
114c'
Mobile Device
114b
120a
Mobile Device
114b'
120a Server
Memory
Control Circuit
Network Interface
UI Interface
Power Supply
244
240
250
252
254
253
246
248

FIG. 4

500
ICM DIAGNOSTICS
Test Course
ICM Voltage
By Hole/Area
Holes
Areas
RUN TEST
CANCEL ALL
Tested: 17/17
16 PASSED
1 FAILED
Result Vol...
Location
Interface
Wirep...
Hole
Area
Sub-Area
0
3G5
IC Interface
1
3
Greens
Greens-1
514

502
505
3G4
3G1
The station report a low voltage in latest diagnostic test
3G5
514
520

Figure 6B:
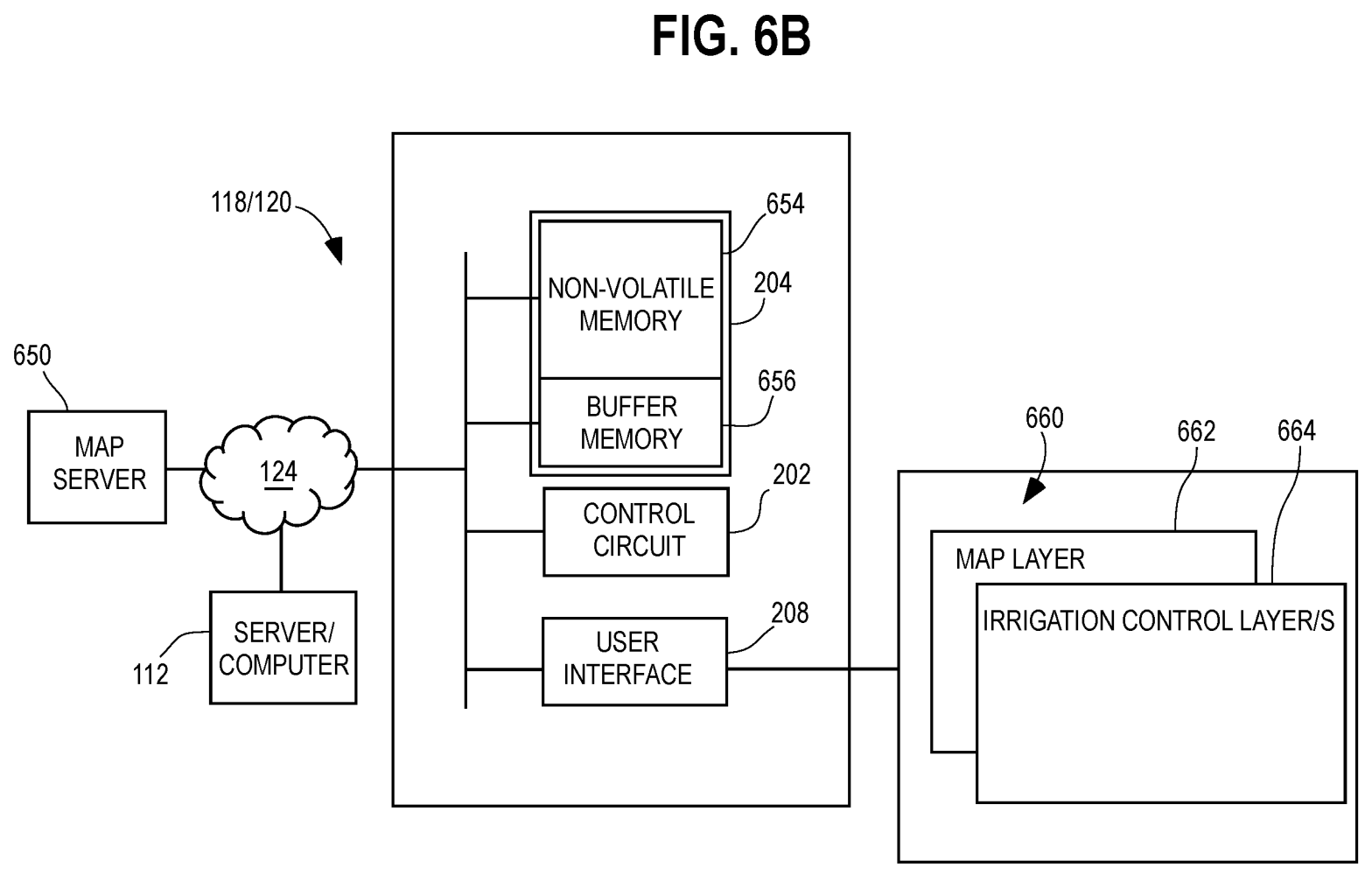

SERVER/ COMPUTER

112

MAP SERVER

650

654

204

656

NON-VOLATILE MEMORY

BUFFER MEMORY

202

CONTROL CIRCUIT

208

USER INTERFACE

660

662

664

MAP LAYER

IRRIGATION CONTROL LAYER/S

Figures 6C, 6D:
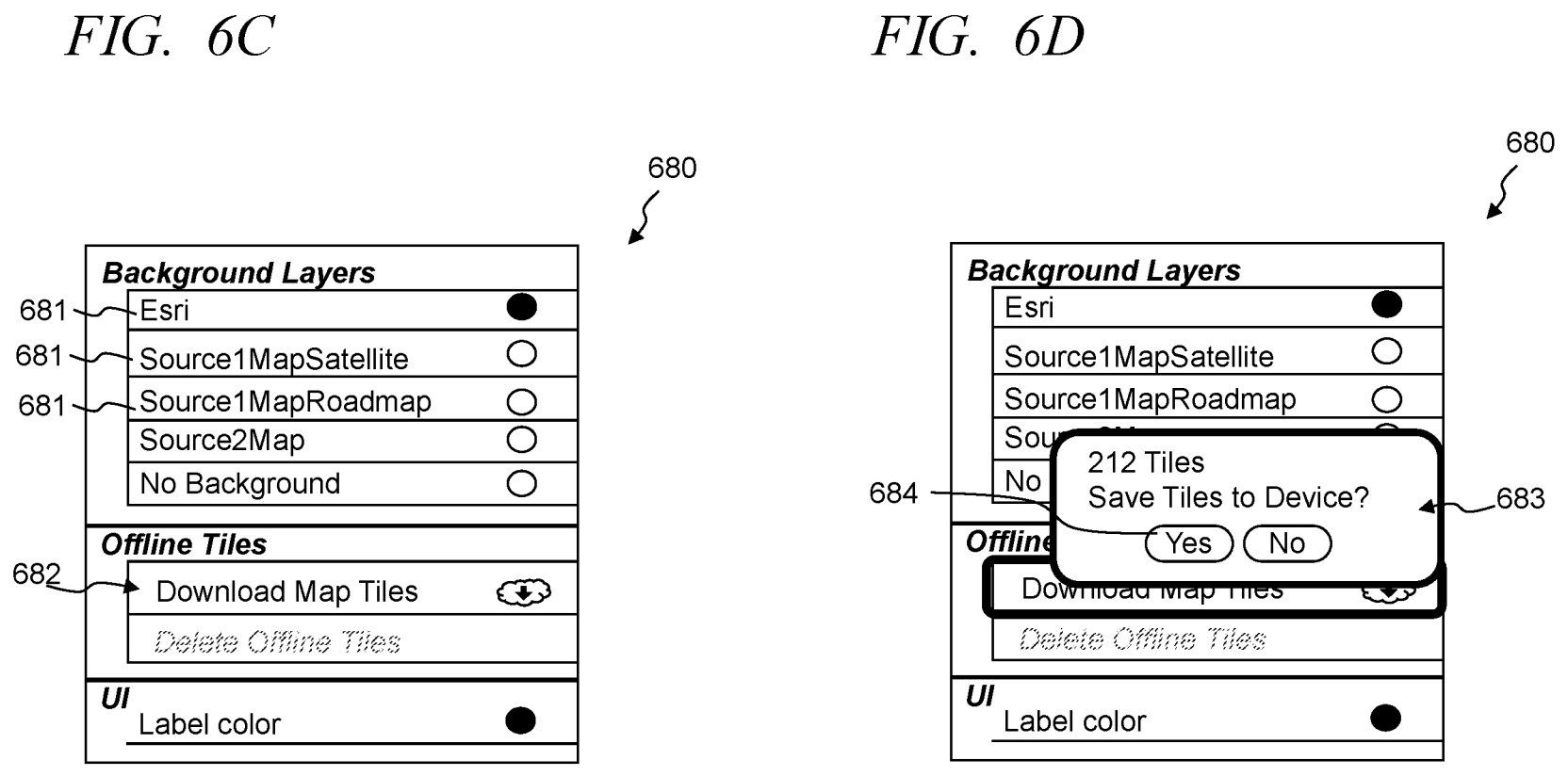

Background Layers
Esri
Source1MapSatellite
Source1MapRoadmap
Sou
No
Offline
Download Map Tiles
Delete Offline Tiles
UI
Label color 212 Tiles
Save Tiles to Device?
Yes
No

Background Layers
Esri
Source1MapSatellite
Source1MapRoadmap
Source2Map
No Background
Offline Tiles
Download Map Tiles
Delete Offline Tiles
UI
Label color 681
681
681
682

FIG. 10A 1000 1072 1073 1074 1070

Stations Holes Areas Interfaces Map

Edit Table Edit Stop Start Pause Resume More Holes Areas

| Locations | Name | Status | Default Runtime | ET | Adjust | Notes |
|---|---|---|---|---|---|---|
| 3A9 | 3A9 | | 00:00:00 | 100% | 100% | Tray 5 |
| 3A10 | 3A10 | | 00:00:00 | 100% | 100% | Tray 5 |
| 4G1 | 4G1 | | 00:00:00 | 100% | 100% | – |
| 6G1 | 6G1 | | 00:05:00 | 100% | 100% | – |
| 1G1 | 1-1G1 | | 00:05:00 | 100% | 100% | Tray 1 |
| 1G2 | 1-1G2 | | 00:05:00 | 100% | 100% | Tray 1 |
| 1G3 | 1-1G3 | | 00:05:00 | 100% | 100% | Tray 1 |
| 1G5 | 1-1G4 | | 00:05:00 | 100% | 100% | Tray 1 |
| 3A9 | 1-1G5 | | 00:05:00 | 100% | 100% | Tray 1 |
| 3A9 | 1-1G6 | | 00:05:00 | 100% | 100% | Tray 1 |
| 3A9 | 1-1G7 | | 00:05:00 | 100% | 100% | Tray 1 |
| 3A9 | 1-1G8 | | 00:05:00 | 100% | 100% | Tray 1 |
| 3A9 | 1-1G9 | | 00:05:00 | 100% | 100% | Tray 1 |

Stations Holes Areas Interfaces Map

Edit Table Edit Stop Start Pause Resume More

Holes Areas

Starts with 1-1

AND OR

Contains

Filter...

| Location | Name | Status | Default Runtime | ET |
|---|---|---|---|---|
| 1A1 | 1-1A1 | | 00:25:00 | 100% |
| 1A10 | 1-1A10 | | 00:25:00 | 100% |
| 1A2 | 1-1A2 | | 00:25:00 | 100% |
| 1AG | 1-1A3 | | 00:25:00 | 100% |
| 1A4 | 1-1A4 | - | 00:25:00 | 100% |
| 1A5 | 1-1A5 | - | 00:25:00 | 100% |
| 1A6 | 1-1A6 | - | 00:25:00 | 100% |
| 1A7 | 1-1A7 | - | 00:25:00 | 100% |
| 1A8 | 1-1A8 | - | 00:25:00 | 100% |

1000
1070
1076
1080
Stations
Holes
Areas
Interfaces
Map
Edit
Table Edit
Stop
Start
Pause
Resume
More
Holes
Areas
Location
Name
Status
Default Runtime
1G1
-
00:05:00
1G10
-
00:05:00
Contains
1G1
AND
OR
Contains
Filter...

1100
1120
1190
1192
1194
1196
1198
1199
1170
1175
1180
1182
1184
1186
www.testirrigationmanagementwebsite.com
COURSE
ACTIVITY
PROGRAMS
REPORTS
SYSTEM SETTINGS
ACTIVITY
Dryrun
Active
Schedule
Completed
Event
List
Course
1day
Start
01/31/2022
12:00 PM
End
02/01/2022
11:59 AM
Course Name
All
1 2 3 4 5 6 7 8 9
M1
TEE
T1 81 70 80 10 10
T2 80 70 70 10 10
T3 91 70 70 10 10
T4 81 70 70 10 10
T5 81 70 70 10 10
T6 81 70 70 10 10
T7 81 70 50 10 10

1200
1284
1288
1282
1286
DASHBOARD
Course
STRINGS.CUSTOM_LAYERS
Leaflet
Home
1205
HOURLY FORCAST
63.3°F
63.3°F/42.6°F
N
E
W
S
0.4 mph
1 FEB
NOW
3PM
4PM
5PM
6PM
DAILY FORECAST
TODAY
WED
THURS
FRI
SAT
SUN
MON
WATER SUMMARY- 7 days
4137925 gal
26 Wed
27 Thurs
28 Fri
29 Sat
30 Sun
31 Mon
1 Tues
MOST RECENT ACTIVITY
1286
No issue reported

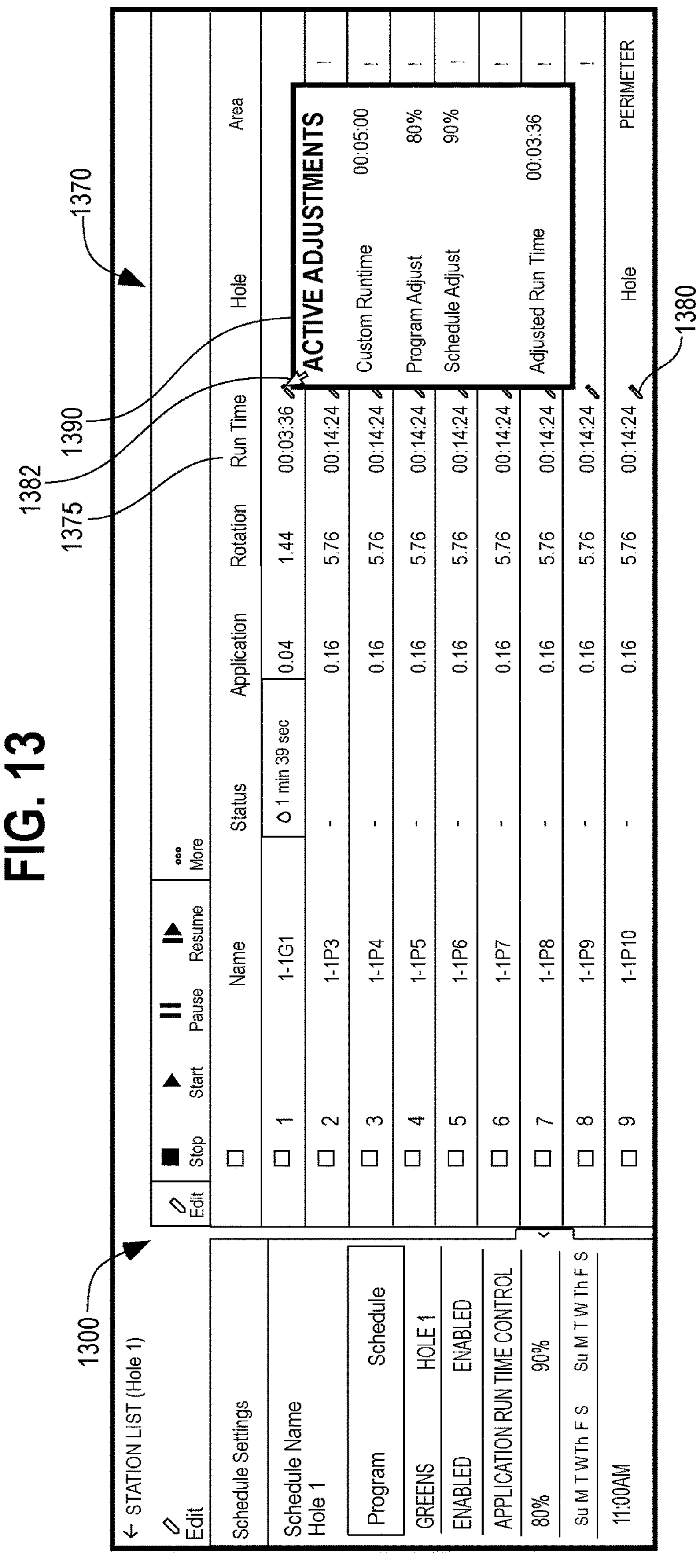
FIG. 13
1300
1370
1375
1382
1390
1380
STATION LIST (Hole 1)
Edit
Schedule Settings
Schedule Name
Hole 1
Program
Schedule
GREENS
HOLE 1
ENABLED
ENABLED
APPLICATION RUN TIME CONTROL
80%
90%
Su M T W Th F S
Su M T W Th F S
11:00AM
Edit
Stop
Start
Pause
Resume
More
Name
Status
Application
Rotation
Run Time
Hole
Area
1 1-1G1 1 min 39 sec 0.04 1.44 00:03:36
2 1-1P3 - 0.16 5.76 00:14:24
3 1-1P4 - 0.16 5.76 00:14:24
4 1-1P5 - 0.16 5.76 00:14:24
5 1-1P6 - 0.16 5.76 00:14:24
6 1-1P7 - 0.16 5.76 00:14:24
7 1-1P8 - 0.16 5.76 00:14:24
8 1-1P9 - 0.16 5.76 00:14:24
9 1-1P10 - 0.16 5.76 00:14:24 Hole PERIMETER
ACTIVE ADJUSTMENTS
Custom Runtime 00:05:00
Program Adjust 80%
Schedule Adjust 90%
Adjusted Run Time 00:03:36

1420
BATCH EDITING 3 SCHEDULES
Application
1.0
in
1440
CANCEL
SAVE

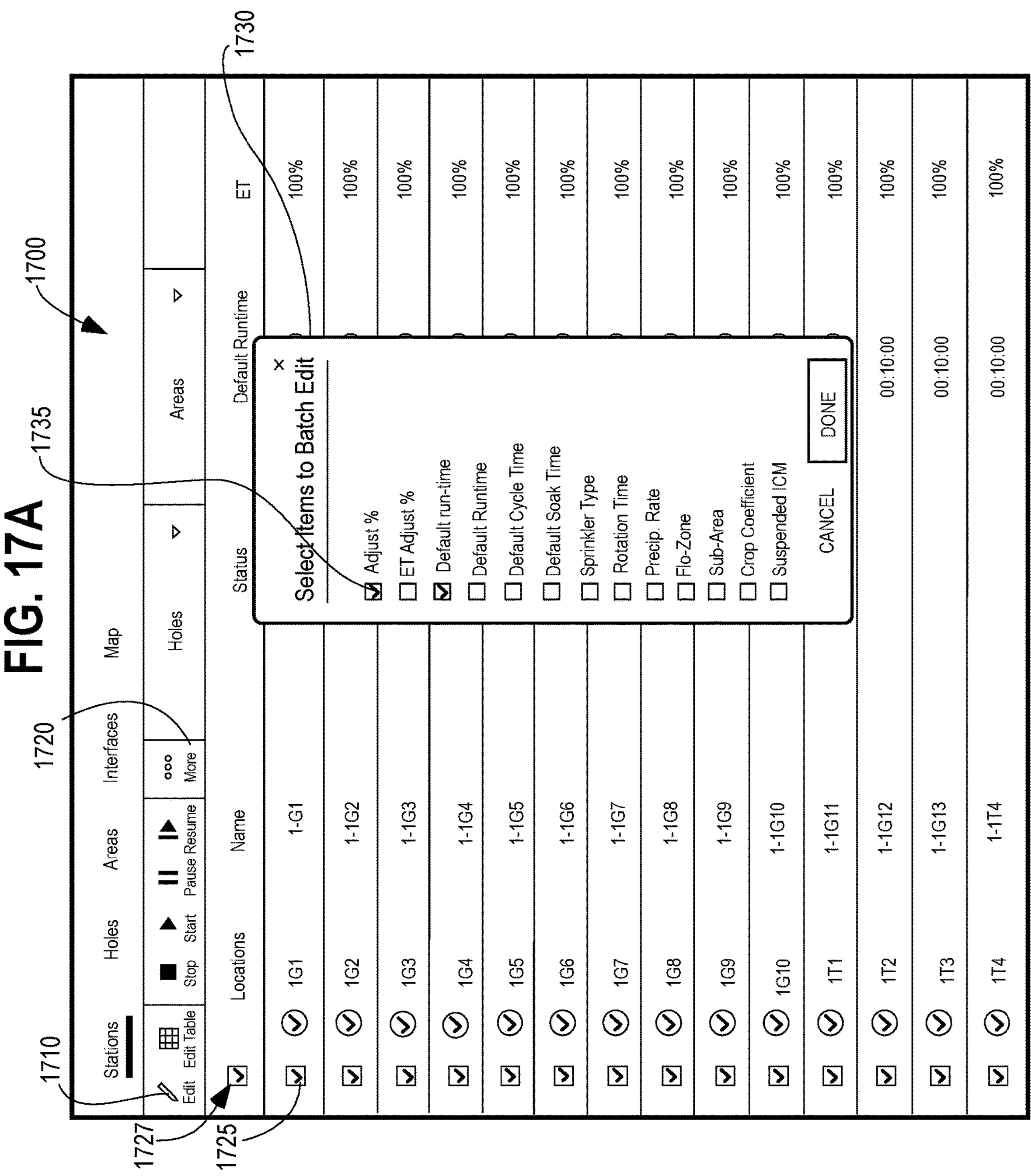

FIG. 17A
1700
1710
1720
1725
1727
1730
1735
Stations
Holes
Areas
Interfaces
Map
Edit
Edit Table
Stop
Start
Pause
Resume
More
Holes
Areas
Locations
Name
Status
Default Runtime
ET
1G1
1-G1
1G2
1-1G2
1G3
1-1G3
1G4
1-1G4
1G5
1-1G5
1G6
1-1G6
1G7
1-1G7
1G8
1-1G8
1G9
1-1G9
1G10
1-1G10
1T1
1-1G11
1T2
1-1G12
1T3
1-1G13
1T4
1-1T4
00:10:00
100%
Select Items to Batch Edit
Adjust %
ET Adjust %
Default run-time
Default Runtime
Default Cycle Time
Default Soak Time
Sprinkler Type
Rotation Time
Precip. Rate
Flo-Zone
Sub-Area
Crop Coefficient
Suspended ICM
CANCEL
DONE 1740
Set Duration
Run Time
Rotation
Application
1741
1743
1745
Depth
.25
in
Run Time
00:22:27
Rotation
-
CANCEL
OK
1744
1746
1749a
1749b
1749c 1810
1830
1840
1800
Stations
Holes
Areas
Interfaces
Map
1824
Edit
Table Edit
Stop
Start
Pause
Resume
More
Holes
Areas
1822
Location
Name
Delete
Status
Default Runtime
ET
1825
1G1
1-G1
Move
1842
1843
Reorder
Reconnect ICM
00:00:00
100%
1G2
1-1G2
00:00:00
100%
1G3
1-1G3
00:00:00
100%
1G4
1-1G4
00:05:00
100%
1G5
1-1G5
00:05:00
100%
1G6
1-1G6
00:05:00
100%
1G7
1-1G7
00:05:00
100%
1G8
1-1G8
00:05:00
100%
1G9
1-1G9
00:05:00
100%
1G10
1-1G10
00:05:00
100%

FIG. 19A 1800 1844 1845a 1845b 1845c 1845d 1845e

Stations Holes Areas Interfaces Map

Edit Table Edit Stop Start Pause Resume More Holes Areas

| | Locations | Name | Status | Default Runtime | ET | Adjust |
|---|---|---|---|---|---|---|
| ☐ | 1G1 | 1-1G1 | | 00:00:00 | 100% | 100% |
| ☐ | 1G2 | 1-1G2 | | | 100% | 100% |
| ☐ | 1G3 | 1-1G3 | | | 100% | 100% |
| ☐ | 1G4 | 1-1G4 | | | 100% | 100% |
| ☐ | 1G5 | 1-1G5 | | | 100% | 100% |
| ☐ | 1G6 | 1-1G6 | | | 100% | 100% |
| ☐ | 1G7 | 1-1G7 | | | 100% | 100% |
| ☐ | 1G8 | 1-1G8 | | | 100% | 100% |
| ☐ | 1G9 | 1-1G9 | | | 100% | 100% |
| ☐ | 1G10 | 1-1G10 | | 00:05:00 | 100% | 100% |

Move 1 Station

New Hole
Hole 1

New AREA
GREEN

Sub-Area
Greens-1

☐ Apply area defaults ☐ Apply new default names

CANCEL SAVE

Reorder Stations

| Location | Name | Address | |
|---|---|---|---|
| 1G1 | 1G1 | OEFAF1 | Move to... |
| 1G2 | 1G2 | OEFAF4 | Move to... |
| 1G3 | 1G3 | OEFB03 | Move to... |
| 1G4 | 1G4 | 169BAB | Move to... |
| 1G5 | 1G5 | OEFBE7 | Move to... |

1878

1870 Apply new default names

1872 Remove gaps

1874 CANCEL

1876 SAVE

FIG. 19D

1880 Choose New Location for 1G4

1882 Location

1G1

1866
Reorder Stations
×
Location
Name
Address
1G1
1G4
169BAB
Move to...
1G2
1G1
OEFAF1
Move to...
1G3
1G2
OEFAF4
Move to...
1G4
1G3
OEFBO3
Move to...
1G5
1G5
OEFBE7
Move to...
Apply new default names
1870
Remove gaps
1872
CANCEL
1874
SAVE
1876

1866
Reorder Stations
×
Location
Name
Address
1G1
1G1
169BAB
Move to...
1G2
1G2
OEFAF1
Move to...
1G3
1G3
OEFAF4
Move to...
1G4
1G4
OEFBO3
Move to...
1G5
1G5
OEFBE7
Move to...
Apply new default names
1870
Remove gaps
1872
CANCEL
1874
SAVE
1876

Figure 20B:
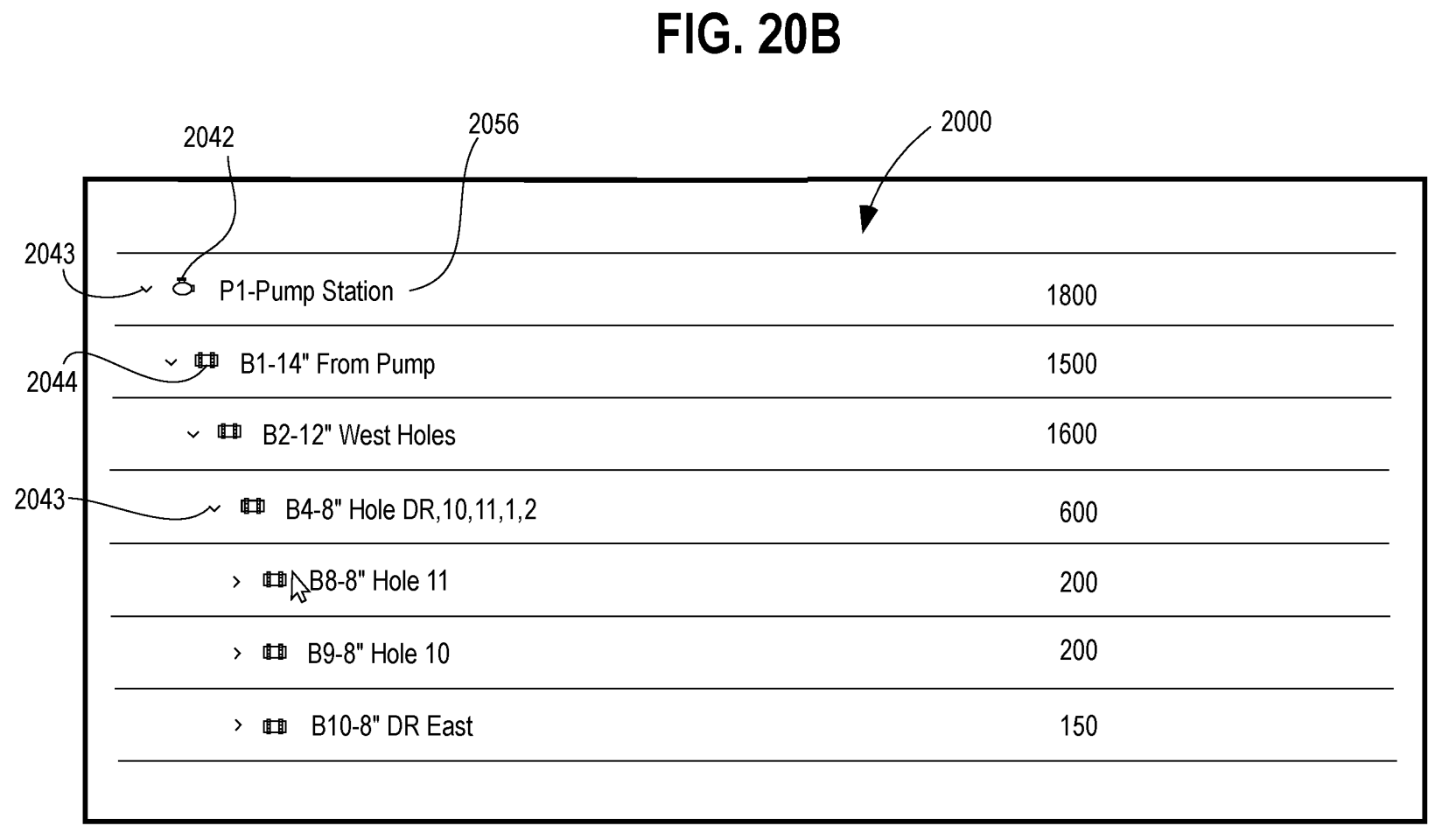

P1-Pump Station 1800

B1-14" From Pump 1500

B2-12" West Holes 1600

B4-8" Hole DR,10,11,1,2 600

B8-8" Hole 11 200

B9-8" Hole 10 200

B10-8" DR East 150

Figure 23:
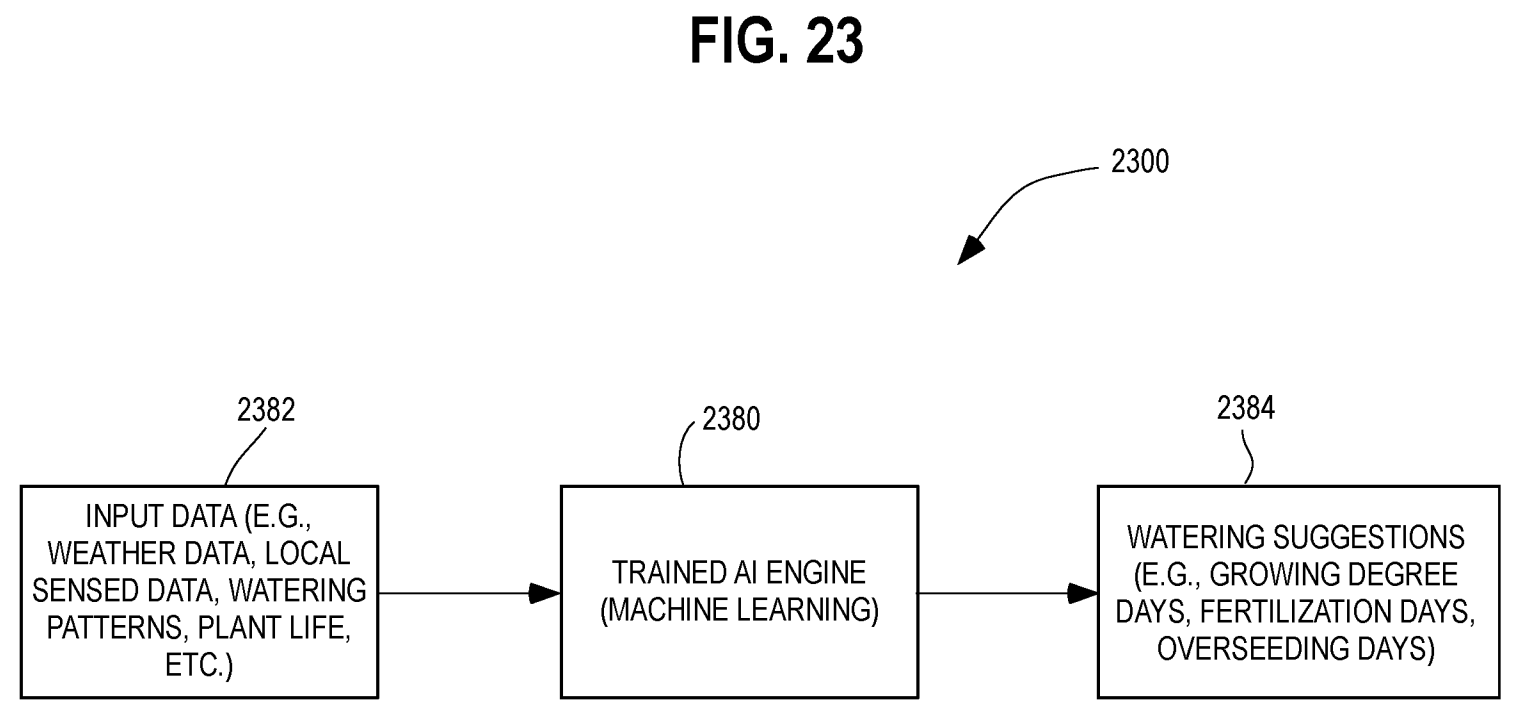

2382
INPUT DATA (E.G., WEATHER DATA, LOCAL SENSED DATA, WATERING PATTERNS, PLANT LIFE, ETC.)

2380
TRAINED AI ENGINE (MACHINE LEARNING)

2384
WATERING SUGGESTIONS (E.G., GROWING DEGREE DAYS, FERTILIZATION DAYS, OVERSEEDING DAYS)

2700
2705
2764
9P4
00:32:21
2752
2754
2758
2757
2755

2800
2805
9F16
9F25
9F21
9A18
9A15
9A17
2832
2866
2868
2869
2870
2872
2874

IRRIGATION CONTROL SYSTEMS AND USER INTERFACES

CROSS-REFERENCE TO RELATED APPLICATIONS

This application claims the benefit of U.S. Provisional Application No. 63/321,633, filed Mar. 18, 2022, U.S. Provisional Application No. 63/399,611, filed Aug. 19, 2022, and U.S. Provisional Application No. 63/428,032, filed Nov. 25, 2022, each of which is incorporated herein by reference in its entirety.

FIELD OF THE INVENTION

This disclosure relates generally to irrigation control and, in particular, to irrigation control systems with user interfaces for monitoring and controlling irrigation.

BACKGROUND

In a typical irrigation control system, a computer executing irrigation control software and/or a dedicated electronic irrigation controller store and execute irrigation schedules that control watering components in a landscape to apply watering. In large-scale irrigation systems that may be employed, for example, on golf courses, there is a very large number of valves or stations, each of which has to be individually controlled (e.g., opened or closed to control water flow to sprinklers) and monitored. Central irrigation control software is often complex and requires the user to undergo specialized training, which is complex, time-consuming, and often not easy to understand, such that a limited number of users are able to properly operate the central irrigation control software.

BRIEF DESCRIPTION OF THE DRAWINGS

Disclosed herein are embodiments of systems, methods, user interfaces, and controls relating to monitoring and/or controlling an irrigation system. This description includes drawings, wherein:

FIG. 1A illustrates a diagram of an exemplary irrigation control system in accordance with some embodiments;

FIG. 4 illustrates an exemplary portion of a user interface in accordance with some embodiments that displays a map of an irrigation area including station icons corresponding to the irrigation stations deployed in the irrigation area and visually indicating an operational status of the irrigation stations;

FIG. 6B illustrates an electronic device in accordance with some embodiments that stores map data downloaded from a wide area network in memory to be retrieved for display on a user interface in the event an active network connection is not available;

FIG. 6C illustrates a simplified representation of an exemplary map source menu displayed by the irrigation management application 114, in accordance with some embodiments;

FIG. 6D illustrates an exemplary a download confirmation option identifying a number of map tiles to be downloaded, in accordance with some embodiments;

FIG. 10A shows an exemplary user interface in accordance with some embodiments that includes a listing of irrigation stations of an irrigation area, permitting a user to select one or more irrigation stations, control the selected irrigation stations, and/or to sort the irrigation stations based on their operational parameters;

FIG. 10B shows an exemplary embodiment of the user interface of FIG. 10A and further showing an interactive name filter feature that permits the user to filter the irrigation stations based on the characters in their identifiers in accordance with some embodiments;

FIG. 13 shows an exemplary user interface in accordance with some embodiments that includes a listing of irrigation stations of an irrigation area, permitting a user to select one or more irrigation stations and view the active operational attribute adjustments for the selected irrigation stations;

FIG. 17A shows an exemplary user interface in accordance with some embodiments that permits a user to select a group of irrigation stations and includes a batch edit menu that permits the user to select one or more operational attributes of the irrigation stations of the group for adjustment;

FIG. 19A shows an exemplary embodiment of the interface of FIG. 18 with a menu that permits the user to enter specific values of where in the irrigation station listing a user-selected irrigation station is to be moved in accordance with some embodiments;

FIG. 19C shows an exemplary embodiment of the interface of FIG. 18, showing another sub-menu that permits the user to select how the irrigation stations in the listing are to be reordered in accordance with some embodiments;

FIG. 19D shows an exemplary embodiment of the interface of FIG. 18, showing another sub-menu that permits the user to select a new location in the listing for an irrigation station being reordered in accordance with some embodiments;

FIG. 20B shows an exemplary embodiment of the user interface of FIG. 20A, and illustrates a listing of flow tree elements indicating multiple expandable flow branch layers in accordance with some embodiments;

FIG. 23 shows a flow chart of an exemplary method of using an artificial intelligence model to process various irrigation area control-related inputs and provide recommendations regarding landscaping of the irrigation area in accordance with some embodiments;

Figure 1B:
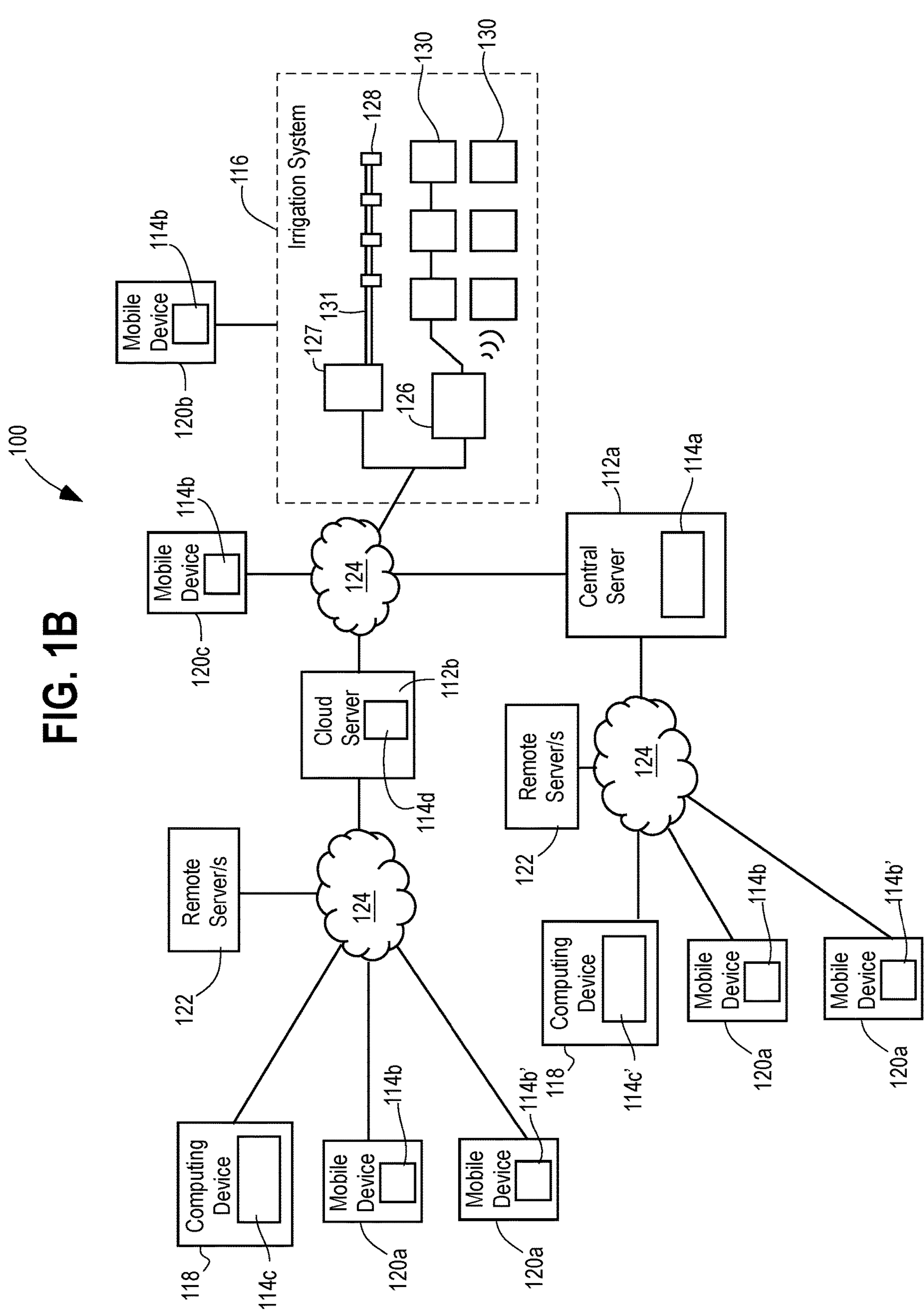
FIG. 1B illustrates a diagram of another exemplary irrigation control system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the art as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the invention. Thus, appearances of the phrases "in one embodiment," "in an embodiment," "in some embodiments", "in some implementations", and similar language throughout this specification may, but do not necessarily, all refer to the same embodiment.

Generally and in some embodiments, systems, user interfaces, and methods related to landscape and/or irrigation management include an irrigation management application which, when executed by a control circuit (e.g., processor) of an electronic device, causes a user interface to be displayed to a user. The user interface includes features that permit a user to do one or more of configure, monitor, program, control, adjust various components and/or operations of the irrigation management system. For example, in some embodiments, the user may check the status, operational parameters, and/or other information relating to irrigation stations and/or other stations of the irrigation system. And for example, in some embodiments, the user interface permits the user to adjust operational attributes of one or more of irrigation stations and/or other stations to control operation of the stations according to the system-generated operational attributes and/or user-adjusted operational attributes.

In some embodiments, the user interface is configured to provide a more intuitive and easier to use interface than in traditional complex central irrigation control systems. Often, traditional central control irrigation systems are difficult to learn to use which limits those that can properly operate the central control irrigation system. In some embodiments, the user interface includes interactive features while viewing a map interface. In some embodiments, the user interface includes interactive features while viewing a data interface. And in some embodiments, the user interface includes intuitive programming features to simplify otherwise tedious and mistake prone programming processes. In some embodiments, various features of the user interface provide easy access to functions of the system without the need to complete extensive training or have extensive experience.

Further, in some embodiments, irrigation management applications may be applicable in multiple landscape and irrigation settings and devices. For example, in some embodiments, an irrigation management application may be at least part of a central irrigation control system. In some embodiments, irrigation management application may be stored and executed at least in part by a central computer, a server providing central control functionality, mobile electronic devices (such as mobile computers, mobile tablets and phones, remote controls, etc.) and various field components (such as interface units, satellite controllers, etc.). In some embodiments, irrigation management application may be implemented in irrigation systems that are not central-control based. For example, the irrigation management application may be stored and executed at least in part by mobile electronic devices (such as mobile computers, mobile tablets and phones, remote controls, etc.) in communication with a stand-alone controller (e.g., a residential irrigation controller) or satellite controller configured to function as a stand-alone controller.

Figure 1C:
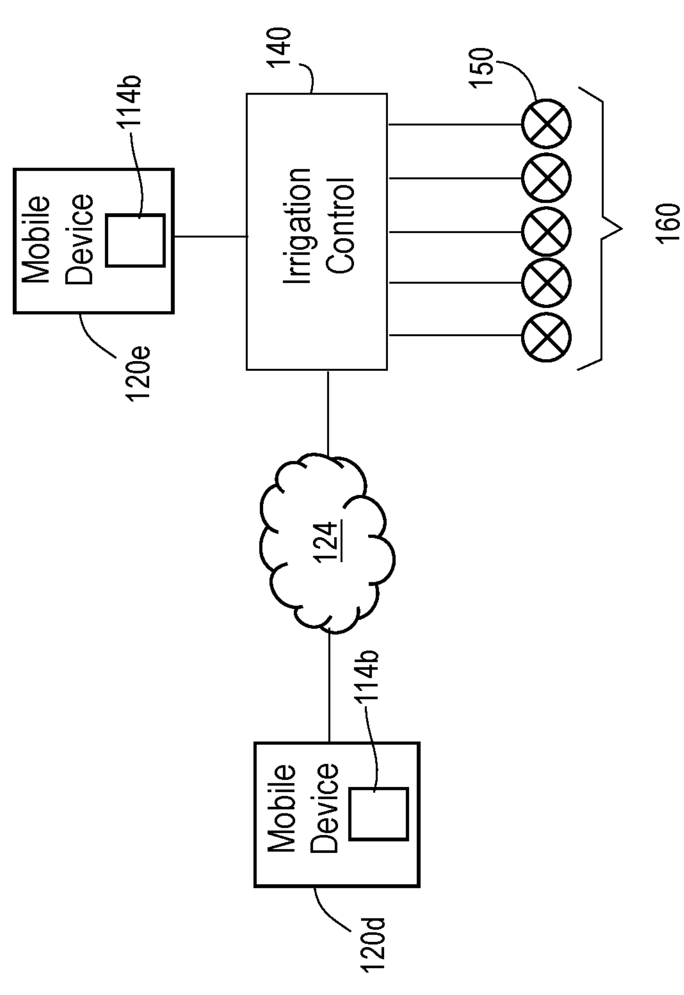
FIG. 1C illustrates a feature of another exemplary irrigation control system in accordance with some embodiments.

Referring to FIGS. 1A-1C, various irrigation management systems are illustrated and described according to some embodiments. In such systems and according to some embodiments, an irrigation management application is provided. As used herein, an irrigation management application generally refers to an application (e.g., software or set of code executable by a control circuit) that provides irrigation management functionality. As used herein, irrigation management generally refers to at least one or both of monitoring and controlling irrigation system components and operation. Accordingly, (1) in some embodiments, the irrigation management application monitors the system, (2) in some embodiments, the irrigation management application controls the system, and (3) in some embodiments, the irrigation management application monitors and controls the system. In some embodiments, these functions can be further defined such that irrigation management generally refers to at least one or more of the following general functions of a landscape or irrigation system: configuring, monitoring, programming, controlling, and adjusting irrigation system components and operation.

Referring to FIG. 1A, an exemplary irrigation management system 100 is shown. Generally, the system 100 includes an irrigation management application 114*a* (e.g., central control software) stored on and executed by a central computer 112, which can be used for managing irrigation components of an irrigation system 116 located at one or more sites. The irrigation management application 114*a* and central computer 112 can be accessed via a network 124 (e.g., the Internet) by authorized remote electronic devices, such as computing devices 118, mobile devices 120*a* (e.g., mobile phones, tablets, etc.). Further, the central computer 112 can communicate with remote server(s) 122 (e.g., weather servers, map servers, and other third party data or service providers) via the network 124. The irrigation management application functions to provide one or more of the functions noted above. For example, in some embodiments, the irrigation management application 114*a* can include, for example, one or more of setting, monitoring and adjusting operational parameters of and informational data associated with any and all components of the irrigation system 116, visually displaying the operational status of and informational data associated with any and all components of the irrigation system 116, automatically or manually controlling the operational parameters of any and all components of the irrigation system 116, and/or automatically or manually turning on and off and/or activating and deactivating any and all components of the irrigation system 116.

In FIG. 1A, the central computer 112, computing devices 118, and mobile devices 120*a*, 120*b* are examples of electronic devices. The term "electronic device" as used herein may include a stationary or portable electronic device, for example, a desktop computer, a laptop computer, a server, multiple communicatively connected servers, a distributed computer, a tablet computer, a mobile phone, a personal digital assistant (PDA), a smartwatch or other wearable device, or any other electronic device including a control circuit (e.g., processor) that executes at least a portion of the irrigation management application and/or related application/s that support the irrigation management application.

The exemplary electronic devices shown in FIG. 1A, namely, central computer 112, computing device 118, mobile devices 120*a*, 120*b*, and server 122, may be configured for data display and entry and processing as well as for communication with each other and other devices of the system 100 via the network 124.

The exemplary network 124 depicted in FIG. 1A may be any computer connection network, e.g., including one or more of a wide-area network (WAN), a local area network (LAN), a personal area network (PAN), a wireless local area network (WLAN), a wired network, a wireless network, or any other internet or intranet network, or combinations of such networks. Generally, communication between various electronic devices of system 100 may take place over hard-wired, wireless, cellular, LoRa, LoRaWAN, Zigbee, Wi-Fi or Bluetooth (e.g., Bluetooth Low Energy (BLE)) networked components or the like. In some embodiments, one or more electronic devices of system 100 may include cloud-based features, such as cloud-based memory storage.

In some embodiments, electronic devices such as the central computer 112, computing device 118, mobile phone/tablet 120*a*, 120*b*, and/or remote server 122 include at least a portion of or are otherwise configured to work with the irrigation management application 114*a*. Accordingly, as shown in FIG. 1A, the mobile devices 120*a* and 120*b* include one of irrigation management applications 114*b* and 114*b*', and the remote computing devices 118 include one of irrigation management applications 114*c* and 114*c*'. In some embodiments, the irrigation management application 114*a*, 114*b*, 114*b*', 114*c*, 114*c*' comprise computer program code that is configured to be respectively installed on and executed by the electronic devices 112, 118, and 120*a*, 120*b* (e.g., by a control circuit of these electronic devices described in more detail below with respect to FIG. 2A-2B). The irrigation management application 114*a*, 114*b*, 114*b*', 114*c*, 114*c*' can be executed by the respective electronic devices 112, 118, 120*a*, 120*b* in concert with other software modules or applications (computer program code), or groups of applications, such as operating systems, browser applications, location applications (e.g., mapping, GPS, etc. applications), two-factor authentication (TFA) applications, single sign on (SSO) applications, graphics processing applications, security applications, etc. For example, in some embodiments, the irrigation management application 114*b*' and 114*c*' comprises a browser application including code (e.g., HTML) and/or scripts (e.g., JavaScript) downloaded from the irrigation management application 114*a* and executed via the browser application that runs on the respective ones of the computing devices 118 and the mobile devices 120*a*. When the browser application executes the received code (e.g., HTML) and/or scripts (e.g., JavaScript) downloaded from the irrigation management application 114*a*, the browser application and the downloaded code/scripts together function as the irrigation management application 114*b*', 114*c*' of the remote computer 118 and mobile device 120*a* to display a user interface for the user.

In some embodiments, the software of the irrigation management application 114*a*, 114*b*, 114*c* can be a dedicated application (e.g., an application specific to irrigation management functions) or a general application that that can provide or support irrigation management functions as well as other operating system and other non-irrigation management functions. In some embodiments, the irrigation management application 114*a*, 114*b*, 114*c* is an add-on application that is installed on one or more of the electronic devices 112, 118, and 120*a*, 120*b*, respectively, and that cooperates with and/or is integral to other application/s of the electronic devices 112, 118, 120*a*, 120*b* such as the operating system and works with the other application/s to provide the functionality described herein. And in some embodiments, the irrigation management application 114*b*, 114*c* can comprise an application configured to link a browser application to a remote computer device (computer 112, 112*a*) or server (server 112*b*) configured to provide signaling (code and/or scripts) to cause the browser application to display the user interface. In other words, the irrigation management application 114*b*, 114*c* can simply provide a link to a computer or mobile device supported website served by the computer 112, 112*a* or the server 112*b*, the website serving the user interface for the display at the remote computer 118 and/or mobile devices 120*a*, 120*c*.

With reference to FIG. 1A, the general functionality of managing (e.g., monitoring and/or controlling) the irrigation system 116 is implemented via a central computer 112, which is connected to irrigation equipment at one or more sites of the irrigation system 116. The components of the irrigation system 116 are variable depending on the type of system and level of control needed. For example, the equipment of the irrigation system 116 may include various field control devices such as interface units 126, communication components/relays/switches (not shown), satellite controllers 130, encoder units 127 (i.e., a type of interface unit that outputs modulated commands on a two-wire path 131), decoders 128, station valves, master valves, sprinklers, emitters, sensors, pumps, pump stations, lighting devices, etc. Generally, one or more of the field components control operation of stations. As used herein, a station is a controlled output of the irrigation system that corresponds to a physical component in the field. A station typically has binary states, such as on or off, but could further be a partially on/partially off state. An example "irrigation station" corresponds to a valve that is controlled, for example, using a latching or non-latching solenoid. The valve is typically in an off state (closed, not allowing water to flow therethrough) or an on state (open, allowing water to flow therethrough). When a given valve is open, water flows through the valve to one or more sprinkler devices in the fluid path downstream of the valve. In some cases, the valve is part of a "valve-in-head" sprinkler (such as a rotor) in which case there is a one-to-one relationship between valve (station) and the sprinkler. In some cases, the fluid path from the valve branches to one or more sprinklers located separate from the valve. In any event, the controlled valve is typically referred to as an irrigation station. In the illustration of FIG. 1A, each of the satellite controllers 130 may couple to and control multiple irrigation stations. And in the illustration of FIG. 1A, each of the decoders 128 may directly control one or more valves, such that a given decoder is coupled to and controls one or more irrigation stations. It is also known that other stations may be controlled by embodiments of the irrigation management application 114*a*. And it is known to use switches e.g., to control pumps, fountains, electrical lighting, and the like such that the switches can each be considered a station being controlled by the irrigation management system.

In the embodiment illustrated in FIG. 1A, the central computer 112 is coupled to the decoders 128 via an encoder unit 127 at the site of the irrigation system 116, and is connected to the encoder unit 127 via the network 124 which can include direct wireline connections from the computer 112 to the encoder unit 127. In some embodiments, the central computer 112 is owned and operated by the user or customer and has the irrigation management application 114*a* installed thereon. In certain aspects, the central computer 112 provides, via the software of the irrigation management application 114*a*, a user interface to the user that is at the computer 112 (e.g., via a keyboard and display directly coupled to the computer 112 or viewed by users at their respective remote electronic devices 118, 120*a* via irrigation management application 114*a*, 114*b*, 114*b*', 114*c*, 114*c*' running respectively thereon.

As will be described in more detail below, in some aspects, the irrigation management application 114*a* of the central computer 112 may generate, via the irrigation management application 114*b*, 114*b*', 114*c*, 114*c*' (e.g., a conventional application, mobile application, web browser application, etc.) a user interface for a user of the electronic device 118, 120*a* that permits the user to monitor the operational status of any component of the irrigation system 116 and to enter and/or modify various operational or informational parameters associated with any of the components of the irrigation system 116. For example, in one aspect, the user of an electronic device 118, 120*a* may enter a user-desired selections (e.g., run time schedule, irrigation station identifier, command to turn irrigation on/off, etc.) via the user interface of the application 114*b*, 114*b*', 114*c*, 114*c*' accessible on the user's electronic device 118, 120*a*, and the entry is received by the central computer 112 and stored in its memory.

In some embodiments, the output signals corresponding to the inputs entered by a user of an electronic device 112, 118, 120*a* into a user interface generated by the respective irrigation management application 114*a*, 114*b*, 114*b*', 114*c*, 114*c*' are transferred by the central computer 112 to the field components. For example, in some embodiments, the central computer 112 sends on/off commands to the interface unit 126 to be passed to the appropriate satellite controller 130 to control the appropriate stations, or may be passed to the encoder unit 127 to be formatted into a command to be transmitted to the appropriate decoder 128 to control the appropriate one or more valve (irrigation station) controlled by the decoder 128. In some embodiments, the irrigation management application 114*a* at the computer 112 transmits an irrigation schedule or an adjustment to an irrigation schedule to a given satellite controller 130 via the interface unit 126, the schedule stored and executed by the satellite controller 130. Notably, while the central computer 112 is shown in FIG. 1A as not being at the site of the irrigation system 116, in some aspects, the central computer 112 may be located at the site of the irrigation system 116. Such a central computer 112 may be a customer-owned computer with irrigation management application 114*a* installed thereon.

With reference to FIG. 1B, in some embodiments, the central computer 112*a* is similar to the central computer 112 of FIG. 1A in that it is remote from the site of the irrigation system 116 and coupled to the irrigation system 116 by a network 124 (e.g., a wide area network). As also shown in FIG. 1B, the irrigation management application 114*d* may be stored and executed by a cloud-based server 112*b*. In such embodiments, the server 112*b* may be hosted by an irrigation company that provides irrigation control services (such as irrigation system monitoring, irrigation schedule creation, management and execution) from a remote central location to multiple different users or customers via remote computing devices 118 and/or mobile devices 120*a* for their respective irrigation systems at their respective sites. As shown in FIG. 1B, the server 112*b* is communicationally coupled to the devices at the site of the irrigation system 116 via the network 124 similar to how the computer 112*a* is communicationally coupled to the devices at the site of the irrigation system 116.

In some embodiments, the cloud-based server 112*b* is owned and operated by the user or customer and has irrigation central control application 114*d* installed thereon. In some embodiments, the functionality of monitoring and/or controlling the irrigation system 116 is implemented via the server 112*b*. For example, the server 112*b* may provide a user interface via the irrigation management application 114*b*, 114*b*', 114*c*, 114*c*' to the user that is viewed by the user at the user's remote computer 118 and/or mobile device 120*a*. Using the irrigation management application 114*b*, 114*b*', 114*c*, 114*c*', the user of a remote computer 118, mobile devices 120*a* may enter a user-desired operational attribute selections (e.g., pause irrigation, restart irrigation, turn irrigation station on/off, etc.), and these selections are received by the server 112*b* and may be stored in its memory. The output signals from the server 112*b* are communicated to the field devices at the site of the irrigation system 116.

In some embodiments, similar to that described in FIG. 1A, the irrigation management application 114*b*, 114*c* can be a dedicated application (e.g., an application specific to irrigation management functions) or a general application that that can provide or support irrigation management functions as well as other operating system and other non-irrigation management functions. And in some embodiments, the irrigation management application 114*b*' and 114*c*' can be a browser-based application that is native to an operating system of the remote computer 118 or mobile device 120*a* or downloaded to and installed on the remote computer 118 or mobile device 120*a*. When the browser-based application receives code (e.g., HTML) and/or scripts (e.g., JavaScript) downloaded from the irrigation management application 114*a* or 114*d*, the browser-based application and the downloaded code/scripts together function as the irrigation management application 114*b*', 114*c*' to display a user interface at the remote computer 118 and mobile device 120*a*. And in some embodiments, the irrigation management application 114*b*, 114*c* can comprise an application configured to link a browser application to a remote computer device (computer 112, 112*a*) or server (server 112*b*) configured to provide signaling (code and/or scripts) to cause the browser application to display the user interface. In other words, the irrigation management application 114*b*, 114*c* can simply provide a link to a computer or mobile device supported website served by the computer 112, 112*a* or the server 112*b*, the website serving the user interface for the display at the remote computer 118 and/or mobile devices 120*a*, 120*b*.

Also as shown in FIGS. 1A and 1B, in some embodiments, the irrigation management application 114*b* of mobile device 120*b* can be configured to provide irrigation management functionality directly to one or more of the components of the irrigation system 116 at the site. For example, the mobile device 120*b* can be configured to communicate wirelessly and directly to one or more of the encoder units 127, the decoder 128, the interface unit 126 and the satellite controllers 130. For example, one or more of these devices may include an integrated or removably connectable transceiver to communicate with the mobile device 120*b*. In such embodiments, the mobile device 120*b* may communicate directly to these devices without first communicating to the irrigation management application 114*a* or 114*d*. Also shown in FIG. 1B, in some embodiments, the irrigation control application 114*b* of mobile device 120*c* can directly communicate with one or more of the field devices via the network 124 without first communicating to the irrigation management application 114*a* or 114*d*.

Generally, users can access features of the irrigation management application 114*a* at the central computer 112, 112*a* and/or at the remote electronic devices 118, 120*a*, e.g., to manage the irrigation system 116 by checking the status of various components of the irrigation system 116, sending commands to various components of the irrigation system 116, making programming changes associated with various components of the irrigation system 116, viewing reports/status/alerts in connection with various components of the irrigation system 116, and so on. In some embodiments, the application 114*a*, 114*b*, 114*c*, 114*d* can communicate with remote servers 122, for example, map servers to obtain map information and/or imagery, weather servers, to obtain rainfall, humidity and other weather-related information that can be used by the application 114*a*-114*d* to adjust watering schedules of the irrigation system 116.

Referring next to FIG. 1C, in some embodiments, the irrigation management application 114*b* permits mobile devices 120*d* and 120*e* to communicate with an irrigation controller 140 directly or via a network 124 without communicating via any central computer 112, 112*a*, or via the central cloud server 112*b*. For example, in some embodiments, the controller 140 is a stand-alone controller or irrigation control unit that is independent of or not part of a larger central control system. In other words, as shown in FIG. 1C, a user of the mobile device 120*d*, 120*e* may use the irrigation management application 114*b* to monitor and/or control various aspects of the status and/or operation of one or more stations 150 via various user interfaces. In this illustrated embodiment, the stations 150 connected to the irrigation controller 140 are irrigation stations (e.g., valves that control the flow of water to one or more sprinkler device fluidly connected to valves).

In the embodiments of FIG. 1C, the network 124 used by the mobile device 120*d* may be any local or wide area network and can include a cellular network, a local wireless network (e.g., a Wi-Fi network), and so on. And in some embodiments, the mobile device 120*e* may communicate with an integrated or removably connected transceiver of the irrigation controller 140 (e.g., using Bluetooth or other direct wireless connection). It is understood that the controller 140 can be any irrigation control device, such as a station-based controller, decoder-based controller, a decoder, wireless valve/rotor, and so on.

Also, as shown in FIGS. 1A-1C, in some embodiments, the functionality of managing (e.g., monitoring and/or controlling) the irrigation system 116 is implemented via software stored on or accessible by the mobile electronic device 120*a*-120*e*, such as a mobile application version of the irrigation management application 114*b* and/or a browser that works together with the irrigation management application 114*a*, 114*d*. In some embodiments, the browser function executing commands and code received from the irrigation management application 114*a*, 114*d* can be referred to as an irrigation management application 114*b*', 114*c*'. As shown in FIGS. 1A-1C, the irrigation management application 114*b* can be an iOS or Android-based irrigation management application (or app) installed on the mobile device 120*a*-120*e* and is configured to wirelessly communicate via the network 124 with one or more of the central computer 112, 112*a*, central cloud server 112*b*, and/or with components of the system 116 in the field. In such case, a mobile application (mobile app) 114*b* of the mobile devices 120*a*-120*e* provides a user interface to the user on a display screen of the mobile device to allow the user to monitor and/or control various aspects of the irrigation system 116. In some embodiments, the mobile device 120*a*-120*e* can transmit wireless signals to one or more of the central computer 112, 112*a*, cloud server 112*b* to provide the signaling to the components of the irrigation system 116 to implement various operational attribute adjustments and/or control commands to one or more components of the irrigation system 116.

It is noted that in some embodiments, at least portions of the irrigation management application is stored in the memory of different devices in the system such that the irrigation management application is distributed between various devices, e.g., the computer 112, 112*a*, cloud server 112*b*, the remote computers 118 and the mobile devices 120*a*-120*c*. Further, in some embodiments, the irrigation management application at the remote computer 118 and/or mobile devices 120 comprises a browser application configured to display the user interface based on signaling received from a remote computer device or server in order to provide irrigation management functionality to the user via the user interface.

Figures 2A, 2B:
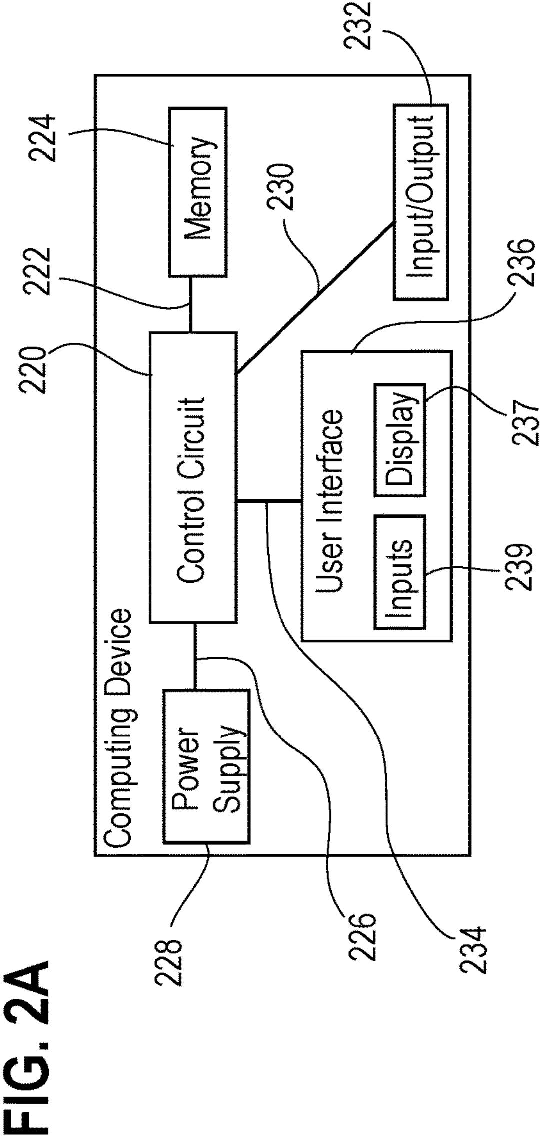
FIG. 2A is a functional block diagram of an exemplary computing device in accordance with some embodiments.
FIG. 2B is a functional block diagram of an exemplary server device in accordance with some embodiments.

With reference to FIG. 2A, an exemplary computing device (e.g., computer 112, 118) configured for use with exemplary systems and methods described herein may include a control circuit 220 electrically coupled via a connection (e.g., a bus, etc.) 222 to a memory 224 and via a connection 226 (e.g., a bus, etc.) to a power supply 228. In some embodiments, the control circuit 220 is a programmable processor (e.g., a microprocessor or a microcontroller). And in some embodiments, the control circuit 220 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

The control circuit 220 can be configured (for example, by using corresponding programming stored in the memory 224 (such as the irrigation management application) as will be well understood by those skilled in the art) to carry out one or more of the steps, actions, and/or functions described herein. In some embodiments, the memory 224 may be integral to the control circuit 220 or can be physically discrete (in whole or in part) from the control circuit 220 and may be configured to non-transitorily store the computer instructions that, when executed by the control circuit 220, cause the control circuit 220 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory 224 may be referred to as a non-transitory medium or non-transitory computer readable medium.

The control circuit 220 of the computing device may be also electrically coupled via a connection 230 to an input/output 232 that can receive signals from other devices, for example, the central computer 112, 112*a*, central cloud server 112*b*, one or more mobile devices 120, server 122, etc., and/or from another electronic device of the system 100 or in communication with the system 100. The input/output 232 of the computing device can also send signals to other devices, for example, interface units 126, encoder units 127, etc.

The control circuit 220 of the exemplary computing device shown in FIG. 2A may be electrically coupled via a connection 234 to a user interface 236, which may include a visual display or display screen 237 (e.g., LED screen) and/or button input 239 that provide the user interface 236 with the ability to permit a user of the computing device to user the irrigation control application 114 to monitor and/or control the irrigation control system 116 by inputting menu selections and/or commands via touch-screen and/or button operation and/or voice commands as will be described in more detail below. It will be appreciated that the performance of such functions by the control circuit 220 of the computing device may not be dependent on a human operator, and that the control circuit 220 of the computing device may be programmed to perform such functions without a human operator. In some embodiments, the user interface 236 is integral with the other components of the computing device, e.g., the computing device is a laptop computer with integrated display 237 and inputs 239 (e.g., keyboard, mousepad). And in some embodiments, the user interface 236 is separated from the other components of the computing device, e.g., the computing device is a desktop or tower computer to which the display 237 and inputs 239 (e.g., keyboard/mouse) are connected.

With reference to FIG. 2B, an exemplary server (e.g., server 112*b*) 112*b* configured for use with exemplary systems and methods described herein may include a control circuit 240 electrically coupled via a connection 242 (e.g., a bus, etc.) to a memory 244 and via a connection 246 (e.g., a bus, etc.) to a power supply 248. As noted above, the control circuit 240 can comprise a fixed-purpose hard-wired platform or can comprise a partially or wholly programmable platform, such as a microcontroller, an application specification integrated circuit, a field programmable gate array, and so on.

The control circuit 240 can be configured (for example, by using corresponding programming stored in the memory 244 as will be well understood by those skilled in the art) to carry out one or more of the steps, actions, and/or functions described herein. In some embodiments, the memory 244 may be integral to the processor-based control circuit 240 or can be physically discrete (in whole or in part) from the control circuit 240 and may be configured to non-transitorily store the computer instructions that, when executed by the control circuit 240, cause the control circuit 240 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory 244 may be referred to as a non-transitory medium or non-transitory computer readable medium.

The control circuit 240 of the server may be also electrically coupled via a connection 250 to a network interface 252 that can receive signals from, for example, the central computer 112/112*a*, mobile device 120, server 122, etc., and/or from another electronic device of the system 100. The input/output 232 of the computing device 118 can also send signals to other devices, for example, interface units, encoder units 127, etc.

The control circuit 240 of the exemplary server shown in FIG. 2B may be electrically coupled via a connection 253 to a UI interface 254 that provides a user of the server with the ability to run the irrigation control application 114*d* to monitor and/or control the irrigation control system 116 as will be described in more detail below. It will be appreciated that the performance of such functions by the control circuit 240 of the server may not be dependent on a human operator, and that the control circuit 240 of the server may be programmed to perform such functions without a human operator.

Figure 2C:
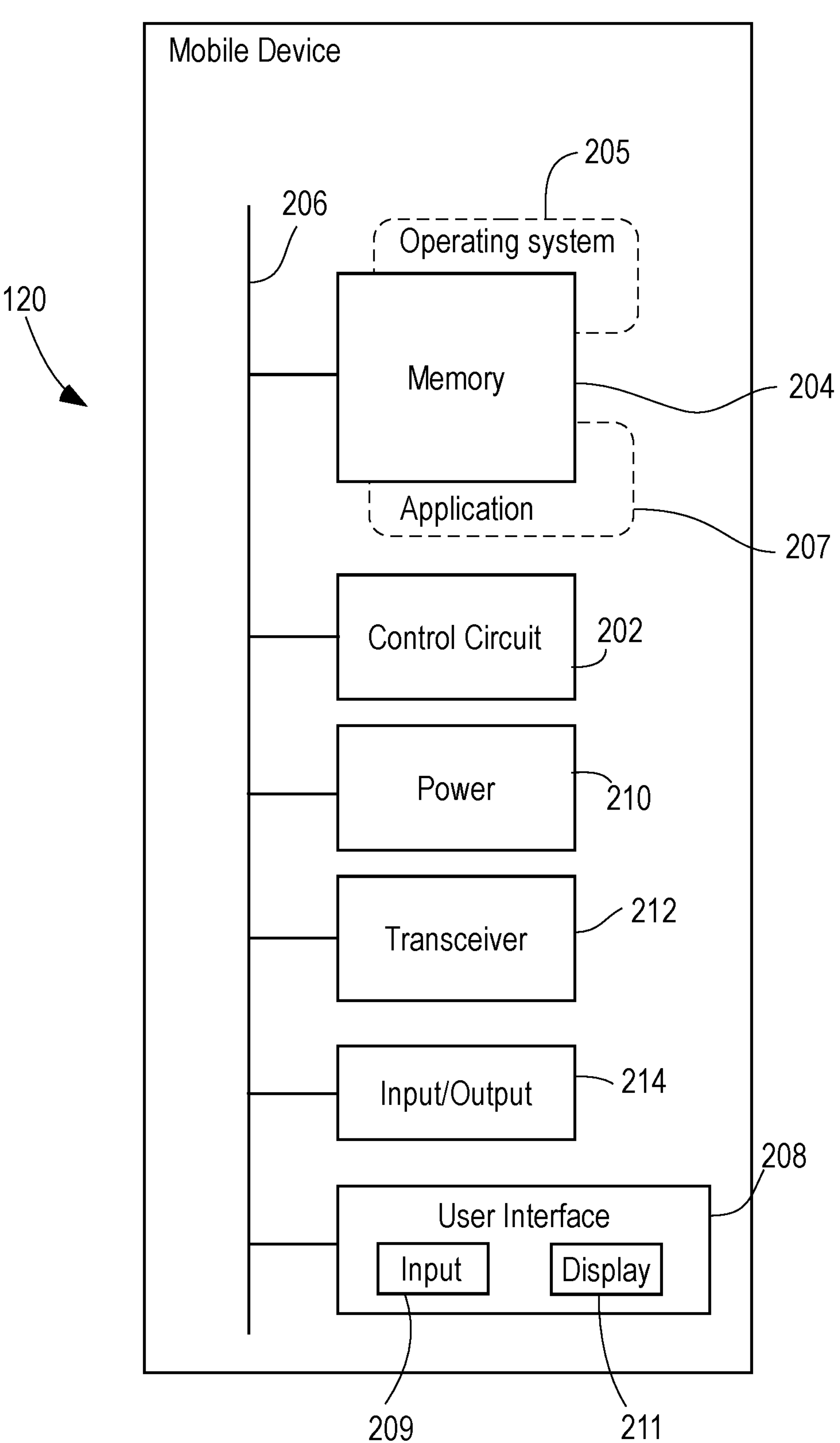
FIG. 2C is a functional block diagram of an exemplary mobile device in accordance with some embodiments.

FIG. 2C is a block diagram of a mobile device 120 (e.g., example mobile devices 120*a*-120*e*), according to some embodiments. The mobile device 120 may be used for implementing any of the functionalities described herein. By way of example, the mobile device 120 may comprise a control circuit 202 (e.g., processor), memory 204, and one or more communication bus 206 (e.g., links, paths, interconnections, or the like). Some embodiments may include one or more internal and/or external power sources or supplies 210. The control circuit 202 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, etc. Further, in some embodiments, the control circuit 202 can be part of control circuitry and/or a control system, which may be implemented through one or more processors with access to one or more memory 204 that can store commands, instructions, code and the like that is implemented by the control circuit 202 and/or processors to implement intended functionality. In some applications, the control circuit 202 and/or memory 204 may be distributed over a communications network (e.g., LAN, WAN, Internet) providing distributed and/or redundant processing and functionality.

In one embodiment, the memory 204 of the mobile device 120 stores data and executable code, such as an operating system 205 and an application 207. The application 207 is configured to be executed by the mobile device 120 (e.g., by the control circuit 202). The application 207 can be a dedicated application (e.g., an application dedicated to monitoring and/or controlling an irrigation system 116), a general purpose application (e.g., a web browser, etc.), and/or a dedicated application linking a general purpose application such as a browser to a user interface transmitted by a central computer or remote server. Accordingly, the application 207 is representative of all types of applications that may be resident on or run by the mobile device 120 (e.g., software preinstalled by the manufacturer of the mobile device, software installed by an end user (which may be a mobile app or an internet browser app), software installed by a vendor (e.g., irrigation company), etc.). In one embodiment, the application 207 operates in concert with the operating system 205 when executed by the control circuit 202 to cause actions to be performed by the mobile device 120. For example, with respect to the disclosure contained herein, execution of the application 207 by the processor of the control circuit 202 causes the mobile device 120 to perform actions consistent with the managing (e.g., monitoring and/or controlling) of the irrigation system 116. In some embodiments, the application 207 includes at least a part of the irrigation management application referred to herein. And in some embodiments, to the extent a browser function which is part of the application 207 or the operating system 205 in receiving commands, code (Java Script) and data to provide a user interface, such browser function can be considered part of the irrigation management application referred to herein.

The user interface 208 of the mobile device 120 can allow a user to interact with the system 100 and receive information through the system 100. In some instances, the user interface 208 includes a display device 211 (e.g., display screen, etc.) and/or one or more user input device 209 (e.g., buttons, touch screen, track ball, keyboard, mouse, etc.), which can be a part of, or wired, or wirelessly coupled with the mobile device 120. In the embodiment shown in FIG. 2C, the mobile device 120 further includes one or more communication interfaces, ports, and/or transceivers 212 and the like, allowing the mobile device 120 to communicate over a communication bus, a distributed computer and/or communication network (e.g., a local area network (LAN), wide area network (WAN), etc.), other wired or wireless networks or communication channels with other devices and/or other such communications or combination of two or more of such communication methods.

Further, the transceiver 212 can be configured for wired, wireless, optical, fiber optical cable, satellite, or other such communication configurations or combinations of two or more of such communications. Some embodiments include one or more input/output (I/O) ports 214 that allow one or more devices to couple with the mobile device 120. The I/O ports 214 can be substantially any relevant port or combinations of ports, such as but not limited to USB, Ethernet, or other such ports. The input/output 214 can be configured to allow wired and/or wireless communication coupling to external components. For example, the input/output 214 can provide wired communication and/or wireless communication (e.g., Wi-Fi, Bluetooth, LoRa, LoRaWAN, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The mobile device 120 is an example of a control and/or processor-based system with a control circuit 202. Again, the control circuit 202 can be implemented through one or more processors, controllers, central processing units, logic, software and the like. Further, in some implementations the control circuit 202 may provide the processor functionality. The memory 204, which can be accessed by the control circuit 202, typically includes one or more processor-readable and/or computer-readable media accessed by at least the control circuit 202, and can include volatile and/or nonvolatile media, such as RAM, ROM, EEPROM, flash memory and/or other memory technology. Further, while the memory 204 is shown as internal to the mobile device 120, the memory 204 can be internal, external or a combination of internal and external memory. The external memory can be substantially any relevant memory such as, but not limited to, solid-state storage devices (SSDs) or drives, hard disk drives (HDDs), one or more of universal serial bus (USB) stick or drive, flash memory secure digital (SD) card, other memory cards, and other such memory or combinations of two or more of such memory, and some or all of the memory may be distributed at multiple locations over a computer network. The memory 204 can store code, software, executables, scripts, data, content, lists, programming, programs, log or history data, user information, irrigation system information, and the like. While FIG. 2C shows various components being coupled together via a bus 206, it is understood that the components may actually be coupled to the control circuit 202 and/or one or more other components directly.

The following description relates to various user interface (UI) and programming features provided by the software of irrigation management application 114*a*-114*d*, which, as mentioned above, can be installed on and executed by, for example, a central control computer/server, a cloud-based server, a stand alone computing device (e.g., desktop, laptop, etc.), and a mobile device (e.g., a mobile phone, tablet, etc.) using an irrigation application.

In several embodiments, an irrigation management application is configured to cause a user interface to be displayed on a display to a user, the user interface including a map of a geographic region that includes at least one irrigation area. In some embodiments, various information is caused to be displayed together with the map. In some embodiments, the map includes imagery, such as aerial image data, whereas in some embodiments, the map is line-based and is a rendering of the a geographic region.

Figure 3A:
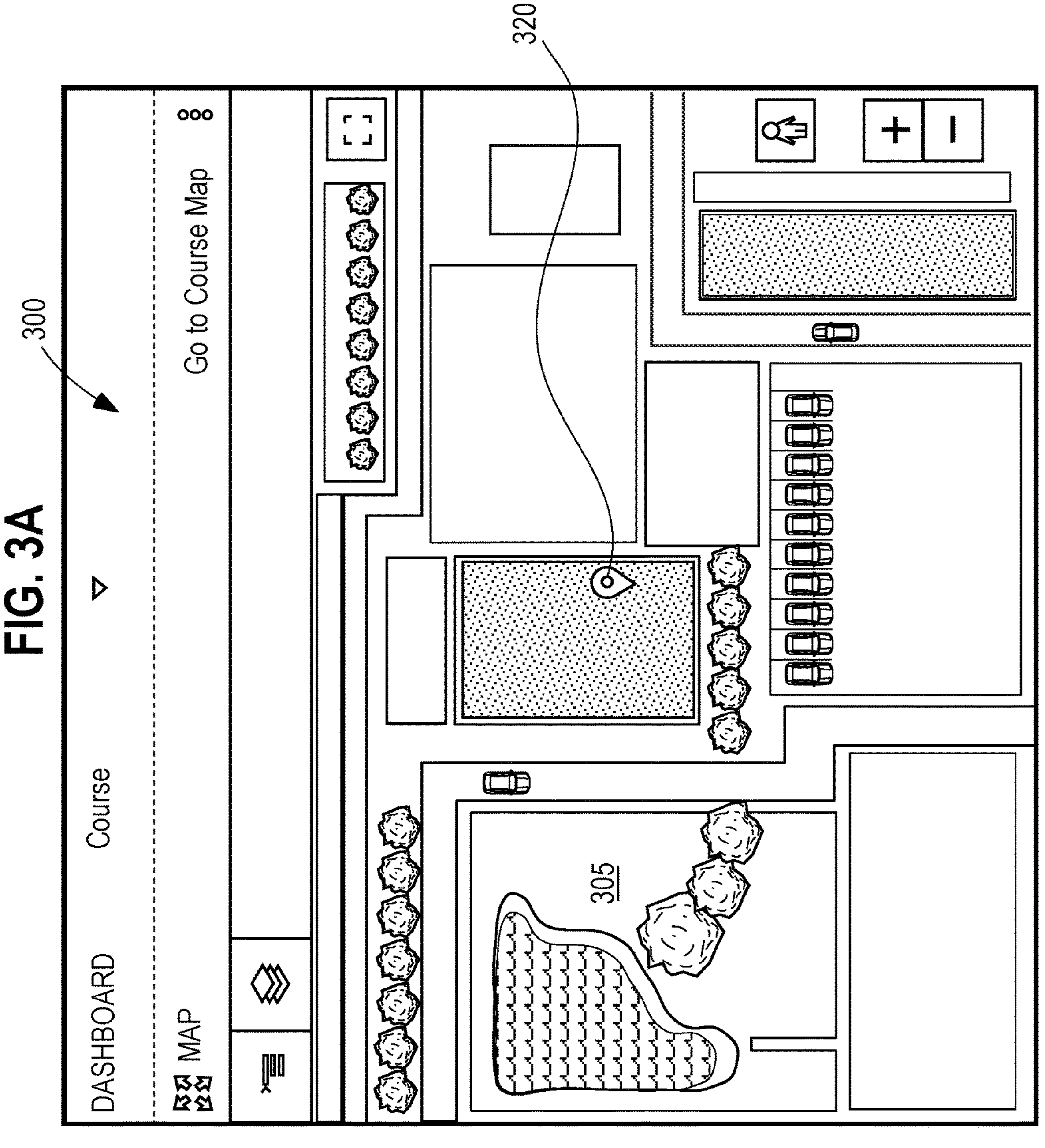
FIG. 3A illustrates an exemplary user interface in accordance with some embodiments that displays a map of an irrigation area and a location icon indicating a physical location of an electronic device of a user on the map.
Figure 3B:
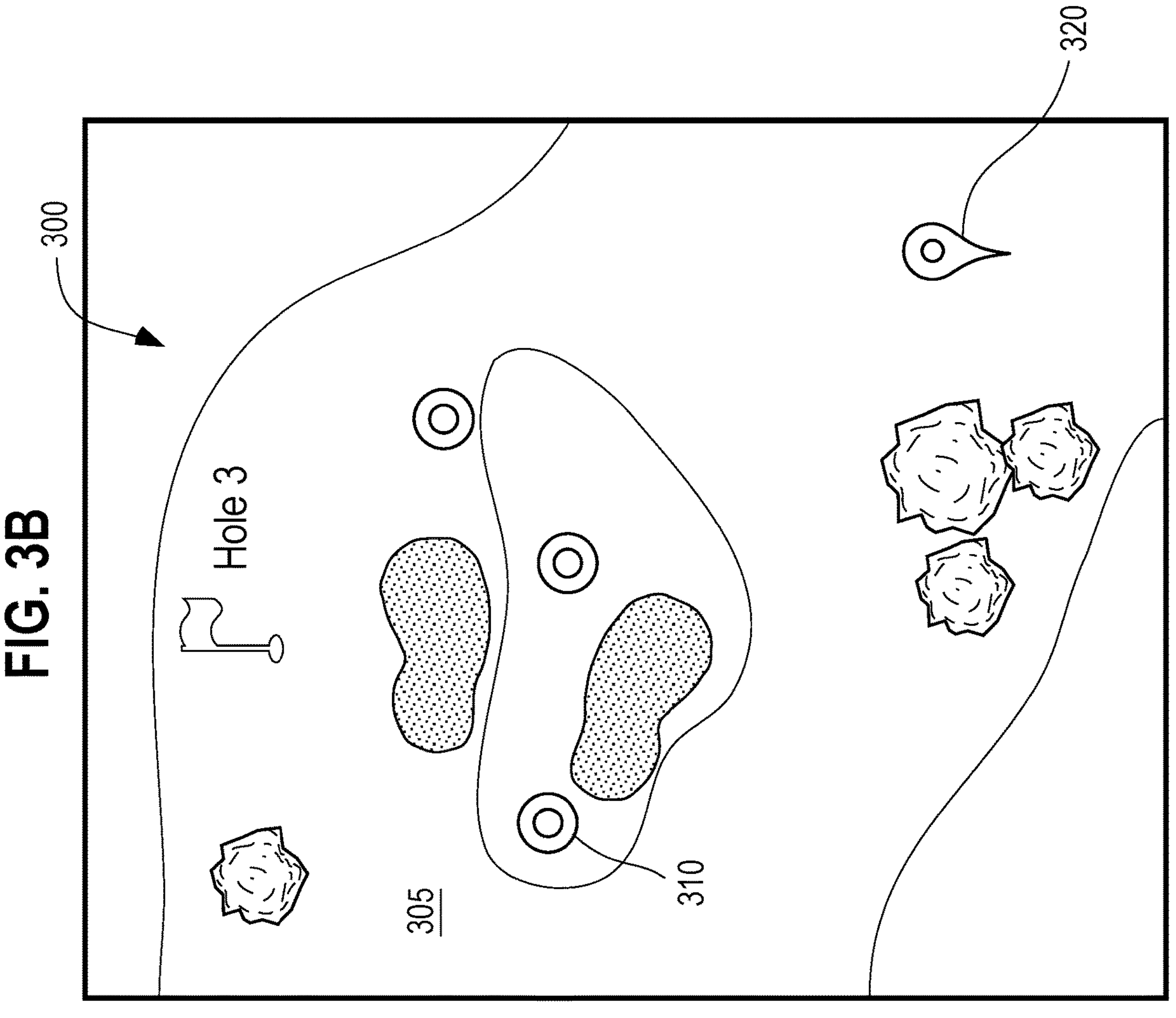
FIG. 3B illustrates an exemplary user interface in accordance with some embodiments that displays a map of an irrigation area and a location icon indicating a physical location of an electronic device of a user in the irrigation area.
Figure 3C:
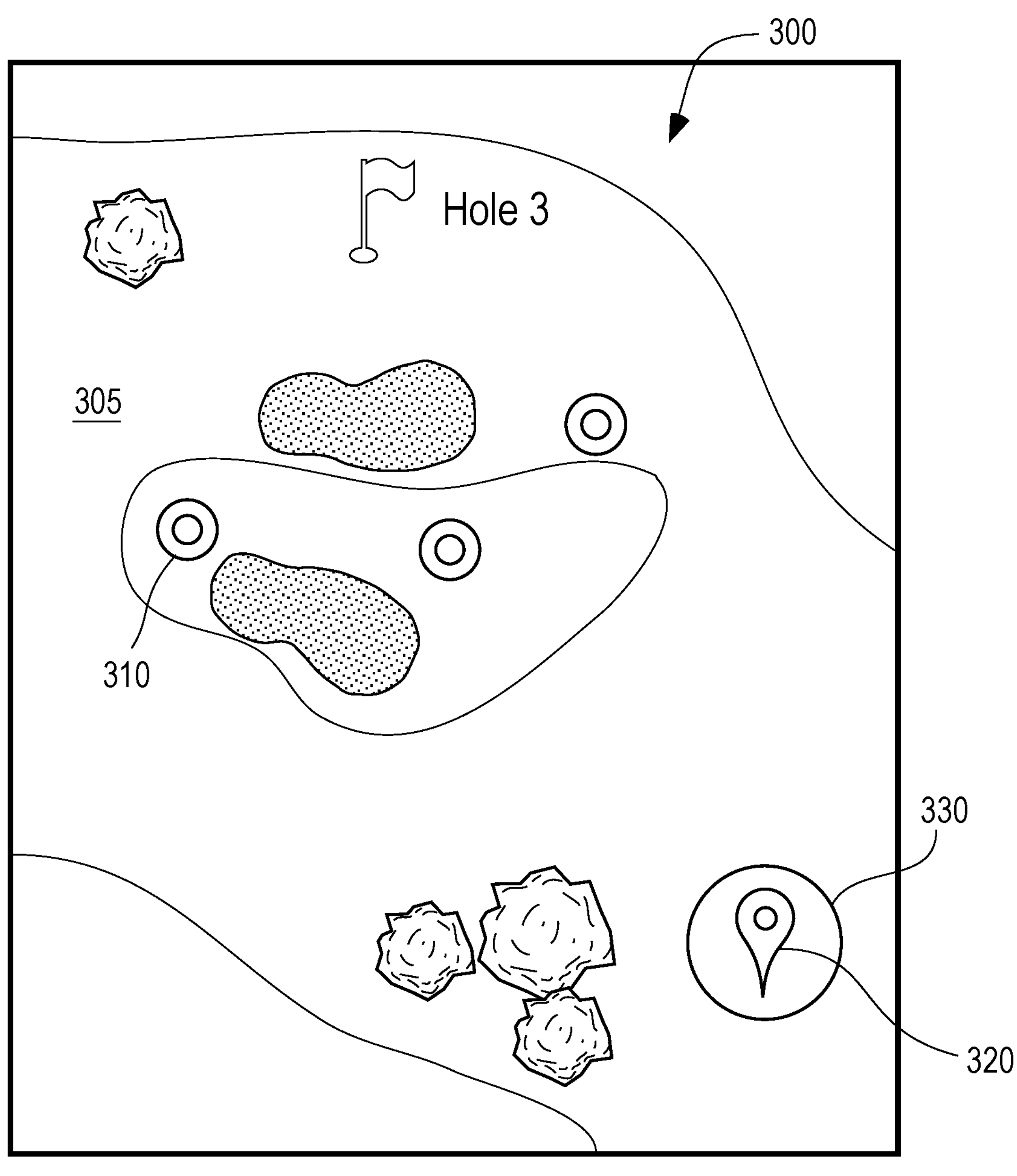
FIG. 3C illustrates an exemplary user interface in accordance with some embodiments that displays a map of an irrigation area, a location icon indicating a physical location of an electronic device of a user in the irrigation area, and a visual area around the location icon indicating a predicted accuracy of the physical location of the electronic device on the map.

With reference to FIG. 3A-3C, in some embodiments, a user interface 300 is caused to be displayed by the irrigation management application 114*a*-114*d* to a user and shows a map 305 of a landscape including portions to be irrigated (referred to herein as an "irrigation area") by an irrigation system 116. As shown in FIGS. 3A-3B, such a map 305 may show the landscape (buildings, roads, cars, grass, trees, bushes, etc.) as well as the locations of various components of the irrigation system 116, such as irrigation stations 310 (e.g., a station being an irrigation valve).

In some embodiments, the irrigation management application 114*a*-114*d* displays the map 305 of a geographic region including the irrigation area within the user interface 300 using satellite imagery, but other types of maps (e.g., street view, terrain, etc.) may be used. In the embodiments illustrated in FIGS. 3A-3B, whether the map 305 is displayed on a computer (FIG. 3A) or on a mobile device (FIG. 3B), the software of the application 114*a*-114*d* is configured to cause the user interface 300 to show the map 305 with a pin 320 indicating the location of the user (in particular, the location of the computer 118 or mobile device 120 of the user) viewing the map 305. This feature can be particularly helpful when the user is mobile and moves around the irrigation area on the map 305 while using a mobile device 120. That is, as shown in FIG. 3B, the user is able to easily see the location of the user (represented by the pin 320) on the map 305 relative to the irrigation components (such as irrigation station 310) located in the irrigation area displayed on the map 305. Notably, the landscape features (i.e., golf course, as well as buildings, parking lot, roads/driveways, and surrounding area) shown in FIGS. 3A-3C are shown by way of example only, and the map 305 displayed within the user interface 300 may be a map of a commercial area, residential area, park, crop fields, etc.

With reference to FIG. 3C, in some embodiments, the irrigation management application 114*a*-114*d* creates a user interface 300 with a map 305 that shows not only the location of a mobile device 120 of the user, but also shows the accuracy of the location of the mobile device 120 of the user on the map 305 by way of a geometric shape 330 (in this case, a circle) surrounding the location icon 320 representing the location of the mobile device 120 of the user. In some aspects, the application 114*a*-114*d* represents the accuracy of the physical location of the user's mobile device 120 via the size of the geometric shape. In other words, in one aspect, the more accurate the location determination of the user's mobile device 120 is, the smaller the shape 330 would be, and the less accurate the location determination of the user's mobile device 120, the larger the shape 330 would be. It will be appreciated that the geometric shape defining the accuracy of the location of the mobile device 120 is shown as a circle by way of example only, and that any geometric shape other than a circle (which may be unshaded or shaded in a selected color) may be used instead. In some embodiments, the accuracy of the estimated location of the user's mobile device 120 is determined using GPS location data sent from the mobile device 120 of the user sent to the application 114*a*-114*d* (and, in some aspects, via the application, to the central computer 112, 112*a*, or to the cloud server 112*b*).

It is noted that a pin 320 representing the location of a given user, such as a user operating a mobile device 120, may be caused to be displayed on any of the maps of the user interfaces described herein. In some embodiments, it can be helpful for the user to see the user's position on the map relative to the other data and features shown on the map.

Figure 4:
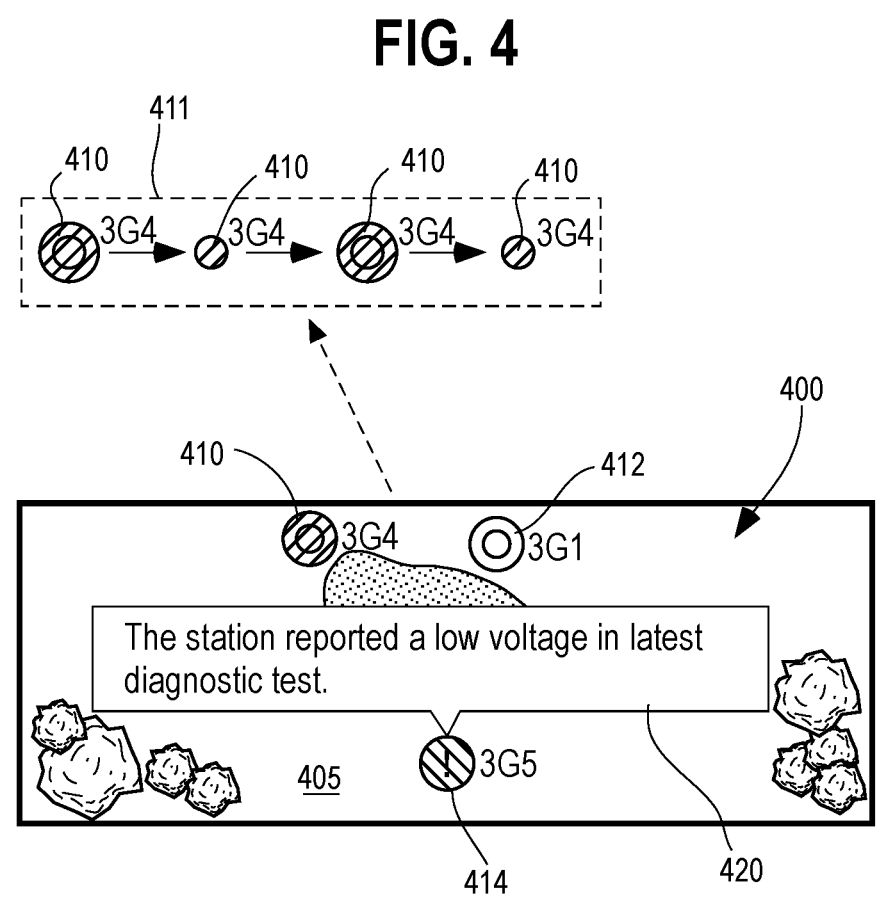

FIG. 4 illustrates a portion of an exemplary user interface 400 caused to be displayed by the irrigation management application 114 that displays a map 405 of an irrigation area indicating the location on the map of the irrigation stations (represented on the map by the station icons 410, 412, 414). In some embodiments, the user interface 400 may be generated and caused to be displayed by one or more of the various irrigation management applications 114 described herein by one or more of the various devices (e.g., central computer 112, cloud server 112*b*, computing devices 118, mobile devices 120, and so on). It is noted that generally, when referring to the irrigation management application, reference is made to any of the various embodiments of irrigation management application as described herein.

In some embodiments, the user interface 400 displays the station icons 410, 412, 414 in a way that they visually indicate (i.e., to a user viewing the user interface) an operational status (e.g., on or off, amount of irrigation run time left in the cycle, malfunction alert, etc.) and/or informational status (e.g., name, type of nozzle, pressure, voltage, etc.) associated with the irrigation stations of the irrigation system 116 that correspond to the station icons 410, 412, 414. For example, in some aspects, the application 114*a* varies the shape and/or color of the station icons 410, 412, 414 representing a given irrigation station to show whether the irrigation station corresponding to a given station icon 410, 412, 414 is on or off.

For example, as shown in FIG. 4, the station icon 410 for irrigation station 3G4 visually indicates (in one example, via being colored in with a predetermined color (e.g., blue, indicated by cross hatch fill)) that this irrigation station is currently on, while the station icon 412 for irrigation station 3G1 visually indicates (e.g., by being clear (no fill) as shown in FIG. 4, or by being colored in with another predetermined color) that this irrigation station is currently off. While the station icon 410 may visually indicate via a color that the irrigation station 3G4 is actively irrigating, in some embodiments (shown in the expansion window 411 of FIG. 4), the station icon 410 is an animated image (e.g., GIF or the like) that toggles between a smaller circle and a larger circle filled with the "on" color (indicated by the fill of the icon circle) to visually indicate a pulsing motion and draw the user's attention to the irrigation station 3G4 that is currently active. More generically, the station icon can be made to display as an animated image that changes between different sizes to indicate the operational status as being on.

In some embodiments, the irrigation management application 114 causes the user interface to be displayed so that the map 405 that the station icons provide a visual indication that the station is working properly or malfunctioning, e.g., the visual indication shows alerts associated with their corresponding irrigation stations. For example, in some aspects, the irrigation management application 114 can vary the shape and/or color of the station icon 410, 412, 414 representing a given irrigation station, or includes a symbol within the station icon to show that there is an alert associated with the corresponding irrigation station.

In the exemplary user interface 400 shown in FIG. 4, station icon 414 for irrigation station 3G5 may be shaded in with a predetermined color (e.g., red, indicated by a different cross hatch fill than icon 410) and/or may include a symbol (e.g., exclamation sign) to visually indicate that there is an alert (e.g., a possible malfunction or any other anomaly) for this irrigation station. For example, if the irrigation station 3G5 corresponding to the station icon 414 failed a diagnostic test, or if one or more sensors of the irrigation system 116 detects an alert condition (e.g., the detected line or device voltage at the irrigation station 3G5 is too low, etc.), the station icon 414 visually displays an alert for the irrigation station 3G5 (as shown in FIG. 4). In some embodiments, the user interface can overlap an informational field 420 proximate the alert condition to briefly indicate the condition leading to the alert status. In some embodiments, the field 420 is displayed along with the station icon 414, and in some embodiments, the field 420 is hidden until the user clicks on or hovers over (e.g., using a pointer or touch) the station icon 414 which then reveals the field 420. In certain aspects, the visual alerts indicated by the station icon 414 within the interface 400 of FIG. 4 are also viewable in log reports that may be accessed by a user of the computer, mobile device, etc. via the irrigation management application. However, such log reports are presented in separate interfaces and disconnected from any map views. In some embodiments, it can be helpful for a user to be viewing the user interface while at the site to see the alert and/or operational status and get visual confirmation of location.

In some embodiments, the irrigation management application 114 is used to monitor various diagnostics, operational attributes, and/or other information associated with the various components of the irrigation system 116. For example, the exemplary user interface 500 of FIG. 5A displays diagnostics (e.g., in table format) of various information relating to operational status of the irrigation stations of the irrigation system 116 deployed in a given irrigation area. Generally, the user interface 500 may display information including but not limited to line voltage, flow rate, water pressure, etc. measured (by one or more sensors) in association with the irrigation stations of the irrigation system 116. In the illustrated embodiment, the exemplary user interface 500 shows that the operational attributes and/or status of 17 irrigation stations were tested, and that 16 out of 17 irrigation stations passed the diagnostic test, while only one of the irrigation stations did not pass the diagnostic test. In one aspect, in addition to the general information indicating how many irrigation stations passed the diagnostic test and how many irrigation stations failed the diagnostic test, the user interface 500 visually indicates the specific irrigation station (in this example, 3G5) that did not pass the diagnostic test, and also shows various information (e.g., physical location of the irrigation station, reason for the alert at the irrigation station, type of interface of the irrigation station, etc.). It will be appreciated that the information shown in association with the irrigation station 3G5 in the user interface 500 has been shown by way of example only, and that, in some embodiments, the user interface 500 may be configured to show additional or different information associated with the irrigation station 3G5.

In some embodiments, the irrigation management application 114 is configured to permit users (e.g., of various devices such as computing device 118, mobile devices 120, etc.) to define various operational attributes of irrigation stations, and to define the values of operational thresholds for these operational attributes that will trigger an alert, which would then be displayed to the user via the irrigation management application 114. For example, the user may define an operational attribute such as the nominal line or device voltage that should be measured at the stations, and specify minimum and maximum thresholds that, if exceeded, would trigger an alert. Once defined, the user may cause the irrigation management application 114 to run a diagnostic test on all or selected irrigation stations of the irrigation system 116. After the diagnostic test is completed, in some embodiments, the report shown in FIG. 5A and discussed above is displayed within the user interface 500 and shows the results of the diagnostic test. As pointed out above, the report shown in FIG. 5A reflecting the results of a voltage test at the irrigation stations of the irrigation system 116 visually indicates 16 irrigation stations passed and 1 irrigation station failed, station 3G5, and the station 3G5 may be associated within the interface 500 with an alert icon 512 (which may be, for example, a triangle with an internal exclamation sign as shown in FIG. 5A) visually indicating that the irrigation station 3G5 failed the diagnostic test.

Figures 5A, 5B:
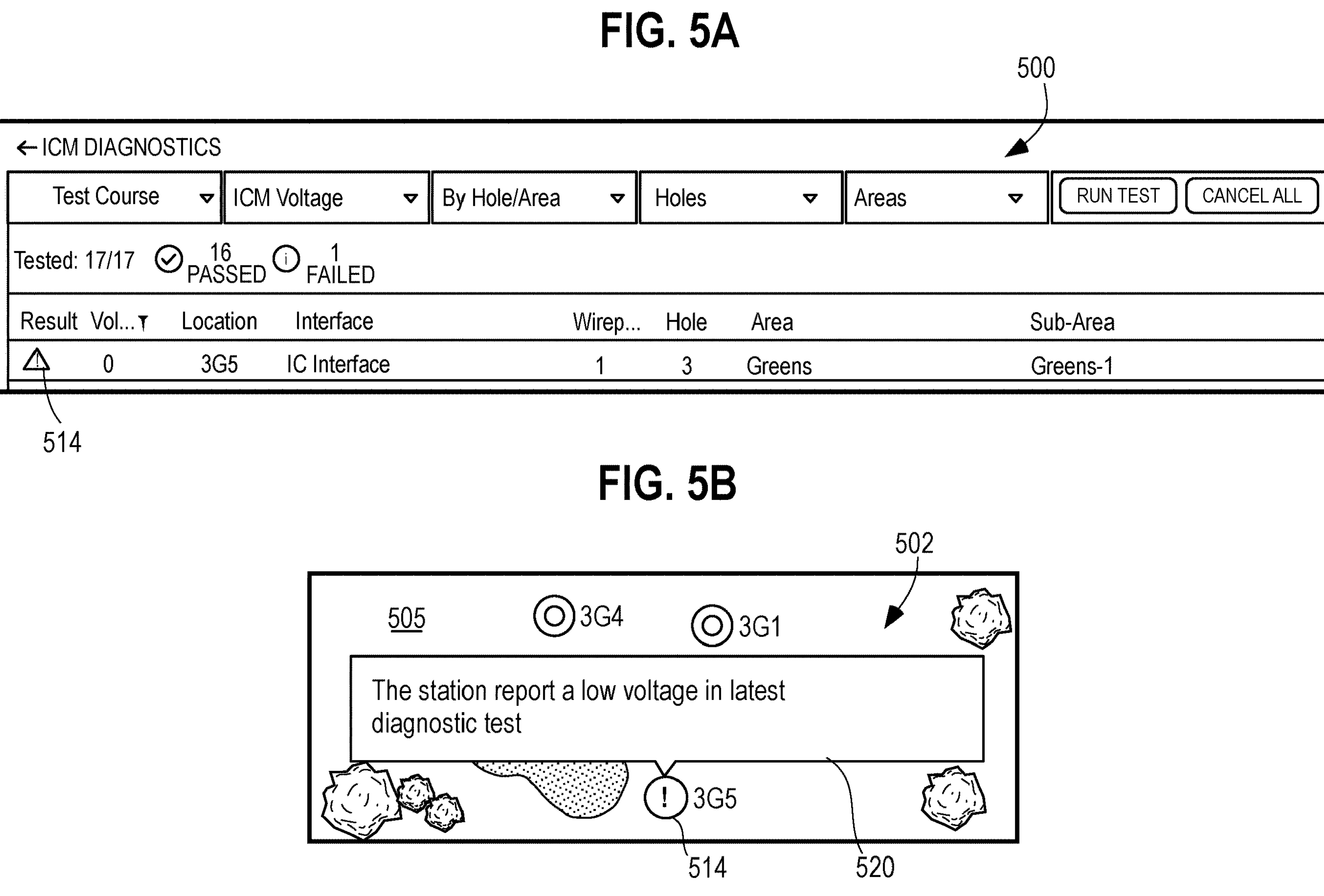
FIG. 5A illustrates an exemplary user interface in accordance with some embodiments that displays diagnostics relating to operational status of the irrigation stations deployed in the irrigation area.
FIG. 5B illustrates an exemplary user interface in accordance with some embodiments that displays, on the map of the irrigation area, diagnostics relating to operational status of the irrigation stations deployed in the irrigation area.

As shown in FIG. 5B, a portion of the user interface 502 may show a portion of the map 505 of a geographic region including the irrigation area that contains the irrigation station 3G5 that failed the diagnostic test. In the exemplary user interface 502 illustrated in FIG. 5B, on the map 505, the station icon 514 for the irrigation station 3G5 that failed the diagnostic test visually indicates the alert. For example, in FIG. 5B, the station icon 514 for station 3G5 is displayed in a color that is indicative of an alert (e.g., red, yellow, etc., see FIG. 4). In addition, as shown in FIG. 5B, the user interface 502 may include an informational field 520 overlaying a portion of the map, with this informational field displaying to the user the reason for the alert, in this case, the reason being that a voltage that was below the user-defined minimum threshold was measured at the irrigation station 3G5 during the diagnostic test.

Figure 6A:
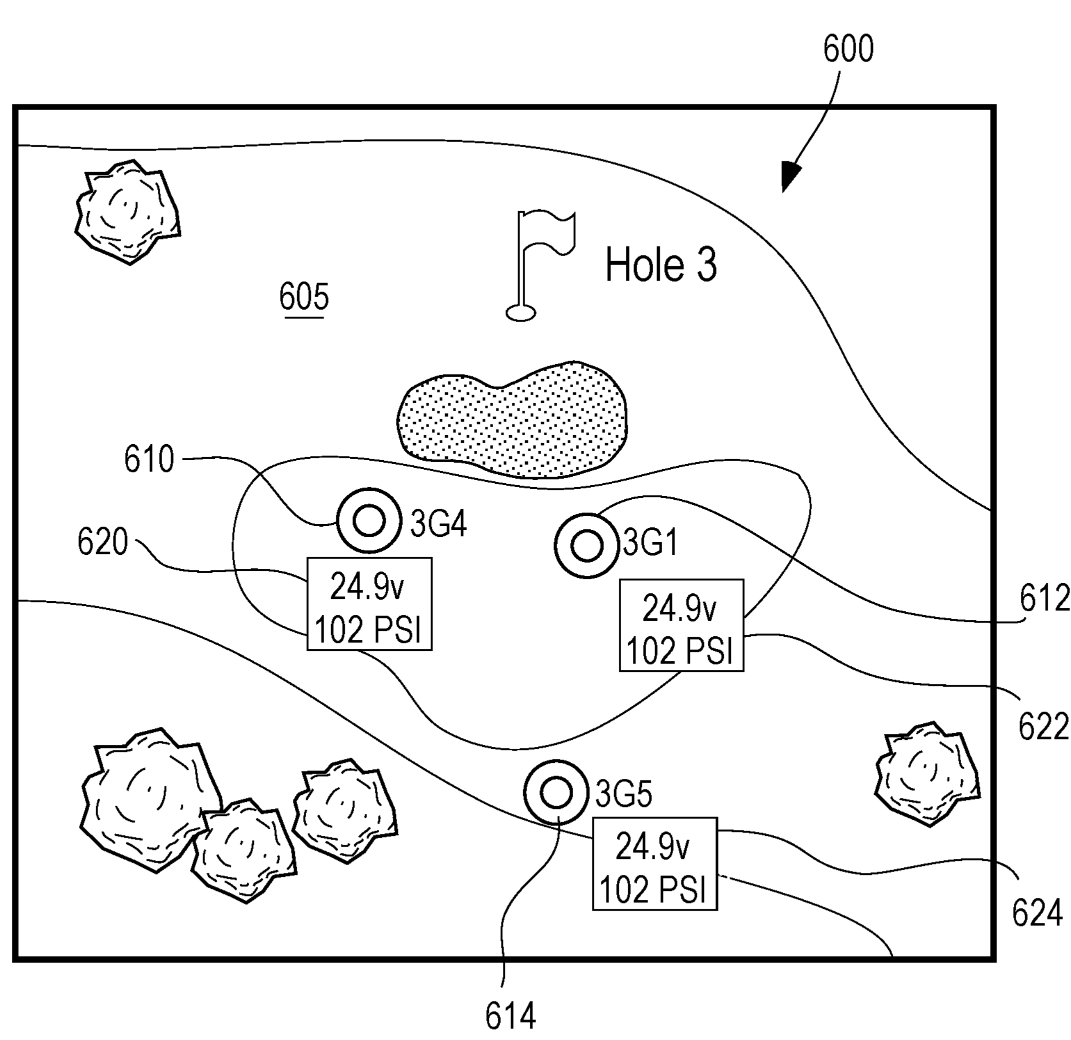
FIG. 6A illustrates an exemplary user interface in accordance with some embodiments that displays a map of an irrigation area including station icons corresponding to the irrigation stations deployed in the irrigation area, as well as informational fields indicating the operational and/or informational attributes of the irrigation stations.

With reference to FIG. 6A, in some embodiments, the irrigation management application 114 may be operated to cause the display of a user interface 600 on a display of a user's electronic device that displays a visual indication of an informational attribute and/or a value for one or more operational parameters of an irrigation station corresponding to a station icon. For example, an informational attribute may include user-defined diagnostics/test results in real-time on the map 605 of a geographic region including the irrigation area displayed within the user interface 600. In the illustrated exemplary embodiment, the user interface 600 displays informational fields 620, 622, 624 that visually indicate values of the measured voltages and pressures at the irrigation stations corresponding to the station icons 610, 612, and 614, respectively. It will be appreciated that the informational fields 620, 622, 624 are shown in FIG. 6A as displaying voltages and pressures by way of example only, and that the user interface 600 may display any other user-defined operational parameters and/or informational attributes (e.g., measured flow volume/rate, nozzle type, location information, geo-location information, elevation relative to sea level of the irrigation stations, etc.) associated with the irrigation stations corresponding station icons 610, 612, 614.

Figure 6F:
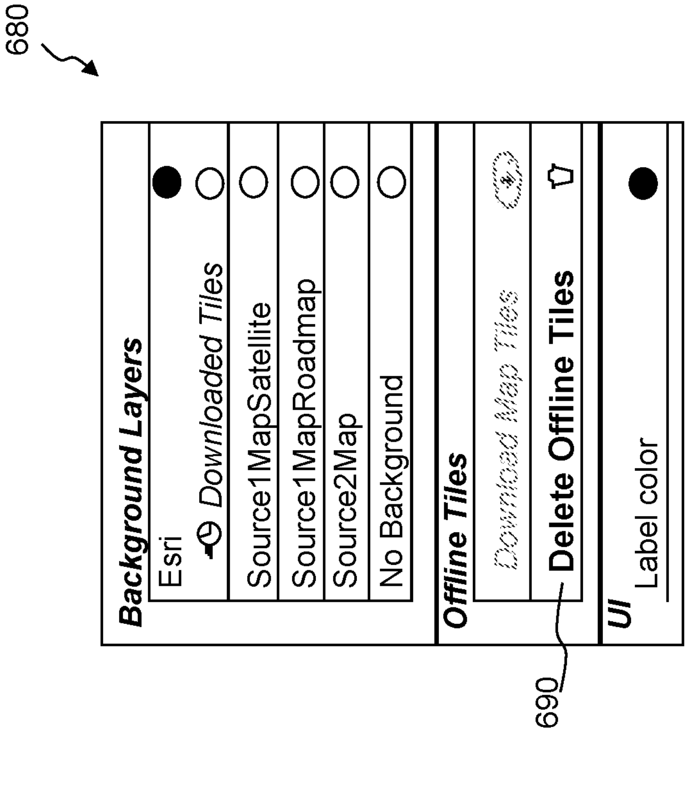
FIG. 6F illustrates a simplified representation of the exemplary map source menu with delete option in accordance with some embodiments.

In the example shown in FIG. 6A, the user interface 600 is configured such that the informational fields 620, 622, 624 that display operational parameters (e.g., voltage and pressure) of the irrigation stations are displayed on the map 605 adjacent their corresponding irrigation station identifiers 3G4, 3G2, and 3G5 and the station icons 610, 612, 614 to assist the user in visually identifying (and troubleshooting) any possible operational issues. In some embodiments, the user interface 600 may be configured such that the informational fields 620, 622, 624 are not always visible on the map 605 as shown in the exemplary embodiment of FIG. 6, but only appear on the map 605 in response to a user manually selecting (e.g., tapping on, clicking on, hovering over with a mouse, etc.) a given one of the station icons 610, 612, 614. And in some embodiments, the informational fields 620, 622, 624 are included in a layer superimposed on the map 605, where the layer can be user selected to be hidden or shown.

Referring next to FIG. 6B while also referring to FIG. 6A, an electronic device is shown in accordance with some embodiments that stores map data downloaded from a wide area network in memory to be retrieved for display on a user interface without having to access a remote source for the map, such as in the event an active network connection is not available. In some embodiments, to display a map of a geographic region including the irrigation area within the interface on an electronic device 120, the irrigation management application 114 obtains (e.g., receive via a wide area network, such as network 124) aerial map imagery corresponding of the portion of the irrigation area from a map server (also referred to herein as a map service server) 650 (and optionally causes this aerial map imagery to be downloaded and locally stored to the memory 204 of the mobile device 120). The irrigation management application 114 may be operated to subsequently display the user interface 660 including a map layer 662 (e.g., the map layer 662 can include the aerial map imagery) of the irrigation area without requiring the electronic device (e.g., mobile device 120, computer 118, server 122 and/or other such electronic devices) operated by the user to have an active connection to the network 124, e.g., when the computer 118 or the mobile device 120 is offline and unable to download the map (e.g., from a map service server) over a network. For example, in one aspect, the imagery of the irrigation area, may include and/or be configured as a map layer 662 that includes the map of the irrigation area 605. The irrigation management application 114 and/or a remote server can further generate and/or access irrigation control layer information that identifies geographic locations of irrigation components (e.g., valves, sprinklers, sensors, etc.) and/or operational status information for the one or more irrigation components that correspond to the irrigation area 605. This irrigation component information and/or status information can be used by the irrigation management application 114 and/or remote server to generate one or more irrigation control layers 664, which can be superimposed on one more geographically corresponding map layers 662. For example, an irrigation control layer 664 can include virtual graphical representations and/or images of the station icons 610, 612, 614 corresponding to the irrigation stations associated with the irrigation area 605. The map and/or map layer obtained from a map service server 650 or the like, and the one or more irrigation control layers 664 may be stored in a memory 204 of the mobile device 120 to speed up the display of the map 605 by the user interface 600. In one aspect, the memory 204 of the mobile device 120 includes a buffer memory 656 that permits temporary storage of data, and this buffer memory 656 can temporarily store the aerial map imagery received from the map service server 650. In some embodiments, the irrigation management application 114 can cause the map 605 and/or map layer 662 to additionally or alternatively be stored in non-volatile memory 654 for longer term storage. As such, the electronic device (e.g., mobile device 120) could rely on the map 605 and/or map layer 662 already stored in its memory 204 without having to access the map server 650 (e.g., when the network connection is down and/or unavailable) and/or could take advantage of an active network connection to download a new map 605, such as to update the map and/or when there have been changes to the map 605. This feature can help in situations when, for example, the mobile device 120 is in a location having poor cell phone/Wi-Fi coverage or limited connectivity, or if the mobile device 120 of the user does not have network access (e.g., Internet access) or does not have the Internet access functionality. The software can display the locally saved map and/or one or more map layers 662, and when relevant simultaneously graphically render one or more irrigation control layers 664 to identify one or more irrigation components, component status information and/or other relevant information as described above and below overlayed on the displayed map layer without having to access the map server 650 and download the map.

In some embodiments, by retrieved the pre-stored map imagery/map layer, in addition to being able to provide map services when there is no network connection, the speed for rendering the user interface with the map is improved, particularly when network connection speeds are low (such as at a location of the irrigation site having poor network coverage). In some embodiments, the irrigation management application is configured to look first to internal memory to load the map layer rather than attempt to retrieve the map layer from the map server. In some embodiments, this can reduce charges for map calls from the map server.

In some embodiments, the irrigation management application 114 provides an option displayed through the user interface to allow the user to download the map and/or the map tiles for one or more maps and/or imagery corresponding of the portion of the irrigation area 605 from the map service server 650. FIG. 6C illustrates a simplified representation of an exemplary map source menu 680 displayed by the irrigation management application 114. The exemplary map source menu 680 can, in some implementations, be a dropdown menu displayed in response to a selection and/or a hovering over a certain option icon. In other implementations the map source menu 680 is displayed while a map is rendered. In some embodiments, the map source menu 680 includes one or more map source options 681 that correspond to different sources of maps and/or map tiles from which the user can select. In some embodiments, the map source menu 680 includes a download map tiles option 682 that can be activated to cause one or more maps and/or map tiles to be downloaded to the electronic device (e.g., mobile device 120). For example, the selection of the download map tiles option 682 can cause the irrigation management application 114 to identify a current map tile being displayed, and communicate with the map source server to identify those map tiles associated with and/or within a threshold geographic distance and/or area of the displayed map tile. FIG. 6D illustrates an exemplary download confirmation option 683 identifying a number of map tiles to be downloaded and one or more options (e.g., an option to initiate the download 684 and an option to decline the download 685).

Figure 6E:
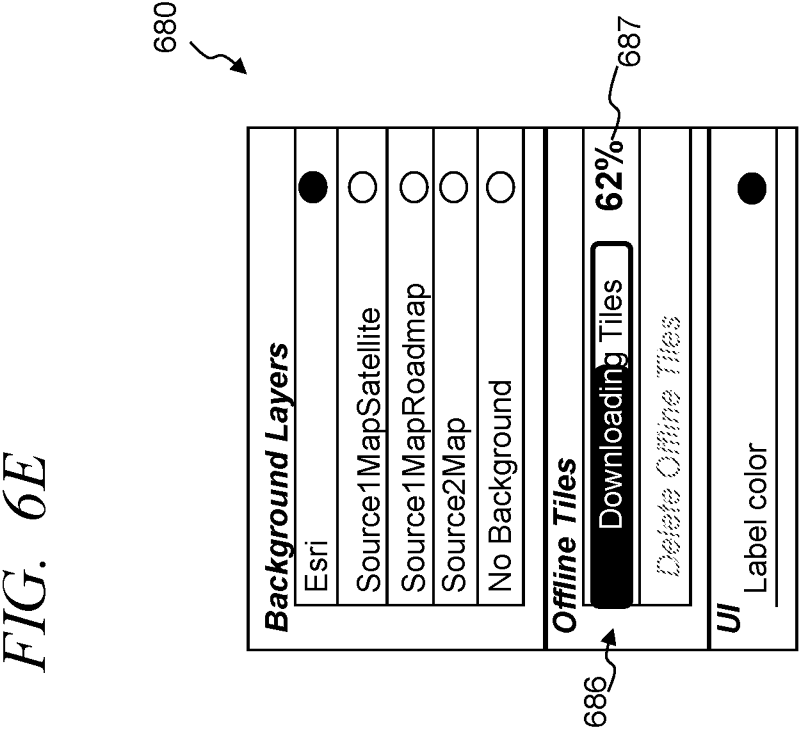
FIG. 6E illustrates a simplified representation of the exemplary map source menu with a download indicator, in accordance with some embodiments.

In some embodiments, the irrigation management application 114 can provide feedback and/or confirmation of the downloading. FIG. 6E illustrates a simplified representation of the exemplary map source menu 680 with a download indicator 686 (e.g., a graphical bar representing an amount downloaded and/or remaining amount to download, a percentage 687 downloaded, and/or other indicators) confirming downloading and/or a status of the downloading. In some embodiments, the map source menu 680 can further include a delete option 690 that when activated causes one or more downloaded tiles and/or downloaded maps to be deleted from the local memory 204 of the electronic device.

Figure 7A:
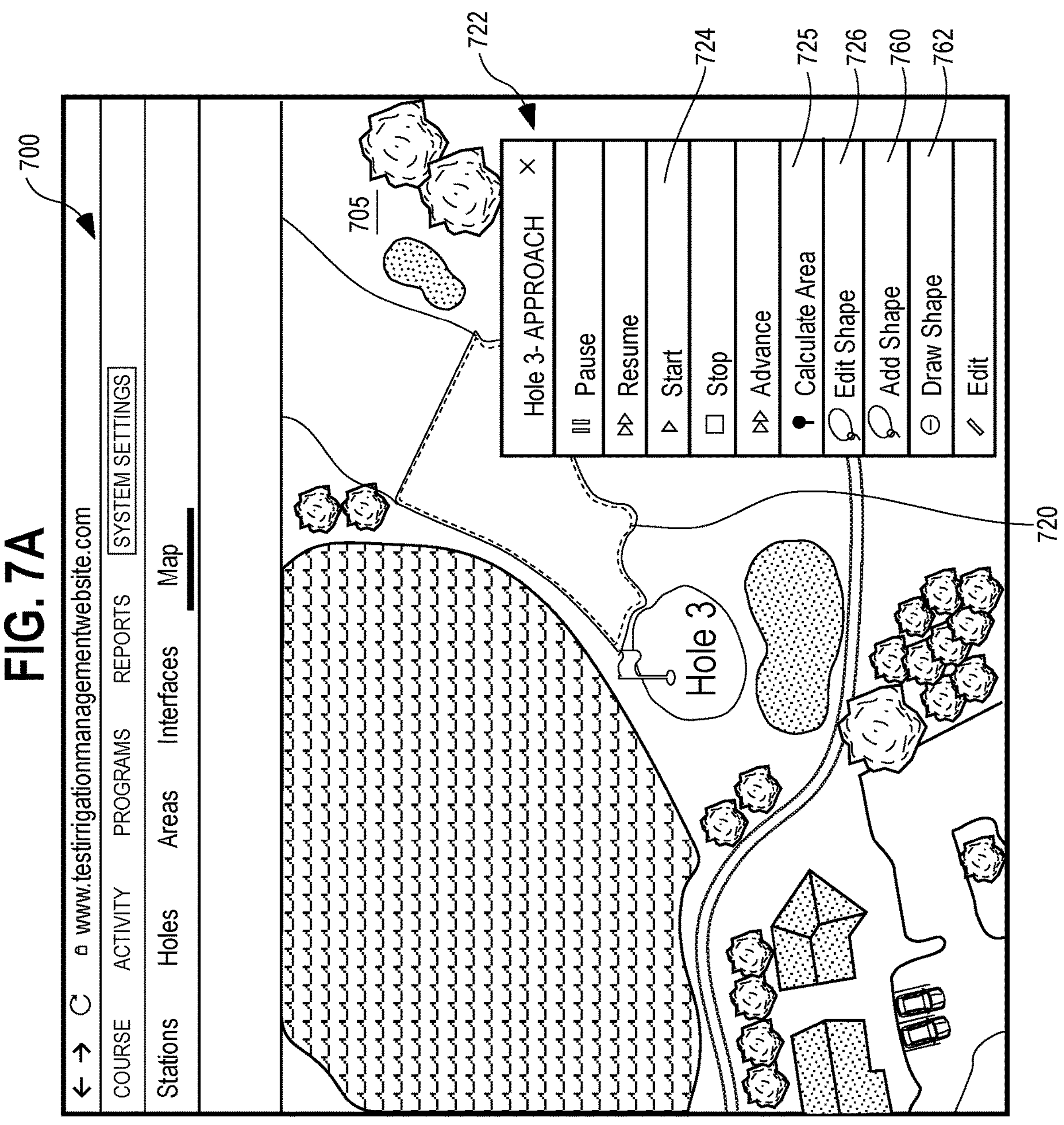
FIG. 7A illustrates an exemplary user interface in accordance with some embodiments that displays a map of an irrigation area where irrigation stations are deployed and shows a multi-station selector feature that permits a user to apply control selections to multiple irrigation stations.

In some embodiments, described in more detail below with reference to FIGS. 7A-7M, the irrigation management application 114 is configured to generate a user interface that causes a multi-station selector feature to be displayed to the user and that permits a user to select irrigation stations and display an interactive control menu overlaid on a portion of the map to allow a control selection to be applied to each of the selected irrigation stations selected. In some embodiments (e.g., as shown in FIG. 7A), the user interface includes one or more independently-selectable portions (e.g., represented by polygons in FIG. 7A) of the irrigation area, and the interactive control menu allows the user to select, monitor and/or control one or more irrigation stations associated with the selected polygon (e.g., located within the shape of the polygon, or otherwise located near the shape of the polygon but that are controlled similarly to those stations within the shape, e.g., the station is physically outside of the polygon but causes irrigation within the polygon). In some embodiments, each polygon may represent a portion of the irrigation area that contains plant life of a similar type (e.g., trees, bushes, etc.). In other embodiments, each polygon may represent a portion of the irrigation area that represents a plant-free section (e.g., bunker of a golf course, etc.) of the irrigation area 705.

In the embodiment illustrated in FIG. 7A, the exemplary user interface 700 allows the user to select a polygon 720, which can be created as described in more detail below, and which represents a portion of the area of the map of the irrigation area 705 (also referred to herein as map 705), and then to make one or more control selections that allow the user to manage (e.g., monitor, control, etc.) various aspects of the devices (e.g., interface units 126, encoder units 127, decoders 128, satellite controllers 130, valves, sensors, etc.) of the irrigation system 116 associated with the user-selected polygon 720. In some aspects, the user interface 700 permits the user to select a polygon 720, which effectively selects all devices (e.g., irrigation stations, etc.) of the irrigation system 116 located in the polygon 720, and permits the user to manage (e.g., monitor, control, etc.) all devices associated with the polygon 720. Devices associated with the polygon can include those devices physically within the periphery or shape of the polygon on the map of the irrigation area 705 as well as device that are located outside of the periphery or shape of the polygon 720 but in some way associated with the area represented by the polygon, such as rotors, valves, encoders that are outside of the polygon but cause irrigation to occur within the polygon.

In the example user interface 700 shown in FIG. 7A, the user has selected (e.g., by tapping, clicking, hovering over, etc.) the area defined by polygon 720 (i.e., area called Hole 3-Approach), in response to which the user interface 700 has generated and displayed an interactive control menu 722, which is displayed within the user interface 700 as being overlaid on a portion of the map 705. This interactive control menu 722 generated by the user interface 700 is shown in FIG. 7A with exemplary control selections (e.g., pause, resume, start, stop, advance, calculate area, edit shape, add shape, draw shape, remove, edit), but it will be appreciated that the user interface 700 may be configured to include additional or different control selections. In some aspects, the control menu 722 permits the user to manually select an operational command such as "Start" 724 within the control menu 722, and such a selection by the user would cause all irrigation stations associated with the polygon 720 to start watering. By the same token, the control menu 722 provides the user with the ability to select other operational commands such as Pause, Resume, Stop, and such a selection would cause all irrigation stations associated with the polygon 720 to either stop, pause, or resume watering.

Figure 7B:
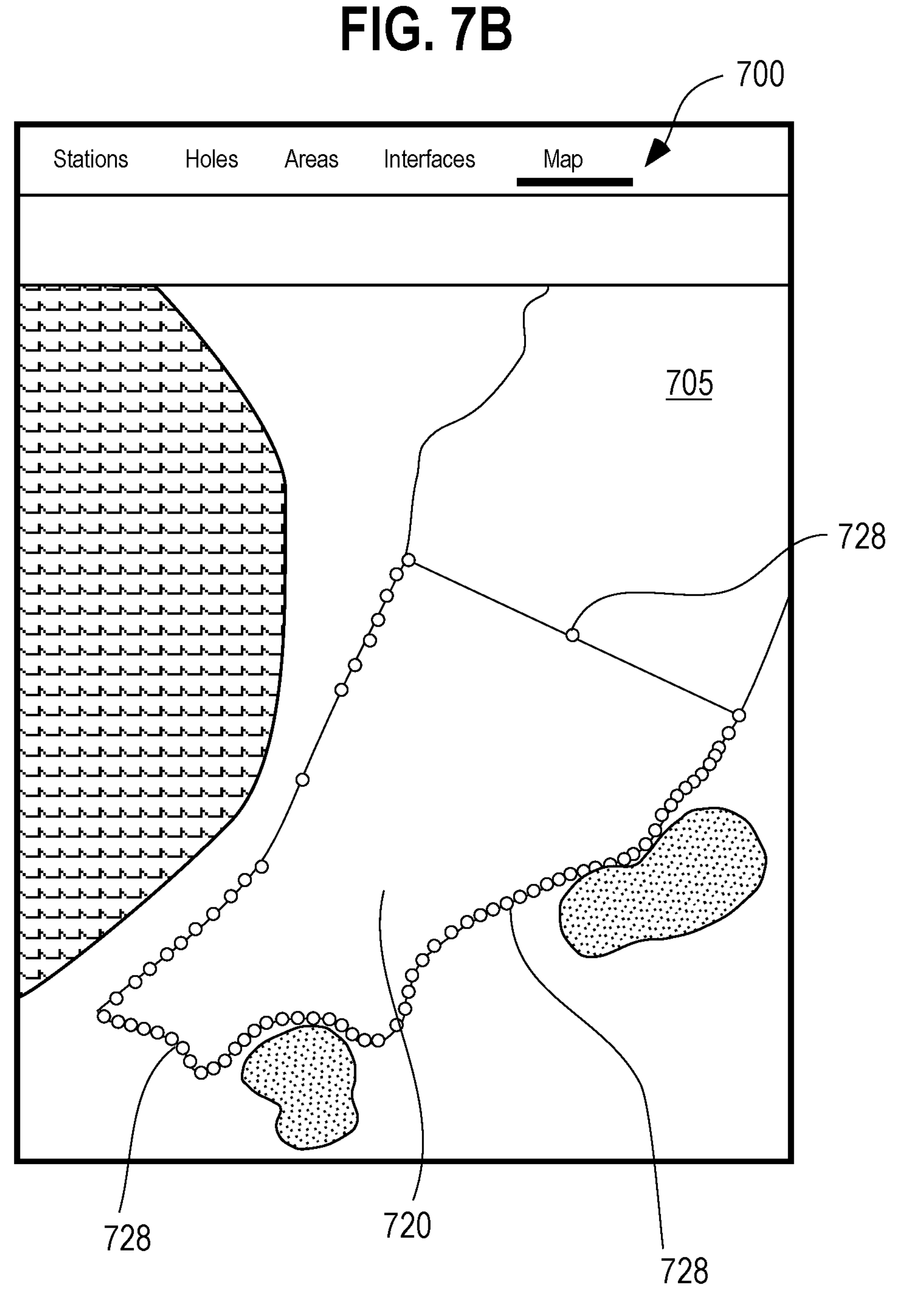
FIG. 7B shows an embodiment of the user interface of FIG. 7A and shows the multi-station selector feature as a user-selectable polygon with an overall shape that the user can edit within the map in accordance with some embodiments.

Notably, some of the control selections of the control menu 722 may not be configured to directly control the devices of the irrigation system 116 associated with the polygon 720. For example, control selection 725 permits the user to calculate the area of the user-selected polygon 720, and control selection 726 permits the user to manually adjust the overall size/shape of the polygon 720. In some embodiments, in response to a selection by the user of the "Edit Shape" 726 control selection in the control menu 722 in FIG. 7A, the user interface 700 displays the various points 728 defining an exterior boundary (i.e., perimeter or periphery) of the polygon 720 on the map 705 as shown in FIG. 7B. In the illustrated embodiment of FIG. 7B, each of the points 728 lying on the perimeter of the polygon 720 can be selected by the user and moved (e.g., by dragging via a finger, computer mouse, etc.) to re-define the overall shape of the polygon 720 and the overall size of the area enclosed by the polygon 720. It will be appreciated that the individual points 728 defining the perimeter of the polygon 720 do not necessarily have to be visible within the interface 700 as shown in the example provided by FIG. 7B, and that the perimeter of the polygon 720 may be visible as a continuous line, and the user may readjust the overall shape/size of the polygon 720 by tapping/clicking on portions of the line and moving portions of the line inwardly/outwardly to reduce/increase the overall size of the polygon 720 and the area enclosed by the polygon 720.

In some embodiments, the irrigation management application 114 may provide the user with a user interface including the map pre-divided into independently-selectable polygons 720 defining variously-shaped areas on the map 705. These pre-defined polygons may be provided by the irrigation management application 114 using a tool that automatically detects changes in the imagery of a map or automatically detects features in the map (e.g., fairways, greens) based on other line-based illustrations or maps and creates selectable polygons within the map. In other embodiments, users can edit the periphery of existing shapes (pre-defined or edited shapes) to create updated or custom shapes (such as shown in FIG. 7B). In other embodiments, users can add generic-shape polygons (square, rectangle, circle, oval, triangle, trapezoid) and edit the periphery (e.g., using an "Add Shape" 760 control selection, see FIGS. 7A and 7C-7G) to manipulate a generic-shaped polygon by a user into a desired custom-shaped polygon. In other embodiments, the user can use a drawing tool to draw a custom-shaped polygon (e.g., using a "Draw Shape" 762 control selection, see FIGS. 7A and 7G).

In some circumstances, pre-defined or existing polygons 720 provided by the irrigation management application 114 may not fully cover a user-desired area of the map 705, which may have a regular geometric shape (e.g., rectangle, circle, square, etc.) or an irregular geometric shape. To address this, in some configurations with reference to FIGS. 7C-7F, the irrigation management application 114 can provide an option to add a shape, e.g., by selecting the "Add Shape" 760 control selection of FIG. 7A which will activate a drawing tool 764, such as a generic-shape polygon 770 which may appear over a portion of the map 705, and which permits the user to manually create a custom-shape polygon **720*a* having an overall size and shape selected by the user, and this custom-shape polygon 720*a* can then be selected by the user as described above with reference to FIG. 7**A.

As shown in FIGS. 7C-7F, each of the points 774 lying on the lines 772 representing the perimeter of the polygon 770 can be selected by the user and moved (e.g., by dragging via a finger, computer mouse, directional arrows, etc.) to re-define the overall shape of the generic-shape polygon 770 and the overall size of the area enclosed by the polygon 770. After the user utilizes the drawing tool 764 to manipulate the polygon 770 into a shape that is acceptable to the user (see FIG. 7E), the user may cause the drawing tool 764 to disappear from view within the interface, causing the final custom-shape polygon **720*a* that was drawn/created by the user using the drawing tool 764 to become visible on the map of the irrigation area 705** within the user interface.

While FIGS. 7C-7F show the drawing tool 764 as providing a generic-shape polygon 770, the perimeter of which is defined by lines 772 having a plurality of points 774 (which may be circle-shaped as shown, square-shaped, etc.), in some embodiments, the drawing tool 764 may omit the enlarged points 774 and may be in the form of a continuous line 772 that defines the perimeter of the polygon 770. In such embodiments, the user may readjust the overall shape/size of the polygon 770 by tapping/clicking on portions of the line 772 and moving portions of the line 772 inwardly/outwardly to reduce/increase the overall size of the polygon 770 to create the custom-shape polygon **720*a***. In these embodiments, the user can create any custom desired shape for which control and/or other operations may be selected from the interactive control menu.

In some embodiments, the user may create a custom-shape polygon using a free-from drawing tool. For example, in some embodiments, using a "Draw Shape" 762 control selection (see FIG. 7A), the user is provided a pencil/finger drawing tool that the user can manipulate to draw a closed polygon having a desired shape. In this way, the user can control movement of a pointer (e.g., via a mouse, finger, etc.) to draw and save the custom-shape polygon **720*a***.

Figure 7D:
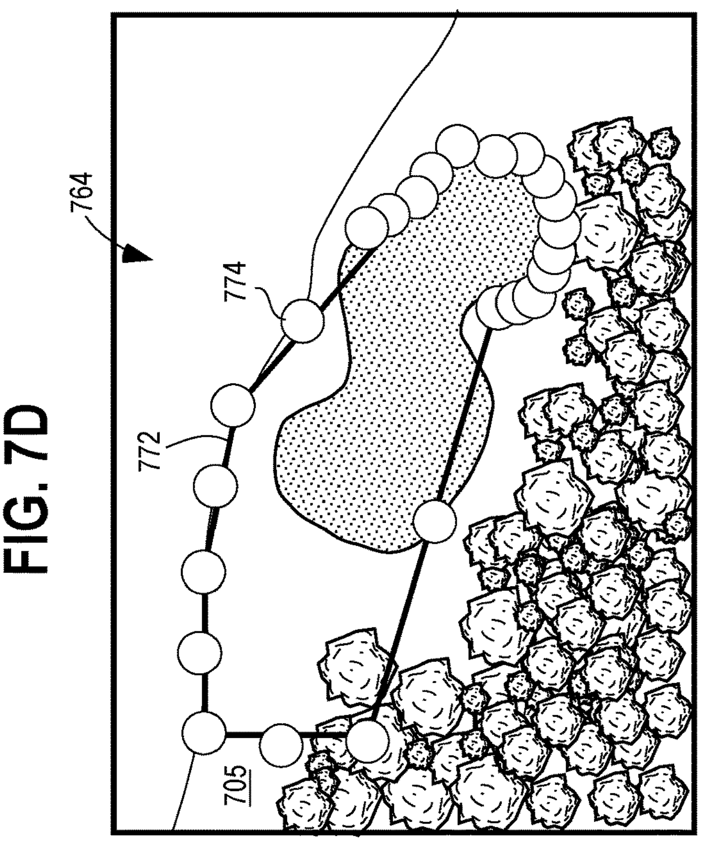
FIG. 7D shows an exemplary embodiment of the user interface of FIG. 7C and illustrates the drawing tool in action while the user is in the process of defining the overall shape for the polygon in accordance with some embodiments.
Figure 7C:
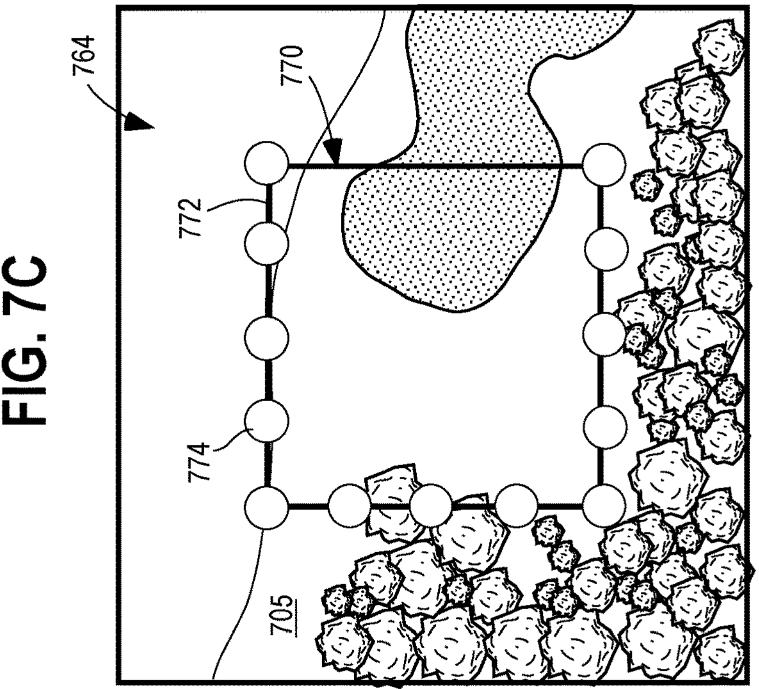
FIG. 7C shows a portion of a user interface and illustrates a drawing tool that permits a user to draw a polygon with a user-defined shape in accordance with some embodiments.
Figure 7F:
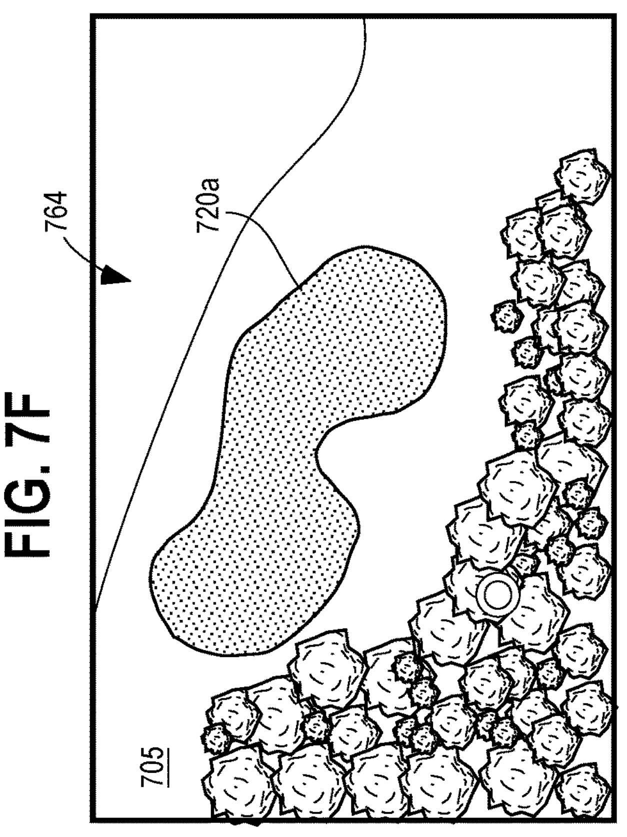
FIG. 7F shows an exemplary embodiment of the user interface of FIG. 7E and illustrates the final polygon drawn on the map by the user using with the drawing tool in accordance with some embodiments.
Figure 7E:
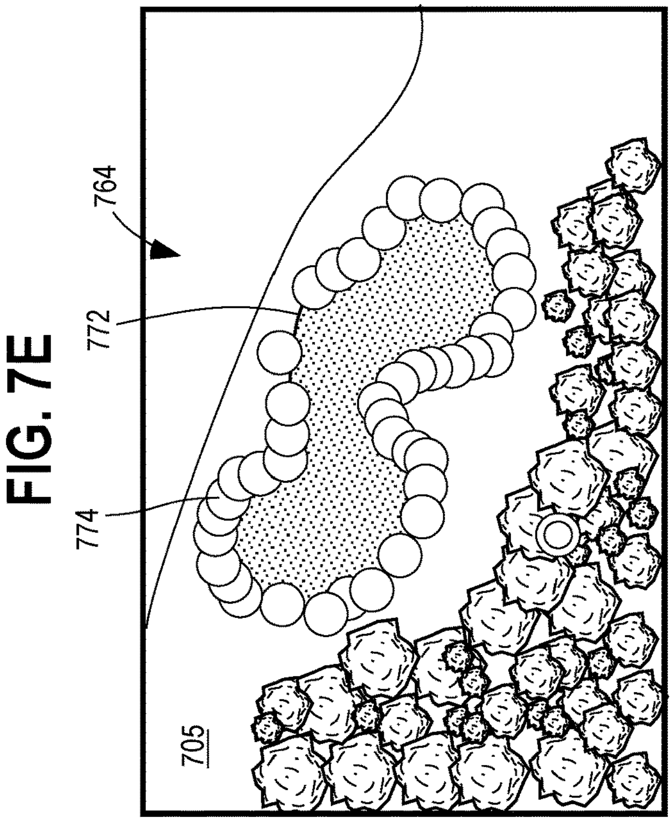
FIG. 7E shows an exemplary embodiment of the user interface of FIG. 7D and illustrates showing the final overall polygon shape defined by the user while using the drawing tool in accordance with some embodiments.
Figure 7G:
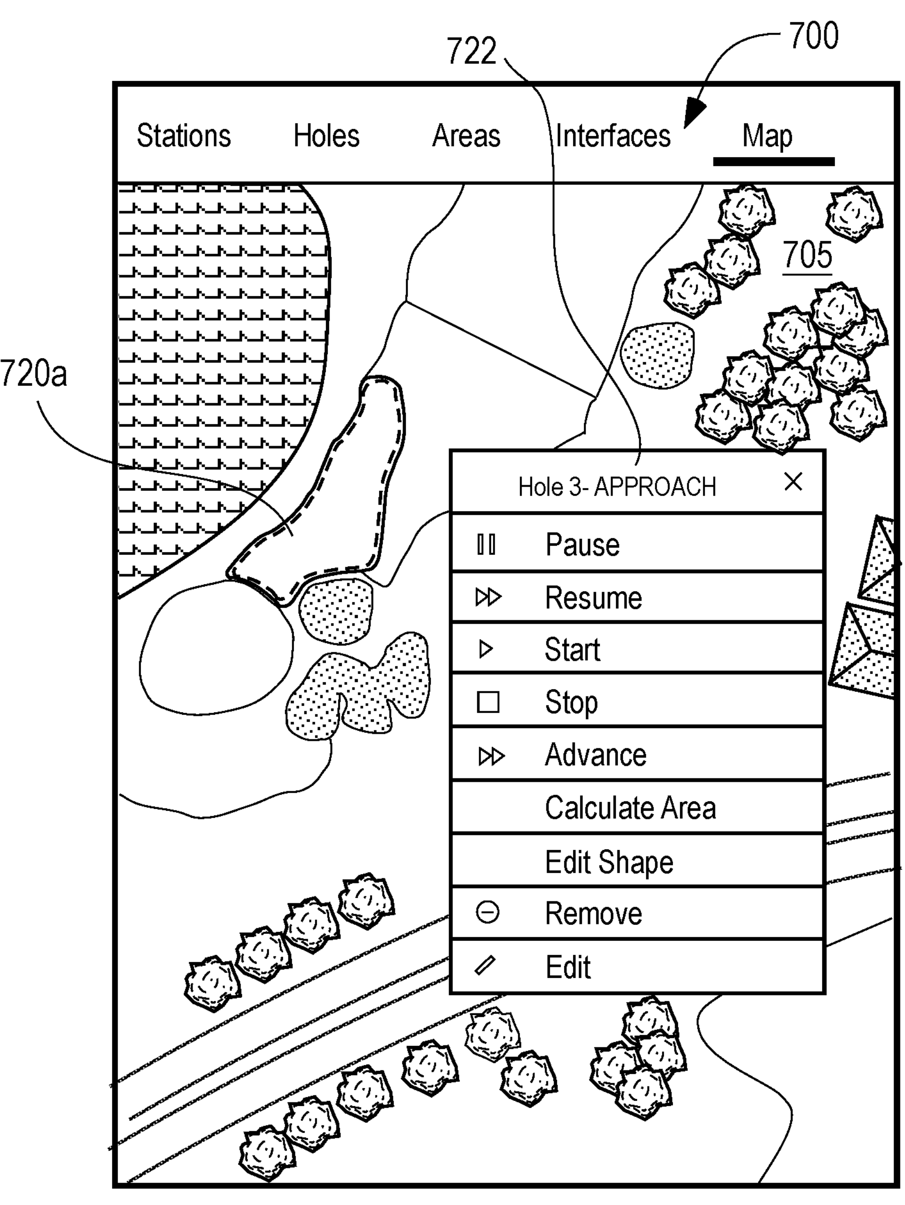
FIG. 7G shows an embodiment of the user interface of FIG. 7A and shows a multi-station selector feature as a user-selectable polygon that was manually drawn by the user, with multi-station control selections adjacent the user-selectable polygon in accordance with some embodiments.

FIG. 7G shows an exemplary custom-shape polygon **720*a* having a custom shape defined by the user, along with the corresponding interactive control menu 722 having various control selections available to the user that pops up within the interface 700 when the user manually selects (clicks, taps, hovers over, etc.) the polygon 720*a*. This custom-shape polygon 720*a* could be the resulting shape from an edit of the pre-defined polygon 720 of FIG. 77B, the result of the edit of a generic-shape polygon 770 of FIGS. 7C-7**H, or the result of a free-form drawn polygon. In some embodiments, any of these custom-shape polygons can be saved and selected again by the same or different user.

With reference to FIGS. 7H-7M, in some embodiments, the irrigation management application 114 provides the user with an interactive user interface 730 that shows a map 705 of an irrigation area and permits the user to use a multi-station selector feature that allows the user to select multiple station icons 732 corresponding to irrigation stations from the displayed map 705 of the irrigation area to create or select a group of irrigation stations, which then permits the user to make a control selection and cause a control and/or other operation to be executed for the irrigation stations associated with the station icons 732 in the user-selected group. For example, the exemplary multi-station selector feature is shown as a multi-station select tool 733 in FIG. 7H, which when activates, allows a user to pick a user-desired number of station icons 732 corresponding to irrigation stations of the irrigation system 116 deployed in the irrigation area, and to then manage (e.g., monitor, control, etc.) such irrigation stations directly from the map 705 of the irrigation area (e.g., to cause those irrigation stations to irrigate for a user-selected period of time or to stop irrigating, or to adjust the operational parameters of the irrigation stations, etc.).

Notably, while a user's selection of a polygon 720, 720*a* of FIGS. 7A, 7C may cause the selection of all station icons 732 associated with the polygon, in some aspects, the multi-station select tool 733 permits the user to select irrigation station icons 732 that are within or outside of any given polygon or area on the map 705. In other words, the user interface 730 may be configured in some embodiments such that station icons 732 can be selected independent of any shape formed with or by the user selected station icons 732.

Figure 7I:
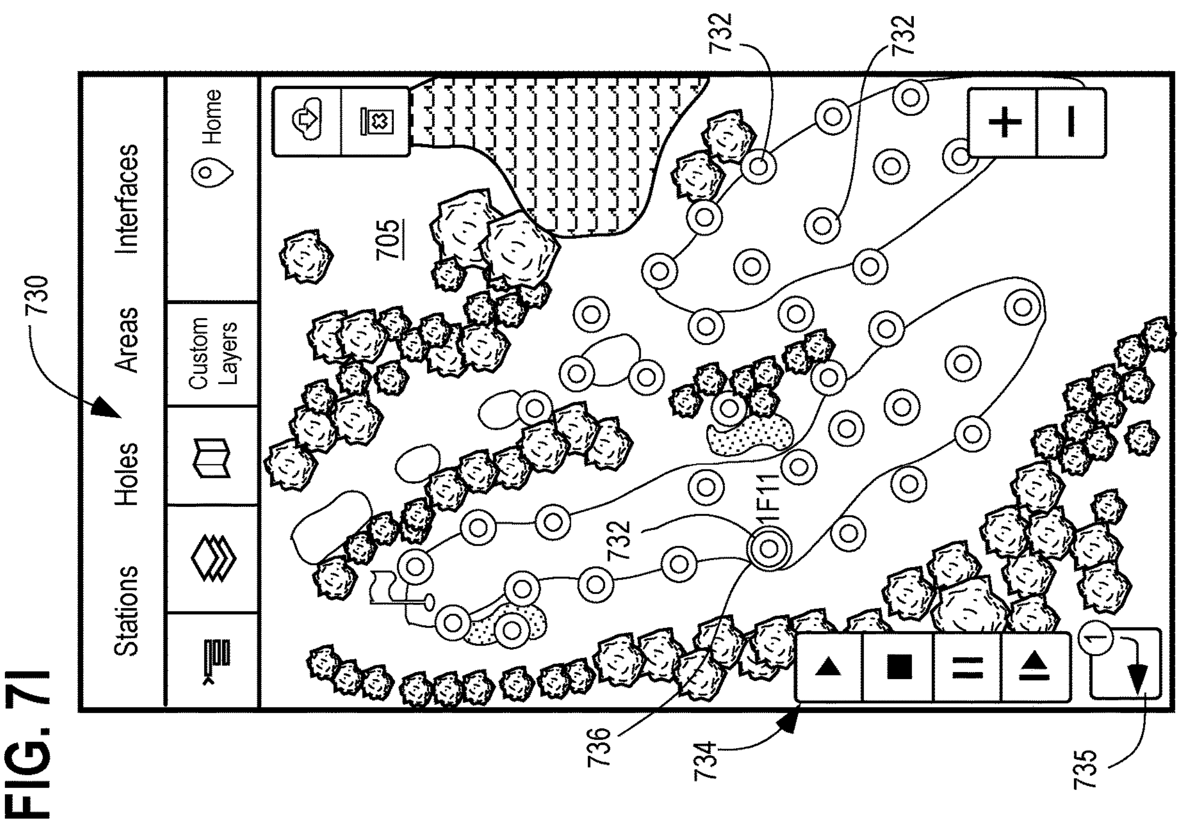
FIG. 7I shows an exemplary embodiment of the user interface of FIG. 7H, visually showing which of the station icons have been selected by the user and showing a control panel that appears within the user interface in response to a user interaction with the multi-station selector feature in accordance with some embodiments.
Figure 7H:
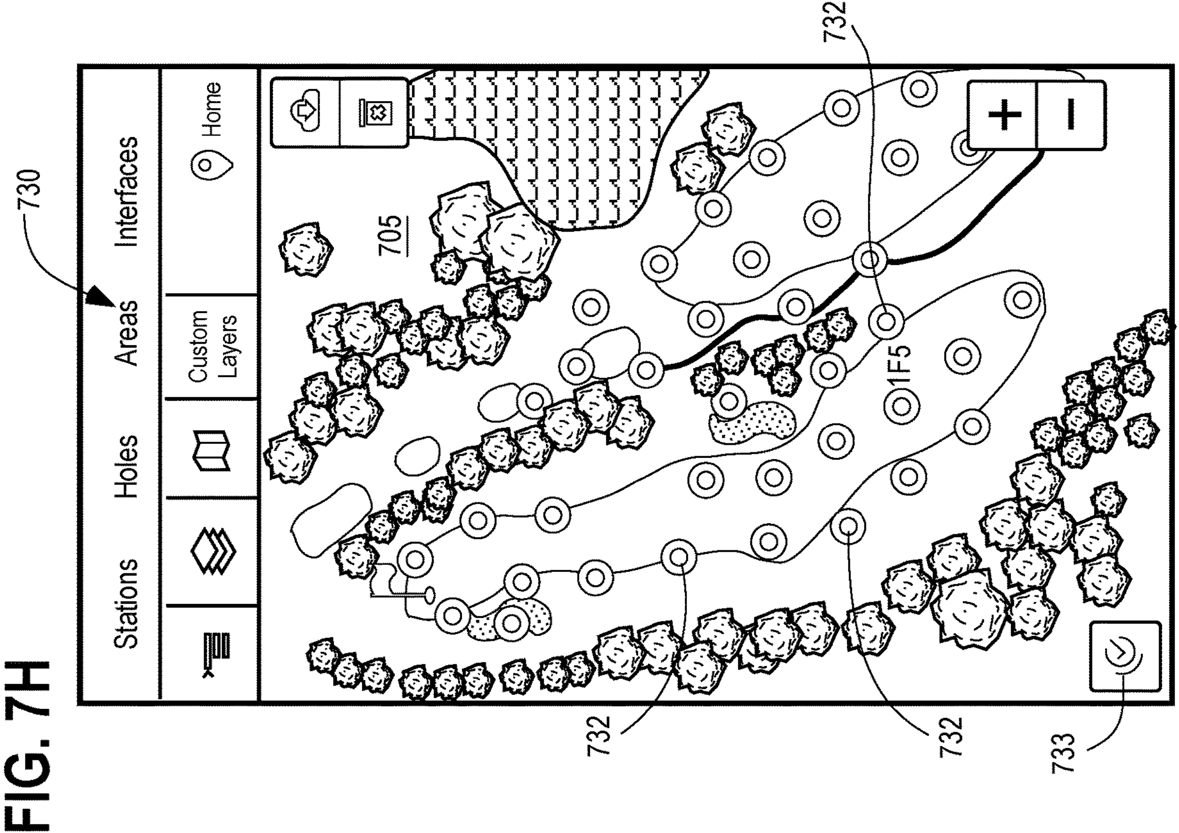
FIG. 7H shows an exemplary user interface in accordance with some embodiments that displays a map of an irrigation area that includes station icons corresponding to the irrigation stations deployed in the irrigation area, the user interface including the multi-station selector feature that permits the user to manually select any of the station icons appearing on the map.

The exemplary user interface 730 shown in FIG. 7H displays a map 705 of the irrigation area to the user, and the map includes imagery (e.g., aerial imagery) of the irrigation area with graphics overlays showing each irrigation station icon 732 (shown as a circle). In the exemplary interface shown in FIG. 7H, and depending on the zoom level of the map 705, at least some station icons 732 display an exemplary identifier, name, or label of the corresponding irrigation station label, e.g., 1F5 (Hole #1, Fairway, Station #5 on a golf course). Notably, while the exemplary user interface 730 shows aerial imagery of an irrigation area comprising portions of a golf course, it will be appreciated that the user interface 730 may display a map of any irrigation landscape other than a golf course. It is also understood that station identifiers may or may not be displayed adjacent station icons depending on the zoom of the map and available space to display the information to the user.

In the embodiment illustrated in FIG. 7H, when a user viewing the user interface 730 desires to select multiple irrigation station icons 732 on the map 705 of the irrigation area to manage operation or view status or other information associated with the irrigation stations associated with the user-selected station icons, the user interface 730 provides the user with the interactive multi-station select tool 733, which may be, for example, an interactive icon, and the user may select the multi-station select tool 733 in FIG. 7D by clicking or tapping on the icon for the tool 733.

In the embodiment shown in FIG. 7I, the user's interaction with the multi-station select tool 733 of the user interface 730 causes the user interface 730 to display an interactive control menu overlaid on a portion of the map or adjacent the map. In FIG. 7I, the interactive control menu is illustrated as a control panel 734 (that includes various control selections that permit the user to, for example, start, stop, pause, and result irrigation) and a selected stations icon 735 (indicating how many station icons 732 were selected by the user). The user is then permitted to click or tap on one or more of the station icons 732 on the map 705 of the irrigation area to select them. In the embodiment shown in FIG. 7I, responsive to a selection by the user of the station icon 732 (corresponding to irrigation station 1F11), the user interface 730 generates a graphical element 736 associated with the station icon 732 to visually indicate that the station icon 732 has been selected by the user, e.g., a circle outline or border around the selected station icon 732. Notably, in some embodiments, the exemplary user interface 730 is configured such that, while using the multi-station select tool 733, the user is permitted to unselect a previously user-selected irrigation station (e.g., 1F11) individually from the map 705 of the irrigation area (e.g., by selecting, clicking, tapping, or hovering over the selected station icon 732 corresponding to the irrigation station 1F11).

FIG. 7I shows that the graphical element 736 associated with the selected station icon is in the form of a circle that surrounds the station icon 732, with the circle being in a color that is distinct from (could be visually lighter than or visually darker than) the color of the station icon 732 (to make it easier to see for the user which station icons 732 have been selected). Alternatively, in some aspects, instead of generating the graphical element 736 around the user-selected station icon 732, the user interface 730 may be configured to change the color of the user-selected station icon 732 to make this icon 732 appear visually distinct from the color of the station icons that have not been selected by the user. In other embodiments, the graphical element 736 can be positioned nearby or adjacent the selected station icon 732.

Since the exemplary user interface 730 shown in FIG. 7I displays a scenario, where only one irrigation station icon 732 was selected by the user after interacting with the multi-station select tool 733, the user interface 730 of FIG. 7I displays a selected stations icon 735 that visually displays to the user the number of station icons 732 selected by the user thus far. In the illustrated embodiment, the selected stations icon 735 appears as a small number 1 in a circle at the upper right corner of the selected stations icon 735 (which itself may visually change from a check mark inside a circle as shown in FIG. 7H to a return key arrow-like symbol as shown in FIG. 7I) to indicate that one irrigation station icon 732 (i.e., the icon for station 1F11) has been selected by the user. It will be understood that the color and the location of the selected stations icon 735 is shown by way of example only, and that the selected stations icon 735 may be in a different color or colorless, may appear at any other location within the user interface 730, and may spell out the word "One" instead of showing the number "1" corresponding to the user-selected number of irrigation station icons 732.

Figure 7J:
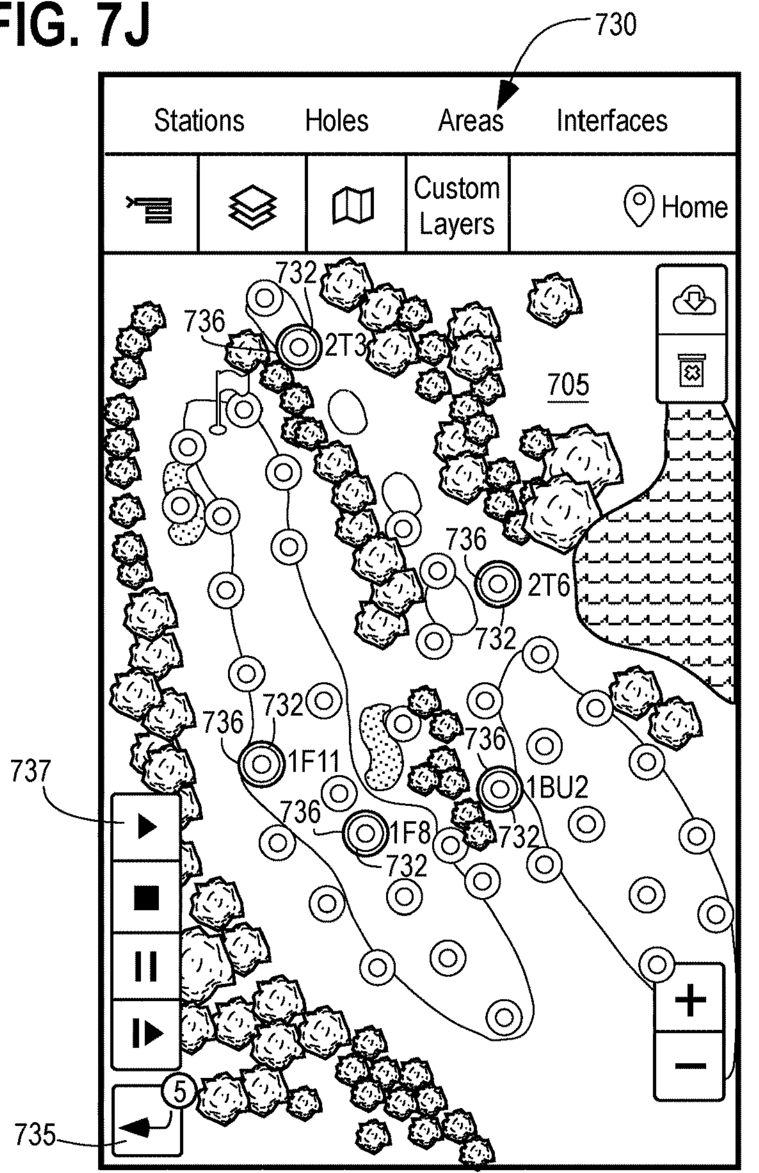
FIG. 7J shows an exemplary embodiment of the user interface of FIG. 7I, visually showing, within the control panel, how many station icons have been selected by the user.

In the exemplary interface 730 shown in FIG. 7J, five irrigation station icons 732 (corresponding to irrigation stations 1F11, 1F8, 1BU2, 2T6, and 2T3) have been selected by the user. Notably, the identifiers of the irrigation stations, e.g., 1F11, 1F8, etc. may be selected to visually indicate to the user a location type on the map where the irrigation station is located and a sequential number assigned to the irrigation station within the location type. For example, in one embodiment, where the irrigation area covers portions of a golf course, and there are 12 irrigation stations installed on the fairway of hole 1, an irrigation station may be assigned the identifier 1F11 (shown in FIG. 7J), with the 1 indicating "hole 1," F indicating "fairway" (G could indicate "green," B could indicate bunker, T could indicate tee area, etc.), and 11 indicating that this irrigation station is "number 11."

As can be seen in FIG. 7J, each of the user-selected five station icons 732 has the graphical element 736 (akin to the graphical element 736 described with reference to FIG. 7H) associated therewith to visually indicate that the station icon 732 has been selected by the user. As mentioned above, the graphical element 736 surrounding a user-selected station icon 732 may be a distinctly-colored circle or ring (or another geometric figure) to visually indicate the station icons 732 that have been selected by the user. In addition, since FIG. 7J shows that the user has selected five station icons 732, the selected stations icon 735 of the exemplary user interface 730 now has the number 5 in the circle, visually indicating to the user that the user has selected five irrigation icons 732 using the multi-station select tool 733.

It will be appreciated that, in some aspects, the user interface 730 may include station icons 732 that were selected by the user, but which are located on a portion of the map 705 of the irrigation area that is not visible in the current exemplary view provided in FIG. 7J (e.g., depending on the zoom selected by the user and/or position of the map). For example, the user may only see 5 station icons selected in the view depicted in FIG. 7J, but the actual number of the station icons 732 selected by the user may be greater than 5 (e.g., 8, 11, etc.) and the numerical value displayed by the selected stations icon 735 could be greater than 5 (e.g., 8, 11, etc.), visually indicating to the user that, in addition to the 5 station icons 732 visible in the current view shown in FIG. 7J, there are 3, 6, or more other additional selected station icons 732 that are located outside of the current view (in some aspects, the user interface 730 permits the user to move to other portions of the map 705 of the irrigation area by swiping or pinching/expanding the map).

As mentioned above, a user's interaction with the multi-station select tool 733 of the user interface 730 causes the user interface 730 to display an interactive control panel 734 that includes various control selections that permit the user to control operation of the irrigation stations associated with the user-selected irrigation station icons 732. The exemplary control panel 734 of the user interface 730 shown in FIG. 7J may include interactive icons/buttons such as Start (represented by the triangle shape), Stop (represented by the square shape), Pause (represented by two parallel lines), and Resume (represented by a vertical line adjacent a triangle), but it will be appreciated that additional or alternative icons/buttons may be used instead.

Figure 7K:
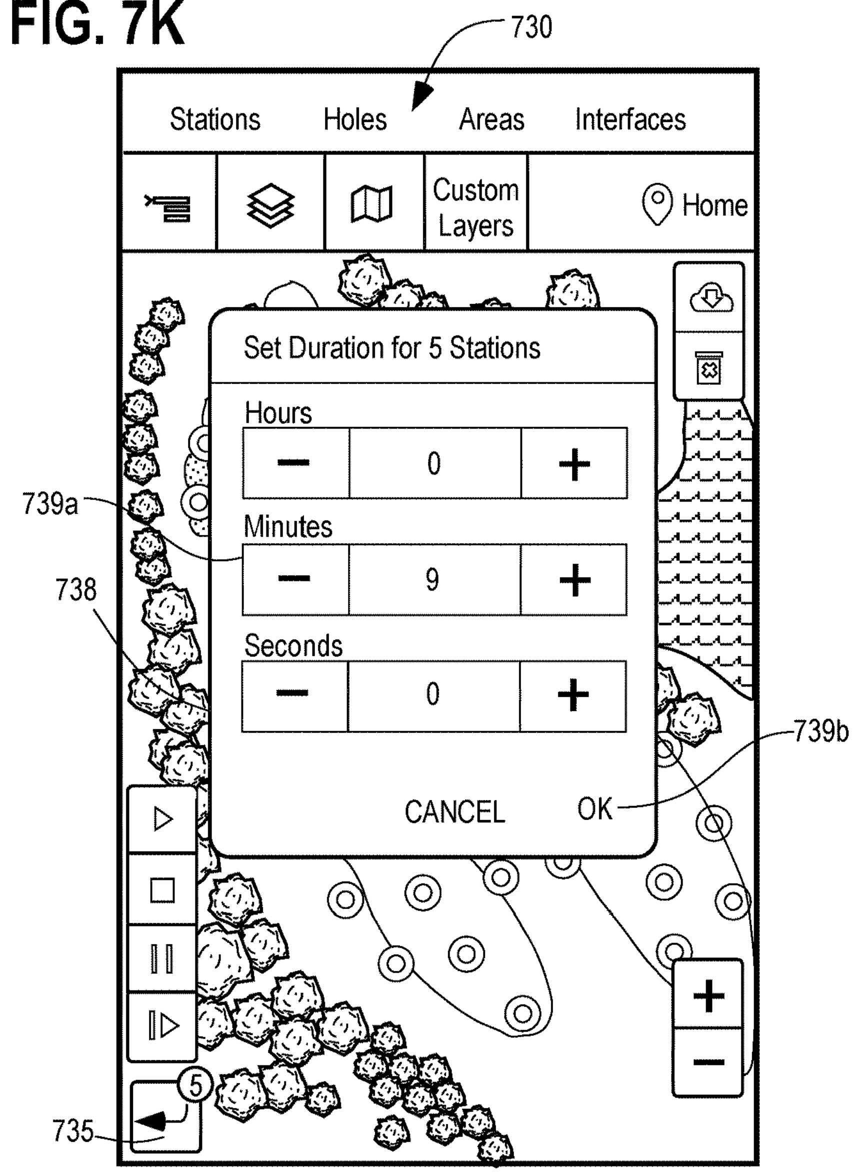
FIG. 7K shows an exemplary embodiment of the user interface of FIG. 7J with an exemplary run duration control sub-menu, which appears in response to a user interaction with the control panel, overlaying a portion of the map in accordance with some embodiments.

In the illustrated embodiment, when the user selects the Start icon 737 control selection in the control panel 734 displayed in FIG. 7J, the user interface 730 responds by causing a duration panel 738 to appear, as shown in FIG. 7K. The exemplary duration panel 738 sub-menu of FIG. 7K may include inputs 739*a* (e.g., up-down, plus-minus buttons/icons, number entry fields, etc.) to allow the user to select the duration (hours, minutes, seconds) of irrigation by the five irrigation stations corresponding to the user-selected station icons 732. In the example shown in FIG. 7K, the user has defined that each of the five selected stations will run for 9 minutes of watering, after which the user can use input 739*b* within the duration panel 738 sub-menu to either click CANCEL to cancel the Start operation, or click OK to execute the Start control command for the five irrigation stations selected by the user.

Figure 7L:
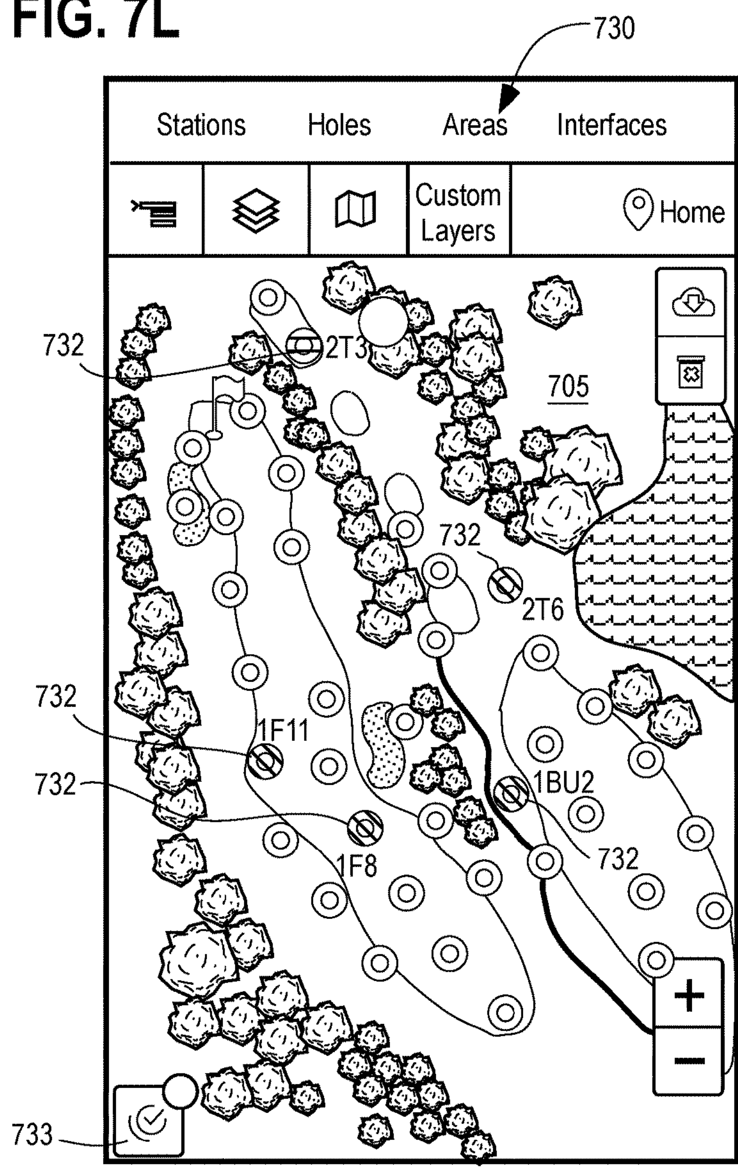
FIG. 7L shows an exemplary embodiment of the user interface of FIG. 7J, but with a visual indication of each station icon that is associated with an irrigation station that is actively irrigating in accordance with some embodiments.

In some embodiments, after the user selects the input 739*b* within the duration panel 738 to initiate the watering by the five user selected irrigation stations 1F11, 1F8, 1BU2, 2T6, and 2T3, the control circuit of the central computer 112*a*, 112*b* (or other controlling element in the system such as irrigation controller 140, for example) may determine which of these five irrigation stations can be turned on at the same time based on the current water pressure and capacity, and send a control signal to all five or selected ones of the five user-selected irrigation stations to cause them to start watering. In some cases, the irrigation system 116 may not run all five user-selected irrigation stations at the same time if there is not enough pressure or capacity to do so, and FIG. 7L shows an example of such a situation, where stations 1F11, 1F8, 1BU2, 2T6 were activated to water, and irrigation station 2T3 was not. The exemplary interface 730 of FIG. 7L visually indicates to the user all five irrigation stations selected for activation by the user by displaying all five irrigation stations in a color that is different from the color of the irrigation stations that were not selected by the user for activation.

In the illustrated embodiment, the icons for all four irrigation stations 732 (i.e., 1F11, 1F8, 1BU2, and 2T6) that are turned on are now shown in the user interface 730 in the active state (which may be represented by a distinct color, blue, green, etc. (shown by different cross-hatching), as well as by an animated icon that toggles/pulsates between a larger size and a smaller size (such as described in FIG. 4), the one irrigation station (i.e., 2T3) that is activated by not yet turned on is shown in a color that is distinct from the color (shown by a different cross-hatching) of the station icons not selected by the user and from the color of the user selected station icons 732 that are currently irrigating. Notably, in the illustrated embodiment, now that the user-selected irrigation stations are activated and the user interface 730 shows which of the user-selected irrigation stations are actively watering, the user interface 730 of FIG. 7L again displays the multi-station select icon 733, permitting the user to select one or more other groups of irrigation station icons 732, and to make control selections for their respective irrigation stations.

Figure 7M:
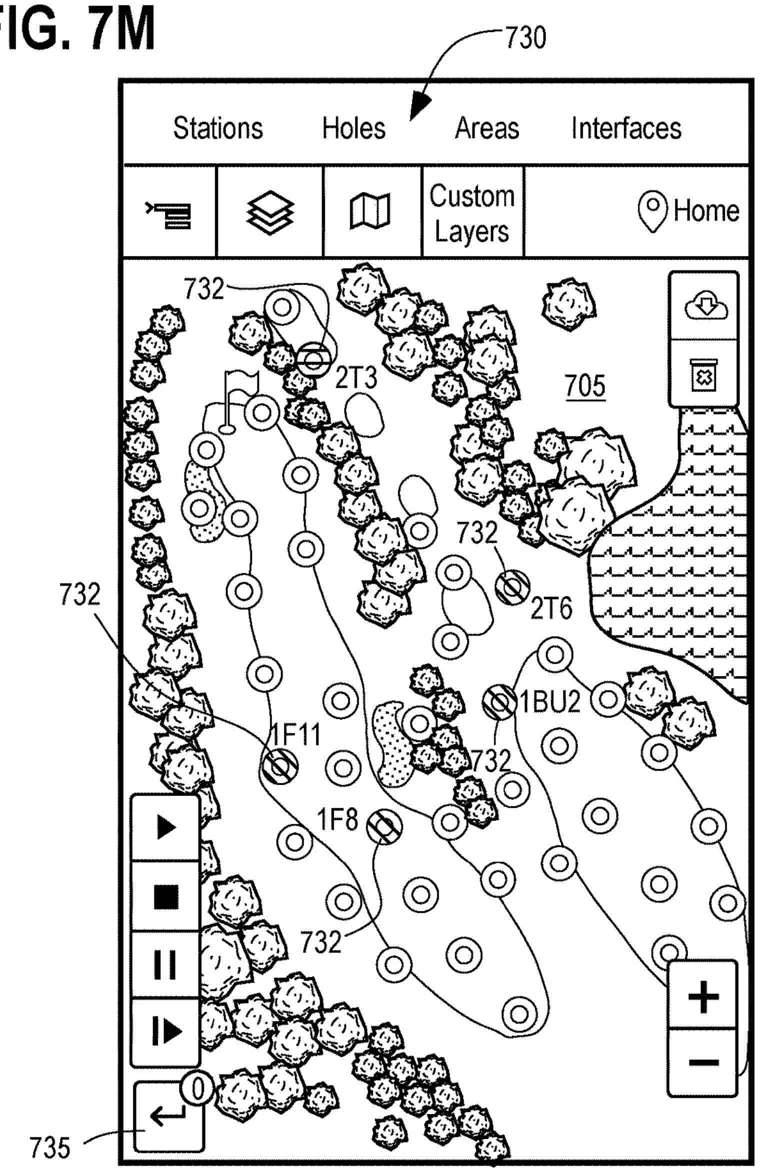
FIG. 7M shows an exemplary embodiment of the user interface of FIG. 7I showing the control panel that appears within the user interface in response to a user interaction with the multi-station selector feature, and permits the user to select a second group of irrigation stations to control in accordance with some embodiments.

In the exemplary embodiment shown in FIG. 7M, responsive to the user selecting the multi-station select icon 733 in FIG. 7L, which would permit the user to select another group of station icons 732 and control the operation of their respective irrigation stations, the user interface 730 displays the selected stations icon 735 with the number zero in the circle to visually indicate that zero station icons selections have been made in the current station icon group. Notably, while the user is using the multi-station select tool 733 to select one or more station icons 732 for the second station icon groups, all irrigation stations that are actively watering are still shown within the interface 730 to visually indicate that they are actively watering. For example, as described above, the station icons 732 for the irrigation stations of the first group that are currently watering may be shown in the interface 730 in a distinct color (e.g., blue, green, etc.) that visually indicates that they are active watering, or by way of an animated image that may show the station icons 732 as pulsating (i.e., toggling between larger and smaller size) to visually indicate that the corresponding irrigation stations are actively watering. It is noted that the exemplary screen shots of FIGS. 7H-7M are screen shots of a mobile irrigation management application 114 for managing the irrigation system 116 (which may be displayed to a user of a mobile device 120), but, in some embodiments, a user interface for managing an irrigation system 116 with similar views, control panels, and menu selections may be presented to a user within a web browser on a computer screen (e.g., the display of a user's computer).

It is noted that in many of the user interfaces presented herein, maps are shown of portions of geographic areas that include portions of an irrigation area. It is understood that the various views illustrated are for exemplary purposes, and that a user can manipulate the map views to zoom in on an area in more detail, or to back out to view a larger area and/or to move to other portions of the irrigation area. Such manipulation of map interfaces is well known and can be implemented through user movements (mouse clicks, finger taps/pinches, etc.). In some embodiments, some displayed features may be viewed depending on the zoom levels.

Figure 8A:
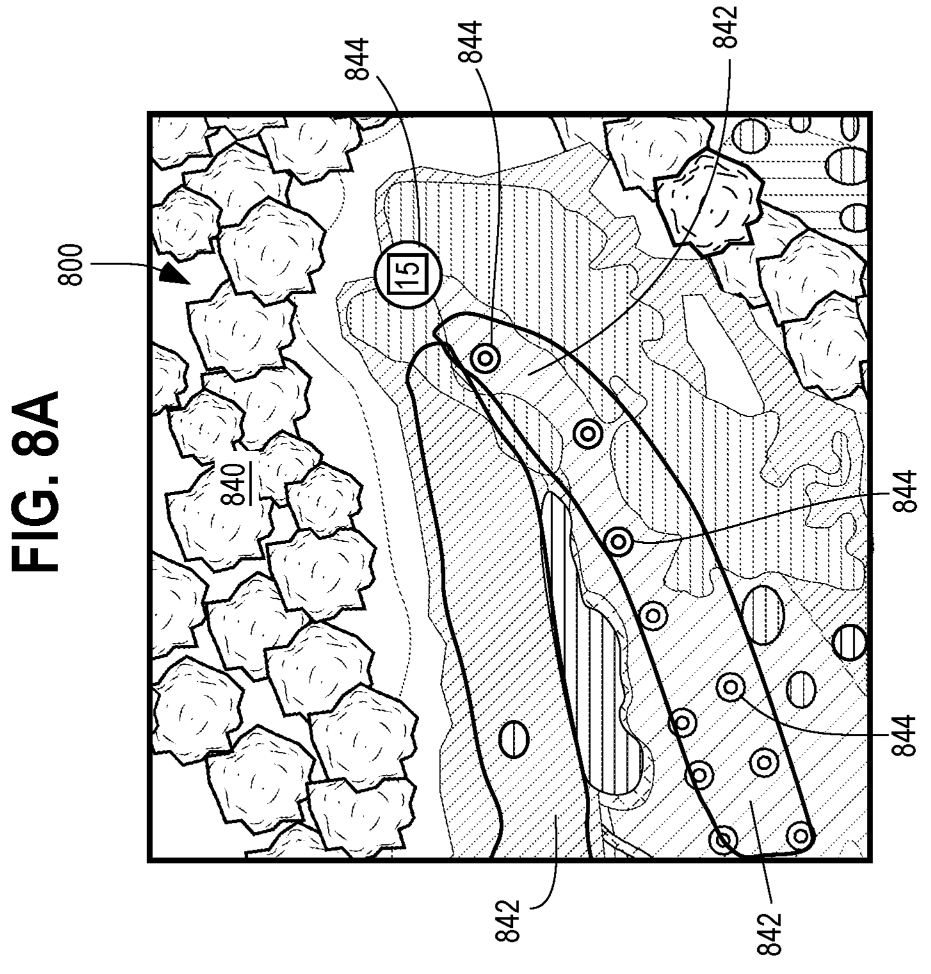
FIG. 8A illustrates an exemplary user interface in accordance with some embodiments that displays a map layer including aerial map imagery, an irrigation control layer superimposed with the map layer, and supplemental image layers superimposed with the map layer and the irrigation control layer.
Figure 8B:
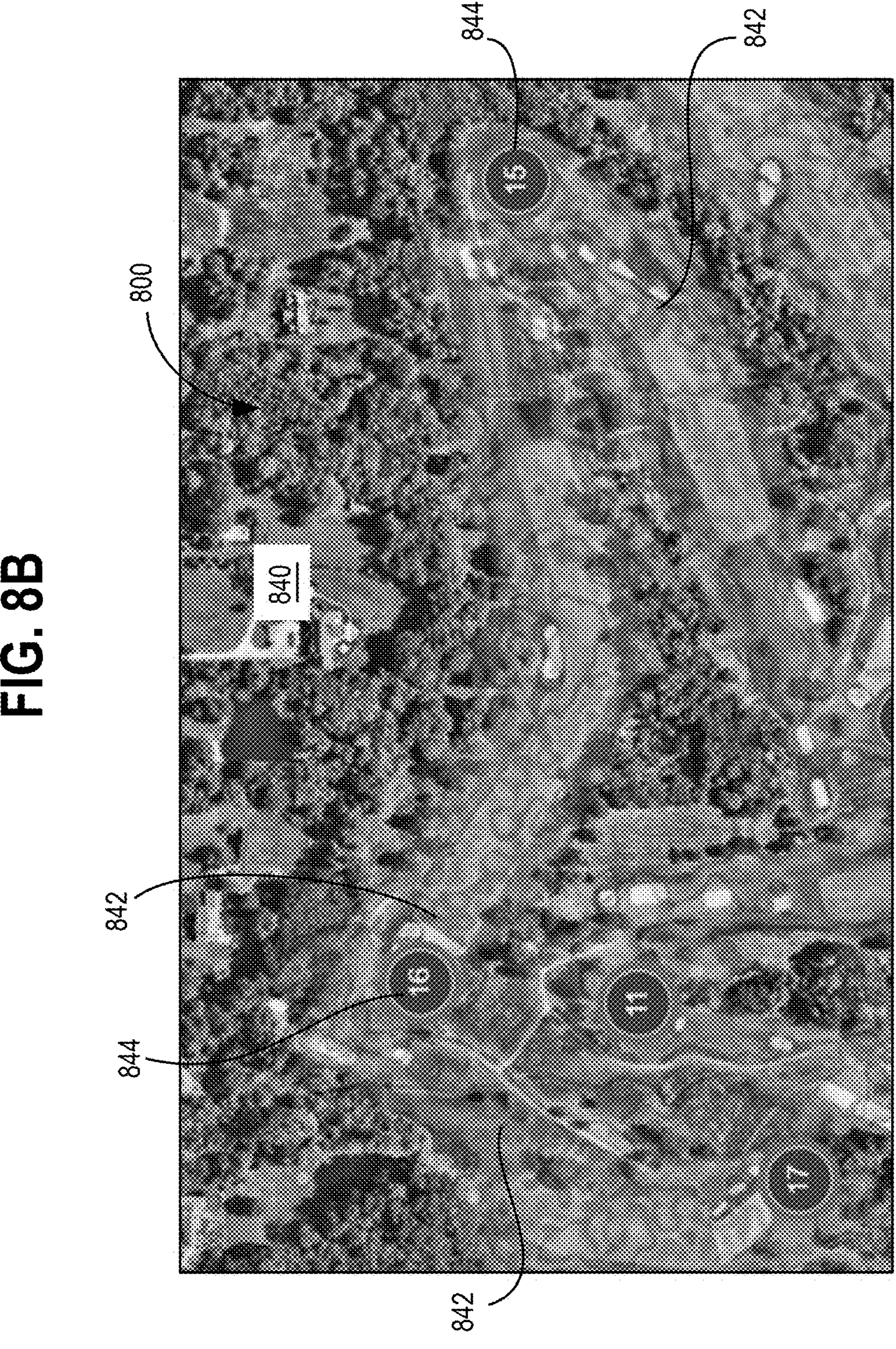
FIG. 8B is a color photographic image of the exemplary user interface of FIG. 8A in accordance with some embodiments that displays the map layer including aerial map imagery, the irrigation control layer superimposed with the map layer, and supplemental image layers superimposed with the map layer and the irrigation control layer.

Referring next to FIGS. 8A and 8B, in some embodiments, the irrigation management application 114 causes a user interface 800 to be displayed for user illustrating a map of the irrigation area and allows a user to add imagery such as third party imagery as a layer (e.g., background or middle layer) overlaid on/superimposed with the map imagery of a map layer and any icons/labeling the different layers (e.g., irrigation control layer/s). For example, the exemplary user interface 800 shown in FIG. 8A is a line drawing including a map layer 840 (indicated without cross hatching), a supplemental image layer 842 (shown with various cross hatch fills), an irrigation control layer 844 showing information items. The various layers 840, 842 and 844 are superimposed over each other such that each layer is at least partially generally visible. Generally, the layers 842 and 844 are overlaid on the map layer 840. In some embodiments, the supplemental image layer 842 is configured to be at least partially transparent and overlaid on/superimposed with the map layer 840 so that the imagery of the map layer 840 is viewable through the supplemental image layer 842. And in some embodiments, the irrigation control layer 844 is overlaid on the both the layers 840 and 842, such that the information and control items (icons, symbols, text, etc.) are opaque and block the layers underneath; however, such items are not large enough to hide the underlying layers. FIG. 8B is a color photographic image of a larger segment of the view of FIG. 8A. The view of FIG. 8B is provided to illustrate the various layers without cross hatch fill. In some embodiments, the map layer 840 comprises aerial map image data, and can be obtained from a third party map service provider.

In some embodiments, the irrigation control layer 844 may comprise one or more different layers having different icons, symbols, text. For example, the irrigation control layer 844 may illustrate station icons and location icons (e.g., a number identifying a location, such as hole 15). In some embodiments, location icons may include a pin 320 or other indicator of a location of a user's mobile device. In certain aspects, the irrigation control layer/s may include one or more additional diagnostic or informational data layers (e.g., including operational status and/or alerts associated with the components of the irrigation system 116), or other information such as landscape elevation relative to sea level, age groups, skill levels, preferences, etc. of golfers on the golf course corresponding to the irrigation area.

In some embodiments, the supplemental image layer 842 may be provided by a third party or by the user. The supplemental image layer may be an image layer visualizing data using different colors such as shown in FIG. 8B (and represented by various different cross hatch sections on the layer 842 in FIG. 8A.) In some cases, the supplemental image layer 842 may be obtained from a third party data provider. Third party image layers 142 that could be included within the exemplary interface 800 include but are not limited to aerial drone footage providing plant stress or a heat map, pedestrian (e.g., golfer, hiker, etc.) foot traffic in the irrigation area (e.g., golf course, park, etc.). For example, such data can be provided by the United States Golf Association (USGA) which can use devices to track golfer movements. And the data represented by the supplemental image layer may be indicated in different colors. For example, in FIGS. 8A and 8B, the supplemental image layer 842 indicates ground temperatures measured from the air, with warmer temperatures indicated in orange/red and cooler temperatures indicated in greens and blues.

Figure 9A:
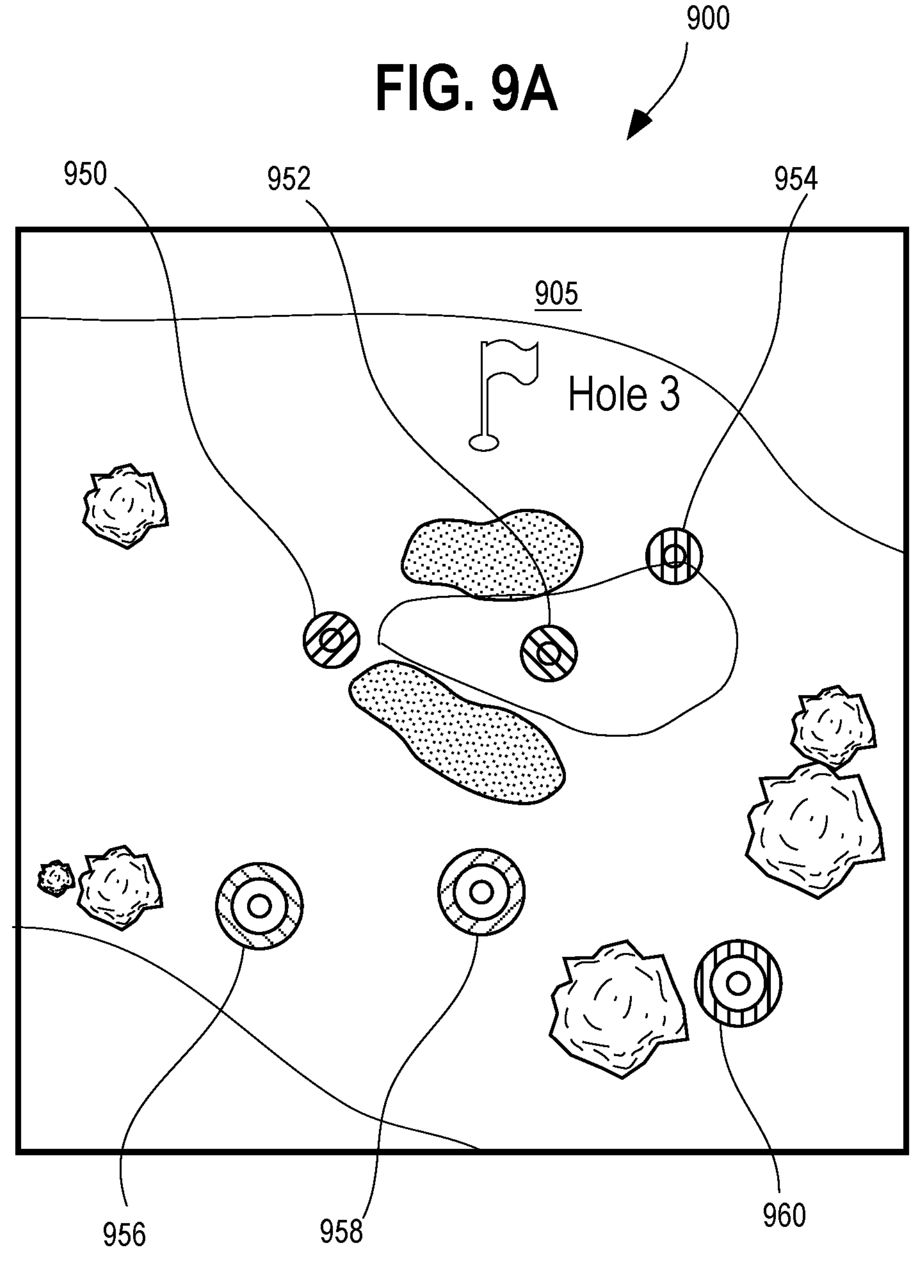
FIG. 9A illustrates an exemplary user interface in accordance with some embodiments that displays a map of an irrigation area including station icons corresponding to irrigation stations deployed in the irrigation area, with the station icons visually indicating various operational attributes of the irrigation stations corresponding to the station icons.

Referring next to FIG. 9A, in some embodiments, the irrigation management application 114, when executed, is configured to cause a user interface 900 to be displayed that includes a map 905 of the irrigation area and shows station icons 950, 952, 954, 956, 958, 960 corresponding to irrigation stations of the irrigation system 116. In this embodiment, the user interface 900 is configured to display the station icons 950, 952, 954, 956, 958, 960 in such a way that the station icons 950, 952, 954, 956, 958, 960 visually indicate an operational status and/or operational attributes and/or informational status/attributes of the irrigation stations corresponding to the station icons 950, 952, 954, 956, 958, 960. In some embodiments, the exemplary user interface 900 shown in FIG. 9A can alter the coloring, shading or highlighting of the station icons 950, 952, 954 to indicate and/or differentiate certain attributes of these station icons.

For example, in FIG. 9A, station icons 950, 952 and 954 are displayed on the map 905 of the irrigation area 905 such that they are visibly of different colors or, in this example, such that they are of different shades of one color (different shades of a color indicated as having cross hatching), e.g., light blue (station icon 950), medium blue (station icon 952) and dark blue (station icon 954. This color variation of the station icons 950, 952, 954 may correspond to a programming aspect associated with the irrigation stations corresponding to the station icons 950, 952, 954, such as a run time percentage adjustment. For example, the lightest shade of the color assigned to station icon 950 may visually indicate that a run time of the corresponding irrigation station was adjusted by 10-70% relative to the original run time (represented by 100%), the medium shade of the color assigned to the station icon 952 corresponds to a run time adjustment of 70-130%, and the darkest shade of the color assigned to the station icon 954 corresponds to a run time adjustment of 130-200%. It will be appreciated that run time adjustment is just one example of an operational attribute that may be visually indicated by a color or shade of a color of the station icons 950, 952, 954, and that other operational or informational attributes associated with the station icons 950, 952, 954 may be similarly displayed.

FIG. 9A also shows that in some embodiments, the user interface 900 may show similar operational or informational attributes by way of differently-colored highlighting (e.g., a circle, ring, etc.) formed around the station icons 956, 958, 960. For example, in the example illustrated in FIG. 9A, the station icons 956, 958, 960 can be visually identical (e.g., executed in the same color), but have a differently colored periphery shape to indicate an operational status or informational attribute of the respective station (e.g., green, yellow, orange circle-shaped highlighting surrounding the station icons 956, 958, 960, again indicated using different cross hatch fill). In an embodiment where this highlighting surrounding the station icons 956, 958, 960 indicates a run time adjustment applied to the corresponding irrigation stations, for example, a green-colored circle about station icon 956 may visually indicate that a run time of the corresponding irrigation station was adjusted by 10-70% relative to the original run time, the yellow-colored circle about the station icon 958 corresponds to a run time adjustment of 70-130%, and the orange-colored circle about the station icon 960 corresponds to a run time adjustment of 130-200%. It will be understood that the colors and geometric shapes shown in FIG. 9A are shown by way of example only, and that other colors and geometric (or irregular) shapes may be used instead.

Figure 9B:
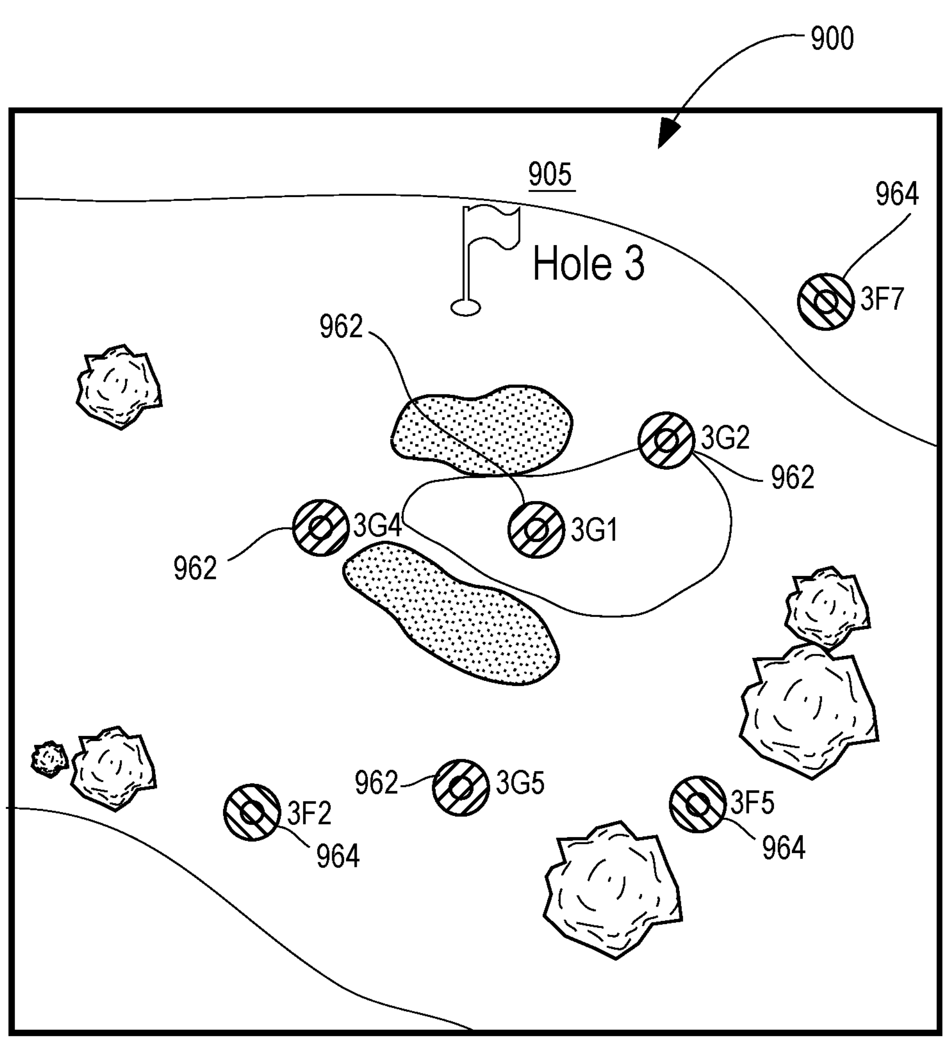
FIG. 9B shows an exemplary user interface in accordance with some embodiments that displays a map of an irrigation area including station icons corresponding to irrigation stations deployed in the irrigation area, with the station icons visually indicating a location type of the irrigation area where the irrigation stations corresponding to the station icons are located.

Referring next to FIG. 9B shows a user interface 900 according to another embodiment, where the user interface 900 is configured to display the station icons such that the visibly indicate a location type in the map 905 of the irrigation area where they are located. In other words, in some embodiments, all station icons 962 may visibly indicate (e.g., by way of all being displayed in an identical color, shape, etc. relative to each other) that they are located in a first location type (e.g., a green of a golf course), while all station icons 964 may visibly indicate (e.g., by way of all being displayed in an identical color, shape, etc. relative to each other but different from the color, shape, etc. of the station icons 962) that they are located in a second location type that is different from the first location type (e.g., a fairway of a golf course). To put it another way, in some implementations, the user interface 900 may display the station icons 962 in a first color (e.g., green) or a first shade of a given color (e.g., light blue) or a first shape (e.g., circle) to indicate that the station icons 962 are all located within a first location type (e.g., golf course green, residential area backyard, etc.) while at the same time displaying the station icons 964 in a second color (e.g., blue) or a second shade of the given color (e.g., dark blue) or a second shape (e.g., square) to indicate that the station icons 964 are all located within a second location type different from the first location type (e.g., golf course fairway, residential area side walk, etc.). In the illustrated embodiment, the station icons 962 are shown with a first cross hatch fill to indicate the same color/shade/shape, and the station icons 964 are shown with a second cross hatch fill to indicate a different same color/shade/shape.

Figure 24:
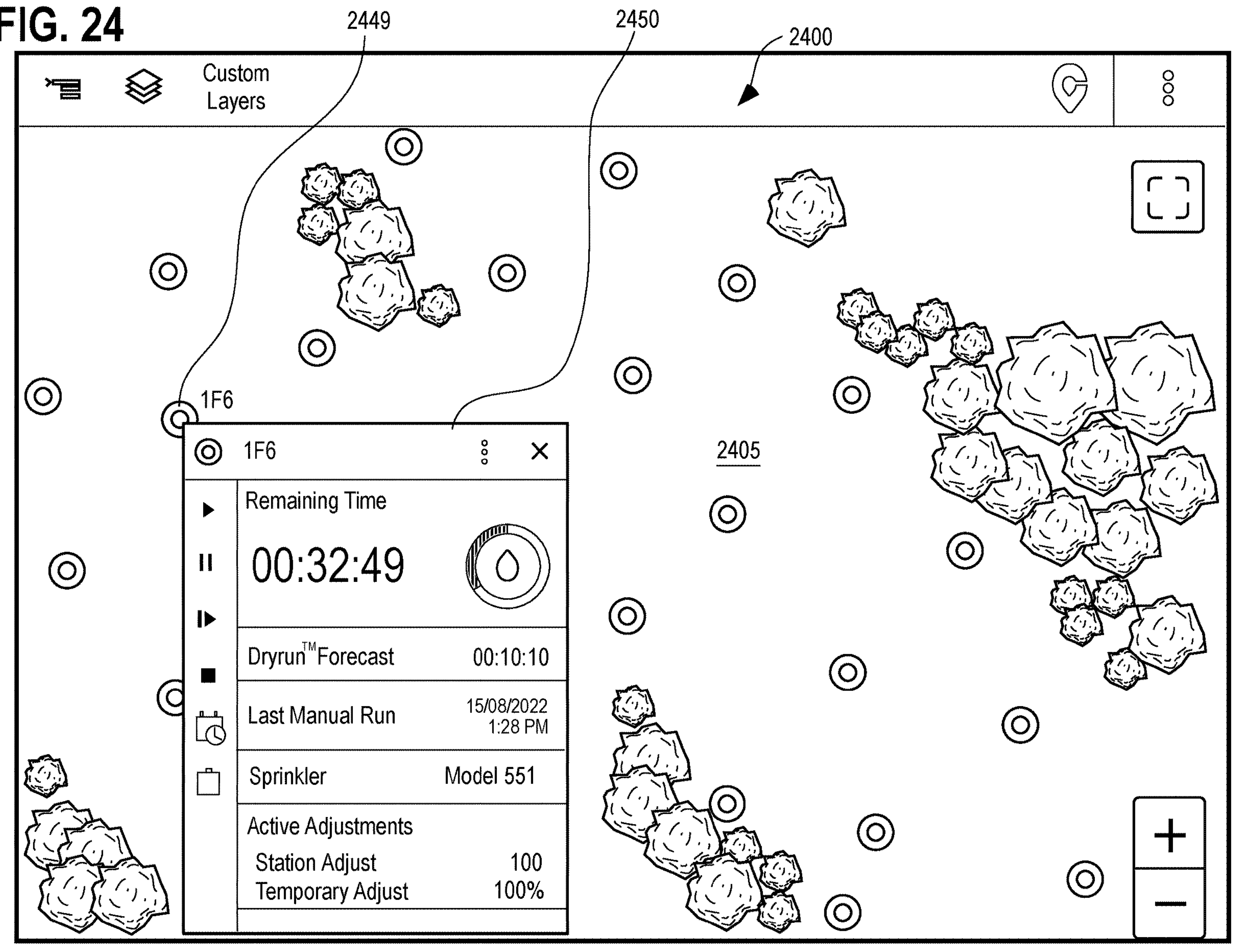
FIG. 24 illustrates an exemplary user interface in accordance with some embodiments showing a map of an irrigation area and multiple station icons corresponding to irrigation stations deployed in the irrigation area, also showing that the user interface permits a user to select a station icon to bring up an interactive control menu that permits the user to see various informational and operational attributes of the irrigation station corresponding to the station icon.
Figure 25:
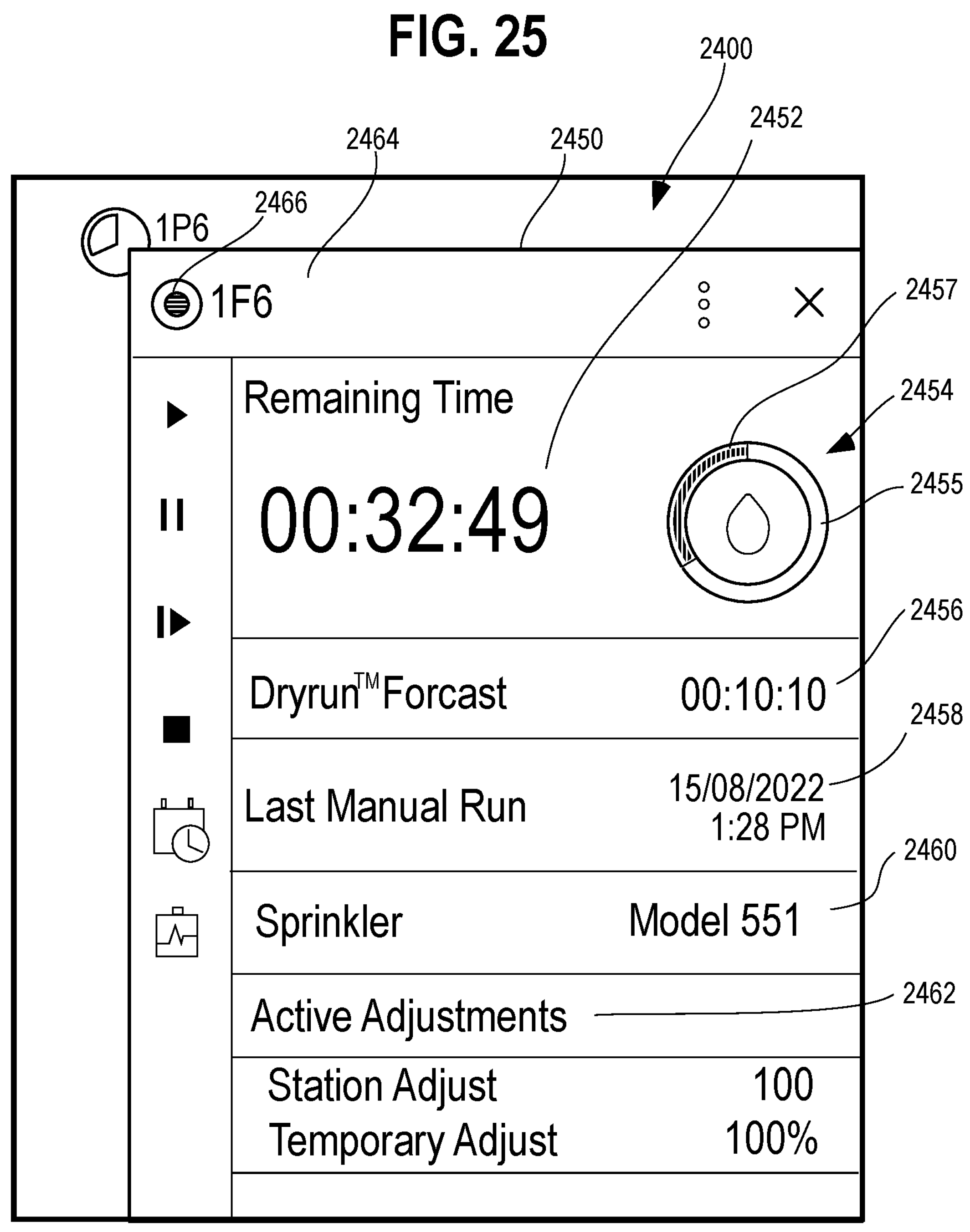
FIG. 25 shows a portion of the interface of FIG. 24 to illustrate an enlarged version of the irrigation station control panel menu of FIG. 24 in accordance with some embodiments.

Next, as shown in FIGS. 24 and 25, in some embodiments, the irrigation management application 114, when executed, may be configured to cause a user interface 2400 to be displayed to a user, the user interface 2400 including a map 2405 of an irrigation area and visually displays irrigation station icons based on their respective physical locations in the irrigation area. In the embodiment illustrated in FIG. 24, the user interface 2400 is configured such that each of the irrigation station icons displayed on the map 2405 of the irrigation area is interactive and is programmed such that, in response to a user either clicking on/tapping/selecting or simply hovering over (e.g., with computer mouse, etc.) a displayed station icon 2449, the user interface 2400 generates and displays an interactive irrigation station control panel 2450 that includes various informational data, operational indications, and/or control selections associated with the irrigation station (in this case, 1F6) corresponding to the user-selected station icon 2449.

In the embodiment illustrated in FIG. 25, the exemplary control panel 2450 may include one or more of the following combination of attributes are displayed together: (1) a remaining watering time countdown 2452 visually indicating a remaining watering time for the irrigation station (in this case, irrigation station 1F6); (2) a remaining watering time graphical indicator 2454 (e.g., icon) that graphically indicates the remaining watering time out of a total run time for the irrigation station 1F6; (3) a dry run forecast 2456 of the estimated time duration of the next watering event for the irrigation station 1F6 given all known operational attributes and/or adjustments; (4) a last run indicator 2458 showing the date and time of the last watering event associated with the irrigation station 1F6; (5) a sprinkler type indicator 2460 that indicates a type of one or more sprinklers used by the irrigation station 1F6 associated with the station icon 2449 (e.g., integrated valve in head sprinkler or sprinklers downstream of the station); and (6) an active adjustments indicator 2462 showing all active operational attribute adjustments that apply to a watering event executed by the irrigation station 1F6. It will be appreciated that the informational and operational attributes shown in the control panel 2450 of FIG. 25 are shown by way of example only, and that, in other embodiments, the control panel 2450 may be configured to display additional and/or alternative operational or informational attributes associated with the irrigation station 1F6. For example, in some embodiments, the last run indicator 2458 indicates a last manual or scheduled run. In some embodiments, the last run indicator 2458 can be alternatively labeled as "Last Irrigated" and include manual or scheduled irrigation, and list the date and time of the last irrigation as well as the run time of the last irrigation.

Furthermore, in the embodiment of the user interface 2400 illustrated in FIG. 25, the control panel 2450 includes an irrigation station or zone name indicator 2464 and a nozzle type indicator 2466. In some aspects, the nozzle type indicator 2466 may be displayed in a color (or a specific shade of a color) and a geometric (or irregular) shape (e.g., a blue circle) specific to a particular nozzle type to visually indicate to the user that the irrigation station 9P4 uses this particular nozzle type. In FIGS. 24 and 25, cross hatch fill is used to indicate a color of the nozzle type indicator 2466. The indication of the specific nozzle type of the irrigation station 1F6 by the nozzle type indicator 2466 is advantageous since, as is well known, the nozzle type of a sprinkler of an irrigation station will dictate the water throw distance and application rate. Additionally, in the illustrated embodiment, the control panel 2450 may include various interactive operational controls (e.g., Start (depicted by the triangle), pause (depicted by two vertical lines), resume (depicted by a vertical line and a triangle, stop (depicted by a square), etc.), and these operational controls may be pressed, clicked, tapped, etc. by the user to cause the irrigation station 1F6 to operate according to the operational control selected by the user within the control panel 2450.

In the embodiment illustrated in FIG. 25, the remaining watering time graphical indicator 2454 visually indicates the remaining watering time of the irrigation station 1F6 in relation to a visualization of the total watering time of the irrigation station 1F6. For example, as shown in FIG. 25, the full circle 2455 represents the total watering time for which the irrigation station 1F6, whereas the shaded or colored portion 2457 (indicated with a fill) indicates the remaining watering time. In FIG. 25, the colored portion 2457 is approximately one-third of the full circle 2455 to visually indicate to the user that that about two-thirds of the watering run time by the irrigation station 1F6 has occurred and that one-third of the total watering time for which the irrigation station 1F6 was activated remains. When viewed side by side with the countdown 2452 showing 00:32:49 (i.e., zero hours, 32 minutes, 49 seconds) remaining, the user can visualize that the full cycle was approximately 90 minutes.

It will be appreciated that instead of showing a full circle with a portion of it shaded or colored as shown in the embodiment of FIG. 25, the remaining watering time graphical indicator 2454 may indicate the remaining watering time relative to the total watering time in an alternative way, for example, by showing another geometric shape (e.g., a bar-graph like rectangle that is approximately one-third filled in by a color or shading, or by explicitly stating as follows: "Remaining Time is 00:32:39 of total 00:90:00."

It is noted that users of prior central control products may be able to obtain at least some of the data viewable in the control panel 2450, but would have to navigate multiple different data menus in different portions of the user interface. In some embodiments, the control panel 2450 aggregates this useful data in one convenient location directly viewable by the user via the map interface and assists the user in visualizing the data while in a map view of the area.

Figures 26, 27:
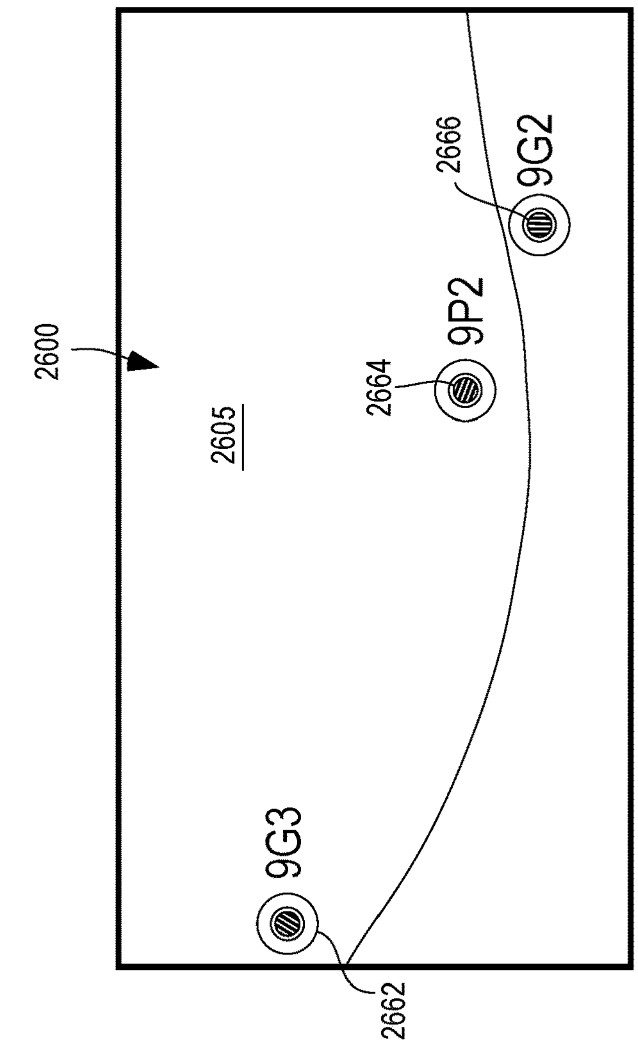
FIG. 26 shows an exemplary user interface in accordance with some embodiments that displays a map of an irrigation area including station icons corresponding to irrigation stations deployed in the irrigation area, with the station icons visually indicating a nozzle type of the sprinklers controlled by the irrigation stations corresponding to the station icons.
FIG. 27 shows an exemplary user interface in accordance with some embodiments that displays a portion of map of an irrigation area including a station icon corresponding to an irrigation station deployed in the irrigation area and illustrating a graphical indicator that may be associated with a station icon to visually indicate an identifier and a remaining watering time for the irrigation station corresponding to the station icon.

Next referring to FIG. 26, in some embodiments, the irrigation management application 114 is configured to cause a user interface 2600 to be displayed to a user, the user interface 2600 including a map 2605 of an irrigation area and visually displays to the user certain types of data and status directly from the map view of the user interface 2600. This data and/or status of the irrigation stations associated with the station icons displayed on the map 2605 of the irrigation area can be found in various menus of the irrigation management application 114*a*, but is conveniently visually displayed to the user directly from the map view.

In the embodiment of FIG. 26, the user interface 2600 is configured such the station icon visually indicates a nozzle type of one or more sprinklers controlled by the irrigation station corresponding to the station icon. For example, a color of a portion of the station icons 2662, 2664, 2666 displayed on the map 2605 of the irrigation area visually indicates the specific nozzle type of one or more of the sprinklers controlled by the irrigation stations (e.g., 9P3, 9P2, and 9G2, respectively) that correspond to the station icons 2662, 2664, 2666. As mentioned above, in some embodiments, it can be advantageous for the user to see the specific nozzle type of the irrigation stations within the user interface 2600 because it is well known that different nozzle types dictate water throw distance and application rate. In other words, knowing the specific type of nozzle type of an irrigation station by looking at the station icons 2662, 2664, 2666 can permit the user of the user interface 2600 to make decisions regarding the components and use of the components of the irrigation system 116.

In the exemplary user interface 2600 shown in FIG. 26, an inner portion of the station icons 2662, 2664, 2666 are displayed on the map 2605 of the irrigation area in different colors (for example, blue, red and yellow, indicated by different cross hatch fills) that visually indicate that the station icons 2662, 2664, 2666 correspond to irrigation stations having three different types of nozzles. In some implementations, the user may know which color corresponds to which nozzle type, or the correlation of the station icon color to nozzle type may be explicitly shown within the user interface 2600 (e.g., if the user selects or hovers over the colored portion of the station icons 2662, 2664, 2666), or the correlation of the station icon color to nozzle type may be explicitly stated in an instruction manual for the irrigation management application 114 running on the electronic device of the user. In some embodiments, instead of being displayed in three different colors, the station icons 2662, 2664, 2666 are displayed in different shades (e.g., lighter, darker, darkest) of the same color (e.g., blue, green, etc.), with each of the different shades of the color representing a specific nozzle type of the corresponding irrigation station.

As shown in the embodiment of FIG. 27, the user interface 2700 may be configured to display, directly from the map 2705 of the irrigation area, a unique identifier 2764 of the irrigation station (in this case, 9P4) corresponding to the station icon for an irrigation station that is actively watering. Further, directly displayed on the map 2705 and adjacent to the station icon is a remaining watering time countdown 2752 indicating the remaining run time. And in some embodiments, the station icon is displayed as including a remaining watering time graphical indicator 2754 similar to that shown in the exemplary control panel 2450 shown in FIGS. 24-25.

For example, in the embodiment illustrated in FIG. 27, the station icon is represented as the remaining watering time graphical indicator 2754 which visually indicates the remaining watering time of the irrigation station 9P4 in relation to a visualization of the total watering time of the irrigation station 9P4. In FIG. 27, a full circle 2755 (which may be shaded/unshaded, colored/uncolored, etc.) represents the total watering time for which the irrigation station 9P4 is to run, whereas the shaded/unshaded, colored/uncolored portion 2757 indicates the remaining watering time of the irrigation station 9P4. In the example of FIG. 27, the portion 2757 is approximately one-third of the full circle 2755 to visually indicate to the user that that about two-thirds of the watering run time by the irrigation station 9P4 has occurred and that one-third of the total watering time for which the irrigation station 9P4 was activated remains. When viewed side by side with the countdown 2752 showing 00:32:21 (i.e., zero hours, 32 minutes, 21 seconds) remaining, the user can visualize that the full watering cycle of the irrigation station 9P4 was approximately 90 minutes. Similar to that described in FIG. 25, the remaining watering time graphical indicator 2754 can be displayed with other geometric shapes (e.g., a bar-graph like rectangle that is approximately one-third filled in by a color or shading.

Figure 28:
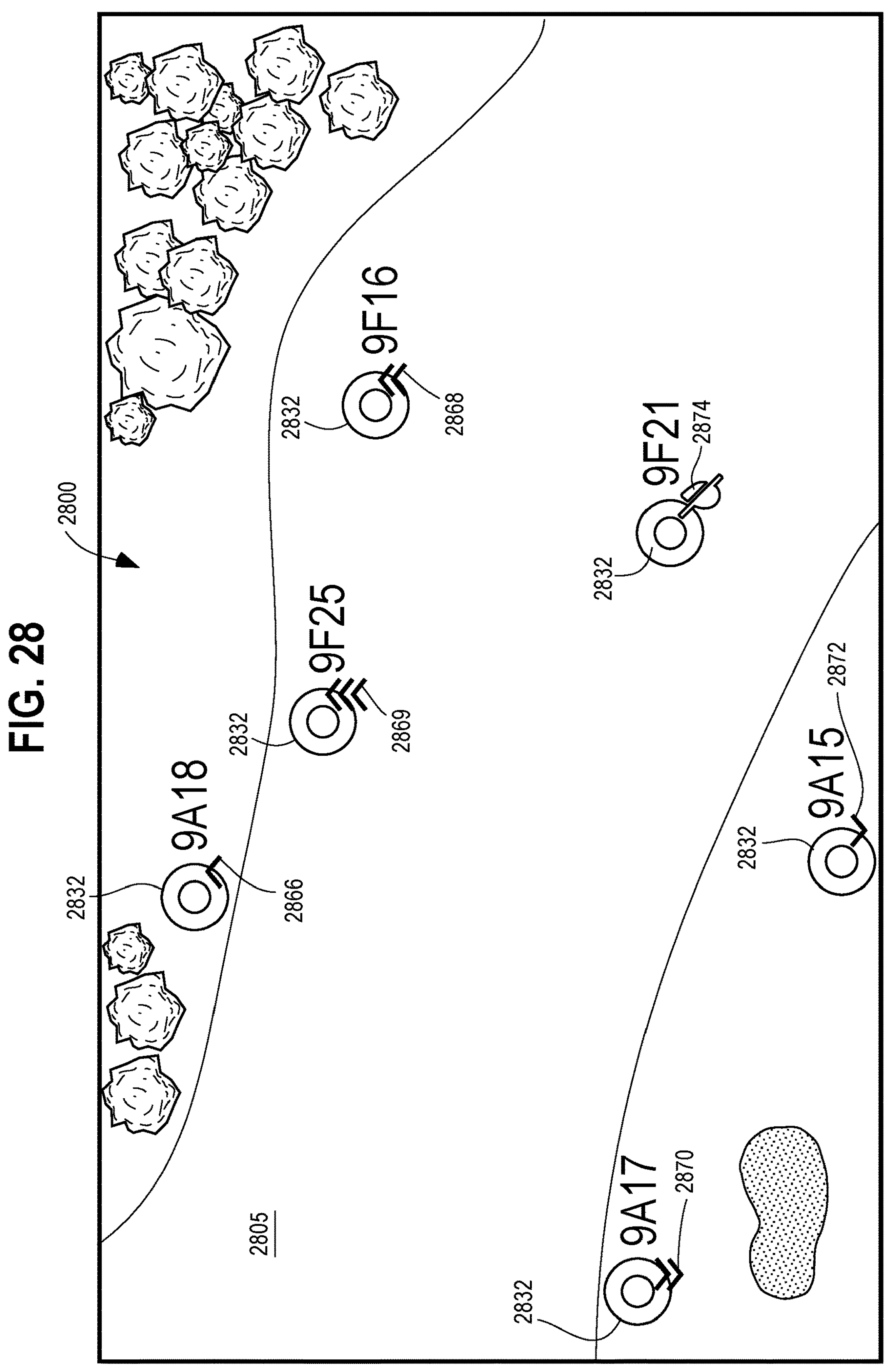
FIG. 28 shows an exemplary user interface in accordance with some embodiments that displays a map of an irrigation area including station icons corresponding to irrigation stations deployed in the irrigation area, with each station icon being associated with a visual marker indicating an adjustment range of an operational parameter of the irrigation station corresponding to the station icon.

With reference to FIG. 28, in some embodiments, the irrigation management application 114, when executed, is configured to cause a user interface 2800 to be displayed to a user and that includes a map 2805 of an irrigation area and visually displays to the user the station icons 2832 corresponding to irrigation stations associated with the irrigation area. Additionally, the user interface 2800 provides visual markers associated with station icons, the visual markers that indicating that an operational parameter of the irrigation station corresponding to the station icon has been adjusted relative to a scheduled operational parameter. In the embodiment illustrated in FIG. 28, the user interface 2800 displays visual markers embodied as adjustment symbols 2866, 2868, 2869, 2870, 2872, 2874 in association with (e.g., displayed adjacent to or nearby) each station icon 2832 that has an operational parameter/attribute adjustment.

The exemplary adjustment symbols 2866, 2868, 2869, 2870, 2872 are illustrated in FIG. 28 in the form of one or two or three (more is also possible in some embodiments) upwardly-pointing or downwardly-pointing symbols, which are shown by way of example as being in a chevron shape, but could alternatively be up/down arrows, plus or minus symbols, water drops, etc. These adjustment symbols 2866, 2868, 2869, 2870, 2872 may be visible in the user interface 2800, or may become visible in response to a user clicking, tapping, selecting, or hovering over the station icons 2832 respectively associated with the adjustment symbols 2866, 2868, 2869, 2870, 2872. In certain aspects, instead of or in addition to using one, two, three, or more graphical upwardly/downwardly pointing adjustment symbols 2866, 2868, 2869, 2870, 2872, the user interface 2800 may include an informational field that displays the operational adjustment and/or the value (or value range) of the operational adjustment.

Those of ordinary skill in the art would appreciate that there are a variety of operational parameter adjustments that can be applied to a given irrigation station, for example, one or more of temporary adjust, station adjust, weather adjust, seasonal adjust, and so on. In some embodiments, these operational parameter adjustments are often defined as percentage values relative to scheduled operational parameters for the irrigation stations, where 100% is the normal unadjusted operational parameter, values less than 100% represent a scaled reduction of the scheduled operational parameter (e.g., irrigation run time, etc.) and values greater than 100% represent a scaled increase of the scheduled operational parameter (e.g., run time). For example, in embodiments, where the operational attribute/parameter being adjusted is run time of an irrigation station and assuming an unadjusted run time is represented as 100%, an adjustment of 80% would cause the irrigation station to water for 80% of the scheduled run time, and an adjustment of 130% would cause the irrigation station to water for 130% of the scheduled run time.

In the exemplary embodiment shown in FIG. 28, the graphical adjustment indicator symbols 2866, 2868, 2869, 2870, and 2872 visually show which irrigation stations (in this case, irrigation stations 9A15, 9A17, 9F25, 9A18, 9F16), have operational attribute adjustments. In particular, in the example provided in FIG. 28, upward pointing symbols (e.g., 2866, 2868, 2869) indicate an operational parameter adjustment of greater than 100% relative to the scheduled operational parameter, and downward pointing symbols (e.g., 2870 and 2872) indicate an operational parameter adjustment of less than 100% relative to the scheduled operational parameter. Further, in the illustrated embodiment, a single upwardly-pointing/downwardly-pointing symbol (e.g., symbols 2866 or 2872) indicates a first level of positive/negative adjustment and a double upwardly-pointing/downwardly-pointing symbol (e.g., symbols 2870, 2872) indicates a second and greater level of positive/negative adjustment, and a triple upwardly-pointing/downwardly-pointing symbol (e.g., symbol 2869) indicates a third and greater level of positive/negative adjustment. In some embodiments, a single (upwardly-pointing or downwardly-pointing) chevron symbol corresponds to adjustment of up + or −20% of the scheduled run time, whereas a double (upwardly-pointing or downwardly-pointing) chevron symbol corresponds to adjustment of more than + or −20% of the scheduled run time, and a triple (upwardly-pointing or downwardly-pointing) chevron symbol corresponds to adjustment of more than + or −50% of the scheduled run time. It is understood that these +/− thresholds are exemplary and may have different values depending on the use. In some embodiments, the +/− threshold defining the display of a single, double, or triple chevron symbol may be set or adjusted by the user such as an administrator of the irrigation management application 114. In some embodiments, additional levels of adjustment can be shown using visual markers.

In the exemplary embodiment shown in FIG. 28, the user interface 2800 may visibly display, on the map 2805 of the irrigation area, a visual marker such as graphical symbol 2874 associated with (e.g., adjacent to) a given station icon 2832 corresponding to an irrigation station (in this exemplary case, irrigation station 9F21), with this symbol 2874 visually indicating that the run time of the irrigation station corresponding to the station icon is adjusted to zero (0%) such that the irrigation station is inactive and no watering will occur by this station. In the illustrated embodiment, the graphical symbol 2874 is represented as a crossed-out water drop, but could be any variety of suitable symbols. In other words, in the embodiment shown in FIG. 28, the graphical element 2874 located adjacent to station icon 2832 corresponding to irrigation station 9F21 visually indicates to the user viewing the map 2805 that the run time of the irrigation station 9F21 has been adjusted to zero, such that no irrigation will occur at irrigation station 10T21.

Figure 10C:
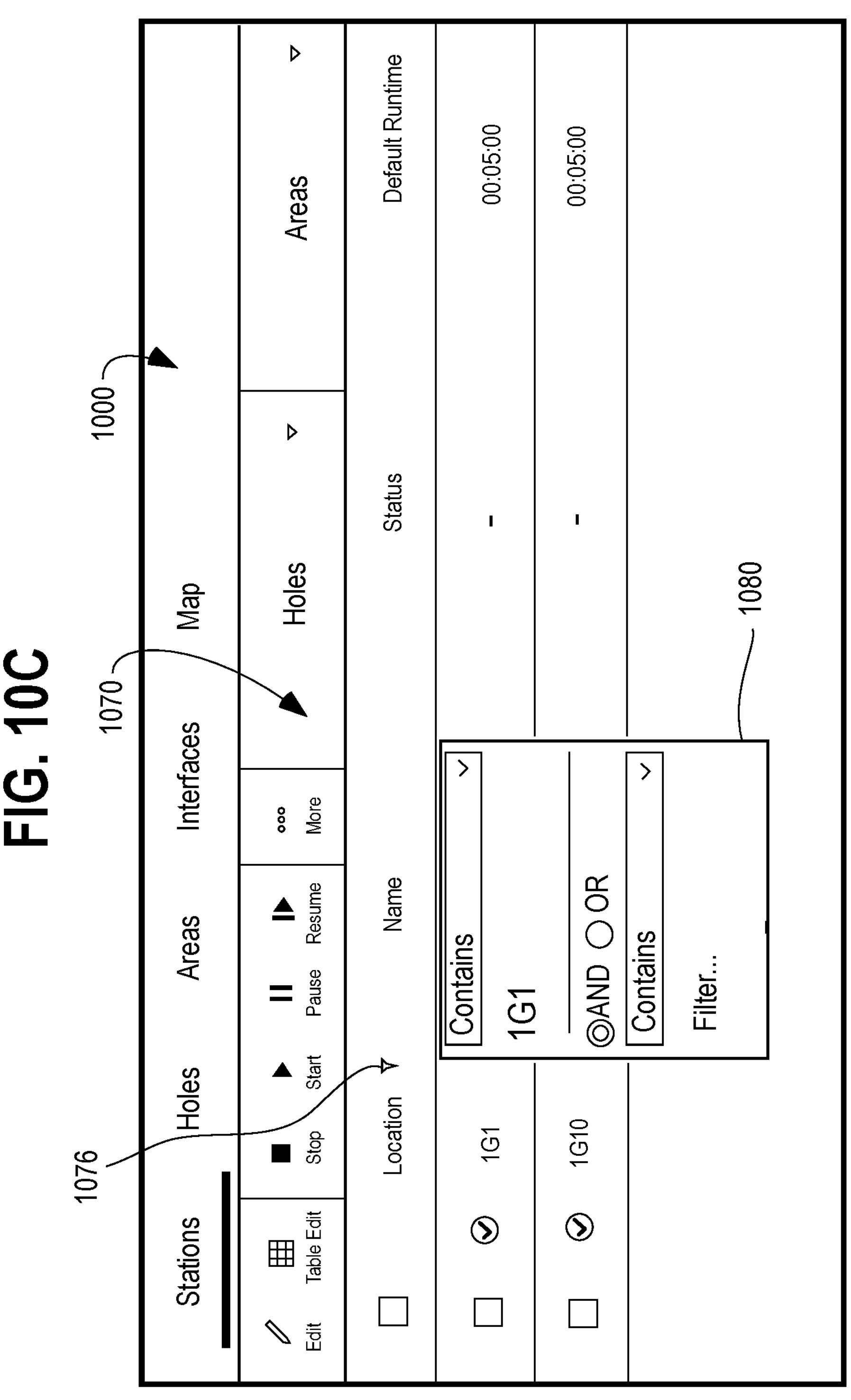
FIG. 10C shows an exemplary embodiment of the user interface of FIG. 10A and further showing an interactive name filter feature that permits the user to search for irrigation stations that contain certain characters in their identifiers in accordance with some embodiments.

With reference to FIGS. 10A-10C, in some embodiments, the irrigation management application 114, when executed by an electronic device causes a user interface 1000 to be displayed that includes a listing of irrigation stations of an irrigation area that displays to the user various data relating to various characteristics or attributes of the components of the irrigation system. In the embodiment illustrated in FIG. 10A, the exemplary user interface 1000 displays a listing of irrigation stations of an irrigation area, permitting a user to select one or more irrigation stations, control the selected irrigation stations, and/or to sort the irrigation stations based on their operational parameters. In FIG. 10A, the listing is in table format that includes rows and columns of the data, user-selected attributes of the irrigation system and provides various data views and reports for users. This data is helpful to assess the health of the irrigation system 116 and/or make adjustments if needed.

In the user interface 1000 according to the embodiment illustrated in FIG. 10A relating to an irrigation system installed on a golf course, data is presented in table format with multiple columns each defining different data types and then multiple rows each corresponding to a given irrigation station, hole, area, etc. Similar to spreadsheets, these data tables may be sorted, filtered and/or searched. For example, when a Stations view 1072 is selected, FIG. 10A shows an exemplary user interface 1000 that displays a listing 1070 of irrigation stations, e.g., as a table, that provides various data (e.g., informational attributes, operational attributes, etc.) for the irrigation stations, with the listing 1070 in the illustrated example having been sorted by irrigation station run time (as a result of the user selecting/tapping/clicking on interactive sort icon 1074) in ascending order. This type of sorting allows the user to easily see various useful information within the user interface 1000, for example, that some irrigation stations (in this example, irrigation stations 3A9, 3A10, and 4G1) have a run time of zero minutes and are thus not scheduled for active irrigation.

The listing 1070 of the exemplary user interface 1000 of FIG. 10A also includes a status icon (e.g., status icons 1075, 1076, 1077) associated with each of the irrigation stations in the listing 1070. These status icons allow the user to visually see within the user interface 1000 whether an irrigation station associated with the status icon is operating normally or malfunctioning. In the example shown in FIG. 10A, each of the irrigation stations in the listing (i.e., 3A9, 3A10, 1G1, 1G2, etc.) is illustrated with a status icon 1075 (e.g., a circle with a check mark) that indicates that these irrigation stations are operating normally. If an irrigation station were associated with a malfunction or another operational alert (e.g., low voltage, etc.), the user interface 1000 could show status icon 1077 (e.g., a circle with an exclamation sign) such as shown for station 6G1. Other kinds of alerts or warnings could be indicated by status icon 1076 (e.g., a circle with a slash) such as station 4G1, which could indicate that this station is disabled.

In addition, the listing 1070 of the exemplary user interface 1070 includes user modifiable irrigation station selection fields 1080 and 1082 that permit the user to select one or more of the irrigation stations in the listing 1070. Notably, the user can select a given station in the listing 1070 by clicking on its respective irrigation station selection field 1080 individually, and the user interface 1000 can display each selected irrigation station with a check mark or other fill inside the irrigation station selection box 1080. Alternatively to selecting individual irrigation stations via the irrigation station selection fields 1080, the exemplary user interface includes a select all option with irrigation station select field 1082, the selection of which by the user causes all of the irrigation station selection fields 1080 in the listing 1080 to become selected (with check marks or other fill appearing in all of the station selection fields 1080 in the listing 1070).

With reference to FIGS. 10A-10C, in some embodiments, the irrigation management application 114, when executed by an electronic device causes a user interface 1000 to be displayed that includes a listing of irrigation stations of an irrigation area that displays to the user various data relating to various characteristics or attributes of the components of the irrigation system. In the embodiment illustrated in FIG. 10A, the exemplary user interface 1000 displays a listing of irrigation stations of an irrigation area, permitting a user to select one or more irrigation stations, control the selected irrigation stations, and/or to sort the irrigation stations based on their operational parameters. In FIG. 10A, the listing is in table format that includes rows and columns of the data, user-selected attributes of the irrigation system and provides various data views and reports for users. This data is helpful to assess the health of the irrigation system 116 and/or make adjustments if needed.

In the user interface 1000 according to the embodiment illustrated in FIG. 10A relating to an irrigation system installed on a golf course, data is presented in table format with multiple columns each defining different data types and then multiple rows each corresponding to a given irrigation station, hole, area, etc. Similar to spreadsheets, these data tables may be sorted, filtered and/or searched. For example, when a Stations view 1072 is selected (which is visually indicated within the exemplary user interface 1000 via an underline appearing under the word "Stations"), FIG. 10A shows an exemplary user interface 1000 that displays a listing 1070 of irrigation stations, e.g., as a table, that provides various data (e.g., informational attributes, operational attributes, etc.) for the irrigation stations, with the listing 1070 in the illustrated example having been sorted by irrigation station run time (as a result of the user selecting/tapping/clicking on interactive sort icon 1074) in ascending order. In some embodiments, similar interactive sort icons (shown in the embodiment illustrated in FIG. 10A in the form of upwardly-pointing arrows) may appear next to the other categories of the listing 1070 (e.g., Locations, Name, Status, ET, Adjust, Notes, etc.) to permit the user to easily sort any one of these other categories. This type of sorting allows the user to easily see various useful information within the user interface 1000, for example, that some irrigation stations (in this example, irrigation stations 3A9, 3A10, and 4G1) have a run time of zero minutes and are thus not scheduled for active irrigation.

The listing 1070 of the exemplary user interface 1000 of FIG. 10A also includes a status icon (e.g., status icons 1075, 1076, 1077) associated with each of the irrigation stations in the listing 1070. These status icons allow the user to visually see within the user interface 1000 whether an irrigation station associated with the status icon is operating normally or malfunctioning. In the exemplary user interface 1000 shown in FIG. 10A, each of the irrigation stations in the listing (i.e., 3A9, 3A10, and 1G1-1G9) may be illustrated with a status icon 1075 that could be in the form of a circle with a check mark that visually indicates that these irrigation stations are operating normally. In the illustrated embodiment, if an irrigation station were associated with a malfunction or another operational alert (e.g., low voltage, etc.), the user interface 1000 could show status icon 1077 (e.g., a circle with an exclamation sign) such as shown for irrigation station 6G1. The exemplary user interface 1000 may visually indicate other kinds of alerts or warnings by a status icon 1076 (e.g., a circle with a slash) such as irrigation station 4G1, which could indicate that this irrigation station is disabled.

In addition, the listing 1070 of the exemplary user interface 1070 includes user modifiable irrigation station selection fields 1080 and 1082 that permit the user to select one or more of the irrigation stations in the listing 1070. Notably, the user can select a given station in the listing 1070 by clicking on its respective irrigation station selection field 1080 individually, and the user interface 1000 can display each selected irrigation station with a check mark or other fill inside the irrigation station selection box 1080. Alternatively to selecting individual irrigation stations via the irrigation station selection fields 1080, the exemplary user interface includes a select all option with irrigation station select field 1082, the selection of which by the user causes all of the irrigation station selection fields 1080 in the listing 1080 to become selected (with check marks or other fill appearing in all of the station selection fields 1080 in the listing 1070).

The exemplary interface 1000 of FIG. 10A further includes an interactive control panel 1073 that includes various control selections that permit the user to control operation of the irrigation stations selected by the user via the station selection fields 1080. The exemplary control panel 1073 of the user interface 1000 shown in FIG. 10A may include interactive icons/buttons such as Start (represented by the triangle shape), Stop (represented by the square shape), Pause (represented by two parallel lines), and Resume (represented by a vertical line adjacent a triangle), but it will be appreciated that additional or alternative icons/buttons may be used instead. The interactive icons/buttons of the control panel 1073 permit the user to control irrigation by the irrigation stations selected by the user within the table 1070 of the user interface 1000. In other words, when a user presses the triangle-shaped Start button within the control panel 1073, all irrigation stations that are selected (i.e., the irrigation stations with check marks in their station selection fields 1080) would begin actively watering their respective portion of the irrigation area.

FIG. 10B shows that, in some embodiments, the user interface 1100 permits a user to filter the irrigation stations by name within the table 1070. In this embodiment, the user interface 1000 is configured to include an interactive name filter feature 1076 that the user may select (e.g., by tapping/clicking/hovering over it). In the example shown in FIG. 10B, the irrigation stations listed in the table 1070 have been filtered by station name. In some embodiments, when the user selects the interactive filter symbol 1076 for the name column, the user interface 1000 displays a filter menu 1078. This filter menu 1078 permits the user to manually input the value by which the user intends to filter the names of the irrigation stations, in this case the user intending to show only irrigation stations having names starting with 1-1 (but, as shown in FIG. 10B, in some embodiments, the filter menu 1078 permits the user to select an option that allows the user to filter the irrigation stations by names that start with and/or contain two user-specified combination of characters (e.g., the user may list irrigation stations that start with 1-1 AND contain "A" to bring up the listing of irrigation stations shown in FIG. 10B). When the user applies this filter via the filter menu 1078, the user interface 1000 responsively lists in the table 1070 only irrigation stations with a name that meets the filter (in this exemplary case, irrigation station with names starting with 1-1 (while irrigation stations not meeting the filter such as irrigation stations starting with 1-2, or with 2, or 3, etc. would not be displayed).

FIG. 10C shows that, in some embodiments, the user interface 1100 permits a user to search the irrigation stations by name within the table 1070. In this embodiment, the user interface 1000 is configured to include an interactive location search feature 1078 that the user may select (e.g., by tapping/clicking/hovering over it). In the example shown in FIG. 10C, the displayed portion of the table 1070 shows locations of irrigation stations that were searched using the interactive location search feature 1078. That is, the user intended to search for irrigation stations by irrigation station location. In the illustrated embodiment, the user selected the interactive search feature symbol 1078 for the location column, in response to which the irrigation management application displays the search menu 1080, where the user can manually put in the characters representing the full name of a portion of the name of the location of the irrigation station, and the user is permitted to either search for only those stations whose location contains 1G1 (as shown in FIG. 10C), or to use the AND/OR feature of the search menu 1080 to search for irrigation station locations that contain 1G1 and/or contain another search parameter (in some embodiments, a sub-menu 1079 of the location search feature 1080 may permit the user to change the "Contains" parameter to "Starts With" parameter). As shown in FIG. 10C, a search as performed by the user using the search menu 1080 would result in only the display of irrigation station locations meeting the user-specified search criteria.

Figure 11:
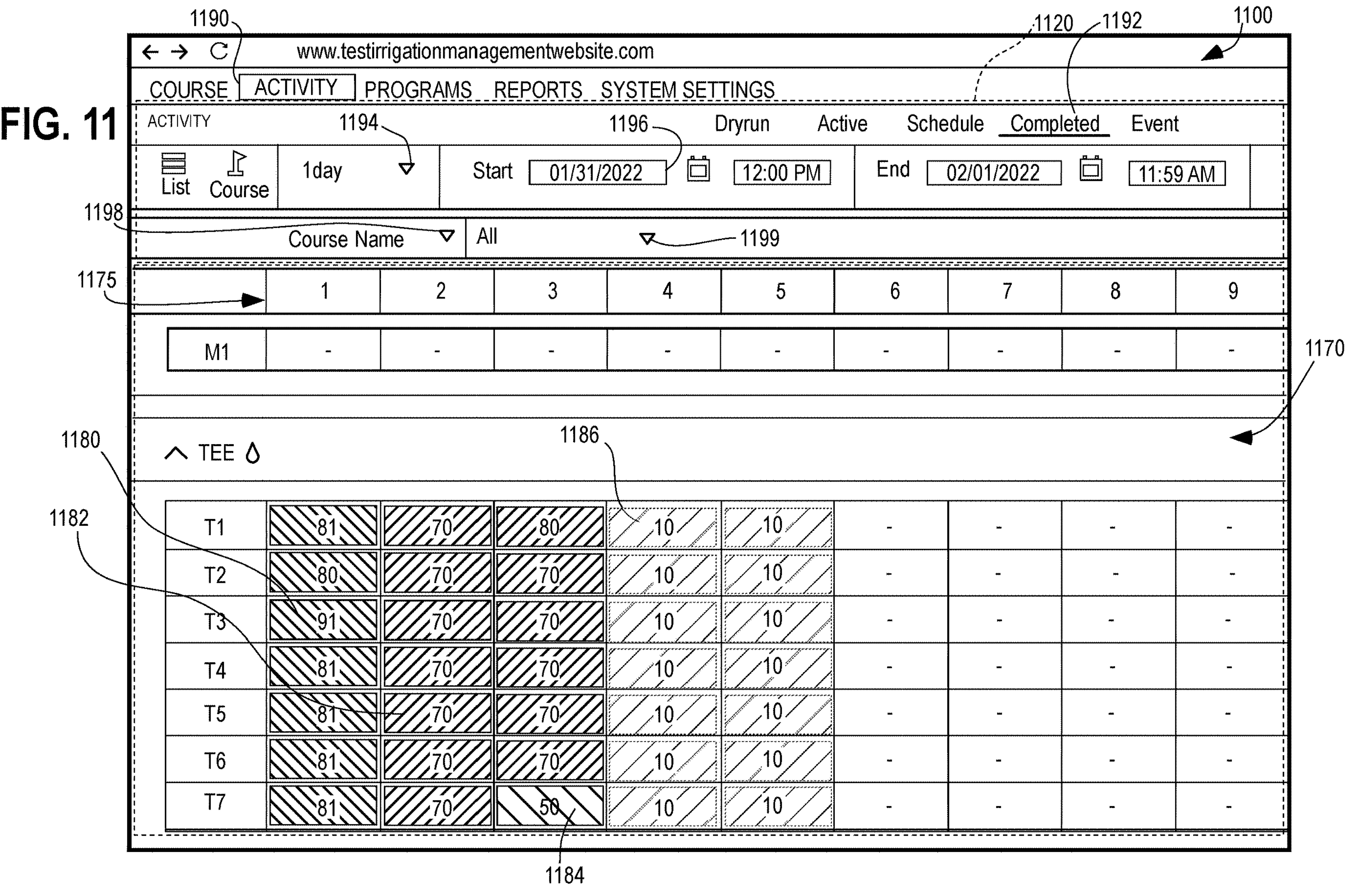
FIG. 11 shows an exemplary user interface in accordance with some embodiments that includes a table of data relating to one or more characteristics of an irrigation system, wherein the data values are displayed in multiple colors such that each color represents a different range of the values of the data.

With reference to FIG. 11, in some embodiments, the irrigation management application 114, when executed, causes a user interface 1100 that displays to the user a table of data 1170 relating to one or more characteristics of an irrigation system, wherein the data values are displayed in multiple colors such that each color represents a different range of the values of the data. In some embodiments, the data relates to various characteristics or attributes of various components of the irrigation system, or to various characteristics or attributes of the irrigation system overall. In the embodiment illustrated in FIG. 11, the exemplary user interface 1100 displays user selectable attributes 1120 and the table of data 1170 that includes rows and columns of the data resulting from the user-selected attributes. In some embodiments, the data in the table 1170 can be shaded in multiple ways or highlighted multiple colors to visually show to the user different numerical ranges of the data being displayed. Notably, the exemplary user interface 1100 of FIG. 11 may be displayed like the other exemplary user interfaces described herein.

The exemplary user interface 1100 shown in FIG. 11 is specifically configured to display data specific to watering activity of irrigation devices of the irrigation system in various areas of a golf course, but the user interface 1100 could display data relating to the use of the irrigation system in any other landscape. In the example shown in FIG. 11, the table 1170 generated within the user interface 1100 is generated after the user selects the interactive tab/icon 1190 called ACTIVITY, which is one of the exemplary function choices that the user interface 1100 permits the user to select, the other exemplary selection tab/icon choices being COURSE, PROGRAMS, REPORTS, and SYSTEM SETTINGS. FIG. 11 also shows that the user has selected the activity selection tab 1192 called "Completed" instead of the other available activity selection tab/icon choices called Dry run, Scheduled, Active, and Events. In addition, FIG. 11 further shows that the user has selected to list, via a drop down menu 1194, the time interval of the data of interest to the user, in this case 1 day, while specifying in user-modifiable input fields 1196 that the 1 day is from 12:00 PM on Jan. 31, 2022 to 11:59 AM on Feb. 1, 2022.

The exemplary table format-type course log depicted within the user interface 1100 lists minutes of irrigation (run time) received by irrigation sub-areas (in this case T1, T2, T3, T4, T5, T6, T7) located in the TEE area of the holes (only data for the first 7 holes is visible in the view of FIG. 11) for a selected golf course ("Course Name" is selected by the user via a drop-down menu 1198). Also, the exemplary interface 1100 in FIG. 11, the user has selected to display all irrigation sub-areas (e., Tee, Fairway, Green, etc.) by selecting "All" from the drop-down menu 1199 (notably, due to screen-size limitations, only data pertaining to irrigation sub-areas T1-T7 located in the TEE area of the holes of the user-selected golf course are visible in FIG. 11, while the data pertaining to irrigation sub-areas F1-Fn located in the FAIRWAY area of the holes of the user-selected golf course, as well as the data pertaining to irrigation sub-areas G1-Gn located in the GREEN area of the holes of the user-selected golf course, and any other irrigation sub-areas of the user-selected golf course are not visible, but could be visible if the user scrolls further down within the table. In the illustrated embodiment, the table 1170 includes a data entry row which, in this example, is designated by MI ("M" may refer to "Miscellaneous"), and which permits the user to enter comments for any of the manual run times listed in the table 1170.

The exemplary table 1170 presented in FIG. 11 indicates the number of watering minutes received by the irrigation sub-areas T1, T2, T3, T4, T5, T6, T7 during each of five separate watering events during the selected period (indicated by the corresponding numbers 1-5 in row 1175) during the user-selected period of time. That is, sub-area T1 received 81, 70, 80, 10 and 10 minutes of watering over the 5 watering times that day. In the embodiment illustrated in FIG. 11, to visually distinguish the different ranges of the numerical values representing the completed wearing times displayed in the table, the exemplary user interface 1100 includes a color gradient that is applied to the data cells of the table 1170 to visually indicate the numerical value difference. In the example shown in FIG. 11, the darker the shading or the darker the color applied to a given data cell, the more minutes of watering were applied. In other words, in the illustrated embodiment, the data cells with the lightest shading (e.g., indicated with the cross hatch fill shown in cell 1186) received 10 minutes of (i.e., the least) watering and the data cells with the darkest shading of the same color (e.g., indicated with the cross hatch fill shown in cell 1180) received 81 and 91 minutes of (i.e., the most) watering. Similarly, starting from the lowest amounts of watering, the data cells with the next darker shade of the same color (e.g., indicated with the cross hatch fill of cell 1184) received 50 minutes of watering. And the data cells with the next darker shade of the same color (e.g., indicated with the cross hatch fill of cell 1182) received 70 minutes of watering. In this way, color is used in the table to indicate various ranges of values of the data.

Notably, while the exemplary user interface 1100 shows that the table associates the darkest shade of a color with the highest numerical value range in the data cell and the lightest shade of the color with the lowest numerical value range in the data cell, in some embodiments, this could be reversed such that the darkest shade of a color is associated with the smallest numerical value range in the data cell and the lightest shade of the color with the highest numerical value range in the data cell. As mentioned above, instead of darker/lighter shading variations, in some embodiments, the cells could be differently highlighted (green to indicate a first numerical value range, yellow to indicate a second numerical value range, orange to indicate a third numerical value range, etc.) to correspond to the numerical data values displayed in the table. In one aspect, the different colors of the data cells of the displayed data table have a first color (e.g., green, blue, etc.) that indicates that the data value displayed in the cell has been increased from a nominal value and the second color (e.g., yellow, orange, etc.)

indicates that the data value displayed in the cell has been decreased from the nominal value.

In some embodiments, colored data cells could be used to show increases and decreases from nominal values. For example, a data cell may not show any color if the run time ran for the nominally scheduled run time, a data cell could be displayed in a first color that indicates that the data value has been increased from the nominal run time (e.g., greater than 100%), and a data cell could be displayed in a second color that indicates that the data value has been decreased from the nominal run time (e.g., less than 100%). Further, in some embodiments, shading and or different colors may be used to show various data value ranges with a dedicated color used to indicate that the data value is an outlier value. For example, in the example user interface 1100, shading could be used to show the various data value ranges, and if for example, a given cell had a value of 200 minutes, such value could be seen as an outlier and colored in a dedicated color (such as red).

While run time is used as an exemplary characteristic with data values displayed, other characteristics and data value could be displayed with color indicating ranges. For example, in some embodiments, the characteristics can include at least one of an irrigation station run time, an irrigation station water usage, and an irrigation station alert occurrences and the values can include at least one of run times, number of gallons used, number of inches of irrigation applied, number of watering passes applied, irrigation station voltage, irrigation station pressure, irrigation station flow, irrigation station age/date code, precipitation rate, and number of irrigation station alerts. Likewise, in some embodiments, the characteristics and data value can relate to at least one of an irrigation station or area run time, an irrigation station or area water usage, a number of irrigation station or area watering passes, an irrigation station voltage, an irrigation station pressure, an irrigation flow, an irrigation flow rate, an irrigation component age, an irrigation station precipitation rate, and a number of irrigation station alerts.

As can be seen in FIG. 11, the user interface 1100 according to several embodiments provides the user with the ability to visually notice various watering patterns in the data of the irrigation system, in this exemplary case, the user being able to see that there is more watering by the irrigation station 116 at the beginning of the day as compared to the end of the day. This use of color coding (or alternatively, highlighting) to reflect different numerical value ranges can be used to look for various patterns in the programming and/or spot mistakes or inconsistencies in the programming.

Figure 12:
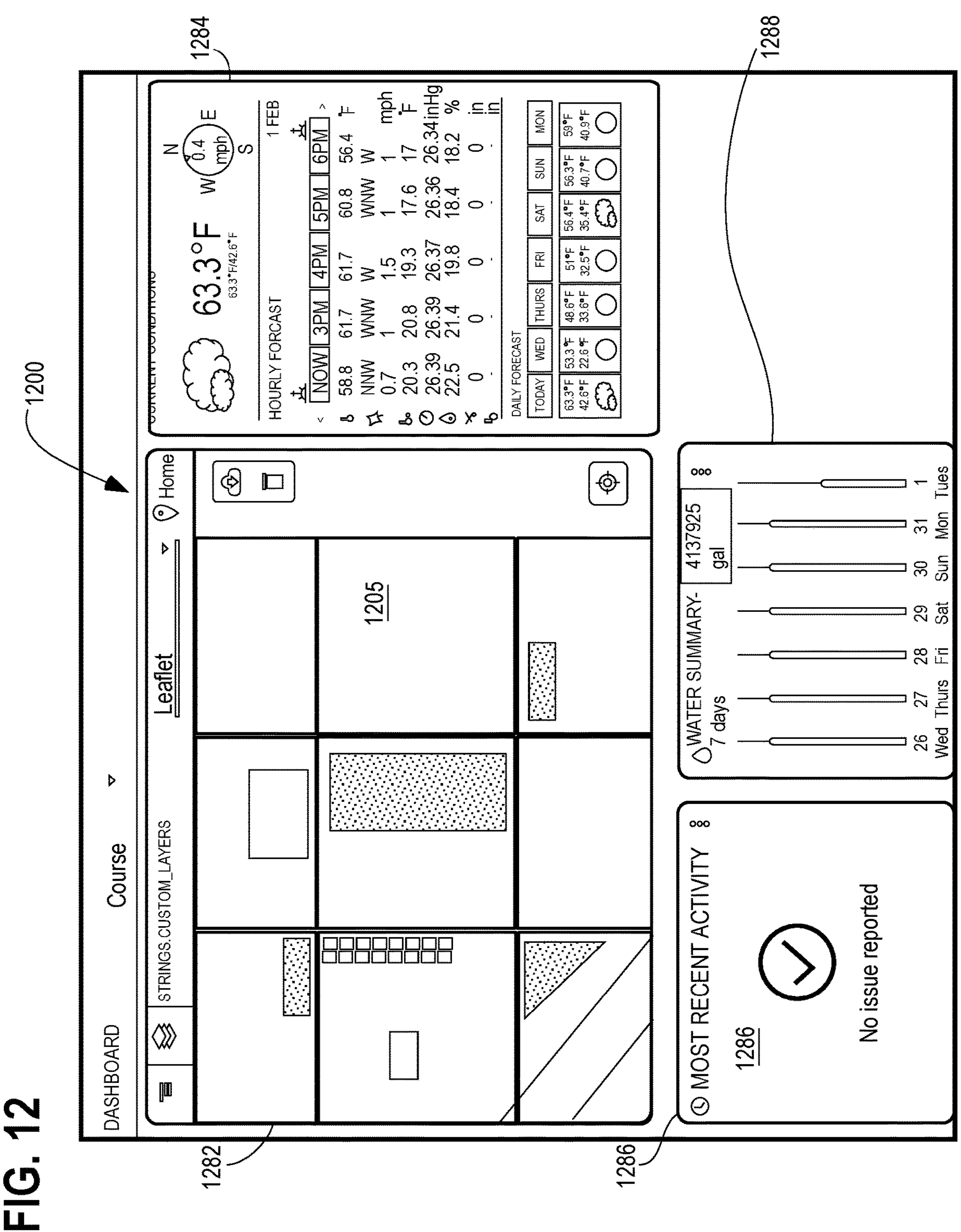
FIG. 12 shows an exemplary user interface in accordance with some embodiments that includes a map of an irrigation area and exemplary informational fields associated with the irrigation area and/or irrigation stations located in the irrigation area.

With reference to FIG. 12, in some embodiments, the irrigation management application 114 is configured to cause a user interface 1200 to be displayed to a user, the user interface 1200 including various informational fields (which may be referred to herein as "data widgets") relating to various attributes of an irrigation system of interest to the user. For example, the exemplary interface 1200 shown in FIG. 12 includes a map widget 1282 that displays a map 1205 of the irrigation area where the irrigation system of interest to the user operates; a weather widget 1284 that may include informational fields to indicate weather information including, but not limited to current weather conditions in the geographic area where the irrigation area is located, hourly forecast of the weather conditions in the irrigation area, daily forecast of the weather conditions in the irrigation area, etc.; a recent activity widget 1286 that may display an informational field indicating data and/or alerts relating to recent irrigation events; and a water summary widget 1288 indicating, for example, a total number of gallons used by the irrigation stations of the irrigation system in the irrigation area over a user-specified interval of time (7 days in the illustrated example). It will be appreciated that the widgets shown in the user interface 1200 shown in FIG. 12 are shown by way of example only, and that the user interface 1200 may include widgets additional or alternative to the widgets displayed in FIG. 12.

In the exemplary user interface 1200 of FIG. 12, the water summary widget 1288 shows water usage data for one week showing the daily water usage in terms of gallons used per day, and a total water usage for the week (in this example, 4,137, 925 gallons). While the water widget 1288 shown in the exemplary user interface 1200 shows water usage over the course of 7 days, it will be appreciated that the water widget 1288 can be configured to show data for other user-selected periods of time, such as hourly, daily, weekly, monthly, etc. In the illustrated embodiment, the water summary widget 1288 may display each of the individual days for which water activity is shown in association with a respectively bar graph representation indicating a total number of gallons used by the irrigation stations in the irrigation area daily during each one of the days. In another embodiment, instead of displaying the water usage in bar graph format, the water widget 1288 may display the total water usage with a numerical representation that indicates the total number of gallons used by the irrigation stations in the at least one irrigation area during each one of the displayed days.

Referring next to FIG. 13, in some embodiments, the irrigation management application 114, when executed by an electronic device, is configured to cause a user interface 1300 to be displayed to a user, the user interface 1300 includes a listing of irrigation stations of an irrigation area, permitting a user to select one or more irrigation stations and view the active operational attribute adjustments for the selected irrigation stations.

In some embodiments, the user interface 1300 visually displays a listing (e.g., in a table) with data relating to system-defined or user defined adjustments to the operational attributes of the irrigation stations of the irrigation system. For example, in some embodiments, certain operational attributes/programs/schedules of the irrigation stations of the irrigation system 116 that are originally defined may be adjusted either manually (e.g., by a user) or automatically (e.g., by the control circuit 220 of the central computer 112*a*). In order for the user to easily see these system component attribute adjustments without looking through multiple menus, in the embodiment illustrated in FIG. 13, the exemplary user interface 1300 may include an active adjustment panel 1390 that visually indicates to the user all active operational adjustments for any one of the user-selected irrigation stations listed within the interface 1300.

The exemplary user interface 1300 of FIG. 13 displays a listing 1070 that provides various data (e.g., informational attributes, operational attributes, etc.) for the irrigation stations (identified in the listing 1370 by their respective unique irrigation station identifiers). In the illustrated embodiment, the user interface 1300 includes a listing of the Run Time 1375 for each of the irrigation stations in the listing 1070, and further includes an interactive active adjustments feature icon 1380 associated with the Run Time for each of the irrigation stations listed in the table 1370. This active adjustment icon 1080 allows the user to visually see within the user interface 1300 the specific adjustment or adjustments that have been made to the original operational parameters of the user-selected irrigation station.

In some embodiments, when the user interacts with an active adjustment icon 1080, for example by hovering over it with a computer mouse 1382 as shown in FIG. 13 (or alternatively by clicking or tapping on the active adjustment icon 1080), the user interface generates the active adjustment panel 1390 and displays it (proximate the Run Time attribute and the active adjustment icon 1080 associated with a given irrigation station) over a portion of the irrigation station listing within the user interface 1300.

In some embodiments, the active adjustment panel 1390 illustrated in FIG. 13 displays information relating to the adjustments that were made (e.g., manually by the user or automatically by system) to the Run Time of the user-selected irrigation station (in this exemplary case, irrigation station 1-1G1). The exemplary active adjustments that are displayed within the exemplary active adjustments panel 1390 of the user interface 1300 of FIG. 13 visually indicate to the user that the irrigation station 1-1G1 has a Custom Runtime of 5 minutes and is subject to a Program Adjust of 80% and a Schedule Adjust of 90% resulting in an adjusted run time of 3 minutes and 36 seconds for the watering schedule assigned to the irrigation station 1-1G1 (this adjusted run time of 3 minutes and 36 seconds is also displayed in the Run Time listing in the listing 1370). Notably, in some embodiments, the adjusted run time that is displayed in the listing 1070 and in the active adjustment panel 1390 is calculated based on the programmed run time for a given irrigation station and the separate run time adjustments that have been applied to the irrigation station.

It will be appreciated that the active operational adjustments associated with the irrigation station 1-1G1 discussed above are shown in FIG. 13 by way of example only and, depending on the operational adjustments defined for a given irrigation station of the irrigation system 116, the active adjustment panel 1390 may display additional or different active operational adjustments for the given irrigation station. For example, in some embodiments, the active adjustment panel 1390 may display one or more of a program adjust value, a schedule adjust value, a seasonal adjust value, a weather-based adjustment value, an evapotranspiration (ET)-based adjust value, a system adjustment value, a manual adjust value, a custom adjust value, or the like. In some embodiments, the active adjustment panel 1390 provides a convenient location and explanation resulting in the displayed run time without the need to navigate to multiple menu options to retrieve this data.

Figures 14, 15:
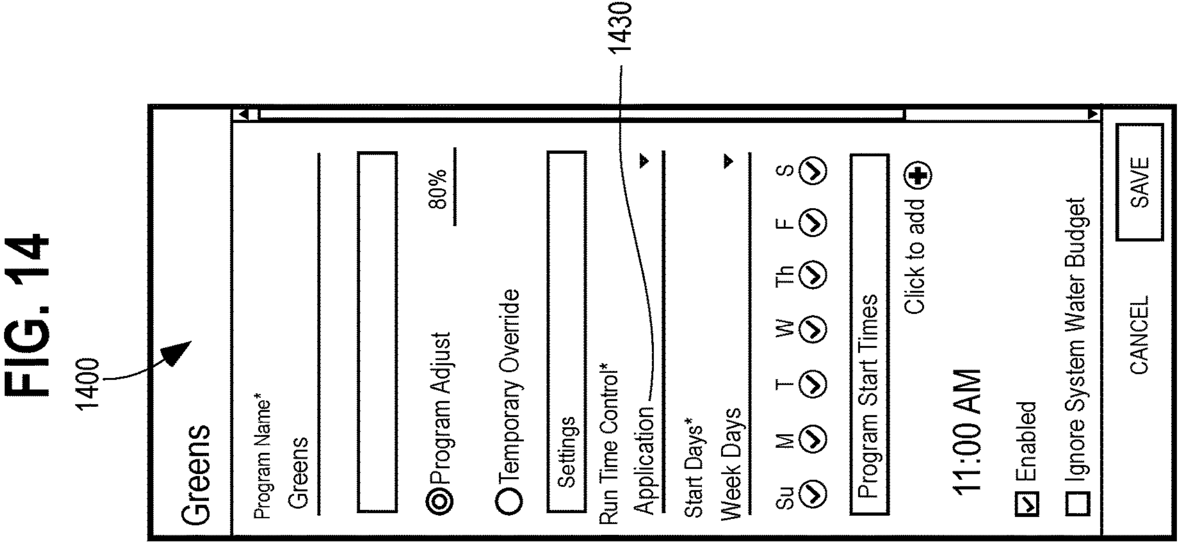
FIG. 14 shows an exemplary user interface in accordance with some embodiments that permits a user to select a program or schedule and define watering in terms of an amount of water to be applied to the area.
FIG. 15 shows an exemplary embodiment of the interface of FIG. 14, showing a sub-menu that permits the user to enter a specific value for the amount of water to be applied by the selected irrigation stations of a program during their run time.

Referring next to FIG. 14, in some embodiments, the irrigation management application 114 is configured to cause a user interface 1400 to be displayed to a user that allows users to control irrigation be defining the volume amount of water to be applied to the area. For example, the user interface 1400 after a user used a drop-down menu 1430 to select a Run Time Control called "Application," which then permits a user to specify a desired water application amount (e.g., in inches of water to provide through irrigation). In some embodiments, in response to a user selecting the "Application" Run Time Control, and the user selecting other variables (start days, start times), and then specifying the numerical value of water to apply to the irrigation area, the irrigation management application will determine the run time needed to apply the amount of water specified by the user. FIG. 15 shows an exemplary Application run time control submenu 1420, which pops up after a user selects "Application" under Run Time Control in the user interface 1400 of FIG. 14, and which includes a user-modifiable input field 1440, which permits the user to enter the user-desired amount of watering to apply, in the illustrated example, the desired watering being 1.0 inches of water. Since the flow rate of the sprinklers of the irrigation stations located in the portion of the user-specified irrigation area (in this case, "Greens") as well as all the other variables of the components of the irrigation are known, the amount of watering time to apply 1.0 inches of water to the user-specified portion of the irrigation area can then be calculated by the irrigation management application.

Figure 16:
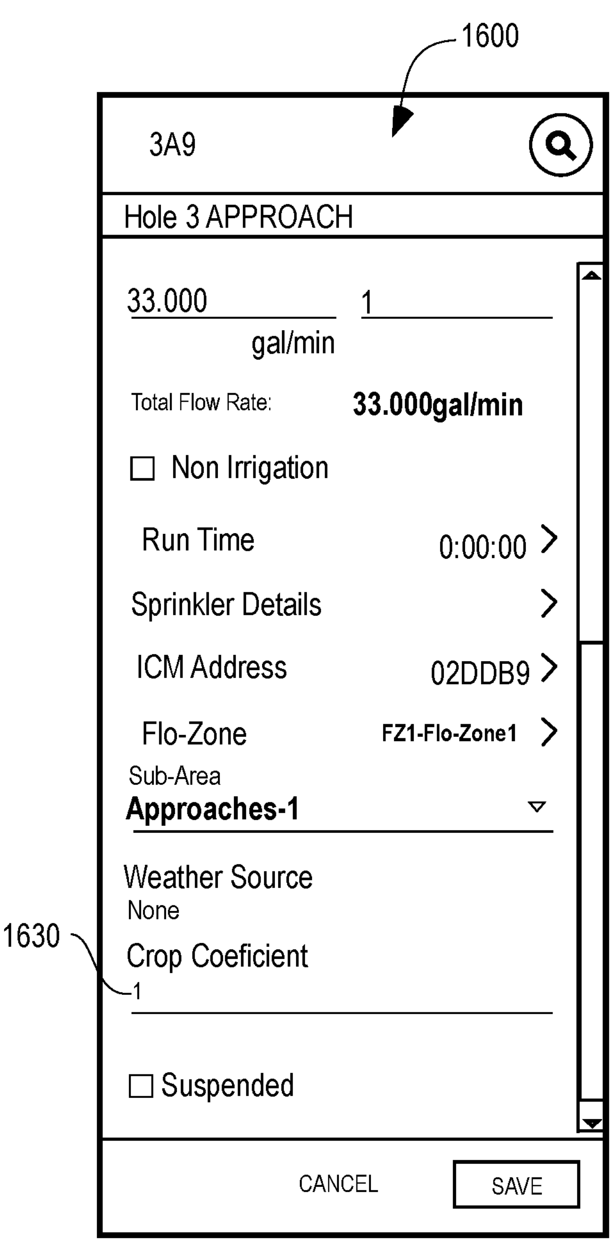
FIG. 16 shows an exemplary user interface in accordance with some embodiments that permits a user to adjust a crop coefficient for one or more user-selected irrigation stations.

Referring next to FIG. 16, In some embodiments, the irrigation management application causes a user interface 1600 to be displayed to a user that provides a user with various options to adjust a crop coefficient for one or more user-selected irrigation stations of the irrigation system. Generally, crop coefficients are properties of plants used in predicting evapotranspiration (ET), where ET is an estimation of the amount of water lost by soil due to evaporation and transpiration (plant water use). Thus, crop coefficients are useful to automatically determine how much water the system should apply to replace the water lost by the plants. Different plant types have different crop coefficients, and in a large irrigation system, there are many types of plants being irrigated.

In central control irrigation systems, users can adjust the crop coefficient globally for all watering programs, and/or adjust for individual programs. However, in some embodiments, the irrigation management application 114 provides the user interface 1600 that allows the user to adjust the crop coefficient for any one or more of the individual irrigation stations that the user wants to specifically control. In the embodiment illustrated in FIG. 16, the user interface 1600 includes a crop coefficient adjustment menu 1620 for a user-selected irrigation station (in this example, irrigation station 3A9). This exemplary crop coefficient adjustment menu 1630 allows the user to set and/or change the crop coefficient for that irrigation station (as illustrated in FIG. 16, the crop coefficient is 1, which is visible in informational field of the crop coefficient adjustment menu 1630). This information displayed in the crop coefficient adjustment menu 1630 allows the user to account for plant life having different crop coefficients in the same area.

Referring next to FIGS. 17A-17E, an exemplary user interface in accordance with some embodiments is shown that permits a user to select a group of irrigation stations and includes a batch edit menu that permits the user to select one or more operational attributes of the irrigation stations of the group for adjustment.

Referring first to FIG. 17A, the irrigation management application is configured to cause an exemplary user interface 1700 to be displayed to a user that displays a listing (e.g., in table format that includes rows and columns of the data) of irrigation stations of the irrigation system and provides the user with ability for the user to select a group of irrigation stations (as shown in FIG. 17A), or a group of programs (not shown), or a group of schedules (not shown) and batch edit one or more variable for the entire group.

In the example shown in FIG. 17A, the user has selected a group of irrigation stations (i.e., 1-G1 through 1T4 which are visually indicated within the user interface 1700 as being selected via check marks within their corresponding irrigation station selector boxes 1725) and caused the user interface 1700 to display an interactive batch edit menu 1730 that permits the user to select at least one operational attribute to edit, and then assign values to the at least one operational attribute to be applied to each irrigation station of the group of multiple irrigation stations. In the illustrated embodiment, the exemplary user interface 1700 also includes a select all irrigation station selector box 1727 which, when selected by the user, selects all of the irrigation stations by placing a check mark into the irrigation station selector box 1725 of each one of the irrigation stations. In some embodiments, the user interface 1700 may be configured to permit the user to cause the display of the interactive batch edit menu 1730 by first selecting/tapping/clicking on the “More” icon 1720. In other aspects, the user interface 1700 may be configured to permit the user to cause the display of the interactive batch edit menu 1730 by first selecting/tapping/clicking on the “Edit” icon 1710. In other embodiments, the user may simply enter a command (e.g., a right click action) to cause the menu 1730 to be displayed.

In some embodiments, the batch edit menu 1730 includes a listing of various user-selectable operational attributes and corresponding selection boxes 1735, one or more of which may be selected by the user (e.g., by clicking/tapping on them) to select one or more of the listed attributes to batch edit and apply values for the attributes to all the user-selected irrigation stations in a single operation of the interactive batch edit menu 1730. In the illustrated embodiment, the batch edit menu 1730 includes various exemplary operational attributes that the user may apply to one or more of the user-selected irrigation stations, such as, Adjust % (e.g., a station adjust), ET Adjust % (e.g., a weather adjust), Flow Rate Per Head (e.g., a flow rate per emitter/sprinkler), Default Runtime, Default Cycle Time, Default Soak Time, Sprinkler Type, Precipitation Rate, Flo-Zone assignment, Crop Coefficient, and Suspended ICM (as used herein, ICM stands for “integrated control module” and this setting allows the user to suspend/resume operation of a given ICM of the station). Thus, generally, operational attributes that may be included in the batch edit menu 1730 of the user interface 1700 may include but are not limited to, one or more of: a run time, a cycle time, a rotation time, a soak time, a station adjust, a weather adjust, a flow rate per emitter, a sprinkler type, an emitter precipitation rate, a flow zone assignment, a crop coefficient, a suspend setting, an assigned station area, and an assigned station sub-area, or the like.

In some embodiments, the user interface 1700 permits the user to select one or more of the operational attributes and to assign values to only the operational attributes that are being assigned and applied to the irrigation stations of the user-selected group of irrigation stations, such that the user is not required to assign values to the operational attributes that the user did not select within the interactive batch edit menu 1730 (i.e., by not clicking on their respective operational attribute selection boxes 1735). For example, as in the illustrated embodiment where the user has selected only Adjust % and “Default Runtime” in the batch edit menu 1370, as will be seen in FIGS. 17B-17D, the user interface 1700 would provide the option to define, set of adjust the value of only these attributes. In some embodiments, this can reduce user error if the user adjusted an attribute not intended. Once the user has selected the attributes to edit and clicked done in FIG. 17A, the user interface displays a value assignment menu 1732 shown in FIG. 17B which is configured to allow the user to assign values to one or more of the operational attributes selected by the user in the interactive batch edit menu 1730.

Figure 17C:
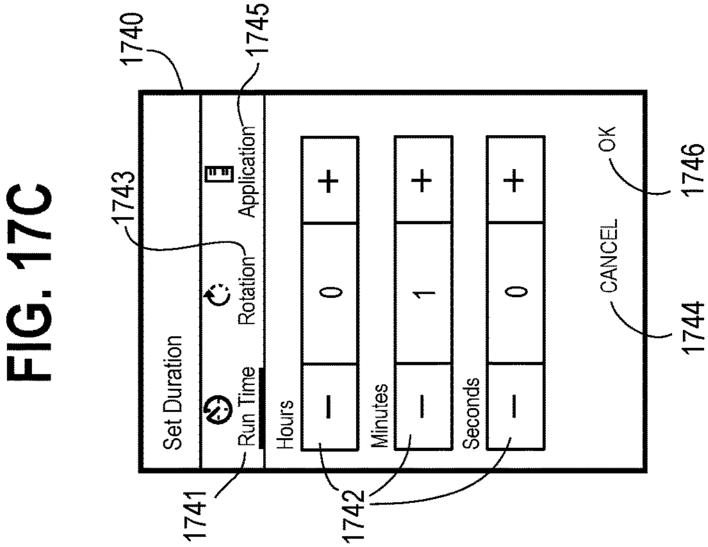
FIG. 17C shows an exemplary embodiment of the interface of FIG. 17A with a sub-menu that permits the user to enter specific values of a selected operational attribute to be applied to the irrigation stations of the group in accordance with some embodiments.
Figure 17B:
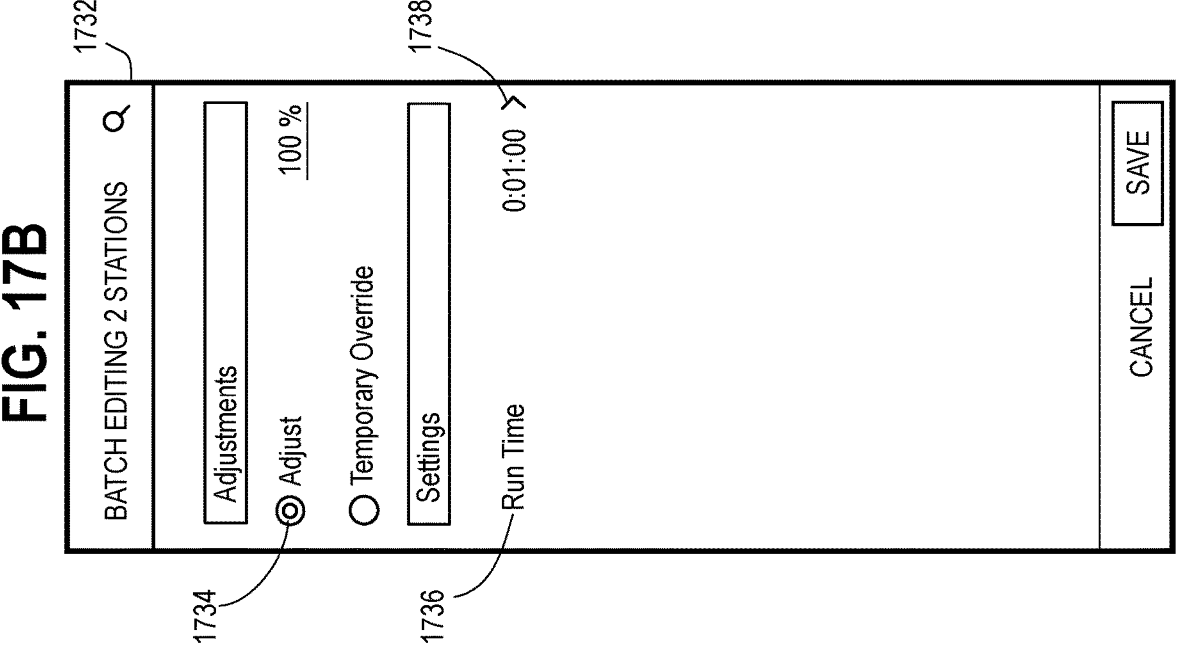
FIG. 17B shows an exemplary embodiment of the interface of FIG. 17A with a sub-menu that permits the user to enter specific values for operational attributes selected in the batch edit menu of FIG. 17A in accordance with some embodiments.

The exemplary value assignment menu 1732 of FIG. 17B shows the options available to the user to adjust or define values for the Adjust % 1734 and the Run Time 1736. In some embodiments, this menu would be displayed within the user interface 1700 when the user selects only the Adjust % and the Default Runtime operational attribute selection boxes 1735. That is, the value assignment menu 1732 will reflect and list only the attributes selected in the operational attribute selection boxes 1735. For example, if one attribute was selected in 1730, only a value for that one attribute would be displayed in the value assignment menu 1732. In another example, if five attributes were selected in menu 1730, then only values for those five attributes would be displayed in the value assignment menu 1732.

In FIG. 17B, to adjust or enter a value for the Adjust % 1734, the user can click or select the number 100% and adjust up or down or enter a new value for the adjust %. And for example, to enter or adjust a value for the run time 1736, the user can click, tap or select icon 1738 which causes a run time value assignment menu 1740 in FIG. 17C to be displayed.

The exemplary value assignment menu 1740 of FIG. 17C (and any other value assignment menu for other attributes) permits the user to adjust the duration of the irrigation by the irrigation stations of the irrigation system 116. In the illustrated embodiment, the value assignment menu 1740 includes three exemplary user-selectable interactive fields/icons 1741 (Run Time), 1743 (Rotation), and 1745 (Application) that the user may select to make various irrigation duration-related adjustments. In the example shown in FIG. 17C, the user has selected to adjust Run Time (e.g., by clicking on, tapping, etc.) the interactive icon 1741 (this can be reflected by an underline appearing under “Run Time” as shown in FIG. 17C, or by highlighting “Run Time,” etc.), which causes the value assignment menu 1740 to bring up the Run Time sub-menu of the value assignment menu 1740, which includes inputs 1742 (e.g., up-down, plus-minus buttons/icons, number entry fields, etc.) to allow the user to select the duration (hours, minutes, seconds) of irrigation to adjust for the user-selected irrigation stations. In some embodiments, the Run Time sub-menu of the value assignment menu 1740 shows the default run time to the user and permits the user to adjust the default run time to another value desired by the user. In the example shown in FIG. 17C, if the user used the inputs of the value assignment menu 1740 to define that the user-selected irrigation station will run for 1 minute of watering.

Figures 17D, 17E:
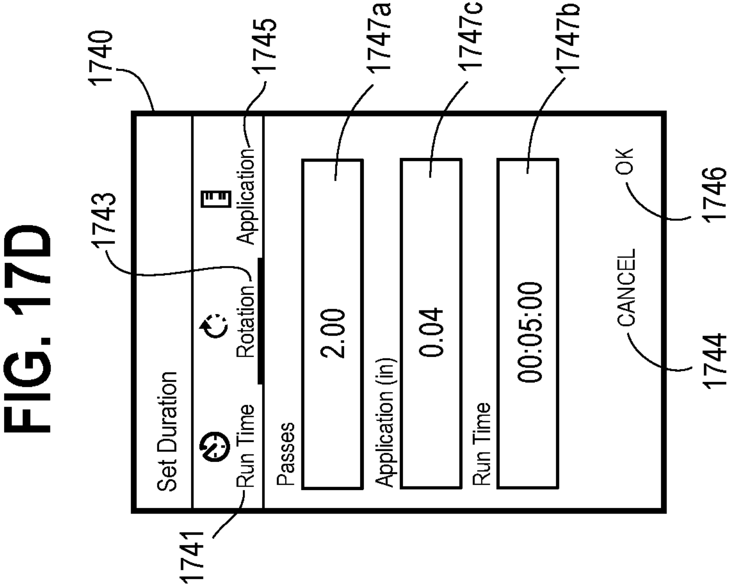
FIG. 17D shows an exemplary embodiment of the interface of FIG. 17A with a sub-menu that permits the user to enter specific values of one user-selected operational attribute to be applied to the irrigation stations of the group in accordance with some embodiments.
FIG. 17E shows an exemplary embodiment of the sub-menu of FIG. 17D that permits the user to enter specific values of yet another user-selected operational attribute to be applied to the irrigation stations of the group in accordance with some embodiments.

In the example shown in FIG. 17D, the user has selected to adjust Rotation (e.g., by clicking on, tapping, etc.) the interactive icon 1743 (this can be reflected by an underline appearing under “Rotation” as shown in FIG. 17D, or by highlighting “Run Time,” etc.), which causes the value assignment menu 1740 to bring up the Rotation sub-menu of the value assignment menu 1740, which includes an input 1747*a* (e.g., a data input field, where a user can enter a numerical value that represents a number of watering passes (2 watering passes in the illustrated example) for the sprinklers of the irrigation stations of the irrigation system 116. In some embodiments, in response to a user entering a number of watering passes desired by the user, a run time specific to the known rotary sprinklers of the irrigation stations of the irrigation system 116 could be calculated (e.g., by the control circuit 220 of the central computer 112*a*), thus allowing the user to simply enter the number of watering passes, and letting the irrigation management application 114*a* display the resulting run time (displayed in window 1747*b* as 5 minutes in the example shown in FIG. 17E), as well as the resulting water application in inches (displayed in window 1747*c* as 0.04 inches in the example shown in FIG. 17E).

In the example shown in FIG. 17E, the user has selected to adjust Application (e.g., by clicking on, tapping, etc.) the interactive icon 1745 (this can be reflected by an underline appearing under “Application” as shown in FIG. 17E, or by highlighting “Run Time,” etc.), which causes the value assignment menu 1740 to bring up the Application sub-menu of the value assignment menu 1740, which includes an input 1749*a* (e.g., a data input field, where a user can enter a numerical value that represents a number of inches the user desires to apply (0.25 inches in the illustrated example) by the user-selected irrigation stations of the irrigation system 116. In some embodiments, in response to a user entering the number of inches to apply by the user-selected irrigation stations, given that the variables (e.g., pressure, sprinkler head rotation speed, arc of rotation of the sprinkler heads, etc.) specific to the known rotary sprinklers of the irrigation stations of the irrigation system 116 are known, the run time required to achieve the user-desired application depth (i.e., 0.25 inches) could be calculated (e.g., by the control circuit 220 of the central computer 112*a*), thus allowing the user to simply enter the number of inches of water to apply, and letting the irrigation management application 114*a* display the resulting run time (displayed in window 1749*b* as 22 minutes and 17 seconds in the example shown in FIG. 17D).

In the illustrated embodiment, after the user sets the user-desired adjustments to irrigation duration using the exemplary Run Time, Rotation, and Application sub-menus of FIGS. 17C-17E, respectively, the user can use input 1744 (i.e., CANCEL) within the value assignment menu 1740 shown in FIG. 17C to cancel the assignment of the user-selected operational attributes to the user-selected irrigation stations, or click input 1746 (i.e., OK) to assign the user-selected operational attributes to the user-selected irrigation stations.

In some embodiments, after the user selects the OK input 1746 in the value assignment menu 1740 (in this example, the Set Duration menu as pointed out above), the user is brought back to the value assignment menu 1732 of FIG. 17B to enter or adjust any values for any further selected attributes. If all are entered, then the user can select input 1748 (i.e., CANCEL) within the value assignment menu 1732 to cancel the assignment of values to the selected operational attributes or click input 1750 (i.e., SAVE) to assign the values to the selected attributes. Once this is done, in some embodiments, the irrigation management application 114 updates the programming associated with the user-selected irrigation stations (in the example illustrated in FIG. 17A, irrigation stations 1-G1 through 1T4) to which this batch edit operational attribute assignment was applied, such that these affected user-selected irrigation stations will now be automatically controlled by the irrigation system in accordance with the operational value(s) assigned to these irrigation stations by the user via the batch edit menu 1730 and the value assignment menus 1732 and 1740. In some embodiments, this saves the user a significant amount of time since the user does not have to edit each station individually.

Figure 18:
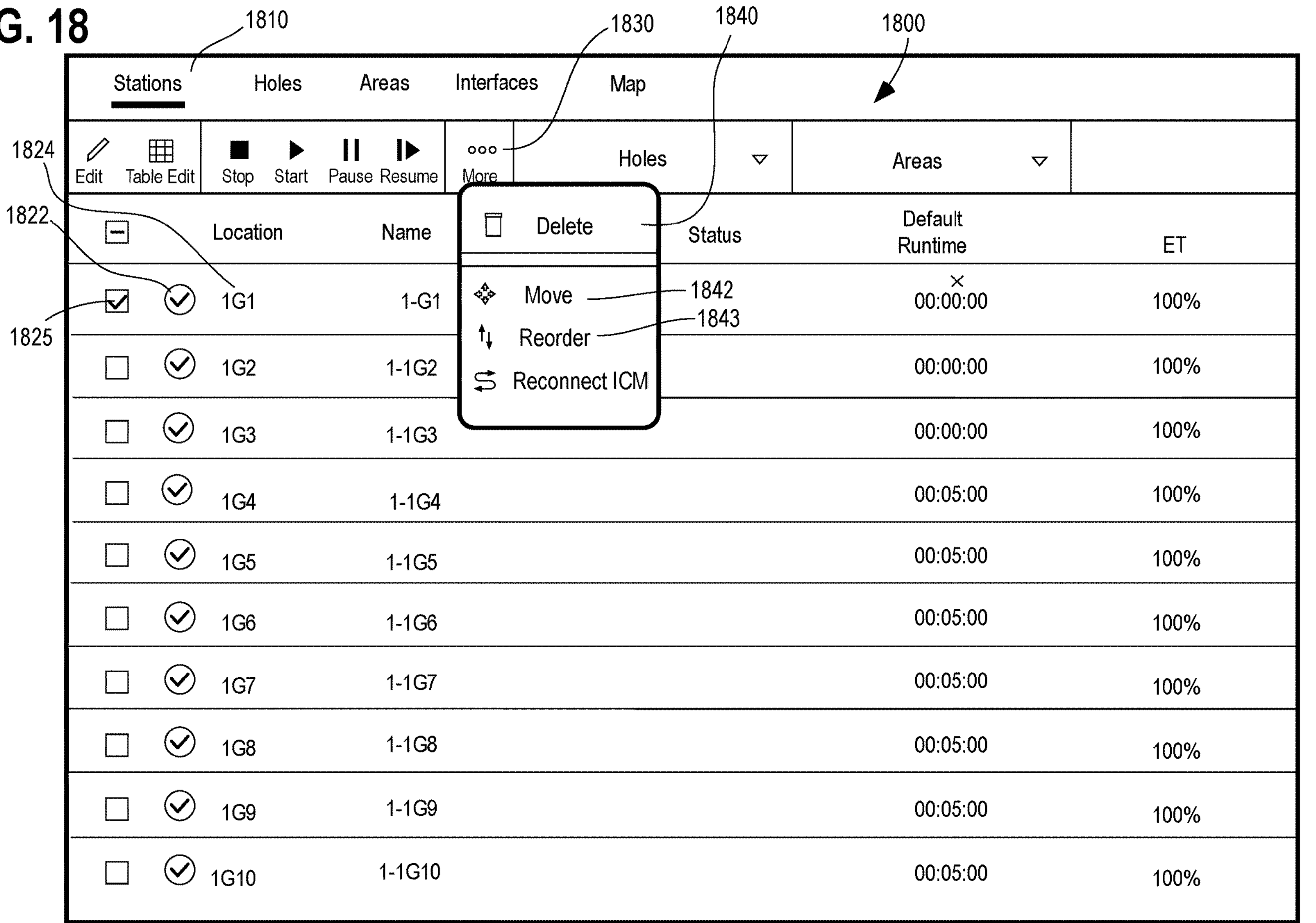
FIG. 18 shows an exemplary user interface in accordance with some embodiments that includes a listing of irrigation stations of an irrigation area, permitting a user to select one or more irrigation stations and to move and/or reorder one or more of the irrigation stations in the listing.

Referring next to FIG. 18, an exemplary user interface 1800 in accordance with some embodiments is shown that includes a listing of irrigation stations of an irrigation area, permitting a user to select one or more irrigation stations and to move and/or reorder one or more of the irrigation stations in the listing. In the embodiment illustrated in FIG. 18, the exemplary user interface 1800 displays a listing (e.g., in table format that includes rows and columns of the data) of various irrigation stations of an irrigation system named (in this case, 1-G1 through 1-1G10) and arranged in an order specified by the user (e.g., by location, by name, etc.). In the embodiment illustrated in FIG. 18, the user interface 1800 includes irrigation station selectors (shown as irrigation station selector boxes 1825), and the only irrigation station selected by the user in the listing of irrigation stations is irrigation station 1-1G1, which is visually indicated by the station selector box 1825 for irrigation station 1-1G1 having a check mark in it.

In some embodiments, the user interface 1800 caused to be displayed by the irrigation management application 114 is configured to include an interactive feature to permit the user to move or re-order/re-sequence a selected irrigation station into a different position within the listing of irrigation stations, or into a different listing that lists irrigation stations of a different group. Advantageously, the user interface 1800 is configured such that, when an irrigation station selected by the user is moved/reordered within its current listing, or moved to another listing of irrigation stations, each of the irrigation stations being moved and/or reordered by the user retain all operational attributes or parameters that were assigned to it before the move/reorder.

In the embodiments illustrated in FIG. 18, the exemplary user interface 1800 shows a listing of stations 1-1G1 through 1-1G10. In some cases, the irrigation stations are automatically assigned these irrigation station names/numbers and the user would like to re-order them. For example, if the user would like to move/reorder station 1-1G1 to a different position within the listing displayed in FIG. 18, such as to the position of station 1-1G5, the user can cause a move/reorder menu 1840 to be displayed. In some cases, the menu 1840 is displayed in response to the user selecting an interactive icon 1830 entitled “More”. Once the menu 1840 is displayed by the user interface, the user to select either the “Move” option 1842 or the “Reorder” option 1843.

In some embodiments, if the user selects the “Move” option 1842 in the move/reorder menu 1840, the user interface 1800 is caused to display a move station menu 1844, an example of which is shown in FIG. 19A. The exemplary move station menu 1844 of FIG. 19A relates to areas or area portions of a golf course and includes user-selectable drop-down menus 1845*a*, 1845*b*, and 1845*c* that permit the user to move an irrigation station to a different location in the same listing of irrigation stations or to a different listing of irrigation stations. In some embodiments, the move station menu 1844 includes user-selectable (i.e., via the drop-down menus 1845*a*-1845*c*) listings or portions of a golf course that may be area portions of the golf course to be irrigated (e.g., “Hole,” selectable via drop-down menu 1845*a*); plant type area portions of the golf course to be irrigated (e.g., “Green,” selectable via drop-down menu 1845*b*), and sub-area portions of the golf course to be irrigated (e.g., “Greens-1,” selectable via drop-down menu 1845*b*).

For example, to move the irrigation station 1-1G1 from Hole 1, Green area, Greens-1 (1G1) to a different location selected by the user, e.g., 1G5, the user would not change the Hole 1 value in drop-down menu 1845*a*, and would not change the “GREEN” value in drop-down menu 1845*b*, but would change the “Greens-1” value in drop-down menu 1845*c* from “Greens-1” to “Greens-5.” In some embodiments, the movement of station 1G1 by the user from Greens 1 to Greens 5 would shift irrigation station 1G2 through 1G5 to now become 1G1 through 1G4, and the irrigation station that was named 1G1 will be renamed as irrigation station 1G5 after the move such that its name is consistent with the default names of the irrigation stations in its new listing, i.e., Greens-5. In some embodiments, after a new position (i.e., 1G5) is selected for the irrigation station (i.e., 1G1) being moved, the user interface 1800 is configured to redisplay the irrigation stations such that the station being moved is displayed in its new position, and the irrigation stations in the listing from which 1G1 is being moved are displayed in their new positions that were shifted as a result of 1G1 being moved to 1G5. In the illustrated embodiment, the exemplary move station menu 1844 includes a user-selectable field/icon/box 1845*d* that permits the user to specify that a new default name is applied to the irrigation stations being moved and/or shifted.

In some embodiments, the operational attributes of the irrigation stations are retained when they are moved, such that the operational attributes that were assigned to irrigation station 1G1, such as run time, ET, Adjust, etc. will carry over and will not change even with the irrigation station 1G1 being moved from Greens 1 to Greens 5 and becoming irrigation station 1G5, and the irrigation management application 114 would update the programming of the irrigation station being moved such that the irrigation station that was moved from 1G1 to 1G5 will be controlled according to its original operational attributes. In some embodiments, when an irrigation station is moved from one listing (e.g., Greens-1) to another listing (e.g., Greens-5), the operational attributes of the irrigation station that is moved may be changed to be consistent with the operational attributes of the other irrigation stations in the new listing (i.e., Greens-5), e.g., by selecting user-selectable field/icon/box 1845*e*. In such cases, the operational attributes of the irrigation station may change in some embodiments when the irrigation station is moved from Greens-1 to Greens-5, and the irrigation management application 114 would update the programming of the irrigation station being moved such that the irrigation station that was moved from 1G1 to 1G5 will be controlled according to its newly-assigned (and not the original) operational attributes.

It will be appreciated that instead of being moved from one sub-area listing to another sub-area listing (i.e., Greens-1 to Greens-5) as described above, a user-selected irrigation station in a listing displayed within the exemplary user interface 1800 could be moved to another portion of the course (e.g., from hole 1 to hole 2, or from the green of hole 1 to the fairway of hole 1 (or the fairway of hole 3) using the other selections (e.g., drop-down menus 1845*a*-1845*c*) in the move station sub-menu 1844. And, as pointed out above, in some embodiments, the user may be able to select whether or not the operational attributes of the irrigation station being moved go with the irrigation station being moved or are deleted, or if the operational attributes of the irrigation station being moved will apply to the new irrigation station that took its place in its original listing.

Figure 19B:
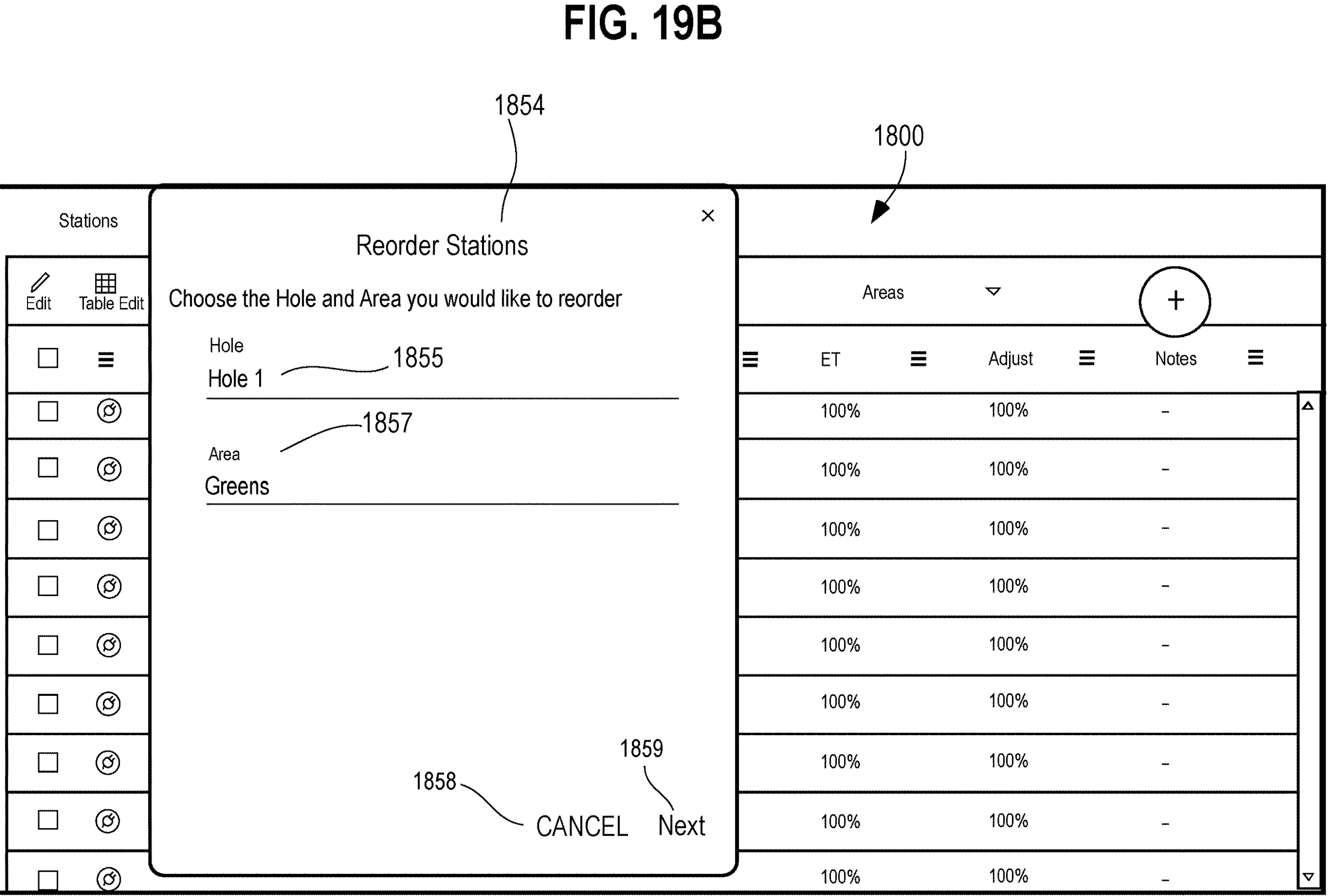
FIG. 19B shows an exemplary embodiment of the interface of FIG. 18, showing a menu that permits the user to enter specific values of how the irrigation stations in the listing are to be reordered in accordance with some embodiments.

In some embodiments, if the user selects the "Reorder" option 1843 in the move/reorder sub-menu 1840, the user interface 1800 is caused to display a reorder station menu 1854, an example of which is shown in FIG. 19B. The exemplary reorder station menu 1854 of FIG. 19B relates to areas or area portions of a golf course and includes user-selectable drop-down menus 1855 (permitting the user to select a user-desired portion of a golf course such as a hole) and 1857 (permitting the user to select a user-desired area on a hole of a golf course such as greens). Notably, the reorder station menu 1854 does not include a drop-down menu that would permit the user to select a user-desired sub-area of a golf course such as greens-1 or greens-5 as shown in FIG. 19A, but it will be appreciated that the reorder menu 1854 may include such a user-selectable option in some embodiments. In the example shown in FIG. 19B, if the user selected, via the drop down menus 1855 and 1857 of the reorder menu 1854 to reorder the irrigation stations in the greens area of hole 1, the user can use input 1858 (i.e., CANCEL) within the reorder menu 1854 to cancel this reorder operation, or click input 1859 (i.e., OK) to proceed with the reorder operation.

FIG. 19C shows an exemplary reorder menu 1866 that the exemplary user interface 1800 would cause to be displayed to the user if the user selects input 1859 (i.e., Next) in the reorder menu 1854. The exemplary reorder sub-menu 1866 shown in FIG. 19C shows a listing of a group of five exemplary irrigation stations that are being reordered, in this example, 1G1, 1G2, 1G3, 1G4, and 1G5. In the illustrated embodiment, the reorder sub-menu 1866 includes a user-selectable link/icon 1878 that permits the user to choose which of the irrigation stations the user desires to reorder. In the example shown in FIG. 19C, the user would click the user-selectable link/icon 1878 next to irrigation station 1G4, in response to which the user interface 1800 to display an exemplary choose new location sub-menu 1880 as shown in FIG. 19D, which permits the user to select a new location for the irrigation station 1G4 being reordered. To that end, in the embodiment illustrated in FIG. 19D, the exemplary choose new location sub-menu 1880 includes a user-selectable field 1882 (e.g., a drop-down menu) that permits the user to select, from a listing of irrigation station locations, a new location for the irrigation station (1G4) being reordered. In the example illustrated in FIG. 19D, the new location the user selected for the irrigation station 1G4 is 1G1.

In the example shown in FIG. 19C, after the user selects (via icon 1878) which irrigation station is going to be reordered, the user can use input 1874 (i.e., CANCEL) within the reorder sub-menu 1866 to cancel the reorder operation, or click input 1876 (i.e., SAVE) to proceed with the reorder operation. If the user proceeds with the order by selecting input 1876 in the reorder sub-menu 1866 of FIG. 19C, the irrigation management application 114 applies the user-selected reorder operation and generates, within the user interface 1800, an updated listing of the irrigation stations (see FIG. 19E) that shows that irrigation station 1G4 has been moved to irrigation location 1G1 consistent with the reorder operation input by the user, and that the irrigation stations 1G1, 1G2, 1G3 and 1G5 have been shifted down to locations 1G2, 1G3, 1G4, and 1G5, respectively.

Figure 19E:
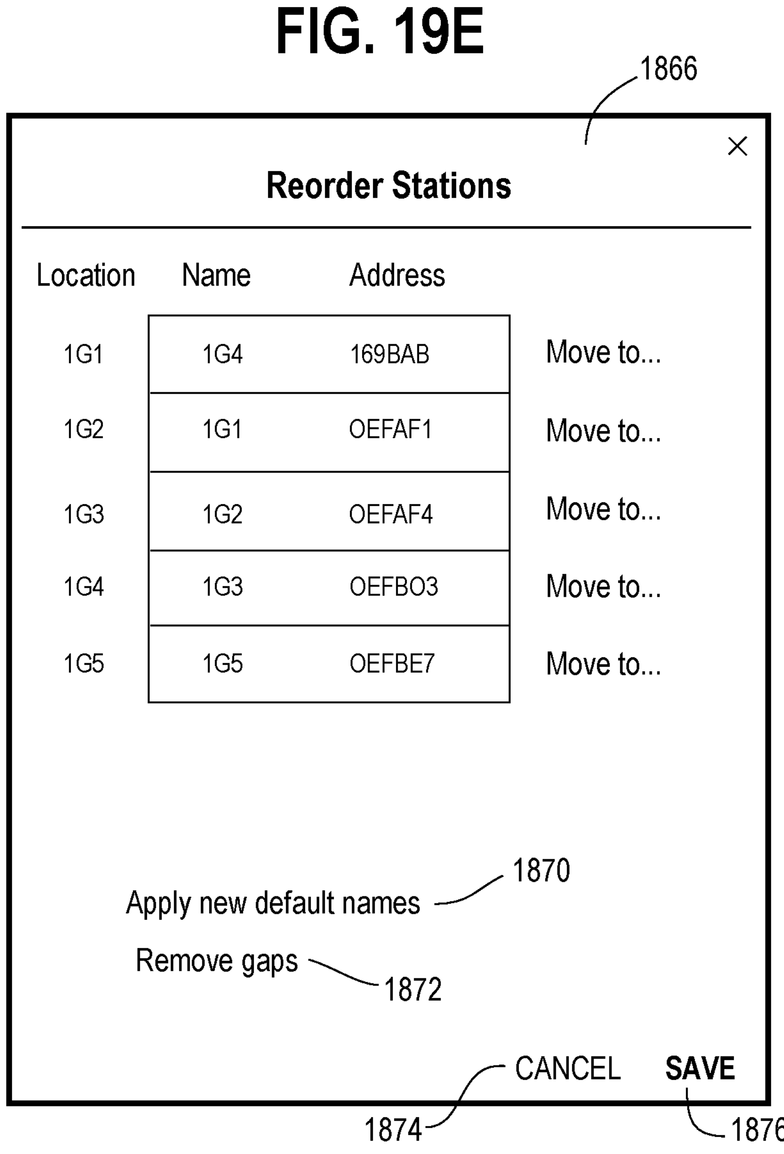
FIG. 19E shows an exemplary embodiment of the interface of FIG. 18, showing another sub-menu that permits the user to select a new location in the listing for an irrigation station being reordered in accordance with some embodiments.

In the embodiment illustrated in FIG. 19E, before the user finalizes the reorder operation, the user is permitted to select options as to whether the irrigation stations being reordered will automatically get assigned new names, and whether any gaps in names caused by the irrigation station reordering will be removed. To that end, in the embodiment illustrated in FIGS. 19C and 19E, the exemplary reorder sub-menu 1866 includes a user-selectable link/icon 1870 called "Apply new default names" and a user-selectable link/icon 1872 called "Remove gaps." In some embodiments, if the user selects the icon 1870 and the icon 1872, when the irrigation stations are reordered, this reordering would shift the irrigation stations in the listing, but the names of the irrigation stations will be shifted appropriately to remove any gaps in the listing and to assign appropriate names/numbers to the irrigation stations based on their position in the reordered listing.

Figure 19F:
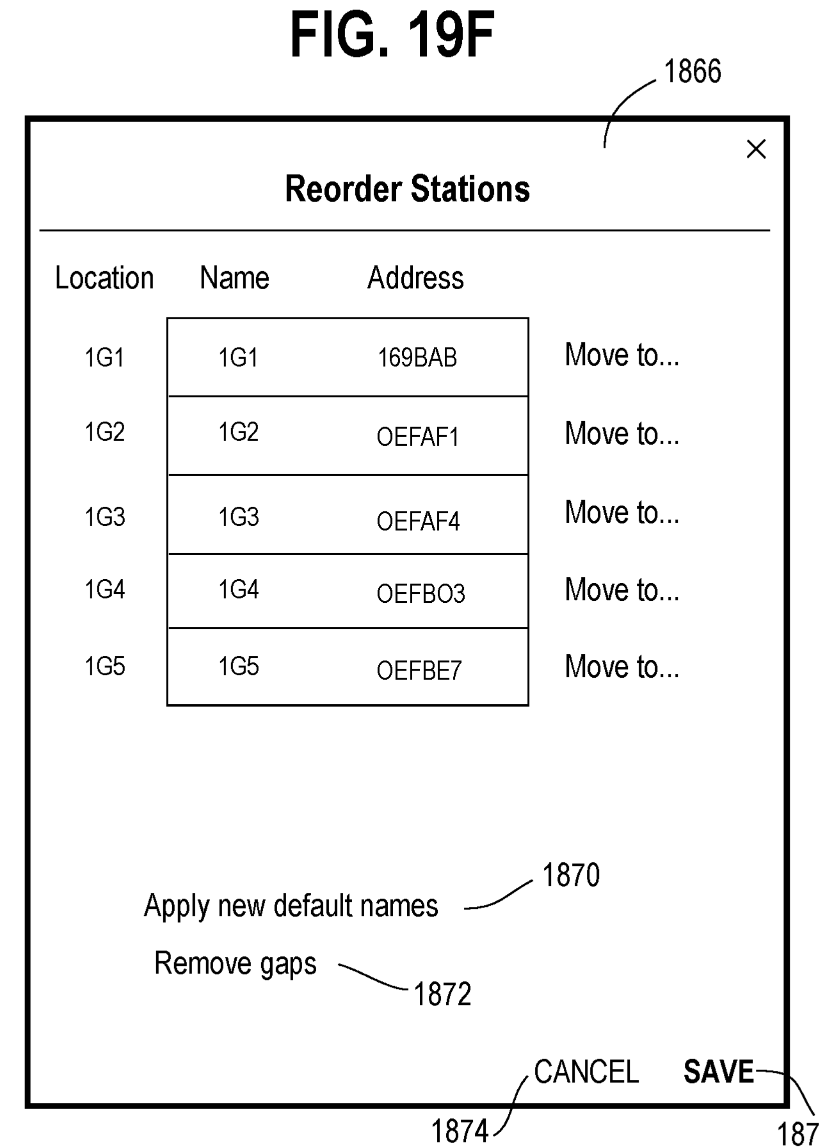
FIG. 19F shows an exemplary embodiment of the interface of FIG. 18, showing another sub-menu that permits the user to select a new location in the listing for an irrigation station being reordered in accordance with some embodiments.

In the example shown in FIG. 19E, after the user selects (via icon 1870) whether to apply new default names and selects (via icon 1872) whether to remove gaps, the user can use input 1874 (i.e., CANCEL) within the reorder sub-menu 1866 to cancel the reorder operation, or click input 1876 (i.e., SAVE) to proceed with the reorder operation. If the user proceeds with the order by selecting input 1876 in the reorder sub-menu 1866 of FIG. 19E, the irrigation management application 114 applies the user-selected reorder operation and generates, within the user interface 1800, an updated listing of the irrigation stations (see FIG. 19F) that shows that the irrigation stations have now been assigned new names and that the gaps in the numerical order of the names of the irrigation stations caused by the reorder have been removed, such that the names of the irrigation stations, i.e., 1G1, 1G2, 1G3, 1G4, and 1G5 now match locations 1G1, 1G2, 1G3, 1G4, and 1G5, respectively. In some embodiments, to complete the reorder operation, the user would select input 1876 SAVE in the reorder sub-menu shown in FIG. 19F.

In some embodiments, the operational attributes of the irrigation stations are retained when they are reordered, such that the operational attributes that were assigned to irrigation station 1G4, such as run time, ET, Adjust, etc. will carry over and will not change even with the irrigation station 1G4 was reordered from location 1G4 to location 1G1, and the irrigation management application 114 would update the programming of the irrigation station being reordered such that the irrigation station that was reordered from location 1G4 to location 1G1 will be controlled according to its original operational attributes.

Referring next to FIGS. 20A-20D, exemplary user interfaces are shown that includes a listing of flow tree elements associated with the irrigation stations of an irrigation area and permits a user to select one or more of the flow tree elements and move one or more of the flow tree elements in the listing.

In some embodiments, the irrigation management application 114 executed on or by an electronic device causes a user interface 2000 to be displayed to a user, and that provides the user with the ability to move flow tree elements (such as provided in Rain Bird's FloManager® product) rather than deleting the branch and then reconstructing a new branch. For example, in some embodiments, FloManager® is a functionality included in the irrigation management application 114 that manages the flow of water through the irrigation system 116. For example, FloManager® may set the capacities of various piping sections in the irrigation system 116. In some embodiments, to enable FloManager® or other flow management system to manage the flow of water through the irrigation system 116, the user may define the various flow branches of the irrigation system. For example, the flow branches of the irrigation system may extend from a larger branch, like branches from a tree grow from the trunk and spread into smaller branches.

Figure 20A:
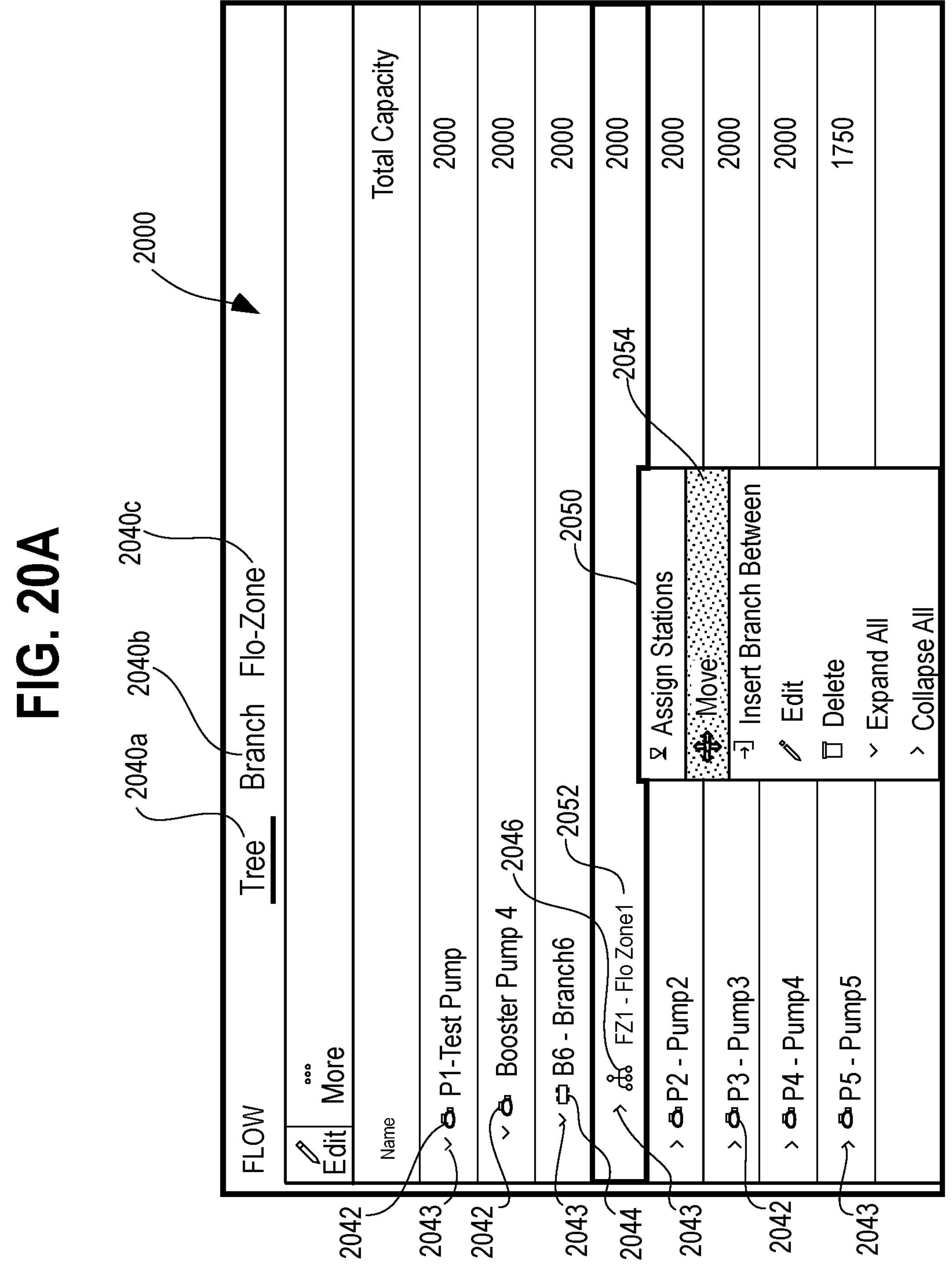
FIG. 20A shows an exemplary user interface in accordance with some embodiments that includes a listing of flow tree elements associated with the irrigation stations of an irrigation area, permitting a user to select one or more of the flow tree elements and move one or more of the flow tree elements in the listing.
Figure 20C:
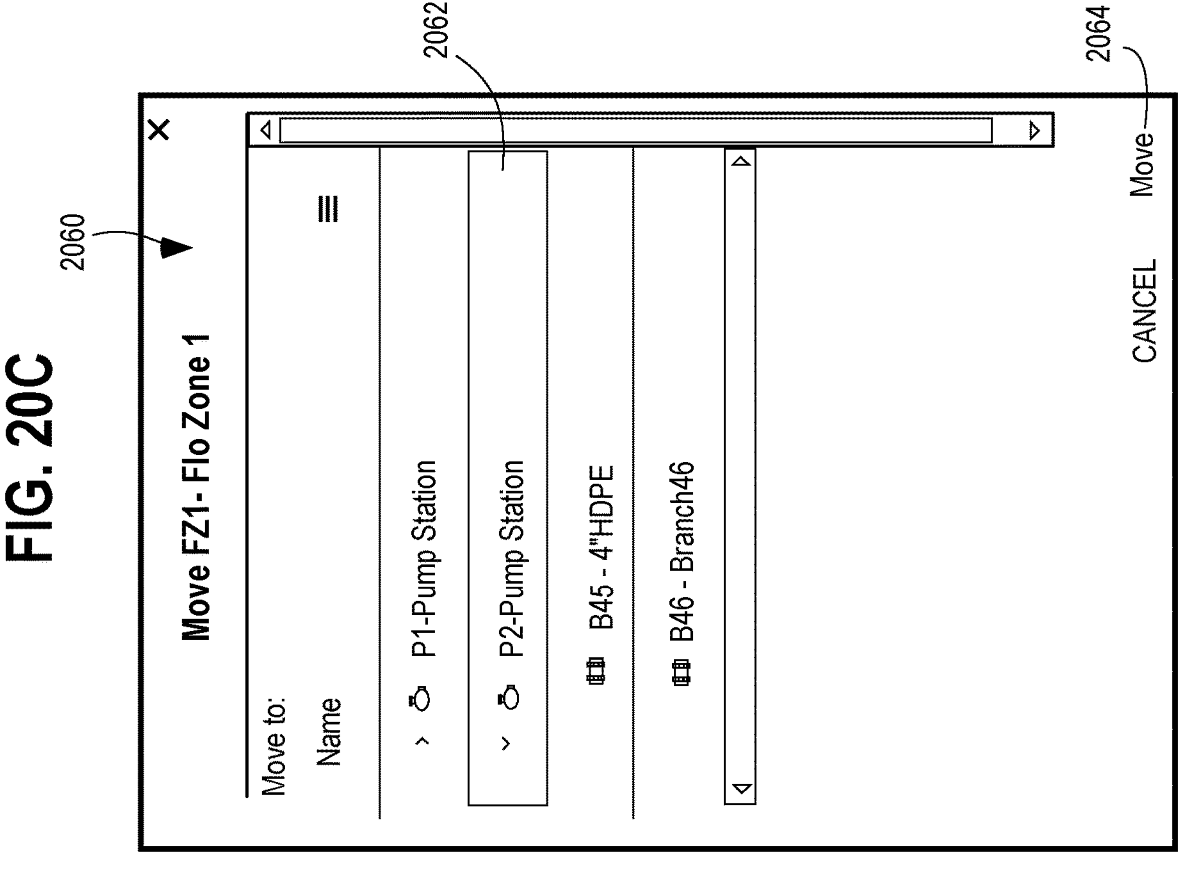
FIG. 20C shows an exemplary embodiment of the user interface of FIG. 20A, and illustrates a sub-menu that permits the user to select a location in the flow tree element listing where to move a selected flow tree element in accordance with some embodiments.

In the user interface 2000 of FIG. 20A, when the tree view 2040 is selected, a flow tree is displayed as a listing of expandable flow tree elements. In some embodiments, the flow tree is a hierarchy of expandable flow element layers, each layer having flow elements, and that may also be expanded. A first expandable flow element layer of the tree is a pump layer indicating a listing of pump elements in the system. In FIG. 20A, a highest level pump layer includes pump elements P1-Test Pump, P2-Pump 2, P3-Pump 3, P4-Pump 4, and P5-Pump 5. Each of these pump layers can be expanded to reveal the layer/s included in the pump layer. In some embodiments, a given pump layer may include more than one expandable pump layer. For example, pump layer P1-Test Pump can be expanded to reveal pump layer Booster Pump 4. Typically, the only pump devices underneath a pump layer are booster pumps, such as Booster Pump 4. Pump layers are indicated in the tree using a pump icon 2042. Any of the flow element layers can be expanded/hidden to show/hide the layers underneath by selecting/clicking/tapping the expansion symbol 2043.

Below or contained within pump layers is a second expandable flow element layer including a flow branch layer indicating a listing of one or more flow branch elements associated with each pump element of the pump layer. For example, as shown in FIG. 20A, flow branch layer B6-Branch 6 is a flow branch layer under pump layer Booster Pump 4, which is under pump layer P1-Test Pump. In the tree, branch layers are indicated in the tree using a branch icon 2044. Similar to pump layers, branch layers may contain one or more additional branch layers or sub-branch layers. For example, see FIG. 20B, which illustrates multiple branch and sub-branch layers. Any of the branch layers can be expanded/hidden to show/hide the layers underneath by selecting/clicking/tapping the appropriate expansion symbol 2043.

Below or contained within branch layers is a third expandable flow element layer including a flow zone layer indicating a listing of one or more flow zone elements associated with each flow branch element of the branch layer. For example, as shown in FIG. 20A, flow zone layer FZ1-Flo Zone 1 is a flow zone layer under branch layer B6-Branch 6. In the tree, flow zone layers are indicated in the tree using a flow zone icon 2046. Similar to pump and branch layers, flow zone layers may contain one or more additional flow zone or sub-flow zone layers. Any of the flow zone layers can be expanded/hidden to show/hide the layers underneath by selecting/clicking/tapping the appropriate expansion symbol 2043.

And in some embodiments, below or contained within flow zone layers is a fourth expandable flow element layer including a sprinkler layer (not shown) indicating a listing of one or more sprinkler elements associated with each flow zone element of the flow zone layer. For example, flow zone FZ1-Flo Zone 1 could be expanded to show any sprinkler elements associated with the given flow zone. In the tree, sprinkler layers are indicated using a sprinkler icon (not shown). Similar to other layers, sprinkler layers may contain one or more additional sprinkler or sub-sprinkler layers. Any of the sprinkler layers can be expanded/hidden to show/hide the layers underneath by selecting/clicking/tapping the appropriate expansion symbol 2043.

In the exemplary embodiment illustrated in FIG. 20A, the irrigation management application 114 generates the user interface 2000 that visually displays to the user a tree diagram of the flow element layers and branches of the irrigation system. In some embodiments, the user interface 2000 allows the user to navigate to and select a given flow element in the hierarchy and display an option to move the given flow element to a different location in the hierarchy (e.g., due to flow reconfiguration or correction), resulting in the element being moved in the tree. In the illustrated embodiment, the user selects flow zone FZ1-Flo Zone 1 (shown as field 2052) by clicking, tapping, and/or hovering over it, in response to which the user interface 2000 generates and brings up a flow tree menu 2050 with a user-selectable interactive move element 2054 called "Move" as shown in FIG. 20A. In addition to "Move," the exemplary flow tree menu 2050 includes various other exemplary user-selectable flow tree-related options such as "Assign Stations," "Insert Branch Between," "Edit," "Delete," "Expand All," and "Collapse All," although it will be appreciated that the flow tree menu 2050 may include additional or alternative user-selectable flow tree options.

In the illustrated embodiment, in response to the user selecting "Move" in the flow tree menu 2050 of FIG. 20A, the user interface 2000 is configured to generate and present to the user a listing of various branch location options, which may be selected by the user (e.g., by clicking, tapping, etc.) to select the user-desired branch location to move the flow zone FZ1-Flo Zone 1 selected by the user in FIG. 20A. In one embodiment shown in FIG. 20C, the user interface 2000 displays an exemplary move flow element sub-menu 2060 that may include a listing of exemplary user-selectable fields 2062 corresponding to various branches/layers of the flow tree where the user could move Flo Zone 1, such as P1-Pump Station, P2-Pump Station, B45-4"HDPE, B46-Branch 46, etc. For example, to move the Flow Zone 1 to branch P2-Pump Station, the user would simply select (e.g., by clicking, tapping, hovering over, etc.) the user-selectable field 2062 entitled P2-Pump Station and select/click/tap the Move option 2064.

Figure 20D:
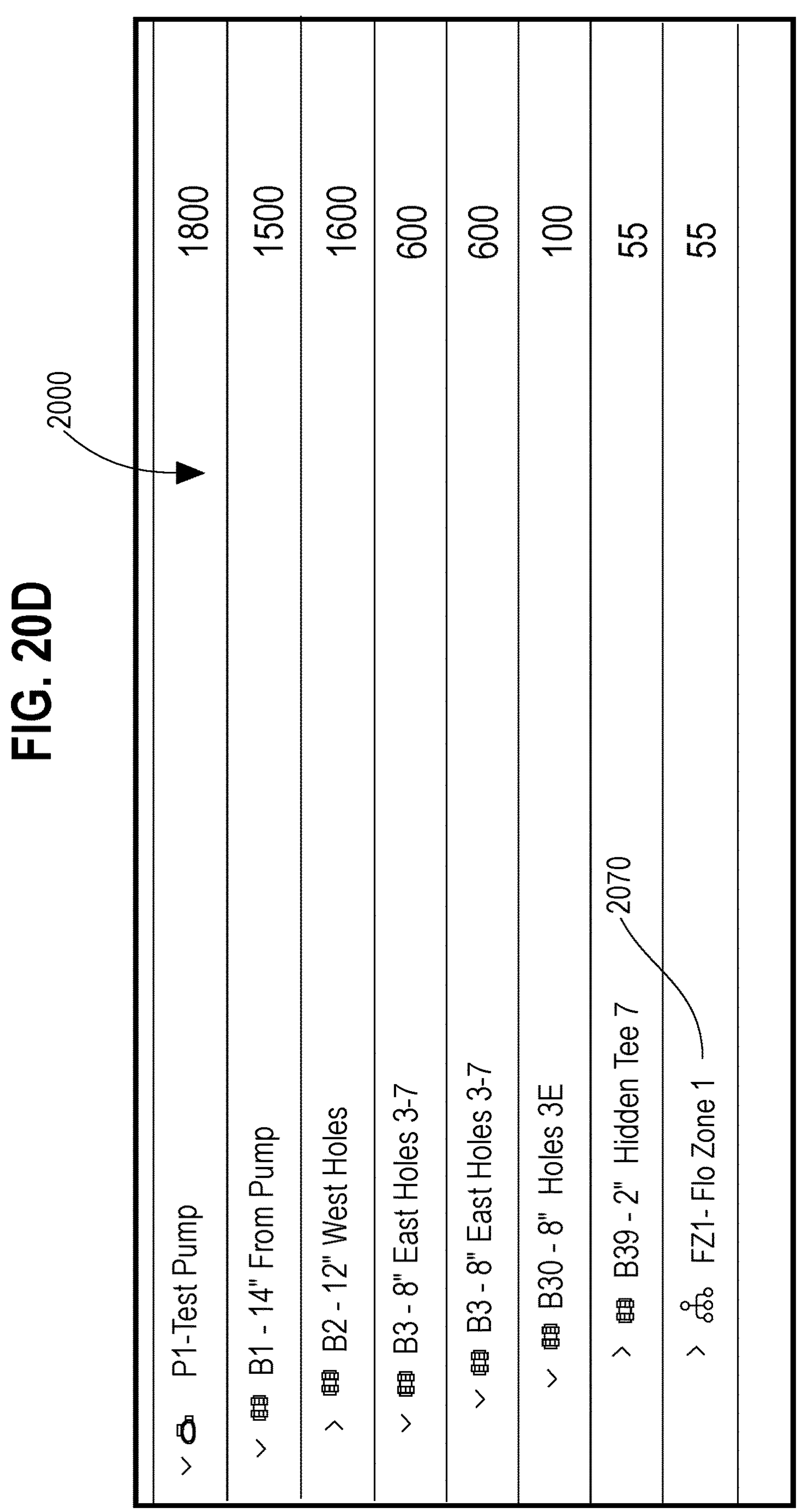
FIG. 20D shows an exemplary embodiment of the user interface of FIG. 20A, and illustrates an updated flow tree element listing after the user moves a selected flow tree element to a different user-defined location in accordance with some embodiments.

In some embodiments, after a new location is selected for the flow tree element being moved, the user interface 2000 is configured to redisplay the flow tree branches as shown in FIG. 20D, such that the flow element (FZ1-Flo Zone 1) having been moved is displayed in its new position 2070, and the flow tree branches in the flow tree branch listing affected by this move of Flo Zone 1 are displayed in their new positions as needed to which they were shifted as a result of Flow Zone 1 being moved to its new position.

In some embodiments, the moved flow element retains all attributes and no re-programming is needed For example, as the branch Flo-Zone 1 is moved into its new position, the irrigation management application 114*a* is configured to transfer all data for Flo-Zone 1 (e.g., operational attributes and/or informational attributes associated with Flo-Zone 1) with Flo-Zone 1 into the new branch in the tree diagram. This saves the user time since the user does not need to delete the original element and re-create a new element at a new location, and does not have to enter the characteristics of the element in its new position.

Figure 21A:
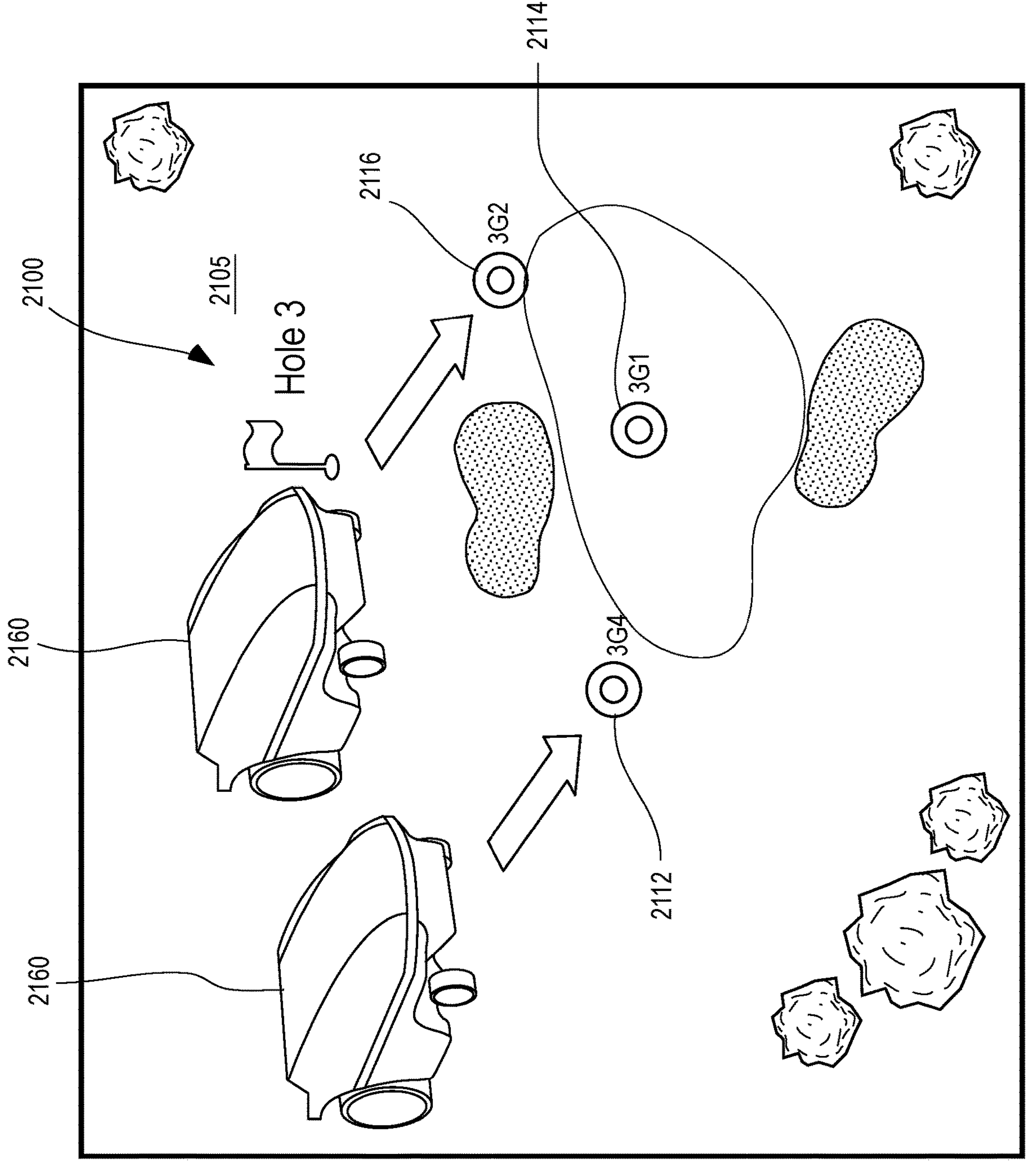
FIG. 21A shows a map of an irrigation area and station icons representing the irrigation stations in the irrigation area, demonstrating that the irrigation stations can be scheduled to be inactive within certain time intervals when irrigation area-maintenance equipment is scheduled to pass through the area that the irrigation stations water in accordance with some embodiments.
Figure 21B:
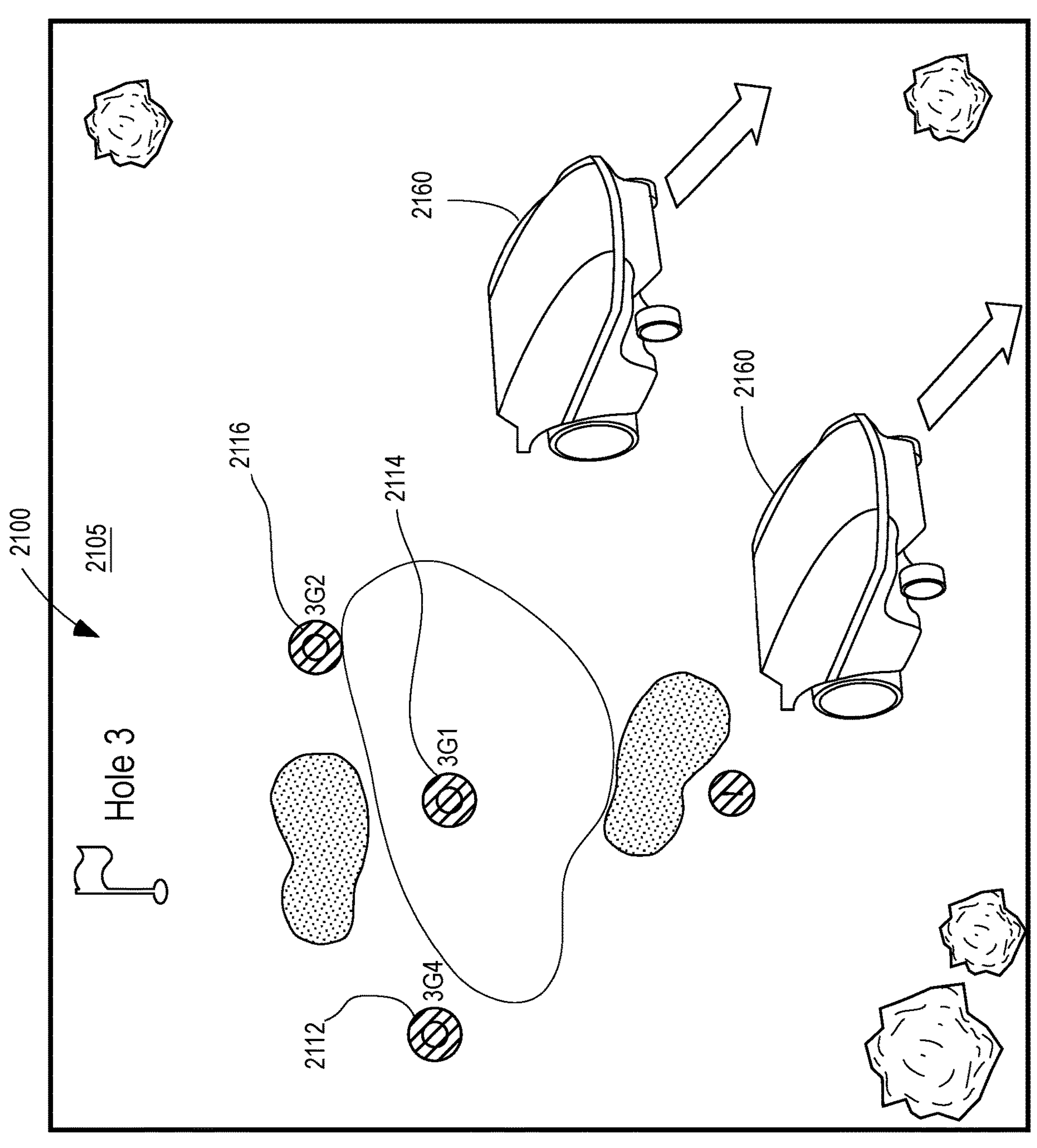
FIG. 21B shows a map of an irrigation area and station icons representing the irrigation stations in the irrigation area, demonstrating that the irrigation stations can be scheduled to be active within certain time intervals when irrigation area-maintenance equipment are not scheduled to pass through the area that the irrigation stations water in accordance with some embodiments.

With reference to FIGS. 21A-21B, in some embodiments, the irrigation management application 114 is configured to cause the display of a user interface 2100 to a user and that includes a map 2105 of an irrigation area and visually displays to the user the station icons 2112, 2114, 2116 which, in this exemplary case, correspond to irrigation stations 3G1, 3G2, and 3G4 of the irrigation system associated with the irrigation area, and provides the user with the ability to prioritize watering by the irrigation stations 3G1, 3G2, and 3G4 based on a mission plan of movement of devices (lawn mowers, golf carts, etc.) in the irrigation area. For example, as shown in FIG. 21A, devices like manned, robotic, or autonomous mower units 2160 can be configured to move through the irrigation area in a known pattern of directional movement (indicated by large arrows aligned with the mowers 2160 in FIG. 21A). Given that the pattern of the movement of the mowers 2160 is known to the electronic device running the irrigation management application 114, active watering by the irrigation stations, in this case, irrigation stations 3G1, 3G2, 3G4, in the area ahead of the mower units 2160 can be paused or delayed until after the mower units 2160 pass through and are out of the area irrigated by the irrigation stations 3G1, 3G2, 3G4.

As shown in FIGS. 21A and 21B, autonomous mowers 2160 advance through the irrigation area while mowing the grass in a known pattern (represented in FIGS. 21A and 21B by the directional arrows aligned with the mowers 2160). In some embodiments, the current location of the mowers 2160 is continuously known, for example, due to global positioning system (GPS) data communicated by the mowers 2160 to a central computer or server running the irrigation management application. In the example shown in FIG. 21A, as the electronic device running the irrigation management application thereon determines, for example, based on the obtained GPS data, that the mowers 2160 are approaching irrigation stations 3G4, 3G1 and 3G2 of the irrigation area 2105, the irrigation management application 114 output signals to delay watering scheduled to occur at these irrigation stations (the irrigation station icons 2112, 2114, 2116 are shown as being uncolored/unshaded within the user interface 2100 of FIG. 21A to visually indicate to the user that they are not actively watering).

On the other hand, once the irrigation management application 114 determines, for example, based on the obtained GPS data, that the mowers 2160 passed through the portion of the irrigation area irrigated by the irrigation stations 3G1, 3G, 3G4, the irrigation management application 114 allows the irrigation by the irrigation stations 3G1, 3G, 3G4 to start (the station icons 2112, 2114, 2116 corresponding to the irrigation stations 3G1, 3G, 3G4 in FIG. 21B may be displayed in color (e.g., blue, etc.) or may pulsate/toggle between a larger and smaller size to indicate that the corresponding irrigation stations 3G1, 3G, 3G4 are actively irrigating).

Notably, the active watering delays and the reactivation of watering by the irrigation stations 3G4, 3G1 and 3G2 described above do not necessarily have to be implemented by the irrigation management application running on a central computer 112, 112*a*, and may be manually implemented by a user of the irrigation management application 114*b*/114*b*' or 114*c*/114*c*' running on computer 118 or mobile devices 120*a*-120*f*. In an example, if the user knows that an automatic mowers 2160 will mow a first portion of the irrigation area from 9-10 PM, a second portion of the irrigation area from 10-11 PM and a third portion of the irrigation area from 11 PM-12 AM, the irrigation management system can prioritize irrigation to begin on the third portion of the irrigation area at 9 PM, then start irrigation on the first portion of the irrigation area after 10 PM, and then begin irrigation on the second portion of the irrigation area after 11 PM, thereby advantageously avoiding interference with the mission plan of the maintenance equipment (e.g., mowers 2160, etc.) through the irrigation area.

Figure 22A:
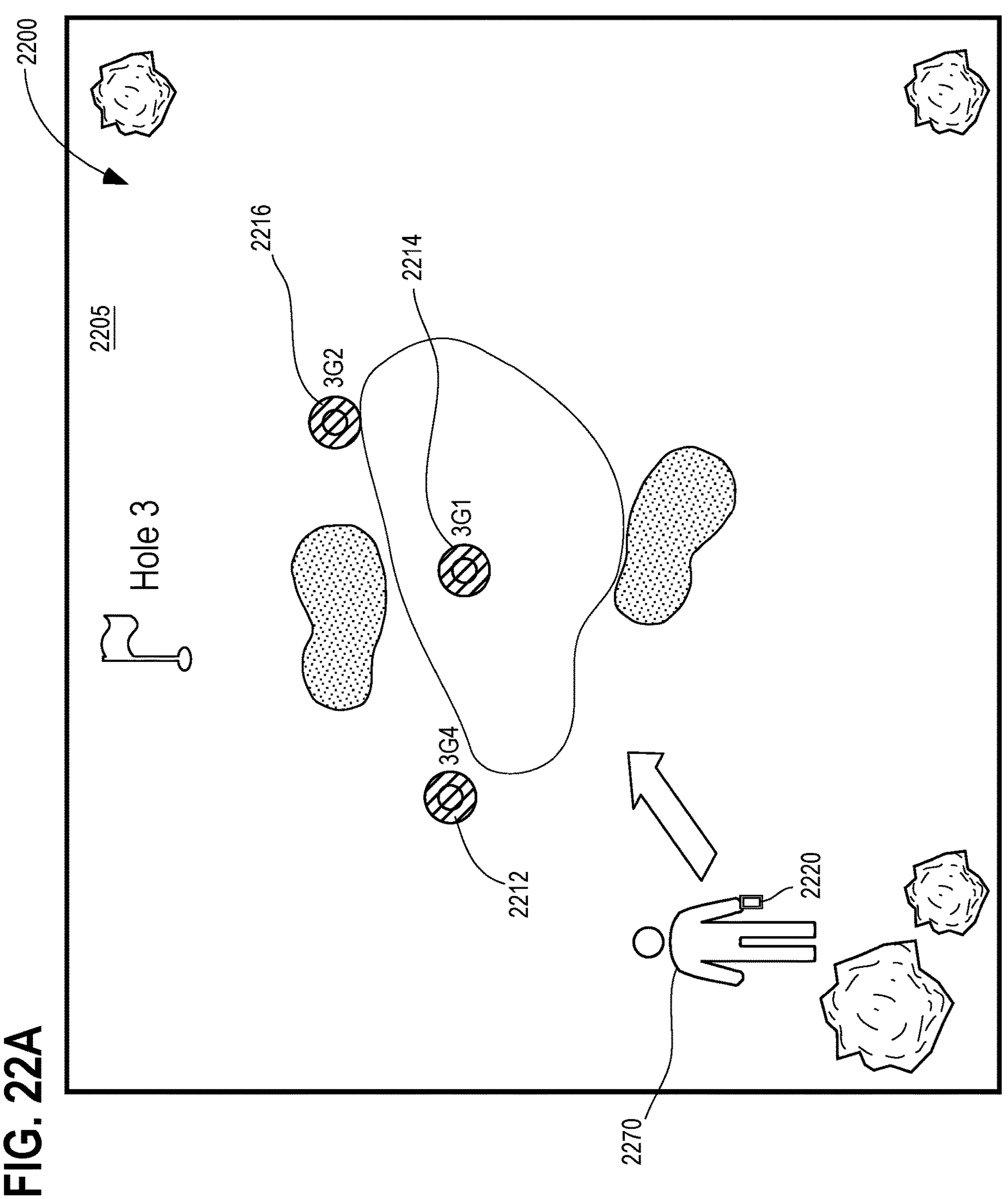
FIG. 22A shows a map of an irrigation area and station icons representing the irrigation stations in the irrigation area, demonstrating that the irrigation stations are active while an electronic device of a user is detected outside of the portion of the irrigation area that the irrigation stations water in accordance with some embodiments.
Figure 22B:
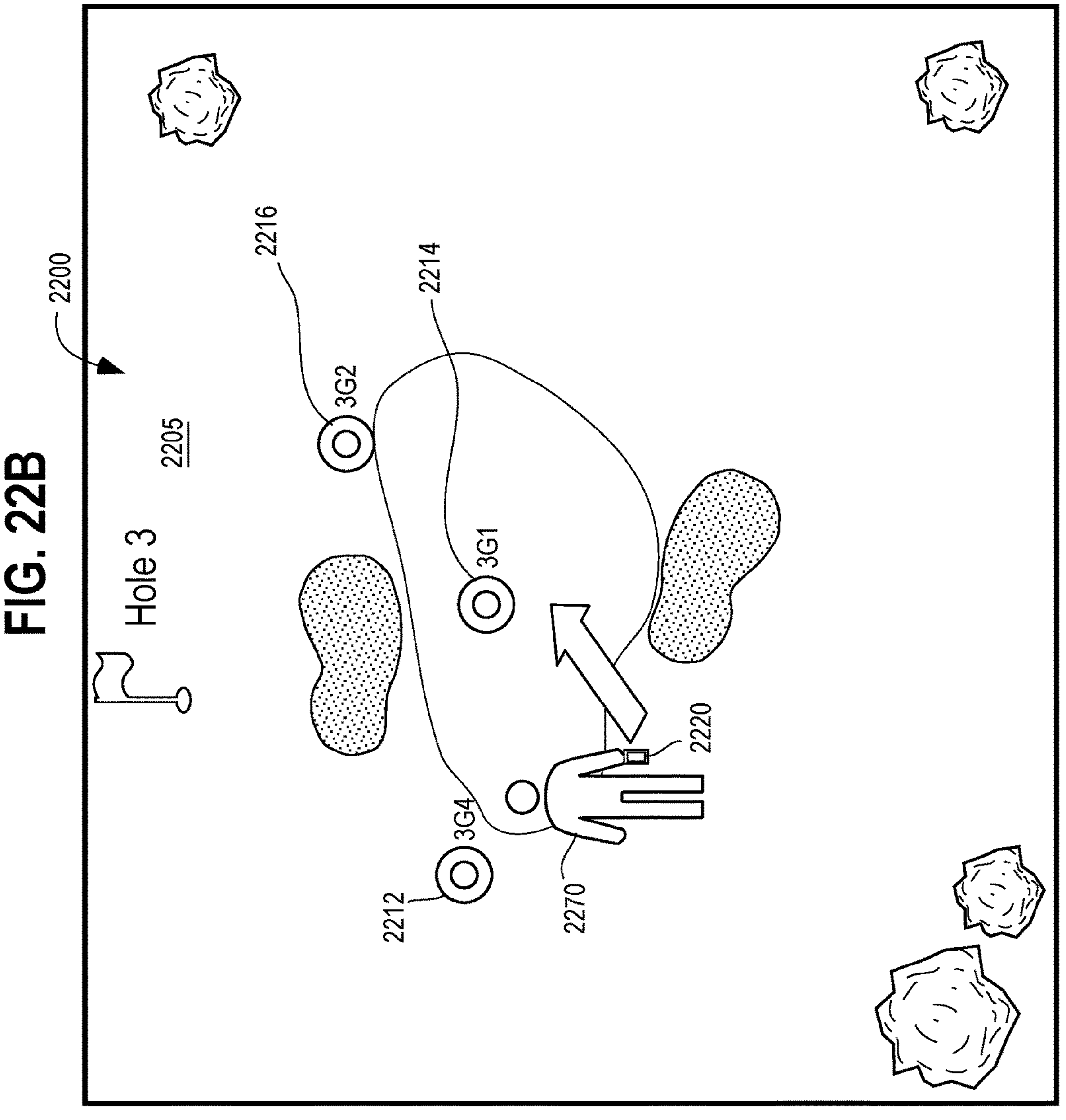
FIG. 22B shows a map of an irrigation area and station icons representing the irrigation stations in the irrigation area, demonstrating that the irrigation stations can be inactivated when an electronic device of a user is detected within the portion of the irrigation area that the irrigation stations water in accordance with some embodiments.

With reference to FIGS. 22A-22B, in some embodiments, the irrigation management application 114 is configured to cause the display to the user of a user interface 2200 that includes a map 2205 of an irrigation area and visually displays to the user the irrigation station icons 2212, 2214, 2216 which, in this exemplary case, correspond to irrigation stations 3G1, 3G2, and 3G4 of the irrigation system associated with the irrigation area, and provides the user of the irrigation management application 114 an option to deactivate irrigation by the irrigation stations 3G1, 3G2, and 3G4 when a person 2270 approaches the portion of the irrigation area being actively irrigated by the irrigation stations 3G1, 3G2, and 3G4.

In one embodiment, the electronic device running the irrigation management application 114 thereon can receive GPS positioning data from mobile device/s 2220 carried by the person 2270 moving in the irrigation area (see FIGS. 22A and 22B). In some embodiments, these devices 2220 can be mobile phones running a mobile irrigation management application 114 thereon. The mobile irrigation management application 114 may use the GPS data from the mobile device 2220 and wirelessly transmit the GPS location data of the mobile device 2220 to a central computer 112, 112*a* running the irrigation management application 114.

In one aspect, if it is determined (e.g., by the irrigation management application) that the location of the mobile device 2220 nears a portion of the irrigation area that is being actively irrigated by the irrigation stations 3G1, 3G2, 3G4, the irrigation management application may automatically cause (or a user may manually cause) active irrigation by the irrigation stations 3G1, 3G2, 3G4 to be paused or delays the scheduled start time of the watering by the irrigation stations 3G1, 3G2, 3G4 until it is determined that the mobile device 2220 leaves the portion of the irrigation area that is irrigated by the irrigation stations 3G1, 3G2, 3G4.

For example, in the example shown in FIG. 22A, the person 2270 is approaching the green of hole 3 on a golf course which the irrigation stations 3G1, 3G2, 3G4 are actively irrigating (the irrigation station icons 2212, 2214, 2216 corresponding to the irrigation stations 3G1, 3G2, 3G4 in FIG. 22A may be displayed as discussed above in color (e.g., blue, etc.) or may pulsate/toggle between a larger and smaller size to indicate that the corresponding irrigation stations 3G1, 3G2, 3G4 are actively irrigating). In an embodiment, GPS data sent from the mobile device 2220 to the electronic device running the irrigation management application indicates that the person 2270 is approaching the green. In one example, since the exemplary user interface 2200 visually indicates to the user of the central computer 112*a* that a person 2270 is approaching a portion of the irrigation area being actively irrigated by the irrigation stations it is known that irrigation is active at stations 3G4, 3G1, and 3G2, the irrigation management application 114*a* causes signaling to be output to irrigation stations 3G1, 3G2, 3G4 to turn them off or pause them while the person 2270 is on the green (the irrigation icons 2212, 2214, 2216 are shown as being uncolored/unshaded within the user interface 2200 of FIG. 22B to visually indicate to the user that they are not actively watering). When it is determined, based on the GPS data received from the mobile device 2220 of the person 2270 that the person 2270 has left the green, the irrigation management application is caused to output signaling to irrigation stations 3G1, 3G2, 3G4 to turn them back on and resume irrigation.

In some embodiments, as shown in FIG. 23, the irrigation management application 114*a* includes an artificial intelligence (AI) model 2380 trained to take various inputs and provide suggestions to users of the irrigation management application (e.g., landscape managers, homeowners, etc.). The AI model 2380 may also be referred to as a machine learning model and/or a neural network (which may be a convolutional neural network, etc.). In some embodiments, the AI model 2380 is trained using many sets of example data, and once trained, is set up to receive current data for the irrigation area where the irrigation system is installed. In some aspects, the input data 2382 can include weather data obtained (e.g., by the irrigation management application) from third party weather servers and/or local weather sensors, local soil and other plant condition sensors, plant life information (e.g., type, crop coefficient, root depth, known growth patterns), soil type data, terrain slope, shade, water schedule data, and so on. In some embodiments, the AI model 2380 analyzes the obtained input data and then makes suggestions to the user (e.g., landscape manager, homeowner, etc.). The water suggestions 2384, which the irrigation management application 114 may cause to be visually displayed in a user interface of a display of an electronic device of a user (e.g., computer 118, mobile device 120*a*) can include, for example, suggestions to the user for upcoming day/s that would be good for scheduling growing degree days, fertilization days, and overseeding days, etc. An example of a third party that provides AI models and tools to provide insights and suggestions for irrigation is provided by Mesur.IO, see https://mesur.io/solutions-landing, incorporated herein by reference.

It is understood that embodiments of the systems/methods of managing an irrigation system, as well as embodiments of the irrigation management application and related features described herein may be implemented (via a computer-implemented application such as a web browser, mobile application, or the like) in one or more of a central control irrigation system, a cloud based irrigation control system, a stand alone irrigation controller, a mobile device such as a mobile computer tablet, phone, or wearable device, or the like. It is understood that the irrigation management system hardware and software components and related features described in reference to various embodiments of systems and methods herein may be implemented for managing (e.g., monitoring and/or controlling) irrigation systems installed in various environments, including but not limited to golf, landscape, agricultural, residential, etc. It is understood that in some embodiments, the irrigation management application to implement one or more features described herein may be implemented across multiple devices and components in wired and/or wireless communications with each. In some embodiments, the irrigation management application is installed on a user's computer equipment or mobile computing device and may use other functionalities native to the host computer device to display to the user a user interface that provides the user with the irrigation system managing functionality as described herein.

It is noted that many of the features described herein entail the display of information to users via various user interfaces. In some embodiments, whether certain data and features are displayed on the user interfaces and/or allow for users to enter/adjust information or data via the user interfaces, displayed/entered/adjusted data can be coupled to and part of the irrigation control system such that an irrigation management application can output various control signals that will cause or change the irrigation of portions of a landscape and/or cause or change other actions in the irrigation system. For example, entered data may result in irrigation schedules or on/off/pause/resume commands to be sent to various field devices to open and close valves of irrigation stations resulting in water emission from sprinkler devices. Similarly, data retrieved from the irrigation system is retrieved in some embodiments from irrigation field components under command and control by the irrigation management application.

Some embodiments provide irrigation management systems that comprises an irrigation management application for use in monitoring and/or controlling irrigation of at least one irrigation area, which may include a plurality of irrigation stations. The irrigation management application can be configured to be executed by an electronic device including a control circuit, and a memory. The irrigation management application can be stored in the memory, and when executed by the control circuit, the irrigation management application is configured to cause a user interface to be displayed on a display to a user, where the user interface can in some embodiments include a map of a geographic region that includes the at least one irrigation area, and cause the user interface to display station icons on the map, each station icon of the station icons corresponding to one of the plurality of irrigation stations. In some embodiments, each of the station icons visually indicates an operational status of an irrigation station corresponding to a respective one of the station icons. The electronic device, in some implementations, comprises one of a computer, a server, and a mobile handheld device. The display can be coupled to or part of the electronic device, and when executed, the irrigation management application can be configured to cause the user interface to be displayed on the display by transmitting instructions to the display.

The display, in some embodiments, can be coupled to or part of another electronic device remote from the electronic device and configured to communicate with the electronic device, and when executed, the irrigation management application can be configured to cause the user interface to be displayed on the display by transmitting signals to the another electronic device, and the another electronic device can be configured to cause the user interface to be displayed on the display. The irrigation management system can further include another irrigation management application stored in a memory of the other electronic device. In some embodiments, the irrigation management application is distributed between the electronic device and one or more additional electronic devices such that at least portions of the irrigation management application are stored in the memory and a memory of the one or more additional electronic devices. The electronic device can comprise a mobile electronic device and the irrigation management application can comprise an application configured to link to a remote computer device or server configured to provide signaling to cause the application to display the user interface. Additionally or alternatively, the electronic device can comprise a mobile electronic device and the irrigation management application can comprise a browser application configured to display the user interface based on signaling received from a remote computer device or server in order to provide irrigation management functionality to the user via the user interface.

In some embodiments, the operational status comprises a visual indication of whether the irrigation stations corresponding to the station icons are on or off. Similarly, the station icon can comprise, in some embodiments, an animated image that changes between different sizes to indicate when the operational status of the irrigation station corresponding to the station icon is on. The operational status additionally or alternatively can comprise a visual indication of whether the irrigation station corresponding to the station icon is working properly or malfunctioning. The operational status, in some instances, can comprise a visual indication representing an alert that the irrigation station corresponding to the station icon is malfunctioning. The user interface can be configured to display a diagnostic report listing the alert visually indicated by the station icon responsive to the user hovering over or clicking on the station icon. In some implementations, the operational status comprises a visual indication representing an alert that the irrigation station did not pass a diagnostic test.

The user interface, in some embodiments, can be configured, in response to a selection by the user of one or more of the station icons visible on the map, to generate an interactive irrigation station control panel. In some embodiments, the interactive irrigation station control panel can be configured to permit the user to view at least one of: a name indicator that indicates an identifier assigned to an irrigation station associated with the station icon selected by the user; a nozzle type indicator indicating a nozzle type of one or more sprinklers controlled by the irrigation station associated with the station icon selected by the user; a remaining watering time countdown for the irrigation station associated with the station icon selected by the user; a graphical indicator of the remaining watering time in relation to a total watering time for which the irrigation station associated with the station icon selected by the user was activated; a dry run forecast of an estimated time duration of a next watering event for the irrigation station associated with the station icon selected by the user; a last run indicator that indicates a date and time of a last watering event completed by the irrigation station associated with the station icon selected by the user; a sprinkler type indicator that indicates a type of one or more sprinklers used by the irrigation station associated with the station icon selected by the user; and active adjustments indicator that indicates all active operational attribute adjustments for the irrigation station associated with the station icon selected by the user. The graphical indicator of the remaining watering time can include a geometric shape that represents the total watering time for which the irrigation station associated with the station icon selected by the user was activated, and a shaded or colored portion of the geometric shape that indicates the remaining watering time for the irrigation station associated with the station icon selected by the user.

The nozzle type indicator, in some embodiments, can be displayed within the interactive irrigation station control panel in a color that is specific to the nozzle type of the sprinklers controlled by the irrigation station associated with the station icon selected by the user. The station icon can be configured to visually indicate a nozzle type of one or more sprinklers controlled by the irrigation station corresponding to the station icon. The station icon can be displayed, in some embodiments, using a color that indicates the nozzle type of the one or more sprinklers controlled by the irrigation station corresponding to the station icon. In some implementations, the station icon associated with an irrigation station that is actively irrigating can be associated with a graphical indicator visually indicating a remaining watering time by the irrigation station and the remaining watering time by the irrigation station in relation to a total watering time for which the irrigation station was activated. The graphical indicator of the remaining watering time can include a geometric shape that represents the total watering time for which the irrigation station was activated and a shaded or colored portion of the geometric shape that represents the remaining watering time for the irrigation station.

In some embodiments, a station icon associated with an irrigation station that is actively irrigating can be associated with an information field that displays an identifier of the station icon and a countdown of a remaining watering time by the irrigation station. An operational status of at least one station icon can visually indicate, in some instances, that at least one operational attribute of the irrigation station corresponding to the station icon has been adjusted. In some embodiments, at least one of the station icons can visually indicate at least one informational attribute of the irrigation station corresponding to a respective one of the station icons. In some instances, at least one operational attribute can be visually indicated using one of a plurality of colors, each of the plurality of colors corresponding to different operational attributes of the irrigation station corresponding to the station icon. In some embodiments, at least one operational attribute can be visually indicated using one of a plurality of shades of a color, each shade of the color corresponding to a different value range of the at least one operational attribute of the irrigation station corresponding to the station icon. For example, a first shade of the color can indicate that a run time of the irrigation station was adjusted by about 10-70%, a second shade of the color can indicate that the run time of the irrigation station was adjusted by about 70-130%, and a third shade of the color can indicate that the run time of the irrigation station was adjusted by about 130-200%, and wherein the second shade can, for example, be darker than the first shade and the third shade can be darker than the second shade. The station icon can be associated with a colored shape surrounding the station icon, where the colored shape surrounding the station icon can be of a color that is different than a color of the station icon. The color of the colored shape surrounding the station icon can indicate different values of the at least one operational attribute of the irrigation station corresponding to the station icon.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory. The irrigation management application can be stored in the memory, and when executed by the control circuit, the irrigation management application can be configured to: cause a user interface to be displayed on a display to a user, where the user interface can include a map of a geographic region that includes the at least one irrigation area; and cause the user interface to display station icons on the map, where each station icon of the station icons corresponding to an irrigation station of the plurality of irrigation stations. The station icon can visually indicate a location type of the at least one irrigation area where the irrigation station corresponding to the station icon is located.

In some embodiments, the station icon cab be displayed using one of a plurality of colors. For example, a first of the colors can represent a first location type of the at least one irrigation area and a second of the colors can represent a second location type of the at least one irrigation area. The first location type can be different from the second location type. The station icon, in some implementations, can additionally or alternatively be displayed using one of a plurality of shades of a color. For example, a first shade of the color can represent a first location type of the at least one irrigation area and a second shade of the color can represent a second location type of the at least one irrigation area, wherein the first location type is different from the second location type.

Some embodiments provide irrigation management systems comprising: an irrigation management application for use in monitoring and/or controlling irrigation of at least one irrigation area including a plurality of irrigation stations. The irrigation management application can be configured to be executed by an electronic device including a control circuit, and a memory, wherein the irrigation management application can be stored in the memory, and when executed by the control circuit, the irrigation management application is configured to: cause a user interface to be displayed on a display to a user, the user interface including a map of a geographic region that includes the at least one irrigation area; and cause the user interface to display station icons on the map, each station icon of the station icons corresponding to an irrigation station of the plurality of irrigation stations. The station icon can be associated with a visual marker that indicates that an operational parameter of the irrigation station corresponding to the station icon has been adjusted relative to a scheduled operational parameter. The visual marker, in some implementations, can comprise a single upwardly-pointing symbol that indicates that the operational parameter of the irrigation station corresponding to the station icon has been adjusted to be greater than the scheduled operational parameter. The visual marker, in some embodiments, can comprise two or more upwardly-pointing symbols indicating that the operational parameter of the irrigation station corresponding to the station icon has been adjusted to be greater than the scheduled operational parameter and was increased by a larger value than an adjustment of the scheduled operational parameter indicated by the single upwardly-pointing symbol. In some embodiments, the visual marker an comprise a single downwardly-pointing symbol that indicates that the operational parameter of the irrigation station corresponding to the station icon has been adjusted to be less than the scheduled operational parameter. The visual marker can, in some implementations, comprises two or more downwardly-pointing symbols indicating that the operational parameter of the irrigation station corresponding to the station icon has been adjusted to be less than the scheduled operational parameter and was decreased by a larger value than an adjustment of the scheduled operational parameter indicated by the single downwardly-pointing symbol. The operational parameter indicated by the visual marker associated with the station icon can, for example, be a run time of the irrigation station corresponding to the station icon, and wherein the visual marker indicates that the run time of the irrigation station corresponding to the station icon is zero such that the irrigation station is inactive.

Some embodiments provide irrigation management system comprising an irrigation management application for use in monitoring and/or controlling irrigation of at least one irrigation area including a plurality of irrigation stations. The irrigation management application can be configured to be executed by an electronic device including a control circuit, and a memory, where the irrigation management application can be stored in the memory, and when executed by the control circuit, the irrigation management application can be configured to: cause a user interface to be displayed on a display to a user, the user interface including a map of a geographic region that includes the at least one irrigation area; cause the user interface to display station icons on the map, each station icon of the station icons corresponding to an irrigation station of the plurality of irrigation stations; and cause the user interface to display an informational field associated with one or more of the station icons, wherein each informational field visually indicates a value for one or more operational parameters of an irrigation station associated with the one or more of the station icons. The one or more operational parameters can, in some instances, comprise one or more of a voltage measured the irrigation station associated with the station icon, a pressure measured at the irrigation station associated with the station icon, a flow value sensed at the irrigation station associated with the station icon, and an elevation of the irrigation station associated with the station icon. The informational field associated with the station icon can, in some implementations, visually indicate the value for a voltage and the value for a pressure measured at the irrigation station associated with the station icon.

In some embodiments, the irrigation management application can be further configured to cause the user interface to display a station identifier associated with each one of the station icons, where the station identifier can identify the irrigation station associated with respective ones of the station icons, and the station identifier can be displayed within the user interface adjacent to the informational field associated with a respective one of the station icons.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory, where the irrigation management application can be stored in the memory. When executed by the control circuit, the irrigation management application can be configured to: receive, via a wide area network, aerial map imagery corresponding to the at least one irrigation area from a map service server; cause a user interface to be displayed on a display to a user, the user interface including a map layer and an irrigation control layer superimposed with the map layer, wherein the map layer comprises the aerial map imagery, wherein the irrigation control layer comprises station icons at locations of the aerial map imagery corresponding to the plurality of irrigation stations; store the aerial map imagery received from the map service server in the memory; and cause, in an event connectivity to the wide area network is interrupted or unavailable, the user interface including the map layer and the irrigation control layer to be displayed on the display to the user, wherein the map layer comprising the aerial map imagery can be retrieved to be displayed to the user from the memory instead of from the wide area network. The irrigation management application can be configured to receive the aerial map imagery corresponding to the at least one irrigation area from the map service server via the wide area network and via the other electronic device. In some embodiments, the irrigation management application can be configured to retrieve, in the event connectivity to the wide area network is interrupted or unavailable, the aerial map imagery received from the map service server from the memory. Some embodiments include a buffer memory that can be configured for temporary storage of data, where the memory can be configured to non-volatilely store the aerial map imagery received from the map service server.

An irrigation management system is provided in some embodiments comprising an irrigation management application for use in monitoring and/or controlling irrigation of at least one irrigation area including a plurality of irrigation stations. The irrigation management application cab be configured to be executed by an electronic device including a control circuit, and a memory, wherein the irrigation management application can be stored in the memory. When executed by the control circuit, the irrigation management application can be configured to: cause a user interface to be displayed on a display to a user, the user interface including a map of a geographic region that includes the at least one irrigation area; cause the user interface to display a multi-station selector feature to allow a user to select two or more of the plurality of irrigation stations associated with the at least one irrigation area; and cause, responsive to a selection by the user of the two or more of the irrigation stations, the user interface to display an interactive control menu overlaid on a portion of the map to allow a control selection to be applied to each of the two or more irrigation stations selected by the user. In some embodiments, responsive to a selection by the user of the control selection within the interactive control menu, irrigation by the two or more irrigation stations selected by the user can be activated, deactivated, paused, or resumed.

The multi-station selector feature, in some embodiments, can comprise a plurality of user-selectable polygons on the map, where each of the user-selectable polygons can define a portion of the at least one irrigation area. A selection by the user of a given polygon can, in some instances, comprise a selection by the user of one or more of the irrigation stations associated with the given polygon. In some instance each of the plurality of user-selectable polygons on the map can correspond to a given portion of the at least one irrigation area. Each given portion of the at least one irrigation area can correspond, for example, to plant life to be irrigated being of a similar type, or to plant-free portions of the at least one irrigation area being of a similar type.

The interactive control menu, in some implementations, can include an edit control selection configured to permit the user to edit a size or shape of the given polygon. In some embodiments, the user interface can be configured, in response to an interaction by the user with the edit control selection, to display a plurality of points defining a perimeter of the given polygon, where the user interface can permit the user to edit an overall size or shape of the given polygon by moving one or more of the plurality of points in one or more directions. The user interface, in some implementations, can be configured, in response to an interaction by the user with the edit control selection, to activate a drawing tool that permits the user to control movement of the drawing tool to draw a custom-shape polygon shape defining a portion of the at least one irrigation area and representing a user selection of the irrigation stations associated with the custom-shape polygon shape. The multi-station selector feature, in some implementations, can be configured to allow the user to add a generic-shape polygon to the map user interface and edit a shape of the generic-shape polygon to define a custom-shape polygon defining a portion of the at least one irrigation area and representing a user selection of the irrigation stations associated with the custom-shape polygon. The generic-shape polygon can, in some applications, have one of a square shape, a rectangle shape, a circle shape, an oval shape, a triangle shape, and a trapezoid shape.

In some embodiments, the multi-station selector feature can be configured to allow the user to select the two or more of the irrigation stations individually from the map. The multi-station selector feature, can in some instances, be configured to allow the user to unselect a previously selected irrigation stations individually from the map. When executed by the control circuit, the irrigation management application in some embodiments can be configured to cause the user interface to display a plurality of station icons, each of the station icons corresponding to one of the irrigation stations at corresponding locations of the map, where the multi-station selector feature can be configured to allow the user to select the two or more of the irrigation stations individually from the map by selecting individual ones of the station icons. The user interface can in some implementations permit the user to select one or more of the station icons displayed on the map by clicking or tapping on the one or more of the station icons. The user interface can be configured, in response to a selection by the user of the one or more of the station icons displayed on the map, to generate a graphical element associated with the one or more of the station icons selected by the user to indicate that the one or more of the station icons have been selected by the user.

In some embodiments, the irrigation management application can be further configured to cause the user interface, responsive to a selection by the user of the multi-station selector feature, to display the interactive control menu overlaid on the portion of the map to allow the control selection to be applied to the irrigation stations corresponding to the one or more station icons selected by the user. The interactive control menu can indicate, in some instances, a total number of the station icons selected by the user. The interactive control menu can include an interactive control selection icon configured to activate irrigation by the one or more of the irrigation stations corresponding to the one or more station icons selected by the user. In some embodiments, the irrigation management application can be further configured to cause the user interface, responsive to a selection by the user of the interactive control selection icon, to generate a run duration sub-menu that can be configured to permit the user to set an irrigation run duration of the one or more of the irrigation stations corresponding to the one or more station icons selected by the user. In some embodiments, each of the station icons is associated with a user-visible identifier that identifies a respective one of the station icons, wherein the user-visible identifier of a station icon indicates at least one of: a location type where an irrigation station associated with a given station icon is located; and a sequential number assigned to the given station icon within the location type.

Irrigation management systems are provided in some embodiments that comprise an irrigation management application for use in monitoring and/or controlling irrigation of at least one irrigation area including a plurality of irrigation stations. The irrigation management application can be configured to be executed by an electronic device including a control circuit, and a memory, where the irrigation management application is stored in the memory. The irrigation management application, when executed by the control circuit, can be configured to: cause a user interface to be displayed on a display to a user, the user interface including a map layer and an irrigation control layer superimposed with the map layer, wherein the map layer comprises aerial map imagery, wherein the irrigation control layer comprises station icons at locations of the aerial map imagery corresponding to the plurality of irrigation stations; and cause the user interface to display one or more supplemental image layers each comprising a visual representation of data and superimposed with the map layer and the irrigation control layer. In some embodiments, each of the one or more supplemental image layers is partially transparent such that portions of the map layer underlying the one or more supplemental image layers are visible to the user. The user interface can include an identifier in association with each one of the one or more supplemental image layers to uniquely identify each one of the one or more supplemental image layers. The user interface, in some embodiments, further comprises a location icon indicating a physical location of the electronic device on the aerial map imagery. At least one of the location icons and the station icons can overlay the one or more supplemental image layers.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory, wherein the irrigation management application is stored in the memory. The irrigation management application, when executed by the control circuit, can be configured to cause a user interface to be displayed on a display to a user. The user interface can, in some embodiments, include a listing of the irrigation stations in the at least one irrigation area by irrigation station identifier, user-modifiable irrigation station selection fields that permit the user to select one or more of the irrigation stations in the listing, and a plurality of interactive icons that permit the user to control irrigation by the one or more of the irrigation stations selected by the user. The user interface, in some implementations, can further include a listing of at least one operational attribute of each one of the irrigation stations in the listing of the irrigation stations. The interactive icons can be configured to permit the user to sort, filter, and/or search the irrigation stations by the at least one operational attribute.

In some instances, the user interface can further include status icons associated with each one of the irrigation stations in the listing, and each of the status icons can visually indicate whether an irrigation station associated with a respective one of the status icons is operating normally or malfunctioning. The user interface can include an interactive name filter feature that permits the user to sort, filter, and search the irrigation stations based at least on the irrigation stations having irrigation station identifiers that share one or more starting characters or that contain two or more identical adjacent characters. In some embodiments, the user interface further includes a location identifier of each of the irrigation stations indicating a location type of each of the irrigation stations within the at least one irrigation area; and an interactive location filter feature that permits the user to sort, filter, and search the irrigation stations based at least on the irrigation stations having location identifiers that share two or more starting characters or containing one or more identical characters.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory, wherein the irrigation management application is stored in the memory. When executed by the control circuit, the irrigation management application, in some embodiments, can be configured to: cause a user interface to be displayed on a display to a user, the user interface including a table of data relating to one or more characteristics of an irrigation system, wherein the table includes rows and columns of the data; and cause the user interface to be displayed such that values of the data are displayed in multiple colors, each color indicating different ranges of the values of the data. In some instances, at least two of the colors comprise different shades of one color. In some embodiments, one of the at least two of the colors additionally or alternatively can comprise a second color different than the one color, the second color to visually indicate a particular data value as an outlier value. The colors, in some implementations, can include a darker color that indicates a higher range of the values of the data than a lighter color, and/or a lighter color that indicates a higher range of the values of the data than a darker color. The multiple colors, in some embodiments, can comprise a first color and a second color, where the first color can indicate for example that the data value has been increased from a nominal value and the second color can indicate for example that the data value has been decreased from the nominal value.

In some embodiments, the characteristics can comprise at least one of an irrigation station run time, an irrigation station water usage, and an irrigation station alert occurrence. The values can comprise at least one of run times, number of gallons used, number of inches of irrigation applied, number of watering passes applied, irrigation station voltage, irrigation station pressure, irrigation station flow, irrigation station age/date code, precipitation rate, and number of irrigation station alerts. In some embodiments, the characteristics comprise at least one of an irrigation station or area run time, an irrigation station or area water usage, a number of irrigation station or area watering passes, an irrigation station voltage, an irrigation station pressure, an irrigation flow, an irrigation flow rate, an irrigation component age, an irrigation station precipitation rate, and a number of irrigation station alerts.

Some embodiments provide irrigation management systems comprising an irrigation management application for use in controlling irrigation of at least one irrigation area including a plurality of irrigation stations, where the irrigation management application can be configured to be executed by an electronic device including a control circuit, and a memory. The irrigation management application can be stored in the memory, and when executed by the control circuit, the irrigation management application can be configured to cause a user interface to be displayed on a display to a user, the user interface including listing of the irrigation stations in the at least one irrigation area by irrigation station identifier, and cause the user interface to display an active adjustment panel over a portion of the listing and proximate to a given irrigation station, where the panel indicating a programmed run time, separate run time adjustments, and an adjusted run time for the given irrigation station.

The irrigation management application, in some implementations, can be configured to cause, in response to a user selection of the given irrigation station in the listing, the user interface to display the active adjustment panel over the portion of the listing and proximate to the selected irrigation station. In some embodiments, the irrigation management application can be configured to cause, in response to a user hover action over the given irrigation station in the listing, the user interface to display the active adjustment panel over the portion of the listing and proximate to the given irrigation station. The separate run time adjustments can include one or more of a program adjust value, a schedule adjust value, a seasonal adjust value, a weather-based adjustment value, an evapotranspiration (ET)-based adjust value, system adjustment value, a manual adjust value, and a custom adjust value. The adjusted run time can, in some implementations, be calculated from the programmed run time and the separate run time adjustments.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory, where the irrigation management application is stored in the memory. When executed by the control circuit, the irrigation management application is configured to: cause a user interface to be displayed on a display to a user, the user interface including a listing of the irrigation stations in the at least one irrigation area with corresponding irrigation station selectors; and cause the user interface, responsive to a selection of a group of multiple irrigation stations by a user via the irrigation station selectors, to display an interactive batch edit menu that permits the user to select at least one operational attribute and assign values to the at least one operational attribute to be applied to each irrigation station of the group of multiple irrigation stations. In some embodiments, the irrigation management application can be configured to cause the user interface to display the interactive batch edit menu that permits the user to select the at least one operational attribute and assign values to only the at least one operational attribute to be applied to each irrigation station of the group of multiple irrigation stations such that the user is not required to assign values to non-selected ones of the operational attributes.

The irrigation management application can be configured, in some embodiments, to cause the user interface to display the interactive batch edit menu that permits the user to select the at least one operational attribute and assign the values to the at least one operational attribute to be applied to each irrigation station of the group of multiple irrigation stations in a single operation of the interactive batch edit menu. The listing of the irrigation stations, in some implementations, can be caused to be displayed in rows and the corresponding irrigation station selectors each can comprise a selection box in each row adjacent each irrigation station of each row. In some instances the at least one operational attribute of the interactive batch edit menu comprises at least one of: a run time, a cycle time, a rotation time, a soak time, a station adjust, a weather adjust, a flow rate per emitter, a sprinkler type, an emitter precipitation rate, a flow zone assignment, a crop coefficient, a suspend setting, an assigned station area, and an assigned station sub-area. The irrigation management application can be further configured, in some instances, to cause the user interface, responsive to a user selection the at least one operational attribute from the interactive batch edit menu, to display a value assignment menu configured to allow the user to assign values to the at least one operational attribute selected by the user in the interactive batch edit menu. The value assignment menu can provide a field that permits the user to input a value for the at least one operational attribute selected by the user, or provides a starting value of the at least one operational attribute selected by the user for the user to adjust. The irrigation control system can be configured to update station programming to control the irrigation stations in according with the assigned values for the at least one operational attribute selected by the user. The listing of the irrigation stations can include a multiple station selector configured to select multiple ones of the irrigation stations.

Some embodiments provide irrigation management systems comprising an irrigation management application for use in monitoring and/or controlling irrigation of at least one irrigation area including a plurality of irrigation stations. The irrigation management application can be configured to be executed by an electronic device including a control circuit, and a memory, wherein the irrigation management application is stored in the memory. The irrigation management application, when executed by the control circuit, can be configured to: cause a user interface to be displayed on a display to a user, the user interface including: a listing of the irrigation stations in the at least one irrigation area with corresponding irrigation station selectors; and an interactive station move or reorder feature. The interactive station move or reorder feature which, when interacted with by the user, can be configured to cause, the user interface to display at least one of: an option for the user to reorder a given irrigation station in the listing to allow the user to shift the given irrigation station into a different position within the listing; and an option for the user to move the given irrigation station to another listing of irrigation stations. In some embodiments, all operational attributes of the given irrigation station and others of the plurality of irrigation stations in the listing or the other listing are retained following reordering or moving. When the option to reorder is selected by the user, the user interface can be caused to display a reorder station menu, the reorder station menu allowing the user to select a new position in the listing for the given irrigation station, where, when the new position is selected, the user interface is caused to redisplay the list of irrigation stations within the given irrigation station in the new position and remaining irrigation stations shifted in view of the new position.

The reorder station menu, in some implementations, can be caused to display a user selection to apply a new default name for the given irrigation station. Similarly, the reorder station menu can, in some instances, be caused to display a user selection to re-sequence the irrigation stations in the listing with default station names to remove gaps in naming. When the option to move is selected by the user, the user interface can in some embodiments be caused to display a move station menu, the move station menu allowing the user to select the other listing of irrigation stations, wherein, when the other listing is selected, the user interface can be caused to redisplay the list of irrigation stations without the given irrigation station. In some embodiments, the move station menu can provide a plurality of listings of irrigation stations including the other listing that may be selected by the user. The plurality of listings selectable via the move station menu can in some instances permit the user to move the given irrigation station to a selectable listing based on user selection of one or more of an area portion of the at least one irrigation area to be irrigated, a plant type area portion of the at least one irrigation area to be irrigated, a non-plant feature area portion of the at least one irrigation area to be irrigated, and a sub-area portion of the area portion of the at least one irrigation area to be irrigated.

In some embodiments, the move station menu can be caused to display a user selection to alter attributes of the given irrigation station to be consistent with default attributes of the irrigation stations of the other listing. The move station menu can in some implementations be caused to display a user selection to apply a new default name for the given irrigation station to be consistent with default names of the irrigation stations of the other listing. When the other listing is selected, the user interface can be caused to redisplay the list of irrigation stations without the given irrigation station including a gap in place of the moved irrigation station and provide a user selectable option to remove the gap and re-sequence the list of irrigation stations. In some embodiments, the irrigation management system can be configured to update station programming to control the given irrigation station in accordance with the operational attributes.

Some embodiments provide irrigation management systems comprising an irrigation management application for use in monitoring and/or controlling irrigation of at least one irrigation area including a plurality of irrigation stations, wherein the irrigation management application can be configured to be executed by an electronic device including a control circuit, and a memory, wherein the irrigation management application is stored in the memory. When executed by the control circuit, the irrigation management application can be configured to cause a user interface to be displayed on a display to a user, the user interface including a flow tree listing including a hierarchy of expandable flow element layers each having flow elements. A first expandable flow element layer can comprise a pump layer indicating a listing of pump elements in the system. A second expandable flow element layer can comprise a flow branch layer indicating a listing of one or more flow branch elements associated with each pump element of the pump layer. A third expandable flow element layer can comprise a flow zone layer indicating a listing of one or more flow zone elements associated with each flow branch element of the branch layer. The irrigation management application can, in some embodiments, further be configured to cause the user interface to allow a user to select a given flow element in the hierarchy, and cause, in response to a selection of the given flow element by the user, the user interface to display an option to move the given flow element.

In response to a selection by the user of the option to move the given flow element, the user interface can be configured to allow the user to move the selected flow element to a new location in the hierarchy of expandable flow element layers. In some embodiments, each of the pump elements, the flow branch elements and the flow zone elements are sequentially named, and wherein one or more of the pump elements, the flow branch elements and the flow zone elements are automatically sequentially renamed based on movement of the flow element by the user. A hierarchy of expandable flow element layers can include, in some implementations, a fourth expandable flow element layer comprising a sprinkler layer indicating a listing of one or more sprinkler elements associated with each flow zone element of the flow zone layer. In some embodiments, one or more of the expandable flow element layers comprises multiple expandable flow element layers. The second expandable flow element layer can comprise a main flow branch layer indicating a listing of one or more main flow branch elements associated with each pump element of the pump layer, and one or more sub-flow branch layers each indicating a listing of one or more sub-flow branch elements associated with each main flow branch element. The option to move the given flow element, in some implementations, can comprise a flow element move menu to allow the user to define a new location in the hierarchy of expandable flow element layers. XXX The following patent documents are incorporated in their entirety herein by reference:

U.S. Pat. No. 10,609,878, granted Apr. 7, 2020, titled WIRELESS REMOTE IRRIGATION CONTROL;

U.S. Pat. No. 11,089,746, granted Aug. 17, 2021, titled WIRELESS REMOTE IRRIGATION CONTROL;

U.S. Pat. No. 9,258,952, granted Feb. 16, 2016, titled VOLUMETRIC BUDGET-BASED IRRIGATION CONTROL;

U.S. Pat. No. 8,849,461, granted Sep. 30, 2014, titled METHODS AND SYSTEMS FOR IRRIGATION CONTROL;

U.S. Pat. No. 9,703,275, granted Jul. 11, 2017, titled METHODS AND SYSTEMS FOR IRRIGATION AND CLIMATE CONTROL;

U.S. Publication No. 2021/0229124, published Jul. 29, 2021, titled IRRIGATION CONTROL BASED ON A USER ENTERED NUMBER OF WATERING PASSES;

U.S. Publication No. 2009/0099701, published Apr. 16, 2009, titled REMOTE ACCESS TO IRRIGATION CONTROL SYSTEMS); and U.S. Provisional No. 63/188,997, filed May 14, 2021, titled AUTO-DETECTION OF DEVICES ON A MULTI-WIRE IRRIGATION CONTROL SYSTEM AND AUTO-ASSIGNMENT OF RECEIVERS TO IRRIGATION ZONES, Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:

1. An irrigation management system comprising:

a control circuit;

a memory; and an irrigation management application for use in monitoring and/or controlling irrigation of at least one irrigation area including a plurality of irrigation stations, wherein each irrigation station of the plurality of irrigation stations comprises a single independently-controllable irrigation valve fluidly connected to at least one sprinkler device, wherein irrigation is caused via the at least one sprinkler device when the single independently-controllable irrigation valve is opened, wherein the irrigation management application is stored in the memory, and wherein when executed by the control circuit, the irrigation management application is configured to:

cause a user interface to be displayed on a display to a user, the user interface including an interactive map of a geographic region that includes the at least one irrigation area, the plurality of irrigation stations displayed at different locations on the interactive map, and a multi-station selector icon displayed on a portion of the interactive map; and cause, responsive to a user selection of the multi-station selector icon, the user interface to:

display an interactive multi-station selector control menu including a plurality of control selections and overlaid on a portion of the interactive map, where the plurality of control selections comprises a turn on control and a turn off control;

allow the user to individually click or tap on each one of two or more of the plurality of irrigation stations displayed at the different locations on the interactive map to create a group of stations including the two or more of the plurality of irrigation stations, wherein the user clicking or tapping on each individual one of the two or more of the plurality of the irrigation stations represents a selection by the user of the two or more of the plurality of the irrigation stations for inclusion in the group of stations, wherein the user can interact with the interactive map to at least move, zoom in, and zoom out a displayable portion of the interactive map and can select any of the plurality of irrigation stations regardless of a location on the interactive map, an association of a given station with a particular area of the interactive map, and/or a station type;

display a selected stations icon indicating, by displaying a numerical value, how many of the plurality of irrigation stations on the interactive map that the user has individually clicked on or tapped on, wherein the numerical value increases by one each time the user individually clicks or taps on a single irrigation station, wherein the numerical value indicates a total number of stations in the group of stations;

allow the user to make a control selection of the plurality of control selections; and cause, responsive to the control selection, a selected control selection to be applied to each of the two or more of the plurality of the irrigation stations, wherein, when the turn on control is selected, a respective single independently-controllable irrigation valve of each of the two or more of the plurality of the irrigation stations is caused to open to cause irrigation from a respective at least one sprinkler device fluidly connected to the respective single independently-controllable irrigation valve of each of the two or more of the plurality of the irrigation stations, and wherein, when the turn off control is selected, the respective single independently-controllable irrigation valve of each of the two or more of the plurality of the irrigation stations is caused to close to prevent irrigation from the respective at least one sprinkler device fluidly connected to the respective single independently-controllable irrigation valve of each of the two or more of the plurality of the irrigation stations.

2. The system of claim 1, wherein, responsive to a selection by the user of the control selection within the interactive control menu, irrigation by the two or more of the plurality of the irrigation stations is activated, deactivated, paused, or resumed.

3. The system of claim 1, wherein the multi-station selector control menu comprises a plurality of user-selectable polygons on the map, each of the user-selectable polygons defining a portion of the at least one irrigation area; and wherein a selection by the user of a given polygon comprises a selection by the user of the irrigation stations associated with the given polygon.

4. The system of claim 3 wherein each of the plurality of user-selectable polygons on the map correspond to a given portion of the at least one irrigation area.

5. The system of claim 4 wherein each given portion of the at least one irrigation area corresponds to plant life to be irrigated being of a similar type, or to plant-free portions of the at least one irrigation area being of a similar type.

6. The system of claim 3, wherein the interactive control menu includes an edit control selection configured to permit the user to edit a size or shape of the given polygon.

7. The system of claim 6, wherein the user interface is configured, in response to an interaction by the user with the edit control selection, to display a plurality of points defining a perimeter of the given polygon; and wherein the user interface permits the user to edit an overall size or shape of the given polygon by moving one or more of the plurality of points in one or more directions.

8. The system of claim 6, wherein the user interface is configured, in response to an interaction by the user with the edit control selection, to activate a drawing tool that permits the user to control movement of the drawing tool to draw a custom-shape polygon shape defining a portion of the at least one irrigation area and representing a user selection of the irrigation stations associated with the custom-shape polygon shape.

9. The system of claim 1, wherein the multi-station selector control menu is configured to allow the user to add a generic-shape polygon to the map user interface and edit a shape of the generic-shape polygon to define a custom-shape polygon defining a portion of the at least one irrigation area and representing a user selection of the irrigation stations associated with the custom-shape polygon.

10. The system of claim 9, wherein the generic-shape polygon has one of a square shape, a rectangle shape, a circle shape, an oval shape, a triangle shape, and a trapezoid shape.

11. The system of claim 1, wherein the multi-station selector control menu is configured to allow the user to select the two or more of the plurality of the irrigation stations individually from the map.

12. The system of claim 11, wherein the multi-station selector control menu is configured to allow the user to unselect a previously selected irrigation stations individually from the map.

13. The system of claim 11, wherein when executed by the control circuit, the irrigation management application is configured to cause the user interface to display a plurality of station icons, each of the station icons corresponding to one of the irrigation stations at corresponding locations of the map; and wherein the multi-station selector control menu is configured to allow the user to select the two or more of the plurality of the irrigation stations individually from the map by selecting individual ones of the station icons.

14. The system of claim 13, wherein the user interface permits the user to select one or more of the station icons displayed on the map by clicking or tapping on the one or more of the station icons.

15. The system of claim 13, wherein, the user interface is configured, in response to a selection by the user of the one or more of the station icons displayed on the map, to generate a graphical element associated with the one or more of the station icons selected by the user to indicate that the one or more of the station icons have been selected by the user.

16. The system of claim 13, wherein the irrigation management application is further configured to cause the user interface, responsive to a selection by the user of the multi-station selector control menu, to display the interactive control menu overlaid on the portion of the map to allow the control selection to be applied to the irrigation stations corresponding to the one or more station icons selected by the user.

17. The system of claim 16, wherein the interactive control menu indicates a total number of the station icons selected by the user.

18. The system of claim 16, wherein the interactive control menu includes an interactive control selection icon configured to activate irrigation by the one or more of the irrigation stations corresponding to the one or more station icons selected by the user.

19. The system of claim 18, wherein the irrigation management application is further configured to cause the user interface, responsive to a selection by the user of the interactive control selection icon, to generate a run duration sub-menu, the run duration sub-menu configured to permit the user to set an irrigation run duration of the one or more of the irrigation stations corresponding to the one or more station icons selected by the user.

20. The system of claim 14, wherein each of the station icons is associated with a user-visible identifier that identifies a respective one of the station icons, wherein the user-visible identifier of a station icon indicates at least one of:

a location type where an irrigation station associated with a given station icon is located; and a sequential number assigned to the given station icon within the location type.

21. The irrigation management system of claim 1, wherein the multi-station selector control menu comprises an interactive tool icon which activates the multi-station selector control menu.

22. The irrigation management system of claim 1 wherein the irrigation management application is configured to cause, responsive to the selection by the user of the two or more of the plurality of the irrigation stations, the user interface to display the interactive control menu overlaid on the portion of the map while still displaying the portion of the map to allow the control selection to be applied to each of the two or more of the plurality of the irrigation stations.

23. The irrigation management system of claim 1, wherein the irrigation management application is configured to cause the user interface to display the multi-station selector control menu to allow the user to select a group of the two or more of the plurality of irrigation stations associated with the at least one irrigation area.

24. The irrigation management system of claim 23, wherein the irrigation management application is configured to cause, responsive to the selection by the user of the group of the two or more of the plurality of the irrigation stations, the user interface to display the interactive control menu overlaid on the portion of the map to allow a single control selection to be applied to each of the group of the two or more of the plurality of the irrigation stations.

25. The irrigation management system of claim 1, wherein another control selection of the plurality of control selections causes each single independently-controllable irrigation valve to close, if open, to stop irrigation from each of the at least one sprinkler device of each of the two or more of the plurality of the irrigation stations.

26. A method for managing irrigation comprising:

by a control circuit executing an irrigation management application stored in a memory, causing a user interface to be displayed on a display to a user, the user interface including an interactive map of a geographic region that includes at least one irrigation area, a plurality of irrigation stations displayed at different locations on the interactive map, and a multi-station selector icon displayed on a portion of the interactive map, wherein the irrigation management application is for use in monitoring and/or controlling irrigation of the at least one irrigation area including the plurality of irrigation stations, wherein each irrigation station of the plurality of irrigation stations comprises a single independently-controllable irrigation valve fluidly connected to at least one sprinkler device, wherein irrigation is caused via the at least one sprinkler device when the single independently-controllable irrigation valve is opened; and causing, responsive to a user selection of the multi-station selector icon, the user interface to:

display an interactive multi-station selector control menu including a plurality of control selections and overlaid on a portion of the interactive map, wherein the plurality of control selections comprises a turn on control and a turn off control;

allow the user to individually click or tap on each one of two or more of the plurality of irrigation stations displayed at the different locations on the interactive map to create a group of stations including the two or more of the plurality of irrigation stations, wherein the user clicking or tapping on each individual one of the two or more of the plurality of the irrigation stations represents a selection by the user of the two or more of the plurality of the irrigation stations for inclusion in the group of stations, wherein the user can interact with the interactive map to at least move, zoom in, and zoom out a displayable portion of the interactive map and can select any of the plurality of irrigation stations regardless of a location on the interactive map, an association of a given station with a particular area of the interactive map, and/or a station type;

display a selected stations icon indicating, by displaying a numerical value, how many of the plurality of irrigation stations on the interactive map the user has individually clicked on or tapped on, wherein the numerical value increases by one each time the user individually clicks or taps on a single irrigation station, wherein the numerical value indicates a total number of stations in the group of stations; and allow the user to make a control selection of the plurality of control selections;

cause, responsive to the control selection, a selected control selection to be applied to each of the two or more of the plurality of the irrigation stations;

when the turn on control is selected, causing a respective single independently-controllable irrigation valve of each of the two or more of the plurality of the irrigation stations to open to cause irrigation from a respective at least one sprinkler device fluidly connected to the respective single independently-controllable irrigation valve of each of the two or more of the plurality of the irrigation stations, and when the turn off control is selected, causing the respective single independently-controllable irrigation valve of each of the two or more of the plurality of the irrigation stations to close to prevent irrigation from the respective at least one sprinkler device fluidly connected to the respective single independently-controllable irrigation valve of each of the two or more of the plurality of the irrigation stations.

27. A non-transitory computer-readable medium storing instructions that, when executed by a control circuit, cause the control circuit to:

cause, by an irrigation management application, a user interface to be displayed on a display to a user, the user interface including an interactive map of a geographic region that includes at least one irrigation area, a plurality of irrigation stations displayed at different locations on the interactive map, and a multi-station selector icon displayed on a portion of the interactive map, wherein the irrigation management application is for use in monitoring and/or controlling irrigation of the at least one irrigation area including the plurality of irrigation stations, wherein each irrigation station of the plurality of irrigation stations comprises a single independently-controllable irrigation valve fluidly connected to at least one sprinkler device, wherein irrigation is caused via the at least one sprinkler device when the single independently-controllable irrigation valve is opened; and cause, responsive to a user selection of the multi-station selector icon, the user interface to:

display an interactive multi-station selector control menu including a plurality of control selections and overlaid on a portion of the interactive map, wherein the plurality of control selections comprises a turn on control and a turn off control;

allow the user to individually click or tap on each one of two or more of the plurality of irrigation stations displayed at the different locations on the interactive map to create a group of stations including the two or more of the plurality of irrigation stations, wherein the user clicking or tapping on each individual one of the two or more of the plurality of the irrigation stations represents a selection by the user of the two or more of the plurality of the irrigation stations for inclusion in the group of stations, wherein the user can interact with the interactive map to at least move, zoom in, and zoom out a displayable portion of the interactive map and can select any of the plurality of irrigation stations regardless of a location on the interactive map, an association of a given station with a particular area of the interactive map, and/or a station type;

display a selected stations icon indicating, by displaying a numerical value, how many of the plurality of irrigation stations on the interactive map the user has individually clicked on or tapped on, wherein the numerical value increases by one each time the user individually clicks or taps on a single irrigation station, wherein the numerical value indicates a total number of stations in the group of stations; and allow the user to make a control selection of the plurality of control selections;

cause, responsive to the control selection, a selected control selection to be applied to each of the two or more of the plurality of the irrigation stations;

when the turn on control is selected, causing a respective single independently-controllable irrigation valve of each of the two or more of the plurality of the irrigation stations to open to cause irrigation from a respective at least one sprinkler device fluidly connected to the respective single independently-controllable irrigation valve of each of the two or more of the plurality of the irrigation stations, and when the turn off control is selected, causing the respective single independently-controllable irrigation valve of each of the two or more of the plurality of the irrigation stations to close to prevent irrigation from the respective at least one sprinkler device fluidly connected to the respective single independently-controllable irrigation valve of each of the two or more of the plurality of the irrigation stations.

* * * * *